United States Patent [19]
Farrand

[11] Patent Number: 5,396,828
[45] Date of Patent: Mar. 14, 1995

[54] METHOD AND APPARATUS FOR REPRESENTING MUSICAL INFORMATION AS GUITAR FINGERBOARDS

[75] Inventor: Philip F. Farrand, Springfield, Mo.

[73] Assignee: Wenger Corporation, Minneapolis, Minn.

[21] Appl. No.: 178,444

[22] Filed: Jan. 6, 1994

Related U.S. Application Data

[63] Continuation of Ser. No. 415,051, Sep. 29, 1989, abandoned, which is a continuation-in-part of Ser. No. 245,565, Sep. 19, 1988, Pat. No. 4,960,031.

[51] Int. Cl.⁶ .................. G09B 15/04; G10G 3/04
[52] U.S. Cl. .................................... 84/462; 84/478
[58] Field of Search ................ 84/462, 477 R, 478

[56] References Cited

U.S. PATENT DOCUMENTS

| | | | |
|---|---|---|---|
| 3,926,088 | 12/1975 | Davis et al. | 84/462 |
| 4,080,867 | 3/1978 | Ratanangsu | 84/477 R |
| 4,318,327 | 3/1982 | Toups | 84/477 R |
| 4,392,409 | 7/1983 | Coad, Jr. et al. | 84/462 |
| 4,479,416 | 10/1984 | Clague | 84/462 |
| 4,958,551 | 9/1990 | Lui | 84/462 |

FOREIGN PATENT DOCUMENTS

WO88/08598 11/1988 WIPO .

OTHER PUBLICATIONS

"Computer Music Synthesis, Composition, and Performance", by Charles Dodge and Thomas A. Jerse, Schirmer Books, © 1985, pp. 36–44.

Primary Examiner—Stanley J. Witkowski
Attorney, Agent, or Firm—Merchant, Gould, Smith, Edell, Welter & Schmidt

[57] ABSTRACT

A method and apparatus for representing musical information as guitar fingerboards dynamically maps the guitar fingerboards to their associated chord notations as the fingerboards are being displayed or printed. The transposition and mapping of the chord symbol onto the fingerboard is accomplished using an array of fingerboard record that represent a chosen set of fretting combinations for a fingerboard and a system for matching the musical information represented by the associated chord with the appropriate fretting combination for that chord.

17 Claims, 15 Drawing Sheets

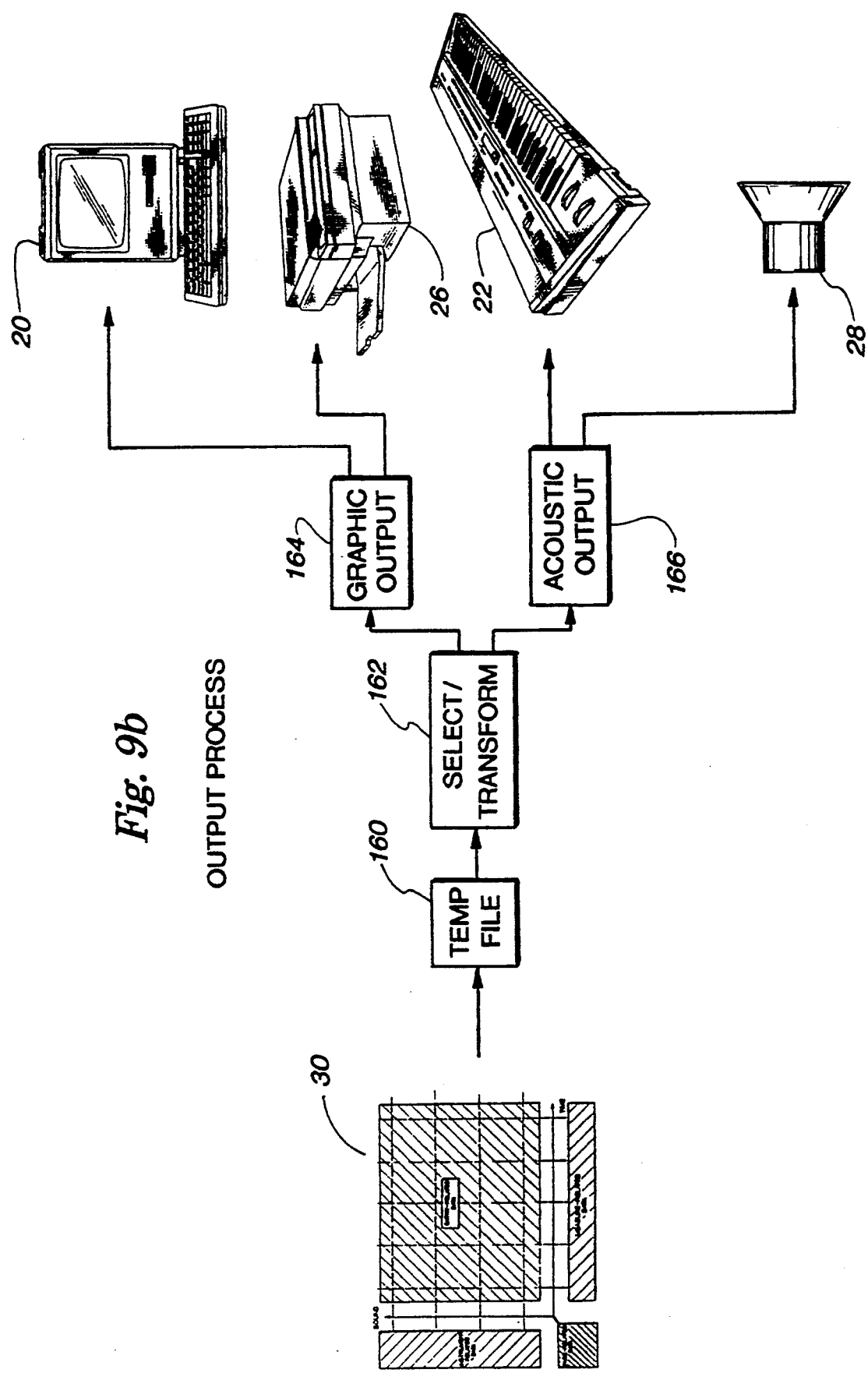

Fig. 10

| Frame 1 | Start 1 | End 1 | | OK |
| Entry Slot 0 | eENTRY Number 1 | | | Cancel |
| Duration [0] | Position [0] | | | Prev Entry |

- ☐ Legality
- ☐ Note/Rest
- ☐ U2 Launch
- ☐ Voice two
- ☐ fe n6b3
- ☐ Chord
- ☐ Clef Change
- ☐ Float Rest

- ☐ Grace
- ☐ Note Detail
- ☐ Mark Detail
- ☐ Text Detail
- ☐ Tuplet
- ☐ U2 Tup Para
- ☐ fe n4b1
- ☐ fe n4b0

- ☐ Ignore
- ☐ Beam Ext
- ☐ fe n3b1
- ☐ Special
- ☐ Beam/Beat
- ☐ Sec Beam
- ☐ U2 Beam
- ☐ Freeze Stem

- ☐ Stem Detail
- ☐ Cross Up
- ☐ Cross Down
- ☐ Reverse Up
- ☐ Reverse Dn
- ☐ Double Stem
- ☐ Split Stem
- ☐ Up/Down Create
Delete
Next Entry Note Slot 0

- ☐ Legality
- ☐ Tie Start

- ☐ Tie End
- ☐ Cross Note

- ☐ Upstem 2nd
- ☐ Dnstem 2nd

- ☐ Upstem Split
- ☐ Accidental

Prev Note
Create
Delete
Next Note

Note ID [0]  Displacement [0]  Raise/Lower [0]

My Jig

*This is an Irish jig.*

FIG. 14

METHOD AND APPARATUS FOR REPRESENTING MUSICAL INFORMATION AS GUITAR FINGERBOARDS

RELATED APPLICATION

This is a continuation of application Ser. No. 07/415,051, filed Sep. 29, 1989, and now abandoned, which application is a continuation-in-part of an application by the same inventor as the present application, entitled METHOD AND APPARATUS FOR REPRESENTING MUSICAL INFORMATION, Ser. No. 07/245,565, filed on Sep. 19, 1988, and issued on Oct. 2, 1990, as U.S. Pat. No. 4,960,031.

TECHNICAL FIELD

The present invention relates generally to the field of music processing devices and methods and apparatus for musical transcription and notation. More particularly, the present invention relates to a method and apparatus for representing musical information, specifically chord symbols, as guitar fingerboards.

BACKGROUND ART

Like human language, musical information is comprised of both aural and written components. The written language of music or musical notation has existed for more than eight centuries, but until the advent of the printing press musicians and composers were required to perform the time consuming task of manual notation in order to memorialize their compositions. Even with the printing press, music notation processing has always been a post composition process usually performed by someone other than the composer or musician. With the introduction of computers, special programming languages have been developed to handle the entry and printing of musical notation. These languages generally use a textually-based user interface that requires the user to enter lengthy sets of computer codes in order to generate a single page of musical notation.

In recent years, music transcription systems have been developed for personal computers in an effort to aid the musician and composer in using musical notation. Some of these transcriptions systems have even attempted to take acoustic musical information recorded as electronic messages and turn this information into standard musical notation or sheet music. Unfortunately, the transcription process of these systems is generally a one-way path and there are no provisions for capturing interpretive musical information, or for recreating the musical information as sound based on the stored music data that are transcribed from the original musical information.

While the music processing devices presently available allow a user to print musical information more efficiently than traditional hand engraving of printing plates, they are far from an ideal music processing apparatus. An ideal music processing apparatus should be able to receive the musical information from its native environment (musical sound), represent the musical information in such a way that it may be automatically converted into its written language equivalent (musical notation), present the musical notation to the user so that it may be manipulated or edited, and then output the musical information, either as musical notation or as musical sound, exactly as it has been composed.

Present music processing apparatus cannot simulate an ideal music processing apparatus in large part because of the limitations imposed by the present methods and systems for internally representing musical information in these systems. The internal representation of musical information for a music processing apparatus is a problem that has challenged musicologists for more than twenty-five years with no single or satisfactory solution. Most music processing apparatus use a code-type representation that stores only the specific musical information needed to achieve the limited objectives of the system, i.e., information about pitch alone, about rhythm alone, or about pitch and rhythm without reference to dynamics or articulation. A few music processing apparatus have attempted to develop language-type representations that would enable the user to encode any element of musical information that is present in common musical notation. For example, the DARMS and MUSTRAN encoding languages were developed for mainframe computers. While flexible and more complete than the code-type representations, current music encoding languages are limited to textual-based entry of musical information and are not structured enough to provide a workable method and apparatus for representing musical information that could be used to create a device approaching the ideal music processing apparatus.

The *Directory of Computer Assisted Research in Musicology*, Center for Computer Assisted Research in the Humanities, 1987, pp. 1–22, identifies five broad classifications that encompass the current methods and systems for representing musical information: music/machine-readable code; music/logic; music/parametric; music/graphic; and music/acoustic. These classifications provide a background for thinking about the various stages of music data representation as the music data move from the input process to the various output processes of display, printing, analysis and sound in a music processing apparatus.

The first classification, music/machine-readable code, covers music processing apparatus that use a code-type representation, usually in the form of an unstructured character string, wherein each character represents, for example, the pitch or duration of the next note to be played in the sequence. The music/logical classification covers those representations that attempt to organize the musical information into logical records and, in this form, more closely represent the logical meaning or structure of the musical information itself. This is the general type of representation that is necessary for developing an ideal music processing apparatus. The next classification, music/parametric, includes all the information of the music/logical representation but presents this data as a list of objects (notes, rests, beams, etc.) whose attributes are determined by specific parameters. Most current music printing programs process their music data in this form. The last two classifications relate primarily to the output of musical information. The music/graphic classification covers representation forms that are closely related to the actual printing or display of the graphic musical information. Examples might include font-lists with X-Y coordinates or strings of redefined ASCII characters that translate directly into music graphics. The music/acoustic classification covers representation forms that are closely related to the actual generation of musical sound. The best known example is the MIDI (Musical Instrument Digital Information) standard that is currently used by manufacturers of synthesizers and other electronic musical instruments. For a more detailed explanation of the MIDI format, reference is made to Boom, *Music Through MIDI*, 1987, Chapter 5, pp. 69-94, which is fully incorporated by reference herein.

More importantly for purposes of the present invention, there presently are no mechanisms available in any music transcription system that allow for the automatic and dynamic representation of musical chords as guitar fingerboards. Guitar fingerboards are the graphical symbols that correspond to the fingering of the frets on a guitar necessary to create the musical chord indicated by the chord notation associated with the guitar fingerboard. The fingerboard symbols are usually located above the staff line in vertical alignment with the associated chord notation as represented on the staff line. Traditionally, the graphical symbols for guitar fingerboards are placed on a sheet of music by hand or by cutting and pasting an image of the desired fingerboard above the associated chord notation. There are no mechanisms or transcription systems that will generate the image or symbol for the appropriate guitar fingerboard based on an analysis of the associated chord notation.

Although the various music processing apparatus currently available have enabled music publishers to produce higher quality printed music or enabled hobbyists to enter and print simplistic musical notation, none of these systems has a method or device for representing musical information in the form of musical chords that enables a musician or composer to automatically and dynamically generate guitar fingerboard symbols based on an analysis of the associated chord notation. Accordingly, there is a continuing need for the development of new tools to assist the musician and composer in the transcription of musical information by providing a method and apparatus for representing musical information, that will allow a musician or composer to dynamically generate guitar fingerboards symbols based on an automated analysis of the associated chord notation.

SUMMARY OF THE INVENTION

In accordance with the present invention a method and apparatus for representing musical information as guitar fingerboards dynamically maps the guitar fingerboards to their associated chord notations as the fingerboards are being displayed or printed. The transposition and mapping of the chord symbol onto the fingerboard is accomplished using an array of fingerboard records that represent a chosen set of fretting combinations for a fingerboard and a system for matching the musical information represented by the associated chord with the appropriate fretting combination for that chord. In the preferred embodiment, the analysis of the chord notation converts each of the notes that make up a chord into a key number for each note and a key number for the bass root of the chord and any alternate bass root. A hash value of all of the notes that make up that particular chord notation is also generated. A variable matching routine is then used to search the array of fingerboard records for either an exact match based on the bass root and the hash value or the best approximated match of the fingerboard records. The fingerboard record can define the actual graphical fingerboard symbol indicating the appropriate fret positions, a pointer to a symbol in a font character set, or a set of position parameters to position the fret indication on a background guitar fingerboard. The matching routine is optimized to maximize the number of matches found, while minimizing the search time for the routine.

In the preferred embodiment of representing the musical information as guitar fingerboards, a programmable data processing means having storage means is used to represent both acoustic and graphic musical information in a common data structure and input/output means operably connected to the data processing means for entering, editing and retrieving the musical information such that a musician or composer may dynamically generate guitar fingerboards symbols based on an automatic analysis of the associated chord notation by the programmable data processing means. This method for electronically processing and storing musical information involves separating the musical information into a plurality of segments, each representing some portion of a measure, and assigning a sequential time dimension value to each segment and measure. The musical information is also separated into a plurality of channels, with each channel representing a sound source (e.g. an instrument) and having a sound dimension value assigned to it. The musical information for a given channel and segment is stored in a memory array by associating the musical information corresponding to a given channel and segment with the memory array node specified by the time dimension value and sound dimension value assigned to the given channel and measure in which the segment appears.

The preferred method for representing musical information of the present invention may further comprise the steps of identifying a plurality of entries that represent certain rhythmic, melodic, and interpretive aspects of the musical information, with each entry comprising one unit of music data selectively representing a rest, a note or a chord. A set of details comprising further acoustic or graphic features of a rest, note or chord may be associated with the entry. Successive entries for a given instrument or sound source are linked together. The linked entries are then assigned to locations in the memory array by defining a first pointer to the successive entries for a given instrument or sound source to designate the first entry to be included in a measure and defining a last pointer to the successive entries for the given instrument or sound source to designate the last entry to be included in the measure.

A primary objective of the present invention is to provide a method and apparatus for representing musical information that will automatically and dynamically represent guitar fingerboards.

Another primary objective of the present invention is to represented musical information in a music processing method and apparatus in a manner such that the musical information may be organized according to the rules of musical notation and interpretation as seen and heard by musicians that allows for the display or printing of guitar fingerboards.

An additional objective of the present invention is to provide a method and apparatus for storing music data specifying a composition in a form that readily permits the automatic and dynamic generation of guitar fingerboards associated with selective chord symbols.

Another objective of the present invention is to provide a method and apparatus for storing musical data in which the data structure used for storage permits easy access for editing the composition and facilitates automatic changing of graphic elements of music notation when acoustic information is changed and vice versa.

Another objective of the present invention is to provide a method and apparatus for storing music data in which essentially all forms of graphical symbols and text used in musical notation may be stored with a clear relationship to the corresponding acoustic information.

A further objective of the present invention is to provide a data structure for music data in which music data is expressed in a common format and pitch, duration and graphic location are all expressed as relative representations for easy transformation so that the fretting of a guitar fingerboard may be automatically changed for an associated chord symbol in the event that the key signature for the chord symbol is changed.

These and other objectives of the present invention will become apparent with reference to the drawings, the description of the preferred embodiment and the appended claims.

DESCRIPTION OF THE DRAWINGS

FIGS. 9a and 9b are block diagrams showing the input and output of music data to the music processing apparatus of the present invention.

FIG. 10 is a depiction of a computer screen showing a Framework Dialogue Box for interfacing with the Music Framework.

FIG. 14 is a sample composition showing the guitar fingerboards as printed using the preferred embodiment of the present invention.

DESCRIPTION OF THE PREFERRED EMBODIMENT

Figure 1:
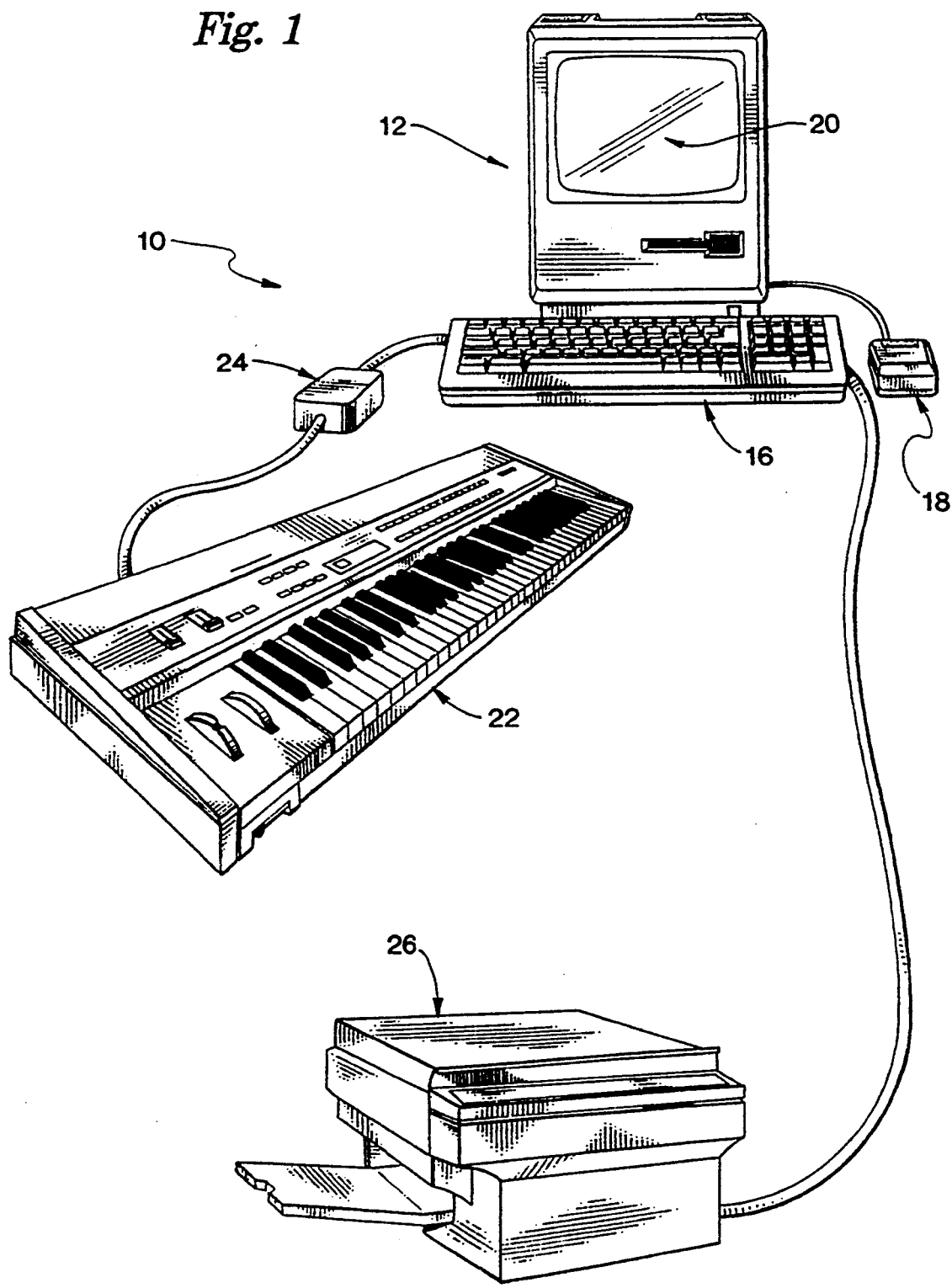
FIG. 1 is a diagram of a music processing apparatus in accordance with the present invention including an electronic instrument keyboard, a MIDI interface, and a programmable data processing means including an alphanumeric keyboard, a pointing device and a graphic display screen.

As a background for understanding the nature and scope of the present invention, it is first necessary to define the various types of information that comprise the musical information to be represented by the present invention. The preferred embodiment of the present invention represents all of the musical information for a composition within a common data structure in the storage means of a computer data processing system. The logical relationships that are represented within this common data structure allow changes in one type of musical information to be reflected in all other types of musical information as needed. The various "types" of musical information that are represented within this one common data structure arise out of the natural representations of both graphic (visual) musical information and acoustic (sound) musical information and the logical relationships between the graphic and acoustic musical information (e.g., pitch expressed in terms of frequency and pitch expressed in terms of placement of a note on a staff), as well as the interrelationships among the natural representations of either graphic or acoustic musical information (e.g., duration as affected by a tie or pitch as affected by a slur). Briefly, the types of graphic and acoustic information that are represented in the common data structure used in the present invention are: melodic information, rhythmic information, interpretive information, and textual information.

As with languages, music is a way for humans to formulate, understand, manipulate and communicate information. Accordingly, the various representations of musical information are not dictated as much by the laws and limitations of nature as they are by the conventions and rules of musicians. The present invention attempts to understand and replicate the various interrelationships, conventions and rules that govern the way musicians see and hear music, rather than imposing a new set of rules and standards for how to represent music in a manner that is most convenient for a computer. In this way, the present invention should be viewed as extensible and able to adapt to new interpretations and methods of how humans represent music. The various types of information that are represented by the present invention are not meant to limit human imagination in creating new ways of representing or understanding musical information. Instead, the present invention encourages looking at musical information in a new light and allows for non-traditional methods of representing that information, for example twentieth century notation.

Though the present invention is not limited by any arbitrary division of the types of musical information that are represented in its common data structure, it is helpful to define the types of musical information that will be discussed. Melodic information refers primarily to both the pitch and absolute duration of the individual notes entered by the musician or composer. Pitch refers to the tonal properties of a sound that are determined by the frequencies of the sound waves that produce the individual note. In classical western musical notation, pitch is denoted with reference to a series of half-step intervals that are arranged together in octaves, each octave comprising 12 half-steps or notes. For purpose of defining melodic information as used in this invention, note duration is the length of time a particular note is played. Note duration is sometimes thought of as the relative time value of a given note, e.g., whole note, half note, quarter note, eighth note. For purposes of this invention, however, note duration in terms of melodic information refers only to the absolute time value of a given note, i.e., absolute note duration. It is necessary to distinguish between relative and absolute time value of a note, because relative time value can only be correctly resolved when the proper beat unit is known, i.e., a half note played at 160 beats per minute should be norated differently than a quarter note played at 80 beats per minute, even though both notes will have the same absolute time value.

Rhythmic information, on the other hand, refers to everything pertaining to the time and emphasis aspects of multiple notes as distinct from their melodic aspects. It includes the effects of beats, accents, measures, grouping of notes into beats, grouping of beats into measures and grouping of measures into phrases. For purposes of the present invention, four distinct components comprise the rhythmic information necessary to easily and accurately transcribe music into musical notation: (1) relative note duration—this is the length of time a note is played in terms of the time signature for the measure; i.e., half note, quarter note; (2) beat unit—the base unit of time used to measure the tempo of a piece of music; (3) measure—the organization of beat units into groups corresponding to the time signature of the composition or section of a composition; and (4) accent—the designation of particular emphasized beat units or notes within a measure. The function and importance of rhythmic information or the "beat" relates to the fact that the human ear seems to demand the perceptible presence of a unit of time that can be felt as grouping the individual notes together. In classical western notation, the beat unit and the relation between beat units and measures are designated by the tempo marking, e.g., 120 beats per minute, and the time signature, e.g., $\frac{3}{4}$, where the top number indicates the number of beat units per measure (in this case 3) and the bottom number designates the type of note in which the beat units will be measured, i.e., the note value that will receive one beat unit (in this case a quarter note). Though sometimes referred to as the beat, for purposes of this invention, an accent will define which notes, beat unit(s), or sub-divisions of beat units in a measure or group of measures are to receive accentuation or emphasis.

Interpretive information refers to the characteristic sounds that are imparted to a piece of music when it is played with the expressions and feelings of a particular performer. Interpretive marks such as crescendos, staccatos, ritards, as well as information relating to tempo, other dynamics, and even settings for modulation wheels on electronic instruments. Interpretive information relates to the manner in which a particular performer will interpret a given piece of music.

Textual information refers to the language information that is associated with a given piece of musical information. This includes not only lyrics, but also title, related notes and other textual information, such as headers and footers, that are not included in the interpretive information.

While musical information may sometimes be referred to throughout this invention according to these four types, it should be understood that these categories are somewhat arbitrary and are used to convey an understanding of the overall concepts embodied in the invention. The guitar fingerboards that are represented by the present invention are primarily melodic information, but might be just as easily referred to as textual information or interpretive information, depending upon the usage and context of the musical information. The fundamental concept behind the present invention is that the musical information represented in a music processing apparatus be organized according to the rules of musical notation and interpretation as seen and heard by musicians so that the interrelationships among different types of representations, in this case chord notations and fretting on a guitar fingerboard are in accordance with those same rules.

THE MUSIC PROCESSING APPARATUS

Referring now to FIG. 1, the functional relationship among selected elements of the music processing apparatus of the present invention can be seen. The music processing apparatus 10 is comprised of a programmable data processing means 12 operably connected to associated input/output means, including an alphanumeric keyboard 16, a pointing device 18, a graphic display screen 20, an instrument means 22 with associated interface means 24, and a printer 26. The preferred programmable data processing means 12 of the present invention is a digital microcomputer having memory means (not shown) for representing the musical information in a common data structure as described hereinafter. In one preferred embodiment, the data processing means 12 is an Apple Macintosh SE computer available from Apple Computer, Inc., 20525 Mariani Avenue, Cupertino, Calif. 95014. The instrument means 22 shown in the preferred embodiment is an electronic keyboard, a DX-7 synthesizer available from Yamaha International Corporation, P.O. Box 6600, Buena Park, Calif. 90622. It will be seen, however, that any instrument equipped with an interface means 24 for encoding the musical information as MIDI or other machine-readable data would be capable of providing musical information to the music processing apparatus 10. It should also be noted that data processing means 12 may include the interface means 24 within the components included in the computer housing. In the preferred embodiment, the Apple Macintosh SE is equipped with an Apple MIDI interface unit and a Laser Writer printer, also available from Apple Computer, Inc. The functioning of the data processing means 12 is controlled by means of control information in the form of a software program that stores and retrieves data utilizing the common data structure described hereinafter. Those skilled in the art will recognize that various software functions utilizing the common data structure could be programmed in a variety of ways or could also be accomplished by equivalent hardware.

THE COMMON DATA STRUCTURE

The music processing apparatus 10 may be used by a musician or composer to enter, retrieve, edit, analyze and output musical information. In order to accomplish these tasks, the musical information must be stored in a machine-readable format so that it may be processed by the data processing means 12. For purposes of the present invention, musical information represented in this manner will be referred to as music data. The common data structure that the music processing apparatus 10 uses to represent music data in the memory means of the data processing means 12 is a new way of storing musical information in a machine-readable format such that the graphic aspects of the music data are related to the acoustic aspects of the music data in a music/logical type of representation. By accommodating both the graphic and acoustic aspects of the music data as related elements in a common data structure, changes to the graphic information can be automatically reflected in changes to the acoustic information, and vice versa. The common data structure allows the present invention to overcome the problems inherent in the prior art where the graphic and acoustic representations of music data are treated as separate and distinct pieces of information. The particular structure and organization of the common data structure also allow the present invention to overcome the problems inherent in the current systems that attempt to utilize a music/logical type of representation of musical information.

Unlike the prior art, the present invention does not define a specific coding scheme for representing each of the four types of musical information. Instead, a common data structure, a logical array called the Music Framework, is established in which elements of music data for any of the four types of musical information listed above may be represented. Moreover, these elements of music data are preferably represented in the logical array with the same basic format for each element, the Enigma format. By using the same basic format for various types of music data and storing all of the music data in a common data structure, the storage and manipulation of the music data is simplified and the overall performance of the music processing apparatus is improved.

To further utilize the flexibility and other advantages of the common data structure (the Music Framework) and the basic format for storing music data (the Enigma format) the present invention also provides for several novel methods and structures for representing the music data within the Music Framework. These begin with the way in which individual music data values are represented and extend to how groups of music data are placed in the Music Framework. First, although the Music Framework provides a method for relating instruments (or other sound sources) and measures (or portions of measures) in time, there is also a need to provide a time relationship among the notes, chord, and rests that are the heart of the music data for each measure. Because musicians and composers tend to create music data in a non-linear fashion, in the present invention the core of the music data (i.e., the notes, chords, and rests) is stored in a flexible, sequentially linked organization, the Entry Pool, that allows for easy insertion, deletion, or modification of the music data. Next, because certain types of music data are physical measured values (e.g., pitch, duration, position) that a musician may wish to systematically modify, as by transposition, rearrangement, or resizing, the present invention chooses to represent the individual value for any type of measured music data as a relative value expressed in terms of an offset or displacement from a user-selected or default absolute value, or expressed in terms of relative units multiplied by a base resolution value. This Relative Representation method allows for quicker manipulations and additional flexibility in representing the individual measured values of the music data, particularly for representation of pitch values by the Tone Center Displacement method. Finally, because composers often use the same music data in different measures and for different instruments, the present invention facilitates this reuse or tieing together of music data by using a Frame Assignment method to associate individual measures of music data for a particular instrument with nodes or intersection points in the Music Framework. This method also leads to certain storage and processing efficiencies in the music processing apparatus 10.

THE MUSIC FRAMEWORK

Figure 2:
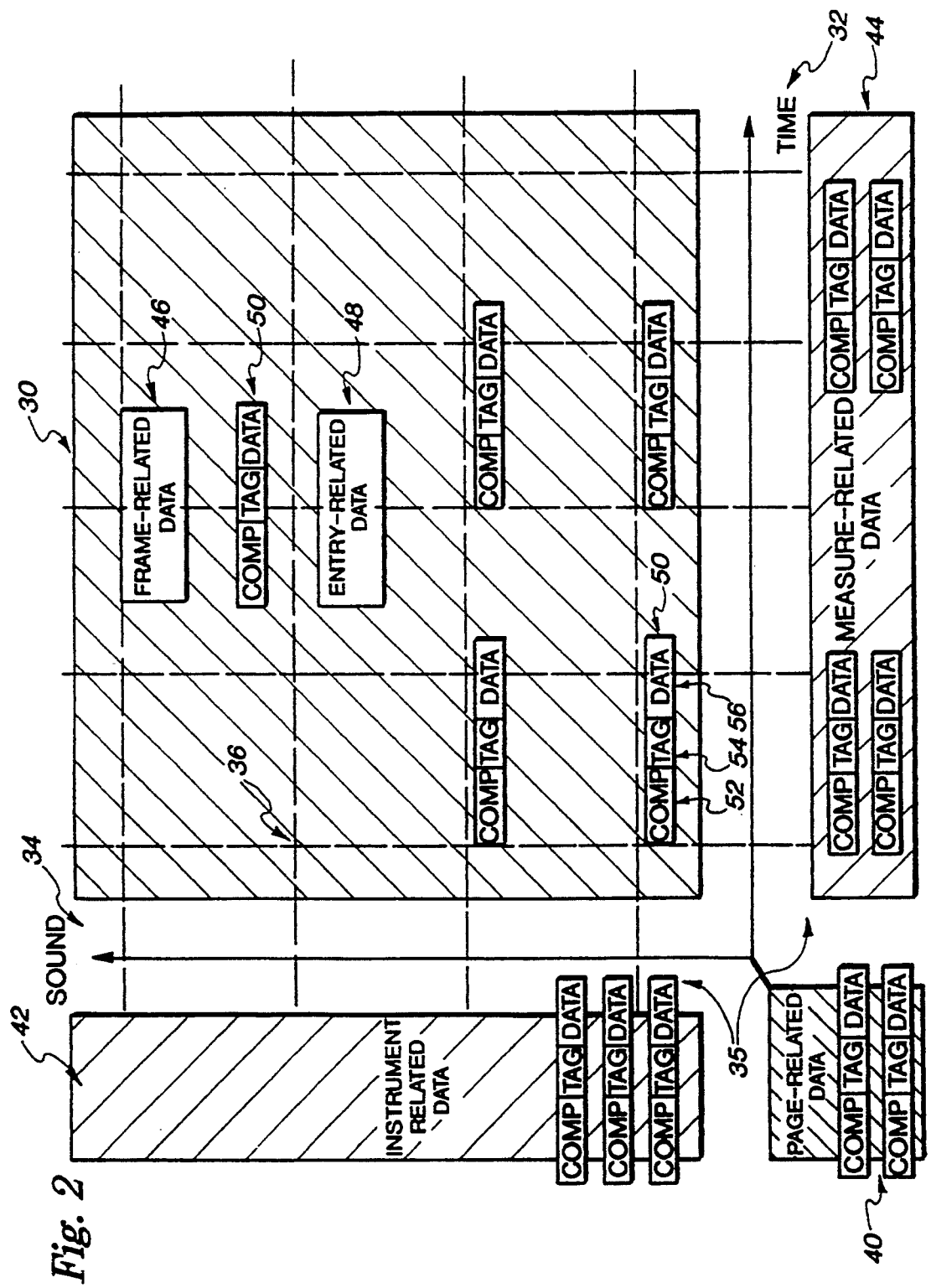
FIG. 2 is an overall block diagram of a Music Framework for representing musical information in a music processing apparatus in accordance with the present invention, including the Enigma Format of the present invention.

As shown in FIG. 2, all of the music data in the common data structure is organized within a Music Framework 30, a multi-dimensional array having Time 32 as its first dimension and Sound 34 as its second dimension. The Music Framework 30 is a kind of time-based organizational chart in which the method and apparatus of the invention places all the various types of musical information the music processing apparatus 10 must manage. Conceptually, the musical information is connected to the various Framework Intersections 36 created by the intersection of discrete values of the two dimensions, Time 32 and Sound 34, of the Music Framework 30. All of the music data represented in the memory means of the data processing means 12 is organized according to a music data hierarchy defined in association with the Music Framework 30. The hierarchical categories of music data represented in the Music Framework 30 include: Page-Related Data 40, Instrument-Related Data 42, and Measure-Related Data 44 represented in the Framework Margin 35, and Frame-Related Data 46 and Entry-Related Data 48 represented at the Framework Intersections 36.

Page-Related Data

Page-Related Data 40 includes all information about any specific page of a composition, including the dimensions of the page size, the page margins, and the system margins of any staff system that appears on the page. Also included in this category of music data are page, staff system, and individual staff reduction or enlargement parameters. Page-specific text blocks, arbitrary music, and headers and footers also are contained in the Page-Related Data 40 category.

Instrument-Related Data

Instrument-Related Data 42 is the musical information that is unique to a particular instrument or sound source (including a voice). This includes the name of the instrument, its transposition, and starting clef. In the Music Framework 30, when an instrument is assigned to a particular staff in a composition it is referenced by an instrument ID number. An unassigned instrument slot is simply a blank staff that is part of a staff system, but has not yet been assigned any frame records.

Measure-Related Data

Measure-Related Data 44 is the information related to each measure in the composition. For purposes of the present invention, the term "measure" applies to the particular measure number common to the music played by all of the instruments in the score during a specified time period. Included in this category is time dilation information, score expression information, repeat information, measure attribute information, measure number information, and key signature and time signature information.

Frame-Related Data

Frame-Related Data 46 is very much like Measure-Related Data 44. The difference between frame-Related Data 46 and Measure-Related Data 44 is that the term measure is used to refer to a specific measure for all instruments up and down the sound dimension of the Music Framework 30. By contrast, the term frame refers to just one measure or one portion of a measure for a particular instrument identified with a single framework Intersection 36. Many of the Measure-Related Data 44 types of information, such as key and time signatures, are more easily thought of as frame-specific, because they may be varied among different instruments in the same measure. In the Music Framework 30, such data may be represented in either or both categories. For example, data relating to the basic key signature of a measure may be stored in the Measure-Related Data 44, and data for a special key signature for a particular instrument for that measure could also be stored in the Frame-Related Data 46. The Frame-Related Data 46 category includes data that are exclusively related to one frame, as opposed to a group of frames on different instruments. It includes MIDI expression information captured from a live performance, measure specific text blocks, and measure specific arbitrary music.

Entry-Related Data

Entry-Related Data 48 refers to the most basic elements in a composition. An entry may be either a note, a rest, or a chord. The music data that comprises the Entry-Related Data 48 represents the vast majority of the musical information to be processed by the music processing apparatus 10. Stored in the Entry-Related Data 48 is the rhythmic and melodic information for the entry, including the duration of the entry and the number of notes contained in that entry. Also stored here are attributes that are peripheral pieces of information attached to the entry. These may be lyrics, chords, staff expressions, or grace note definitions. A subset of Entry-Related Data 48 contains the displacement and accidental amount of the note, as well as tie information and key velocity information. A more complete definition of all the types of attributes found in the Entry-Related Data 48 category is provided in the explanation of the Entry Pool below.

THE ENIGMA FORMAT

FIG. 2 also shows the Enigma Format 50 that is the basic field format by which virtually all of the music data is stored in the memory means of the data processing means 12. The Enigma Format 50 is used to represent music data for all five of the hierarchical levels of music data and allows the data processing means 12 to break the musical information down into discrete segments of music data. Each segment of music data can be thought of as a data element that represents some definable portion of the musical information that has certain characteristics and attributes, as well as defined relationships with other data elements. The advantages of the Enigma Format 50 is that it does not limit what those data elements must be, nor does it limit how two or more data elements will be related to one another. Instead, the Enigma Format 50 provides a common basis for defining what each data element will represent and how that data element will relate to other data elements. In this sense, the Enigma Format 50 is truly extensible because a musician is not limited to the current way of defining or interrelating segments of music data and new ways of defining or interrelating music data elements may be easily and quickly incorporated into the common data structure for the music processing apparatus 10.

for each data element that is defined in the Music Framework 30 of data processing means 10, the Enigma Format 50 for that data element is comprised of three fields: a comparator 52, a tag 54, and an associated data field 56. The tag 54 is a code that identifies the type of data element. Each unique code for the tag 54 defines a unique type of data element, what the data element represents, and how the data element will relate to other data elements. For example, a 'MS' tag identifies the data element as a Measure Specification tag having a defined data field associated with it. The particular combination of a comparator 52, a unique tag 54, and a defined data field 56 will be referred to hereinafter as a tag structure. The tag structure for a 'MS' tag is based on this data elements role as a part of the Measure-Related Data 44 and might include, for example, data defining the height and width of the measure when it is displayed on the graphic display 20 or printed on the printer 26. The comparator 52 is a numeric value that identifies how this data element is related sequentially to other data elements having the same type of tag 54. For example, a '2' comparator for a 'MS' tag identifies the particular data element as the Measure Specification data element for the second measure of a particular composition. The data field 56 is a fixed-length packet of data whose content depends on the type of tag structure. For example, the data field 56 for an note may contain bit-mapped information that defines how to position a note on the staff, or for an element of Instrument-Related Data 44 it may contain ASCII codes representing the name of an instrument for a staff.

In the preferred embodiment of the Enigma Format 50, the comparator 52 may occupy two bytes or four bytes. The comparator 52 may be either a sixteen bit number with a maximum value of 65,535, or may be divided a 32 bit number divided into two 16 bit numbers each with a maximum value of 65,535. The tag 54 is a two character ASCII code. The length of the data field 56 is fixed, its length depending upon the tag structure identified by the two character tag 54.

THE ENTRY POOL

Figure 3:
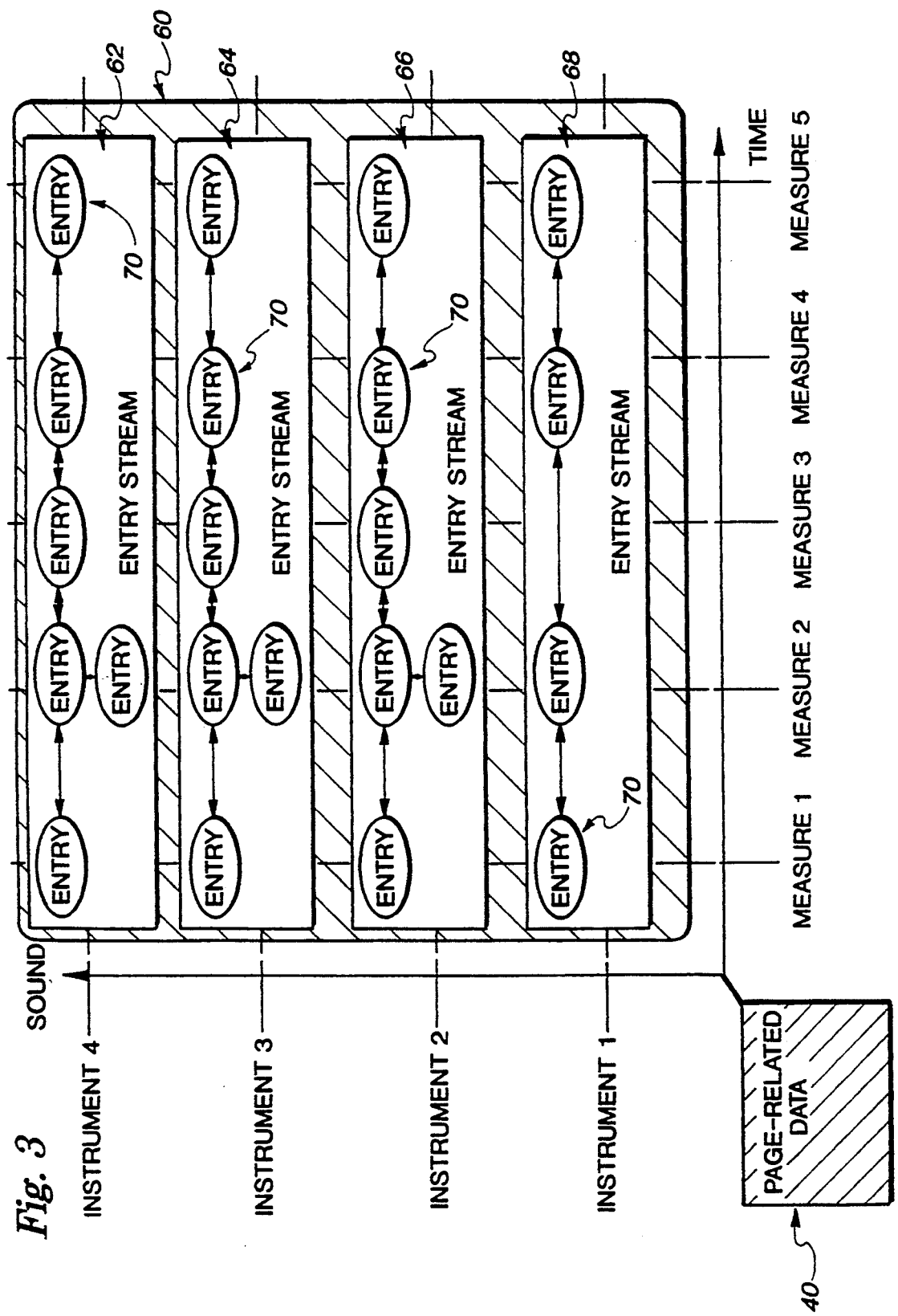
FIG. 3 is a block diagram of the Entry Pool of the present invention showing the relationships among Entries (note, rests, and chords) stored in the Music Framework.

Because the bulk of the music data represented by the music processing apparatus 10 is comprised of Entry-Related Data 48 that must be accessed quickly and efficiently, the present invention uses a unique method and structure for storing the rhythmic and melodic music data associated with entries (notes, rests or chords). As shown in FIG. 3, the Entry-Related Data 48 is represented on the Music Framework 30 as an Entry Pool 60 comprised of rows of Entry Streams 62, 64, 66 and 68, each row made up of a plurality of Entry Elements 70. The Entry Streams 62, 64, 66 and 68 represent a sequential, time-based linking of the Entry Elements 70 that correspond to the Instrument-Related Data 42 for that row. These Entry Streams 62, 64, 66 and 68 are independent of one another. The Entry Pool 60 makes no stipulations on the concurrency or sequentially of the Entry Elements 70 as they are physically represented in the memory means of the data processing means 12. The key to understanding the structure of the Entry Pool 60 is that each Entry Element 70 in the Entry Stream 62 is linked to the next sequential Entry Element 70, as well as to any Entry Elements that belong to the same time interval, e.g., the individual notes of a chord. By using the sequential linking concept of the Entry Pool 60, the music processing apparatus 10 is able to represent the Entry-Related Data 48 as a series of threads or streams of entries that do not need to be stored in an exact physically sequential arrangement in the memory means of the data processing means 12.

In the preferred embodiment the structural foundation of the Entry Pool 60 is a two dimensional double link list. The two dimensional double link list structure for the Entry Pool 60 solves the problem of requiring an absolute identifier to access the Entry-Related Data 48. Because double link list data structures do not rely on physical sequentially for data access, this type of structure is well suited to the non-linear quick access requirements for real-time entry and manipulation of music data. Once an Entry Element 70 is defined as beginning at a certain offset, it need not shift physically in the memory means due to array manipulations because the double link list array manipulations do not move data, but merely rearrange links. Because only the links are manipulated during edits, the double link list provides a flexible structure in an interactive environment that meets the requirements for real-time entry and manipulation of music data. While a two dimensional double link list is described as the preferred embodiment for the Entry Pool 60 of the present invention, it should be recognized that other types of data structures permitting expression of sequential relationships may also be used to achieve similar sequential linked access to the Entry-Related Data 48 and are intended to be within the scope of the present invention.

Figure 4:
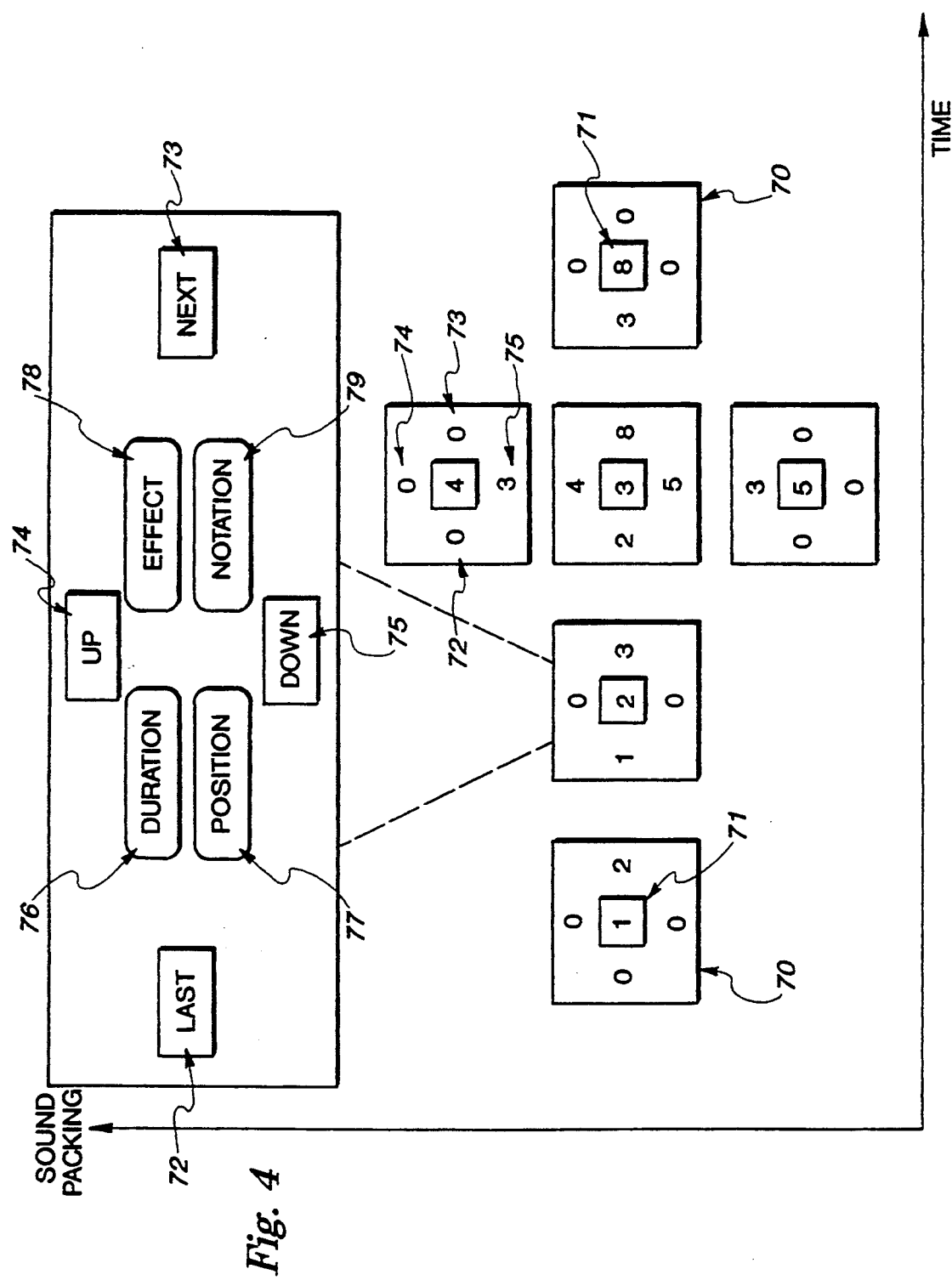
FIG. 4 is a block diagram of the preferred embodiment of the Entry Pool showing the Entries in a two dimensional double link list arrangement for a simple six-entry Entry Pool.

Referring now to FIG. 4, the preferred embodiment of a two dimensional double link list structure for a single Entry Stream 62 of the Entry Pool 60 will be described. The first dimension is a time dimension (horizontal in FIG. 4) and the second dimension is a sound packing dimension (vertical in FIG. 4). The time dimension delineates the time relationship among sequential Entry Elements 70 in the Entry Stream 62. The sound packing dimension delineates the sound relationship among Entry Elements 70 in the Entry Stream 62 that occur during or start at the beginning of the same time period. The time dimension allows the Entry Elements 70 to be sequentially linked in the Entry Stream 62. The sound packing dimension allows two or more Entry Elements 70 to be grouped together to form, for example, a chord.

In the example shown in FIG. 4, the individual Entry Elements 70 each have an associated Entry Number 71 (represented in the shaded ovals as Entry Nos. 1–5 and 8), although the Entry Number 71 is not actually a part of the data stored for the Entry Element 70. The Entry Number 71 is used to physically locate the Entry Element 70 in terms of a displacement or offset from a base value that represents the beginning of the Entry Pool 60 in the memory means of the data processing means 12. As described in conjunction with the section entitled Data Structure Intensive Model, the Entry Number 71 is also used as a comparator value to identify other tag structures that contain additional Entry-Related Data 48 that must be associated with the particular Entry Element 70 identified by the Entry Number 71. The shaded rectangle in the top portion of FIG. 4 shows the data fields that are defined for each Entry Element 70, in this case for Entry No. 2. In essence, the Entry Pool 60 is comprised of an array of Entry Elements that are each 32 byte elements containing these data fields. In the preferred programming language 'C', the data fields of the array consist of the following declared structure:

```
#define ENTRY struct entry
ENTRY
       {
       ufourbyte Last;
       ufourbyte Next;
       ufourbyte Up;
       ufourbyte Down;
       twobyte Duration;
       twobyte Position;
       fourbyte Effect;
       fourbyte Notevalue };
```

The first four data fields defined in the array (Last 72, Next 73, Up 74, and Down 75) are four byte values used to implement the preferred embodiment of the two dimensional double link list structure of the Entry Pool 60. Last 72 and Next 73 define the previous and succeeding Entry Elements 70. Up 74 and Down 75 provide for the construction of multiple notes or chords in the same time segment. Each of these variables contains the value of an Entry Number 71. By pointing to the next linked Entry Element 70 in this manner, the Entry Elements 70 do not need to be stored contiguously in the memory means.

The two byte data field Duration 76 holds the relative duration of the entry in terms of relative duration units. For example, a quarter note might be represented as "1024", meaning 1024 relative duration units. The two byte data field Position 77 holds the relative positional displacement value of the x origin of graphic representation of the entry from the start of the measure. Each Entry 70 is graphically represented as a specified figure (e.g. quarter note, half rest) displayed or printed with respect to an horizontal origin for that Entry 70. The displacement value is specified in terms of virtual page horizontal units. Only the relative horizontal position of an Entry 70 need be specified, as the vertical position will be calculated by the positioning of the Entry 70 on the staff as defined by the Tone Center Displacement method, described hereinafter in the section entitled Relative Representation.

The four byte data field Effect 78 primarily controls the graphic attributes of the Entry Element 70. The four byte data field Notation 79 primarily controls the acoustic attributes of the Entry Element 70. Both Effect 78 and Notation 79 are bit mapped with each data bit defined to indicate a particular attribute of Entry-Related Data 48 associated with that entry. The definitions for each of the data bits for Effect 78 and Notation 79 are set forth hereinafter in the section entitled Data Structure Intensive Model.

RELATIVE REPRESENTATION

Any music data value that is a physically measured value (e.g., pitch, duration, position) is represented in the music processing apparatus 10 in terms of a Relative Representation method by specifying the measured value as a user-defined or default base value plus an offset or displacement (e.g., horizontal origin plus offset), or by specifying the measured value in terms of relative units multiplied by a base resolution value (e.g., 3200 relative duration units per second times the relative duration value), or by a combination of both. The Relative Representation method makes the manipulation of measured music data more flexibly available for the composer. For example, if a composer wanted to copy and transpose one frame of music data from one instrument to another, Relative Representation of the pitch information allows the transformation to be performed very simply by changing the base value. The Relative Representation method also makes the measured music data much easier to manipulate for the data processing means 12. For example, resizing a page of a printed score is easily accomplished if the music data relating to page position of the entries is stored as relative virtual horizontal and relative virtual vertical units having a user or system definable relation to actual size.

Figure 5:
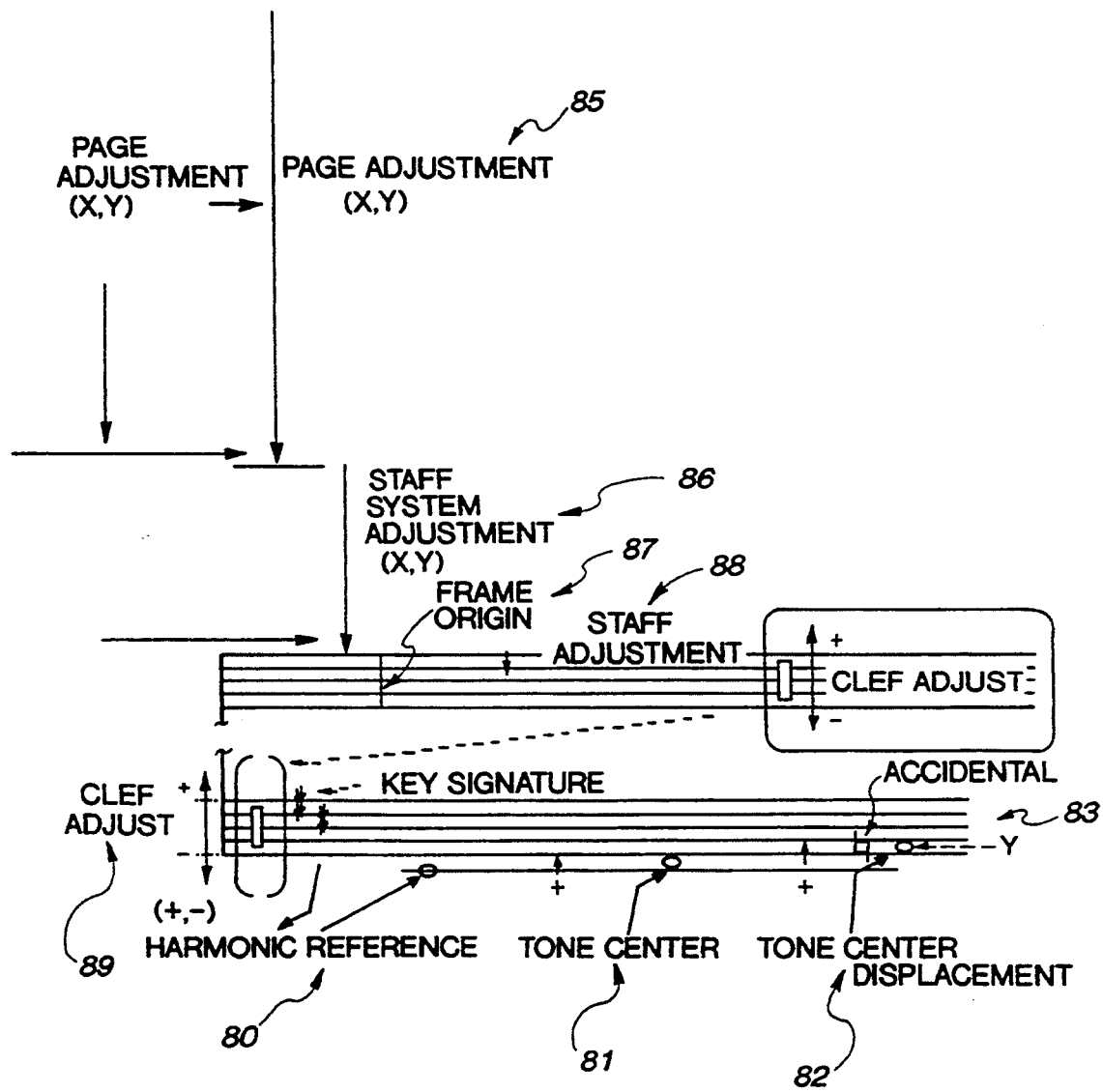
FIG. 5 is a block diagram of the Relative Representation of measured music data in the present invention showing Tone Center Displacement for representing the pitch value of Entries and vertical graphic placement of a note on a staff as this information is stored together in the Music Framework.

The representation of the pitch of a note has been a tricky problem for music processing apparatus. One particular problem, for instance, is the correct handling of transposed instruments and key signature changes. The present invention solves the problem of pitch representation through a unique method called Tone Center Displacement, as shown in FIG. 5. Using the Tone Center Displacement method, the pitch and accidental of each note are related back to the key signature, which is related back to an absolute frequency called the Harmonic Reference 80. This allows for the pitch of all notes to be expressed relative to a Tone Center 81, as opposed to being a fixed frequency value or key letter. The advantage is that if any part of the hierarchy is changed, the pitch information "under" the change will automatically adjust accordingly without any re-computation whatsoever. Transposition becomes instantaneous with guaranteed accuracy.

Harmonic Reference 80 and Tone Center 81 have to do with the key signature. Tone Center Displacement 82 and Accidental Amount 83 have to do with the relationship of a note to the key signature (or tone center) in diatonic steps and accidentals. Harmonic Reference 80 is a movable zero point, best thought of as the "middle C" of all key signatures. All key signatures are related to this point, instead of being fixed independently of each other. Tone Center 81 is the tonic, or center, of the key signature, and is almost always the same as the key signature (E is the tone center of E minor). The Tone Center 81 is related to the Harmonic Reference 80 by a number of diatonic steps and an alteration amount. For example, if the harmonic reference were "C" (the default), a tone center of "D" would be represented by a diatonic step amount of 1 since that tone center is one diatonic step away from "C". An Alteration Amount (not shown) is used to signify non-diatonic step deviations from the diatonic displacement. The tone center of "A-flat" is 5 diatonic steps from "C" with an alteration amount of −1, which accounts for the flat and differentiates it from the tone centers for "A" and "A-sharp". Tone Center Displacement 82 is the distance of a note, in diatonic steps, from the tone center. A "B" in the key of D major would have a displacement value of 5 (5 diatonic steps away, or a major sixth). Accidental Amount 83 is the amount of accidental on a note. Like the alteration amount for the tone center, it is used to represent non-diatonic step differences from the displacement value. In general, an accidental amount of 1 equals 1 sharp, 2 equals 2 sharps, −1 equals 1 flat, −2 equals 2 flats, and 0 equals a natural. A "B-flat" in the key of f would have a displacement of 3 and an accidental amount of −1, while a "B-double sharp" would have a displacement of 3 and an accidental amount of 2.

Representing music data using the Tone Center Displacement method greatly simplifies transposition, both for acoustic and graphic representation of the music data. Because all note pitches are related to a Tone Center 81, changing the Tone Center 81 (i.e., the key signature) automatically results in correct transposition of all notes. Additionally, because only one value is being changed, transposition becomes almost instantaneous. For example, a key signature (or tone center) of E-flat is represented by a diatonic displacement of 2 (2 steps from middle C) and an alteration amount of −1 (to account for the flat). The note G-flat in this key signature would be represented by a displacement amount of 2 (2 diatonic steps from the tonal center) and an accidental amount of −1 (to account for the flat). If the user changed the key signature to G major (a displacement from middle C of 4 and an alteration of 0), the pitch of the note is now 2 diatonic steps from G major with an accidental amount of −1, resulting in the note B-flat, which is the correct transposition.

It should be noted that the Tone Center Displacement method is not tied to a seven diatonic step scale, such as is common in Western music. The transition to a quarter tone or eighth tone scale can be made fairly easily. Furthermore, the accidental amounts are relative distances, meaning that, although a value of 1 usually stands for a sharp, the user may reconfigure the key format so that 1 may stand for a quarter-sharp, 2 a sharp, 3 a three-quarter sharp, etc. As a result, Tone Center Displacement provides a very flexible, musically-intuitive system for these type of linear key formats.

The Tone Center Displacement method is also useful in conjunction with the Relative Representation method for positioning music data, for example, when printing or displaying a staff system with the associated musical notation. The horizontal position of an Entry Element 70 on a virtual page is determined by the horizontal (x) components of the position of page, Page Adjustment 85, and the position of the staff system on the page, Staff System Adjustment 86. Then the position of the particular frame on the particular staff, frame Origin 87 is added to the horizontal position of the particular Entry Element 70 within that frame as defined by Position 77. Consequently, the horizontal position of an Entry 70 in relative positional units on a virtual page is calculated as: x = Position 77 + Frame Origin 87 + Staff System Adjustment 86 + Page Adjustment 85. The vertical position of an Entry Element 70 on a virtual page is determined by the vertical (y) components of the position of page, Page Adjustment 85, and the position of the staff system on the page, Staff System Adjustment 86. Any adjustment to the size of the staff, Staff Adjustment 88 or adjustment to the clef, Clef Adjustment 89, is determined. Finally, the note is placed in its proper position on the staff by using the Tone Center Displacement method. Consequently, the vertical position of an Entry 70 in relative positional units on a virtual page is calculated as: y = Tone Center 81 + Tone Center Displacement 82 + Harmonic Reference 80 + Clef Adjustment 89 + Staff Adjustment 88 + Staff System Adjustment 86 + Page Adjustment 85.

FRAME ASSIGNMENT

Figure 6:
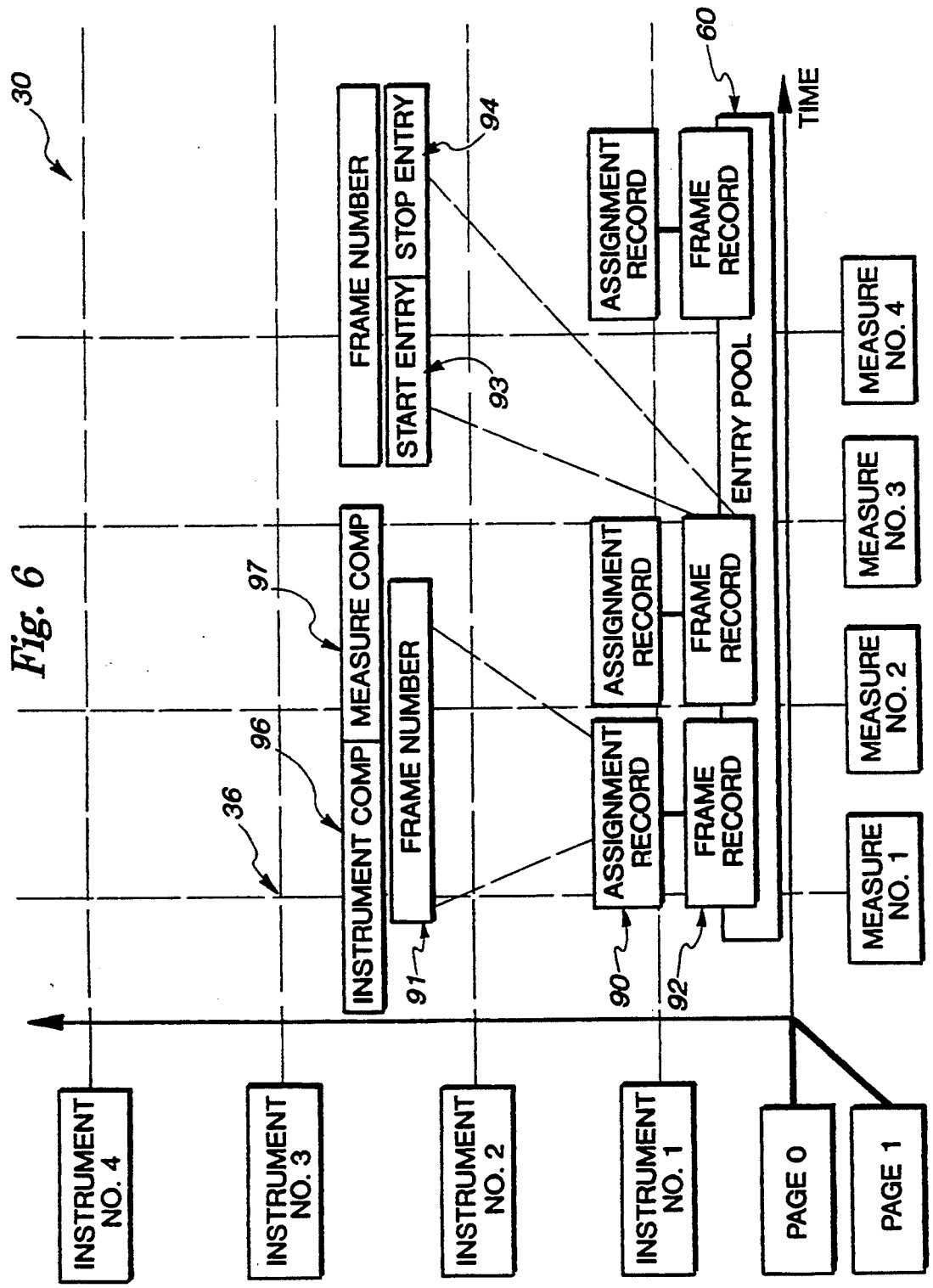
FIG. 6 is a block diagram for the Frame Assignment method showing music data assigned to specific instruments and measures on the Music Framework.

Referring now to FIGS. 2 and 6, the frame Assignment method will be described. The Frame-Related Data 46 is represented on the Music Framework 30 by an Assignment Record 90 and at least one associated frame Record 92 for each frame for which there is Entry-Related Data 48. The relationship between the Assignment Records 90 and the Frame Records 92 provides the link between the Music Framework 30 and the individual Entries 70 in the Entry Pool 60. For each Framework Intersection 36 that has Entry-Related Data 48 associated with it, an Assignment Record 90 is created. Conversely, if there is no music data associated with a particular Framework Intersection 36, then no Assignment Record 90 is created and no music data is stored for that frame.

In the preferred embodiment, each Assignment Record 90 contains a Frame Number 91 that points to a Frame Record 92. The Frame Record 92 contains a Start Entry 93 and an Stop Entry 94 variables that together define the beginning and end of a segment of the Entry Pool 60. All of the Entries 70 with Entry Numbers 71 between the values for Start Entry 93 and Stop Entry 94 are in the frame that is assigned to the particular Framework Intersection associated with the Assignment Record 90.

The Assignment Record 90 is stored in the Enigma format 50 and is comprised of a comparator 52 split into an instrument comparator 96 and a measure comparator 97, a tag 54 defined as 'GF' (short for graphics file assignment record) and a data field 56 containing at least a Frame Number of a Frame Record 92 that will point to the music data that is to be associated with the particular Framework Intersection 36. By referencing the Frame Record 92, instead of incorporating either the music data itself or pointers directly to the music data, the Assignment Record 90 allows for maximum flexibility and optimization of the music data contained in the Music Framework 30.

In the preferred embodiment, the data field 56 for the 'Gf' tag is defined as a four word data array having the following structure when programmed in the preferred programming language, 'C':

```
#define GFHOLD struct gfhold
GFHOLD
{
    twobyte rec;   /* The record number to assign */
    twobyte clef;  /* The clef of the measure */
    twobyte mfont; /* The alternate music font to use */
    twobyte flag;  /* The flag used to assign attributes */
};
```

One of the software routines that is used to implement the frame Assignment method is called 'dt2serch0'. It is passed the two comparators 96 and 97, a tag, 'Gf', and an incidence number. If the routine is passed an incidence number of four, it will search through the tag structures for the Entry-Related Data 48 looking for the fourth instance of a record which matches the comparators and tag. An example of this routine in 'C' is as follows:

```
tbool findGFrec( instrument, measure )
    twobyte instrument;
    twobyte measure;
{
    GFHOLD *gh;
    twobyte *dt2serch();
    if( (gh = dt2serch( instrument, measure, 'GF', 0 )) )
        return( YES );
    return( NO );
}
```

The routine is passed an instrument number and a measure number. It calls dt2serch() to fetch the base address of the data array element of the record which has the comparators equal to the instrument number and the measure number and a tag of 'GF'. If dt2serch () returns greater than zero, an Assignment Record 90 exists for the particular Framework Intersection 36.

Because each Entry Stream 62 in the Entry Pool 60 is continuous as a result of the sequential links, some mechanism is needed to break an Entry Stream into smaller pieces without imposing an artificial hierarchy on the Entry Pool 60. The Frame Record 90 accomplishes this by holding in its data a starting entry number, Start Entry 93, and an ending entry number, Stop Entry 94. These two numbers 'frame' a piece of a stream in the Entry Pool. As can be deduced, it is easily possible that two frames will overlap or that one frame might enclose another. Although there are no stipulations on the interweaving of frames, by convention the frame which encompasses the largest portion of the overlap is referred to as the 'original'. The other frames are 'mirrors'. There is no duplication of the material in a mirrored frame. It is simply another way of viewing the original material.

It will be seen that there are many advantages to representing musical information as a series of Assignment Records 90 pointing to music data and associated with framework Intersections 36 in the manner described. First, because the Music Framework 30 and the Assignment Records 90 are not storing the musical information, but only pointing to it, the parameters of the Music Framework 30 are not fixed by the limitations of the particular computer 16 that the software program may be running on. The Music Framework 30 may have as many instruments or measures as a composer desires. Second, because the Music Framework 30 does not store any information when there is no musical information for a particular instrument for a particular measure, there is no need to represent whole rests in a musical composition stored in accordance with the method and apparatus of the present invention. Consequently, a significant amount of computer memory is conserved by not using a whole rest or other type of place-marker to signify the absence of musical information for a particular measure and instrument. The software program places a whole rest in the output for a particular instrument and measure on the Music Framework 30 if there were no Assignment Records 90 that had a matching instrument comparator 96 and measure comparator 97. Finally, it will be seen that retrieval of the musical information using the method and apparatus of the present invention is not limited to a sequential or serial system for accessing the music data. This allows for random access to the musical information, as well as increased performance in accessing the information, including allowing for the hocketing or mirroring of music data as will be discussed below.

An additional advantage of representing the musical information as Assignment Records 90 is that multiple Assignment Records 122 may be assigned to the same framework intersection 36 on the Music Framework 30 by storing multiple Assignment Records 90 having the same instrument comparator 94 and measure comparator 95. Conceptually, this may be thought of as adding a third dimension to the Music Framework 30 for separating the musical information into multiple renditions of a particular segment as played by a particular instrument. There may be several variations of interpretive information that could be stored for a given measure for a trumpet solo and even small variations in the notes themselves, i.e. grace notes, but the musical notation for that measure might be the same. In other words, the way that Louis Armstrong played the first measure of a solo could have different interpretive, rhythmic and melodic information than the same measure as played by Doc Severensen, even though both were reading the same sheet music. The method and apparatus of the present invention allows both renditions of the same measure to be stored together in a common data structure, thereby allowing, for example, the playback of the first eight measures of a song using Louis Armstrong's style and then switching to Doc Severensen's version of the last sixteen measures. Using the Assignment Record 90 of the preferred embodiment, the musical information for multiple renditions of a given measure and instrument is easily accommodated by having multiple Assignment Records 90 with the same instrument comparator 94 and measure comparator 95, but with different Frame Numbers 91.

A SAMPLE COMPOSITION

Figure 7:
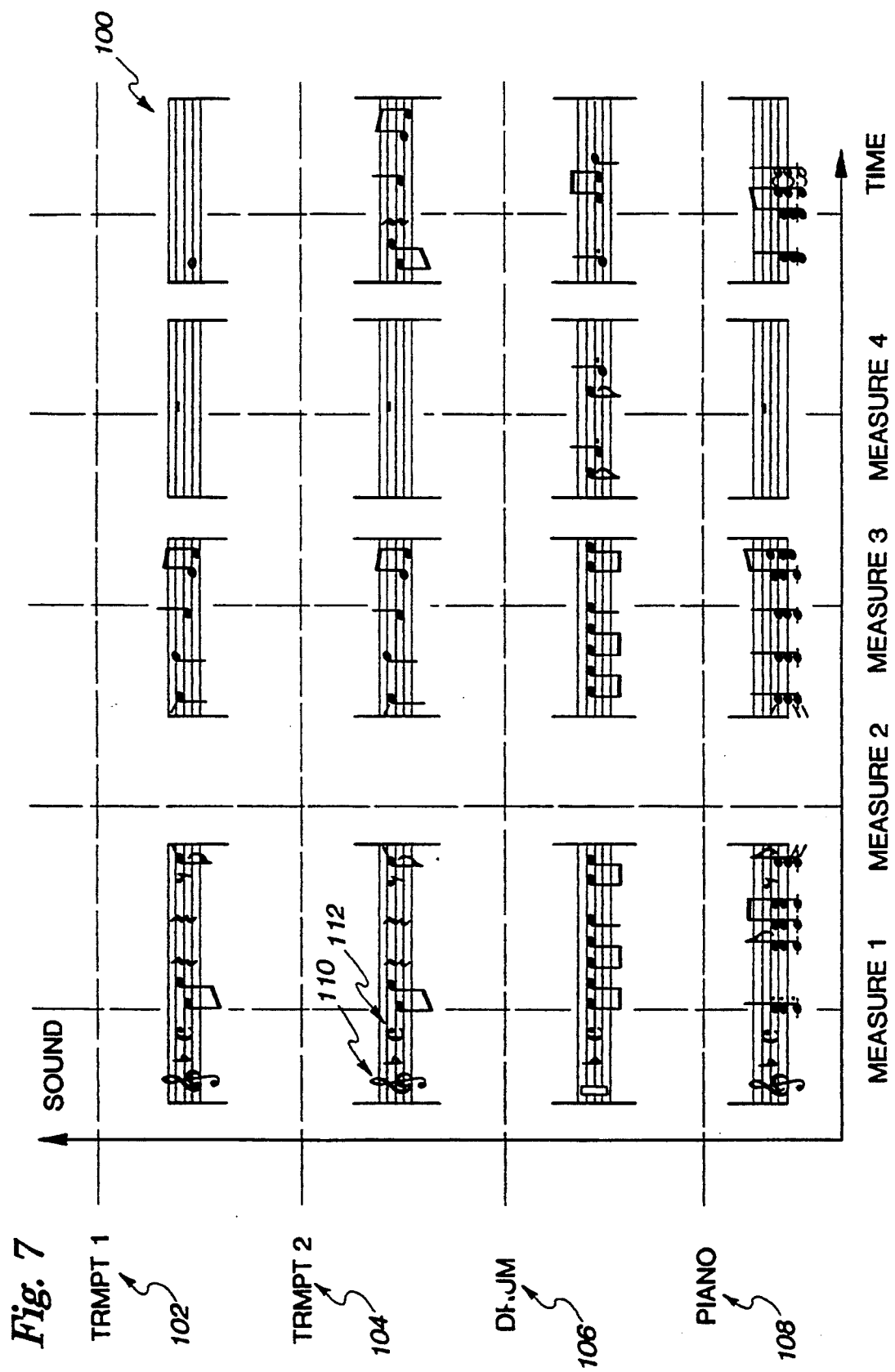
FIG. 7 is a notational representation of the Music Framework showing selected measures of a sample composition associated with nodes in the Music Framework.
Figure 8:
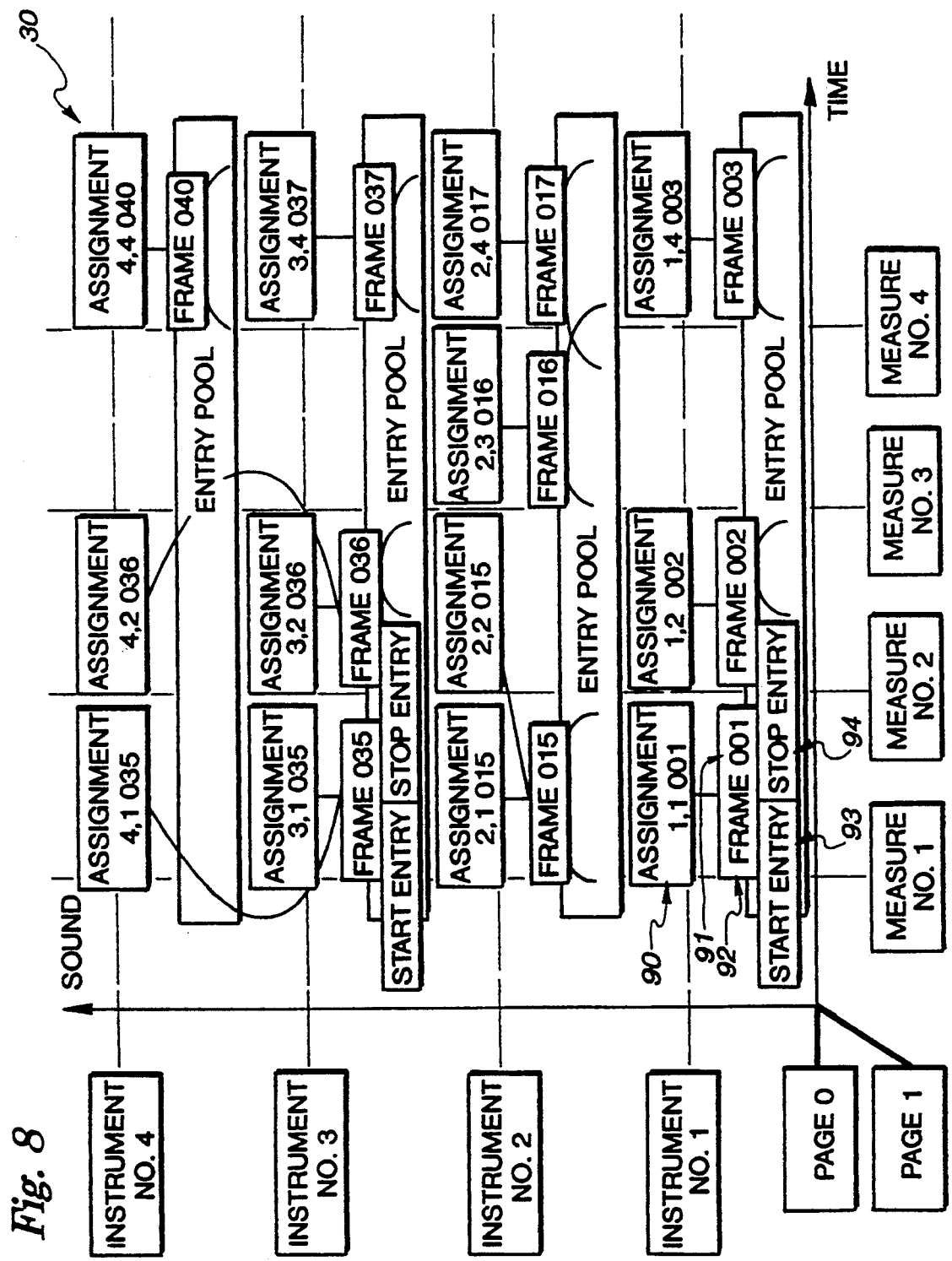
FIG. 8 is a block diagram of the Music Framework showing the relationships among various elements for the sample composition shown in FIG. 7.

Referring now to FIGS. 2, 7 and 8, the Music Framework 30, Enigma Format 50, and Entry Pool 60 and the frame Assignment method of the present invention will be described in operation in terms of a sample composition 100. FIG. 7 shows the sixteen measures of the sample composition as they would be logically placed on the Music Framework 30. FIG. 8 shows a block diagram conceptual representation of the sample composition 100 as stored in the Music Framework 30. The Page-Related Data 40 consists of the title of the composition and any other pertinent page information, such as page layout, etc. The Instrument-Related Data 42 consists of the music data for the four instruments used in the sample composition, First Trumpet 102, Second Trumpet 104, Snare Drum 106, and Piano 108. The Measure-Related Data 44 includes all of the music data relating to the four measures of the sample composition 100 that are shown, i.e. key signature 110, time signature 112. Finally, the Frame-Related Data 46 and the Entry-Related Data 48 hold the majority of the musical information presented in the sample composition 100. It will be seen that the placement of all five categories of music data on the Music Framework 30 allows for a logical organization of the musical information that provides for an efficient access to the musical information.

A couple of interesting aspects of the musical information conveyed by the sample composition 100 shown in FIG. 8 should be noted. In Measure 3, for example, all of the instruments except the Snare Drum 106 have no music data to be played for that measure, i.e. each measure is a whole rest. The Music Framework 30 represent such whole rests as the absence of an Assignment Record 90 for that Framework Intersection. Often times, a composer will want more than one instrument to play essentially the same musical information, or will want the musical information in a frame to be repeated by the same instrument. In music terms this correspondence between frames of music data, either for the same instrument (horizontal) or for different instruments (vertical), is sometimes referred to as hocketing or mirroring. Examples of vertical hocketing are shown at first and Second Trumpet, Measures 1 and 2. An example of horizontal hocketing is shown in Measures 1 and 2 of the Snare Drum. If a composer wants a second frame in a composition to be identical to a first frame, the same musical information for that frame is repeated in the composition. To maintain this identity if the musical information in the first frame should change, the information in the second frame should also change. The Music Framework 30 allows for mirroring or hocketing to be used by the composer, or by the program itself, to make the most use of the musical information.

The use of pointers within the common data structure of the present invention allows for maximum flexibility and optimization in representing the musical information. For example, at Measures 3 and 4 of the Snare Drum, it will be seen that the last pointer of the Frame Record 92 for Measure 3 overlaps the first pointer for the Frame Record 92 for Measure 4. By examining the sample composition in FIG. 7, it will be apparent that the last note in Measure 3 is, in fact, the identical note as the first note in Measure 4. By representing the music data in this manner, computer storage can be conserved and the composer is given ultimate control over all of the music data in a composition so that he or she may identify any entry, or group of entries, in an entire composition and copy that entry, or group of entries, to another location in the composition.

ACCESSING THE COMMON DATA STRUCTURE

Figure 9A:
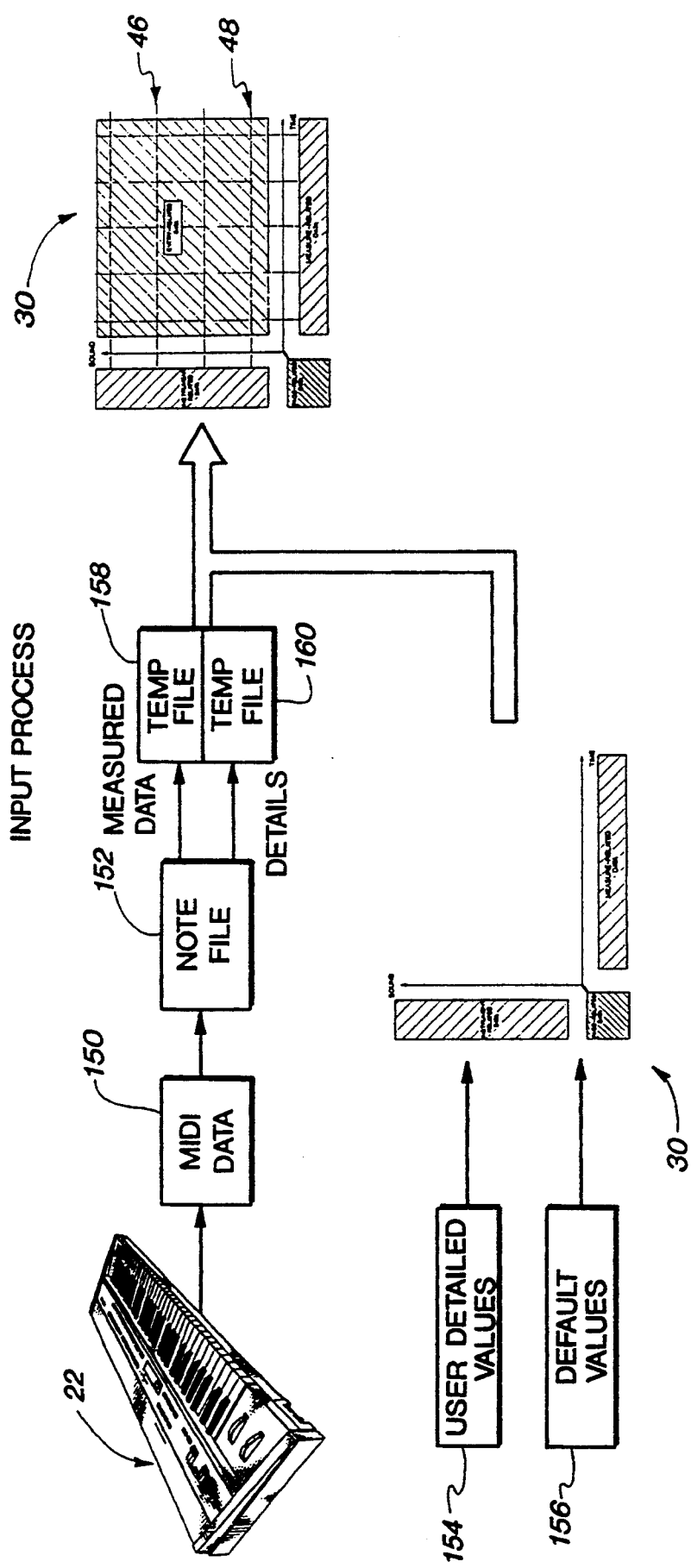

Referring now to FIGS. 9a and 9b, the method and apparatus of the present invention is explained in terms of how music data is placed in and retrieved from the common data structure. For purposes of this explanation, it will be assumed that the music data to be processed is MIDI data from a keyboard instrument 22 and MIDI interface 24, although it will be clear that other forms of electronically coded acoustic or graphic music data may be used as input. Briefly, when music data comes into the music processing apparatus 10 in the form of a MIDI data file 150, it is transcribed into a note file 152 that contains all of the melodic, rhythmic, and interpretive information associated with the MIDI data file 150. At this point, either the user enters user-selected values 154 for Page-Related Data 40, Instrument-Related Data 42 and Measure-Related Data 44 data elements (e.g., time signature, key signature, instrument list), or the music processing apparatus 10 uses prescribed default values 156 for the data elements for these categories of music data as stored in the Music Framework 30. Next, the measured music data is translated into relative data values and stored in a temporary file 158. For example, the melodic data (which is in absolute pitch value) is translated into relative pitch values using the Tone Center Displacement method and the rhythmic data (which is absolute duration values) is translated into relative durational values. The interpretive data and other non-measured values for the rhythmic and melodic data are translated into the appropriate tag structures and also stored in a temporary file 160. The result is a sequential file of Entries 70 (temporary file 158) and associated tag structures (temporary file 160) that are not yet differentiated into measures or organized into the format of the Music Framework 30 and Entry Pool 60 as shown in FIGS. 3 and 4, although the tag structures that have been generated in the Enigma format 50 will now permit the differentiation and organization of the music data to occur. Finally, the Frame-Related Data 46 and the Entry-Related Data 48, including the Entry Stream 62, the Assignment Records 90, and the frame Records 92 are generated by examining the Entries 70 for each channel of music data and identifying the starting and ending points for each frame. A more detailed explanation of the transcription process is presented in the related application entitled, METHOD AND SYSTEM FOR TRANSCRIBING MUSICAL INFORMATION INCLUDING METHOD AND SYSTEM FOR ENTERING RHYTHMIC INFORMATION, filed in the United States Patent Office on Jan. 14, 1988 and identified by Ser. No. 143,861, a copy of which is attached as Appendix A and incorporated herein by reference.

Outputting music data from the common data structure is, to a certain extent, the reverse of the input process. First, all of the music data on the Frame Margin 35 of the Music Framework 30 is collected in a temporary file, including the Page-Related Data 40, Instrument-Related Data 42 and Measure-Related Data 44. Using the music data in the temporary file 160, the music data in the Entry Pool 60 is sequentially added to the temporary file 160 measure by measure, starting with the smallest instrument number. Finally, a transformation 162 of the music data is performed to output the music data either as graphic data 164 to the graphic display screen 20 or the printer 26, or as acoustic data 166 to the electronic keyboard 22 or to an external speaker 28 in the data processing means 12. When a graphic output is intended, all of the music data is converted into pixels with coordinates on a virtual master score that includes all instruments and measures. This master score is then partitioned into pages of an appropriate size either for printing or screen display. When acoustic output is intended, the music data is converted to electronic signals corresponding to notes of the specified frequencies, duration, and volume with the specified relationship to adjacent notes. The acoustic data 166 may drive either an instrument with sound reproducing capability or an external speaker.

The preceding are typical input/output applications for which the method and apparatus of the present invention may be used. In the next sections, two specific methods of accessing the common data structure of the present invention will be described: the Framework Dialogue Box and the Enigma Transportable file. The former is a user interface that permits a user to view and specify many of the music data values, primarily Entry-Related Data values, that are stored in the common data structure. The latter represents an article of manufacture that is produced by the present invention as another potential form of output whereby all of the music data in the Music Framework 30 may be transported from one music processing apparatus 10 to another without losing any of the music data or any of the information about its structure in the Music Framework 30.

The Framework Dialogue Box

Referring now to FIG. 10, a Framework Dialogue Box 180 is shown as one of the preferred ways of allowing the user direct access to the Entry Element 70 data structure in the hierarchy of data structures outlined above. With the music processing apparatus 10 operating on the data processing means 12, the user would select the screen display of the Framework Dialogue Box 180 by using either the keyboard 24 or the mouse 26 to designate a particular framework Intersection 36 to be examined. The framework Dialogue Box 180 gives relevant information about the Entry Elements 70 for that Framework Intersection 36 (as identified by an Assignment Record 90), as well as the ability to alter the music data relating to those Entry Elements 70. All of the information displayed in the Framework Dialogue Box is for one Entry Element 70, although the rest of the Entry Elements 70 may also be accessed by using Prev Entry or Next Entry buttons as described below. Each of the action items on the computer screen for the Framework Dialogue Box 180 is described as follows:

Frame is the Frame Number 91 of the Frame Record 92. This identification number has not so much to do with the frame's position in the score as it does the order in which it was created. A new frame is allocated each time one is needed to hold new information (i.e. new entries). This happens when the user adds additional music data to the score or when the user copies or replaces segments of the score from one location to another.

Start and End are the numbers of Start Entry 93 and Stop Entry 94 that point to the Entry Elements 70 in Entry Pool 60 associated with the Frame Record 92.

eEntry Number is the number of the current Entry Element 70, relative to the order in which it was drawn from the Entry Pool 60.

Entry Slot refers to the position of the current entry in the Framework Dialogue Box 180. A value of 0 indicates that the current entry is the first entry for this Frame Record 92. Greater values indicate subsequent entries.

Duration is the duration of the current entry in relative units.

Position is the horizontal positioning offset of the current entry, relative to its normal position. This number is also in relative units.

OK will return the user to the score, saving any changes he or she has made.

Cancel will return the user to the score, cancelling any changes.

Prev Entry and Next Entry switch the display to the previous and next entry slot for this frame Record 92.

Create creates a new entry before the current one. All values will be set to the default values. If the user wants the new entry to be a note, instead of a rest, he or she must also create a new note as explained below.

Delete deletes the current entry.

Prev Note and Next Note move the display to the next note slot on that entry. Create creates a new note before the current one. All values will be set to the default (0 in all cases).

Delete deletes the current note.

The 32 selection boxes under entry slot 182 represent 32 bits that are part of the data structure for each Entry Element 70. Selecting or deselecting these boxes will alter the appearance and functionality of that particular entry, removing or adding "detail" as the options indicate. In many cases, deselecting a selected box will permanently remove that type of detail from that entry, and that particular type will need to be reentered.

Legality means that this entry is part of the data in the current Frame Record 92. The last entry slot for a Frame Record 92 always has legality turned off. Turning legality off on any entry will establish that entry as the end of the current frame—clicking OK will result in any entries after this entry being removed.

Note/Rest when turned on, dictates that this entry is a note, as opposed to a rest.

V2 Launch marks this entry as the start of a string of voice two entries (although this entry is still a voice one). All subsequent notes will be treated as voice two entries until an entry with the Voice Two bit turned off is reached.

Voice Two signifies that the current entry is a Voice 2 entry.

Chord is turned on if there is a Chord Symbol linked to the entry. Turning this bit off will permanently unlink the chord symbol from the entry.

Clef Change is used for multiple clefs in the Frame Record 92. The program uses it in redrawing the screen to determine where clef changes fall.

Float Rest dictates that this entry, if it is a rest, should float to the pitch of the middle line. If left off, the height of the rest will be determined by the displacement value in Note Slot 0.

Grace dictates that this note is a grace note.

Note Detail means that there is some type of note specific detail attached to this entry. This includes all adjustments made with by the user on the computer screen 18 and any reduction or enlargements made to the notes on this entry. Deselecting this bit will permanently unlink any such detail from this entry.

Mark Detail determines if there are Expression markings associated with the current entry (Note Expressions or Staff Expressions). Deselecting this bit will permanently unlink any such detail from this entry.

Text Detail determines if there are lyrics associated with the current entry. Deselecting this bit will permanently unlink any such detail from this entry.

Tuplet is used to link the current entry to a tuplet definition. Deselecting this bit will permanently unlink any such detail from this entry.

V2 Tup Para is for the special case where a tuplet definition is attached to a series of voice two entries within a tuplet definition on a voice one entry. If the user desires that the temporal spacing of the voice two tuplet be relative to the spacing of the voice one tuplet, this bit must be set on the voice two note that is linked to the voice two tuplet definition.

Ignore makes the current entry invisible. It is used when doing a Horizontal Hocket, and the current entry is not selected for display. It is also used for split measures. The measure is actually drawn in both staves except the ending notes (after the split point) are invisified in the top stave and the beginning notes (before the split point) are invisified in the bottom stave. In a normal measure, selecting this bit will simply "invisify" that entry. All subsequent entries will be drawn in their normal place, but ignored notes will not sound in playback.

Beam Ext dictates that beam extension detail is attached to this entry. Deselecting this entry will permanently unlink any detail from the entry.

Beam/Beat determines where the beams will break. If this bit is left off, and this entry and one before it have a duration of an eighth note or less, the two entries will be beamed together. This bit also affects playback. If this bit is selected, the entry will have a slightly harder attack.

Sec Beam dictates that there is Secondary Beam Break information tied to this entry.

V2 Beam allows voice two entries that are not launched off the same voice one entry to be beamed together. If this entry is an eighth note or shorter, and the last voice two note launched off of the previous voice one entry is an eighth note or shorter, and the Beam/Beat bit is deselected on the current entry and this bit is selected, the two entries will be beamed together.

Freeze Stem allows you to freeze the stem up or down. It works in conjunction with the Up/Down 402 box next to it in the dialogue box.

Stem Detail dictates that there is a stem detail linked to this entry. Deselecting this bit will permanently unlink any detail attached to this entry.

Cross Up dictates that there is cross staff beaming detail attached to this entry.

Cross Down is used to indicate that there was cross staff detail linking part of the current entry to the staff below the current frame.

Reverse Up indicates that the entry has a reverse upstem.

Reverse Dn indicates that the entry has a reverse downstem.

Double Stem indicates that the current entry is double-stemmed.

Split Stem indicates that the current entry contains a split stem. The Upstem Split box in the Note Slot section may be set in conjunction with this bit.

Up/Down determines the direction of the stem if the Freeze Stem bit is also set. If selected, the stem direction will be frozen up, otherwise, it will be frozen down.

Note Slot refers to the different notes and their details that lie resident on each entry. An entry may have up to sixteen notes.

Note ID is a number used to reference the note in that particular note slot. The number here denotes the order in which the notes were entered. Changing this number after the note has been entered has little effect on the note in that slot.

Displacement is the distance of that particular note from the Tone Center 82 in diatonic steps.

Raise/Lower is the Accidental Amount 88 distance of that note from the diatonic displacement.

Legality is similar to Legality in the entry slot. If turned on, it signifies that the current note is part of the current entry. If turned off, it signifies that this note marks the end of the notes on that entry.

Tie Start denotes that the start of a tie is present on that note.

Tie End denotes that the end of a tie is present on that note. This will only graphically appear if the current entry occurs at the beginning of a new staff system or a new page. In playback, the current note will not sound if this bit is set.

Cross Note signifies that this note is displayed in another instrument, and is used in conjunction with Cross Up in the entry slot.

Upstem 2nd if set and the entry has an upstem, will result in the current note being placed on the opposite (right) side of the stem.

Dnstem 2nd if set and the entry has a downstem, will result in the current note being placed on the opposite (left) side of the stem.

Upstem Split is used in conjunction with the Split Stem bit in the entry slot. It signifies that the current note is "split" to the upstem, as opposed to the downstem.

Accidental determines if the Accidental Amount 88 is displayed on the note or not. If set, the accidental will appear.

The Enigma Transportable File

Figure 11:
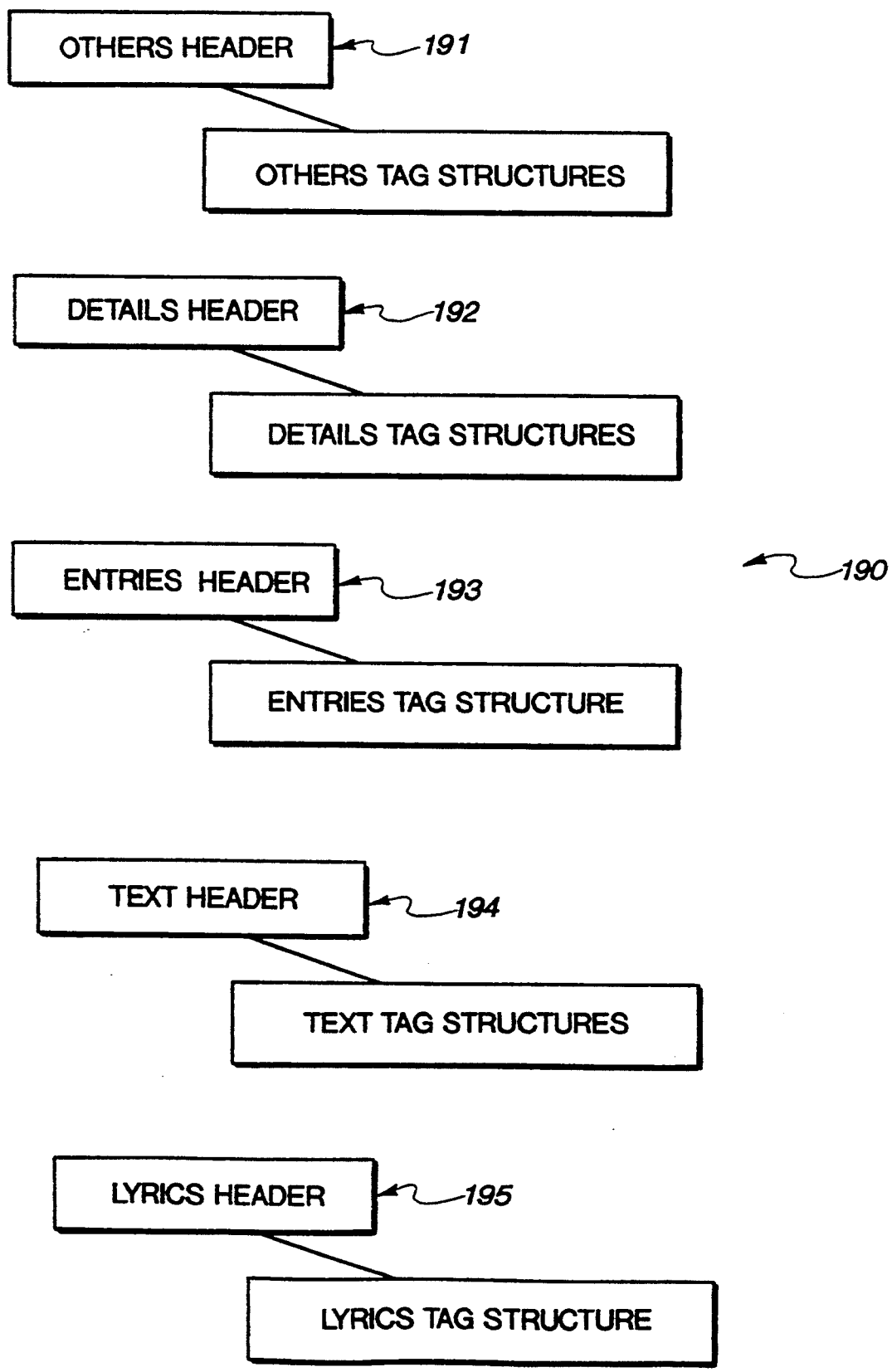
FIG. 11 is a block diagram showing the format of a transportable version of the music data represented in the Music Framework.

Referring to FIG. 11, a block diagram showing the format for a transportable data file 190 embodying the common data structure of the present invention is shown. To preserve the music data in a format that can be most easily reconstructed into the common data structure of the present invention, the transportable data file 190 stores the music data essentially according to the Data Structure Intensive model of the Music Framework as discussed below. In the preferred embodiment, the transportable data file is stored as ASCII and hexadecimal codes with the music data for the different groups of tag structures separated by header records that identify the current group of tag structures. The headers are: Others Header 191, Details Header 192, Entries Header 193, Text Header 194 and Lyrics Header 195. Each header is followed by the ASCII and hexadecimal codes associated with the music data for the particular tag structures or other variable under those headers.

A listing of the Enigma Transportable file 190 generated by the preferred embodiment of the present invention for the sample composition 100 shown in FIG. 7 is attached hereto as Exhibit B and is fully incorporated herein by reference.

TWO CONCEPTUAL MODELS FOR THE MUSIC FRAMEWORK

The software program and common data structure that control the functioning of data processing means 12 may be further explained based on two alternative conceptual models: (1) an Algorithmic Intensive Model, and (2) a Data Structure Intensive Model. The Algorithmic Intensive Model views the software as a collection of routines or "communities" that are executed according to the entry points, subroutine calls and return points specified within their code. Each community is dedicated to accomplishing a specified task. For example, the Playback Community is responsible for assembling a performance from the musical data for audio playback. A community receives or has access to certain musical information contained in various data structures and will pass back selected information to the overall program when the community has accomplished its specified task. Using the Algorithmic Intensive Model, the software is viewed as control means for executing a series of specific music data processing functions, each function operating on musical information stored in a common data structure.

The Data Structure Intensive Model views the software as establishing a set of data structure groups. Each data structure group is responsible for storing selected, related parts of the musical information, for example the relative time duration of all notes. Some data structure groups are more oriented toward acoustic data; others are more oriented toward graphic data. The data structure groups are extensively interlaced by various links with other data structures. These links can be viewed as information requests and/or execution path instructions, because a link to another type of data may require a subroutine call to handle that type of data. Using the Data Structure Intensive Model, the software program is viewed as defining a set of data structure groups, each with a collection of routines to service that group. These routines are then conceptually grouped by manager or supervisory routines that store, link, and provide access to common or interrelated types of musical information.

ALGORITHMIC INTENSIVE MODEL

The software for the music processing system 10 of the present invention can be thought of as four communities: Transcription, Graphics, Playback, and Editing. Each community can be thought of as a group of software routines that performs a specific function. Each Community breaks into smaller groups of software subroutines known as Districts. Some Districts break down further into sub-subroutines called Townships. Some Townships break down further into sub-subroutines called Blocks.

The Transcription Community is responsible for the conversion of mass music data input that specifies a composition into usable data for the Graphics Community. A master note file would be the normal input to the Transcription Community. The Transcription Community takes this note file and converts it into Graphic File Records. The Graphics Community is responsible for assembling a visual score from the musical data. Responding to certain information found in the data, the Graphics Community selects execution paths. During the execution of these paths a score is created. The Playback Community is responsible for assembling a performance from the musical data. Responding to information found in the data, the Playback Community creates a playback list and calls a routine to output the information to a playback channel. The Editing Community is responsible for manipulating the musical data in accordance with the user's desires. After the manipulation is complete, the supervisory program could call the Graphics Community to update the visual score of the edited composition or the Playback Community to perform the composition as changed by editing.

The Transcription Community

The Transcription Community breaks into four districts:
Transfer
Filter
Krunch
Record The Transfer District is responsible for packing an internal data structure with a measure's worth of information. It is the Transcription Community District which deals with the outside world. Two hardware specific routines called getkey() and putkey() provide the interface.

The Filter District is responsible for arranging the music data for the Krunch District. It insures that the notes are in the Protocol Note File format and performs any necessary data manipulation including quantization.

The Krunch District converts the sanitized data into a Graphic File Record. In the process it performs duration analysis, harmonic analysis, stem assignment and harmonic rest assignment.

The Record District places the Graphic file Record into mass storage. The actual destination of the record is program dependant.

The Filter District

The Filter District breaks into three Townships:
Protocol
Justify
Resolve

The Protocol Township insures that the music data is in the correct protocol. It is called at the beginning and the end of the Filter District.

The Justify Township justifies the left and right edges of note groupings. It also checks for quick succession of notes with small durations and small overlaps. It eliminates these overlaps. The Justify Township breaks into three Blocks: Right Justify, Overlaps and Long Durations.

The Resolve Township quantizes the music data with the resolution (time base) set by the user. The Resolve Township breaks into two Blocks: Resolve Start and Resolve End.

The Krunch District

The Krunch District breaks into four Townships:
Duration Analysis
Harmonic Assignment
Stem Assignment
Rest Harmonic Assignment The Duration Analysis Township sweeps through the music data and compiles entries. It assigns these entries Primary Voice and Secondary Voice status. It interleaves any necessary rests. The Duration Analysis Township breaks into four Blocks: Next Rest, Entry Grouping, Voice Assignment and Entry Log.

The Harmonic Assignment Township takes the new entries and the current key signature and assigns harmonic content to the notes. The Harmonic Assignment Township breaks into two Blocks: Harmonic Level Assignment and Seconds Status Assignment.

The Stem Assignment Township sweeps through the entries and assigns stem directions.

The Rest Harmonic Assignment Township sweeps the entries and assigns harmonic content to the rests.

The Graphics Community

The Graphics Community is unique in that three governors or supervisory routines rule this community: The Score Governor, The Part Governor and the POSTSCRIPT Governor. Each of these can rule the Graphics Community for it own type of output. The Graphics Community breaks into three districts:
Page
Stave
Measure The Page District is responsible for driving a page of music to the output device. The Stave District is responsible for a stave of music to the output device. The Measure District is responsible for driving a measure of music to the output device.

The Page District

The Page District breaks into four Townships:
Stave
Page Text
Arbitrary Page Music
Header The Stave Township is the same as the Stave District. This township is elevated to the level of a district, because it can serve as an alternate entry point for the Graphics Community.

The Page Text Township prepares for output any text blocks assigned to the page.

The Arbitrary Page Music Township prepares for output any arbitrary music assigned to the page.

The Header Township prepares for output any headers for the page. The Header Township breaks into two Blocks: Global Headers and Local Headers.

The Stave District

The Stave District breaks into eight Townships:
Staff Creation
Measure Allocation
Signature
Dynamic
Repeat
Measure Number
Measure Text
Arbitrary Measure Music
Barline The Staff Creation Township draws the stave system to the output device. The Staff Creation Township breaks into three Blocks: Draw Staff, Draw Bracket, Draw Instrument Name.

The Measure Allocation Township determines the number of measures to pack on the present line.

The Signature Township draws the time and key signatures for the piece as needed. The Signature Township breaks into two Blocks: Key and Time.

The Dynamic Township draws dynamics to the output device. The Dynamic Township breaks into two Blocks: Text Dynamics and Object Dynamics.

The Repeat Township draws repeats to the output device. The Repeat Township breaks into three Blocks: Bar Repeats, Bar Endings and Text Repeats.

The Measure Number Township draws measure numbers to the output device.

The Measure Township is the same as the Measure District. This township is elevated to the level of a district, because it can serve as an alternate entry point for the Graphics Community.

The Measure Text Township outputs any text blocks assigned to the measure.

The Arbitrary Measure Music Township outputs any arbitrary music assigned to the measure.

The Barline Township draws barlines to the output device.

The Measure District

The Measure District breaks into three Townships:
Beam
Entry
Grace

The Beam Township draws beam groups to the output device. The Beam Township breaks into three Blocks: Beam Calculation, Entry Drawing and Beam Drawing.

The Entry Township draws entries to the output device. It is the same as the Entry Drawing Block under the Beam Township however it is an alternate entry point in the Measure District. The Entry Township breaks into nine Blocks: Clef Change, Interpretive Mark, Entry Dynamic, Lyric, Rest, Chord, Note, Stem and Accidental.

The Grace Township drives the Beam and Entry Townships to create grace notes.

The Playback Community

The Playback Community breaks into four districts:
Interpretive Mark
Dynamic
Grafile
Repeat The Interpretive Mark District is responsible for altering the start times, end times and amplitudes of notes through interpretive marks.

The Dynamic District is responsible for deciphering the dynamics and logging them in the output stream.

The Grafile District converts the frame record into acoustic data and logs it in the output stream.

The Repeat District tracks the progress of playback through the measures of the piece and redirects flow as necessary.

The Edit Community

The Edit Community provides access to and the ability to change all elements of the music data that a composer would desire to change. It is analogous to a word processor for word-oriented text, but must be able to handle all the data in the common file structure set forth above.

DATA STRUCTURE INTENSIVE MODEL

Figure 12:
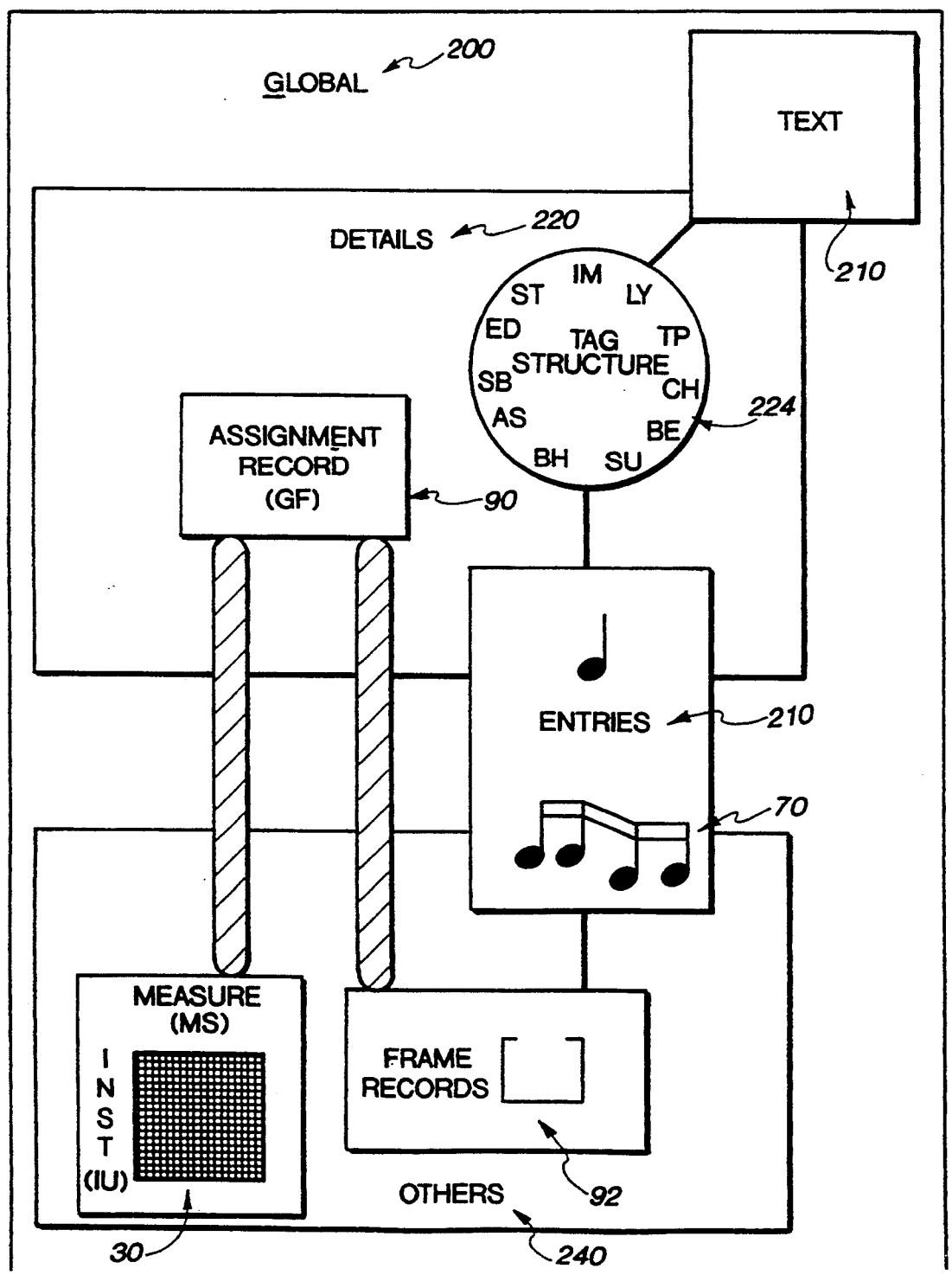
FIG. 12 is a block diagram of a Data Structure Intensive Model showing the relationship among the various data structure groups used by the Music Framework.

A simplified block diagram of the interrelationships among the primary data groups that are stored in the common data structure of the Music Framework 30 is shown in FIG. 12. The primary data groups represent a conceptual scheme for bringing together data that are either functionally related for purposes of computer processing or conceptually related in the mind of a composer-user of the present system or both. Related data elements having the same comparator structure for their tag structure are stored together in one of the data groups in the memory means of the data processing means 12 and operated on by common software routines. Though the various categories of music data, i.e. Page-Related Data 40, Entry-Related Data 48, are each represented in district tag structures, the music processing apparatus 10 stores certain of the tag structures together in these data groups so that they may be accessed and manipulated more easily.

The common data structure for the Music Framework 30 may be viewed as comprising several data groups: The Global Group 200, the Entries Group 210, the Detail Group 220, the Text Group 230 and the Other Group 240. In the preferred embodiment of the present invention, the data structure for the Music Framework 30 is defined by declaration statements in the preferred programming language C, and each of the declaration statements for each of the data groups includes declarations for all of the tag structures that will be associated with that particular data group. An extensive and detailed explanation for each of the tag structures, as well as the relationship between the tag structures and the data groups and the tag structures and the software routines is set forth in Appendix C, entitled "Discussion of the Enigma Data Structures", which is fully incorporated herein by reference. Appendix C provides specific programmer-level information on the preferred embodiment of the present invention.

The Global Group

Briefly, the Global Group 200 contains the data that should be available as a common resource for all of the remaining data groups. Because the present invention is designed to store music data in a form that is both transportable and extensible, there are many composition-wide defaults and control values that may be assigned by the user. Some of these defaults and control values are stored in the Global Group 200 and are available to all of the remaining data groups. Data elements in the Global Group 200. Some of the global variable are not expressed in the Enigma Format. They are programming language variables that are globally defined.

The Entries Group

The Entries Group 210 contains the actual individual units of music data or Entry Elements 70. These are identified by the Enigma format tag "eE" in the Enigma Transportable file 190. An entry contains the basic melodic and rhythmic information necessary to represent the individual unit of music data. An entry also contains the interpretive information needed for stylistic variations in graphically representing the individual unit of music data, such as stem direction, type of beaming and voice status.

The majority of the music data for an Entry Element 70 is stored in the bit-mapped data fields Effect 78 and Notation 79. The bit maps for both Effect 78 and Duration 79 are set forth below in hexadecimal format. For each bit field identified, a brief description of the function of the bit field is provided. The parenthetical references in the description are to the tag structure definitions that are set forth in Appendix C.

| EFFECT Bit Field Definitions | |
|---|---|
| Bit Field Name | Bit Position |
| SETBIT | 0x80000000 |
| NOTEBIT | 0x40000000 |
| CNTLRBIT | 0x20000000 |
| CNTLBIT | 0x10000000 |
| LINKBIT | 0x08000000 |
| CHORDBIT | 0x04000000 |
| ICLEFBIT | 0x02000000 |
| FLOATREST | 0x01000000 |
| GRACENOTE | 0x00800000 |
| NOTEDTAIL | 0x00400000 |
| IMRKDTAIL | 0x00200000 |
| TEXTDTAIL | 0x00100000 |
| TUPLSTART | 0x00080000 |
| CTUPPARA | 0x00040000 |
| PRFMDATA | 0x00020000 |
| OCTVCONT | 0X00010000 |
| IGNOREBIT | 0x00008000 |
| BMEXTDTAIL | 0x00004000 |
| SPECIALALTS | 0x00001000 |
| BEATBIT (BEAMBIT) | 0x00000800 |
| SECBEAMBIT | 0x00000400 |
| CNTLCONTBIT | 0x00000200 |
| FREEZSTEM | 0X00000100 |
| STEMDTAIL | 0x00000080 |
| CROSUPBIT | 0x00000040 |
| CROSDWBIT | 0x00000020 |
| REVUPSTEMBIT | 0x00000010 |
| REVDWSTEMBIT | 0x00000008 |
| DBLSTEMBIT | 0x00000004 |
| SPLITBIT | 0x00000002 |
| UDBIT | 0x00000001 |

SETBIT—This bit must be set for the program to recognize the entry.

NOTEBIT—If this bit is set, the entry is a note entry. Otherwise, it is a rest entry.

CNTLRBIT

CNTLBIT—These two bits control the temporal function definitions for entries. Temporal function definitions are necessary because of split-stemming. Music notation allows the over lapping of durations under certain circumstances. The three classes for temporal function definition are Normal, Controller and Controlled. A Normal entry begins and ends without interference from others. If other entries begin with the period of existence for an entry, it is a Controller entry. These other entries which begin and end are Controlled entries, since come aspects of their visual appearance are controlled by the Controller entry, i.e. stem and tie direction. The CNTLRBIT is set for Controller entries. The CNTLBIT is set for Controlled entries. Neither bit is set for normal.

LINKBIT—If this bit is set, the program will treat this entry and the next entry as one entry. The LINKBIT can be set on successive entries to form an entry of up to 29 notes.

CHORDBIT—If this bit is set, the program will look for a CHRD record in the Detail Group under this record and entry number (See discussion of CHRD in the Detail Group).

ICLEFBIT—This bit signals an inter-measure clef change the program sets this bit in response to the creation of CLEFENUM records (See discussion of CLEFENUM in the Other Group).

FLOATREST—If this bit is set and the entry is a rest entry, the program will use the harmonic value of the middle line of the staff for its vertical position regardless of the clef.

GRACENOTE—If this bit is set, the entry is grace note.

NOTEDTAIL—If this bit is set, the program will look for CUEN and ALTS records in the Detail Group under this record and entry number (See discussion of CHRD in the Detail Group and ALTS in the Detail Group).

IMRKDTAIL—If this bit is set, the program will look for IMRK, ITXT, RPNO and TUPN records in the Detail Group under this record and entry number (See discussion of IMRK, ITXT, RPNO and TUPN in the Detail Group).

TEXTDTAIL—If this bit is set, the program will look for Lyric Data (LYRDATA) and WEXT records in the Detail Group under this record and entry number (See discussion of LYRDATA and WEXT in the Detail Group).

TUPLSTART—This bit signals the start of a tuplet. If it is set, the program will look for a TUPL record in the Detail Group under this record and entry number (See discussion of TUPL in the Detail Group).

CTUPPARA—Normally when a controlled entry begins a tuplet, the reference duration value is fetched from the current durational units. If this bit is set, the program will use the durational units in existence to the controller entry for the reference duration.

PRFMDATA—If this bit is set, the program will look for PERFDATA records in the Detail Group under this entry number (Using the high and low words) (Using the high and low words) (See discussion of PERFDATA in the Detail Group).

OCTVSTART

OCTVCONT—These bit are reserved for future expansion.

IGNOREBIT—If this bit is set, the program will ignore the entry.

BMEXTDTAIL—If this bit is set, the program will look for a BEAMEXTEND record in the Detail Group under this record and entry number (See discussion of BEAMEXTEND in the Detail Group).

SPECIALALTS—If this bit is set, the program will look for a TIEALTER records in the Detail Group under this entry number (Using the high and low words) (See discussion of TIEALTER in the Detail Group).

BEATBIT (BEAMBIT)—This bit signals the start of a new beam.

SECBEAMBIT—If this bit is set within a beam group, the program will break the secondary beams (those less than an eighth at this entry).

CNTLCONTBIT—Normally, the beaming of controlled entries occurs with the period of existence for the controller entry. If this bit is set, the program can beam two controlled entry groups together, even though they may be separated by a controller entry.

FREEZSTEM—If this bit is set the stem direction is frozen with the setting of UDBIT.

STEMDTAIL—If this bit is set and the entry starts a beam group, the program will look for BMLO and BMHI records in the Detail Group under this record and entry number (See discussion of BMLO and BMHI in the Detail Group and ALTS in the Detail Group). Otherwise, the program will look for a STHG record in the Detail Group under this record and entry number (See discussion of STHG in the Detail Group). In both cases, the program will look for a STEMDEF record in the Detail Group under this record and entry number (See discussion of STEMDEF in the Detail Group).

CROSUPBIT

CROSDWBIT—The program allows selected notes of entries to cross up or down to other staves in the stave system. If either bit is set, the program will set the CROSSBIT on a note before drawing it and if that bit is set it will draw the note in the staff above or below the current staff depending on whether the CROSUPBIT or the CROSDWBIT is set.

REVUPSTEMBIT

REVDWSTEMBIT—The program allows stems to be reversed independently for upstems and downstems.

DBLSTEMBIT—If this bit is set, the program will double stem the entry.

SPLITSTEM—If this bit is set, the program will split stem the entry. The notes which are a part of the upstemming will have their UPSPBIT set.

UDBIT—This bit indicates whether the entry is upstemmed or downstemmed.

NOTATION Bit Field Definitions

| Bit Field Name | Bit Position |
| --- | --- |
| SETBIT | 0x80000000 |
| TSBIT | 0x40000000 |
| TEBIT | 0x20000000 |
| CROSSBIT | 0x10000000 |
| UPSECBIT | 0x08000000 |
| DWSECBIT | 0x04000000 |
| UPSPBIT | 0x02000000 |
| ACCIBIT | 0X01000000 |
| NOTEID | 0x001F0000 |
| TCDBITS | 0x0000FFF0 |
| TCDRLBIT | 0x00000008 |
| TCDAMOUNT | 0x00000007 |

SETBIT—This bit must be set for the to recognize the note.

TSBIT

TEBIT—These bits signal the beginning and end of a tie respectively.

CROSSBIT—If this bit is set and either the CROSUPBIT or CROSDWBIT is set in the ef element above, the program will look for a CROSSSTAF detail and attempt to cross-staff the note to the instrument in it

UPSECBIT

DWSECBIT—The program defines upstem seconds and downstem seconds. This bits indicate to the program if this note is either or both.

UPSPBIT—If this bit is set and the SPLITBIT is set in the ef element above, the program will group this note with the upstem. Otherwise, the note will be grouped with the downstem.

ACCIBIT—If this bit is set, the program will draw an accidental on the note.

NOTEID—These bits allow the program to stamp an ID on the note which will not change even if the note changes. It allows the continuous tracking of note in horizontal hockets, for instance.

TCDBITS—These are the Tone Center Displacement bits that defines notes in relationships to key. The value in these bits is a tone center displacement in terms of harmonic levels from the tone center of the key. The program creates the actual harmonic level on the fly as its drawing the record. This means the record can be placed in any key signature and all the note heads and accidentals will automatically be placed correctly. The tone center displacement is in the range of −1048 to 1047.

TCDRLBIT—This bit indicates whether the value in TCDAMOUNT will raise or lower the tone center displacement. Set for raise TCDAMOUNT—These bits supply the amount of alteration which should be applied to the tone center displacement. For instance, a d sharp in the key of c would have a tone center displacement of 1, the TCDRLBIT set and a value of 1 in these bits. An e flat in the key of c would have a tone center displacement of 2, the TCDRLBIT clear and a value of 1 in these bits.

The Details Group

The Detail Group 220 operates primarily with the Entry Elements 70 and the Assignment Records 90. As discussed in more detail later, the Assignment Records 90 are used to place frame-Related Data 46 at particular framework Nodes 36 of the Music Framework 30. A great deal of additional music data may be associated with each of the Entry Elements 70 by using a variety of tag structures shown in the Detail Tags 124 to handle, for example, the modification of stems and beams, alteration of size of entries, assignment of interpretive marks, assignment of interpretive text, construction of tuplets, assignment of lyrics, construction of chord symbols, assignment of records to particular instruments and measures, assignment of text blocks to measures, control of floating key and time signatures, and assignment of arbitrary music to measures, among other things. In short, the Detail Group 220 contains the tag structures that handle all of the complex details associated with the musical information. The tag structures defined for the Detail Group 220 are listed by tag 54, structure name as identified in Appendix C, and a brief description of the function of the tag:

| Tag | Structure Name | Description |
| --- | --- | --- |
| AC | PERFDATA | Performance Data for Captured Performance |
| AS | ALTS | Alternate Sizing |
| BH | BMHI | Beam High Alteration |
| Bh | SBMALT | Secondary Beam Alteration (High) |
| BL | BMLO | Beam Low Alteration |
| Bl | SBMALT | Secondary Beam Alteration (Low) |
| BM | BEAMCHART | Beaming Chart |
| CD | CROSSTAFF | Cross Staff Information |
| CH | CBRD | Chord Symbol |
| ch | LYRDATA | Choruses |
| CL | LYRICLINES | Base Line Offsets for Vertical Positioning of Chords |
| CN | CUEN | Cued Note |
| Cn | CLEFOCTV | Clef/Octave Delineation for Key Formats (Negative Bank) |
| CP | CLEFOCTV | Clef/Octave Delineation for key Formats (Positive Bank) |

-continued

| Tag | Structure Name | Description |
| --- | --- | --- |
| DE | BEAMEXTEND | DownStem Beam Extension |
| ED | EDYNAMIC | Entry Level Dynamic Assignment |
| FL | FLOATS | Floating Key and Time Chart |
| GF | GFHOLD | Grafile Record Assignment Chart |
| HH | HHOCKSPEC | Horizontal Hocketting Note Selection Charts |
| HI | SHAPENOTE | Instrument Shape Note Head Data Files |
| HR | SHAPENOTE | Frame Shape Note Head Data Files |
| IM | IMRK | Interpretive Mark |
| KS | DTSTRING | Symbol Lists for Replacing Accidentals |
| LD | LDLINE | Line Spacing Delineation Charts |
| LP | DTPERCENT | Line Percentage Enduction Chart |
| ME | MIDIEXPRS | MIDI Expressions |
| MM | MARBMUSIC | Arbitrary Music Assignment for Measures |
| MT | MXTTIE | Text Block to Measure Assignment |
| RP | RPNO | Roll Piano Mark (Iterated Interpretive Marks) |
| sB | DTSTRING | Secondary Beam Break Information |
| se | LYRDATA | Sections |
| SL | STEMDEF | Alternate DownStem Definition |
| ST | STHG | Stem Height Alteration |
| SU | STEMDEF | Alternate UpStem Definition |
| Te | TIEALTER | End Tie Alteration Information |
| TN | TUPN | Tuplet Number Specification |
| TP | TUPL | Tuplet Specification |
| Ts | TIEALTER | Start Tie Alteration Information |
| UE | BEAMEXTEND | UpStem Beam Extension |
| ve | LYRDATA | Verses |

The Text Group

The Text Group 230 is a data structure that may store either of two types of textual information: lyrics or text blocks. Lyrics are strings of characters that are linked to individual entries that will be displayed along with the entries when the musical information is graphical displayed. Text blocks are all other types of textual information that may appear on a piece of sheet music, but do not convey musical information. For example, the composer's name, the title of the composition, or a copyright notice.

The Other Group

All other data not encompassed by the Global Group 200, the Entries Group 210, the Detail Group 220, or the Text Group 230 are found in the Other Group 240. The Other Group 140 is a data structure that controls the layout of the music information and the assignment of repeats, dynamics, arbitrary music format and placement, headers, text blocks, measure numbers, shape definitions and alternate key and time signature formatting. The Other Group 240 includes the tag structures that define music data for the time and sound dimensions of the Music Framework 30, in the form of the Instrument Usage 'IU' tag structure and the Measure Specification 'MS' tag structure. The tag structures defined for the Other Group 240 are also listed by tag 54, structure name as identified in Appendix C, and a brief description of the function of the tag:

| Tag | Structure Name | Description |
| --- | --- | --- |
| AB | ARBBOUNDS | Arbitrary Music Bounds Specification |
| AC | TDIALATION | Performance Information for Time Dilation |
| AH | ARBHEADER | Arbitrary Music Header Specification |
| AM | ARBMUSIC | Arbitrary Music Specification |
| An | AAMOUNT | Accidental Alteration Amount (Negative Bank) |
| Ap | AAMOUNT | Accidental Alteration Amount (Positive Bank) |

-continued

| Tag | Structure Name | Description |
|---|---|---|
| BC | BEATCHART | Alternate Positioning Chart by Beats |
| BI | SEPERATES | Separate Position Placement |
| BR | BACKREPT | Backward Bar Repeat Specification |
| CE | CLEFENUM | Inter-Measure Clef Changes List |
| CS | CSPEC | Core Specification |
| DA | DURALLOT | Duration Allotment for Proportional Spacing |
| DB | DATABLOCK | Data Array in Words |
| DC | ILIST | Inst List for Individual Placement of Dynamics (score) |
| dc | ILIST | Inst List for Individual Placement of Dynamics (parts) |
| De | ENCLSPEC | Dynamic Enclosure Specification |
| DI | SEPERATES | Separate Position Placement |
| DO | DOBJSPEC | Dynamic Object Specification |
| DT | DTXTSPEC | Dynamic Text Specification |
| DY | DYNAMIC | Dynamic Assignment |
| EB | DATABLOCK | Text Shapes Exception Block |
| EE | REPTENUM | Repeat Actuators Enumeration |
| EI | SEPERATES | Separate Position Placement |
| EN | STRINGS | Effects Name |
| ES | ENDSTART | Ending Bracket Repeat Specification |
| ET | ENDGTEXT | Ending Bracket Text |
| FA | FRAMEATTS | Frame Attributes |
| FM | FREEZMEAS | Frozen Measure Group |
| FN | STRINGS | Font Name |
| FR | FRAMESPEC | Frame Specification |
| FS | FROZENSTAVE | Frozen Stave Specification |
| Fs | FROZENSPLIT | Frozen Measure Split Specification |
| GN | STRINGS | Group Name |
| GP | DATABLOCK | Group Pool (Delivers the next group ID to use) |
| GS | GSPEC | Instrument Group Specification |
| He | ENCLSPEC | Header Enclosure Specification |
| HS | BEADSPEC | Header Specification |
| HT | STRINGS | Header Text |
| IA | INSTATTS | Instrument Attributes |
| IK | DATABLOCK | Suffix Interval Keynumber Offsets |
| IL | ILIST | Instrument List |
| IN | STRINGS | Instrument Name |
| IO | ILIST | Inst List for Individual Override for Dynamics (score) |
| io | IUST | Inst List for Individual Override for Dynamics (parts) |
| IP | DATABLOCK | Instrument Pool (Delivers the next instrument ID to use) |
| IS | ISPEC | Instrument Specification |
| IU | INSTUSED | Stave Instrument Usage |
| IV | INTVBANK | Interval (or Suffix) Bank |
| IX | IMRKDEF | Interpretive Mark Definition |
| KA | KEYSATTRIB | Key Format Attributes |
| KF | KEYFORMAT | Alternate Key Format Specification |
| KL | CLIPSPEC | Clip Specification |
| KM | KEYIVIAP | Key Mapping for Relationship of Semi to Scaletones |
| LB | LONGBLOCK | Data Array in Longs |
| LI | SEPERATES | Ending Bracket Text Separate Position Placement |
| Me | ENCLSPEC | Measure Number Enclosure Specification |
| MI | SEPERATES | Individual Positioning for Measure Numbers |
| MM | ARBASSIGN | Arbitrary Music Measure Assignment |
| MN | MENUMAP | Measure Number Specification Map |
| Mn | MENU2MAP | Secondary Measure Number Specification Map |
| MO | ILIST | Measure Number Individual Override |
| MP | DATABLOCK | Initial Patch Settings for MIDI Channels |
| MS | MSPEC | Measure Specification |
| NS | NAMESPEC | Instrument Name Specification |
| OC | DATABLOCK | Output Route (Channel) Mapping to Midi Channels |
| On | ACCIORDER | Accidental Alteration Order List (Negative Bank) |
| Op | ACCIORDER | Accidental Alteration Order List (Negative Bank) |
| PD | PLAYDUMP | Dump String Enumeration for Text Dynamics |
| Pd | PLAYDUMP | Dump String Enumeration for Object Dynamics |
| PL | PLAYINST | Instrument Output Channel Configuration |
| PM | PARBMUSIC | Arbitrary Music Page Assignment |
| PO | PAGEOFFSET | Page Coordinate Offsets |
| PP | PERCENTS | Page Percentage Reduction/Enlargements |
| PS | PSPEC | Page Specification |
| PT | TEXTBLOCK | Text Block Definition |
| pT | PTXTTIE | Text Block Assignment to Page |
| RI | SEPERATES | Repeat Separate Position Placement |
| RO | ILIST | Repeat Individual Override |
| RS | REPTSPEC | Repeat Specification |
| RS | REPTENUM | Repeat Actuators Enumeration (Incident of 1) |
| RT | REPTTEXT | Repeat Text |
| RU | REPSUSED | Repeat Assignment |
| Rx | ENCLSPEC | Repeat Enclosure Specification |
| SB | SHAPEDATA | Shape Definition Data |
| SD | SHAPEDEF | Shape Definition |
| SL | SHAPELIST | Shape Definition Instruction List |
| SP | PERCENTS | Stave Percentage Reduction/Enlargements |
| SS | SSPEC | Stave Specification |
| TD | TXTLAYOUT | Text Layout for Text Block Assignment |
| TL | TIMELOWER | Alternate Time Signature Lower Half |
| Tn | FSTKEY | Tone Centers for Key Format (Negative Bank) |
| Tp | FSTKEY | Tone Centers for Key Format (Positive Bank) |
| TU | TIMEUPPER | Alternate Time Signature Upper Half |
| XI | XISPEC | Part Extraction Rest Measure Specification |
| XL | DATABLOCK | Executable Shape Sample List |
| XS | EXECSHAPE | Executable Shape Definition |

The tag structures of the Detail Group 220 and Other Group 240 are both defined to provide for representation of most of the visual and acoustic attributes that might be associated with the musical information at the note, rest and chord-level that will be processed by the music processing apparatus 10. However, the flexibility and extensibility of the Enigma format 50 allow for any number of additional tag structures to be defined to accommodate any visual or acoustic musical information that a composer or musician might want to have represented in a music processing apparatus. When the Enigma format 50 is combined with the Music Framework 30, the Entry Pool 60 and the Relative Representation and Frame Assignment methods, the present invention is capable of representing musical information in a method and apparatus that approaches an ideal music processing apparatus.

REPRESENTING GUITAR FINGERBOARDS

With the previous description of how musical information can be represented in a common data structure, a method and system will be described for representing musical information as guitar fingerboards showing how graphic representations for guitar fingerboards may be dynamically generated based upon the automatic analysis of selective chord notations that are represented in the common data structure. It will be seen that in the preferred embodiment of the present invention, the chord notation that will be associated with a guitar fingerboard is represented in the common data structure described above. In particular, the chord notations are represented as an entry or group of entries using the relative Tone Center Displacement method described above. Alternatively, the chord notation may be represented as a chord symbol (i.e., a letter or group of letters—"E" or "Cm7"), using, for example, the "ch" tag structure described above. While the common data structure and tag structure are the preferred method and apparatus for representing the chord notation to be automatically mapped into a guitar fingerboard, it should be recognized that many other methods and systems for representing chord notation would work equally as well with the present invention.

Figure 13:
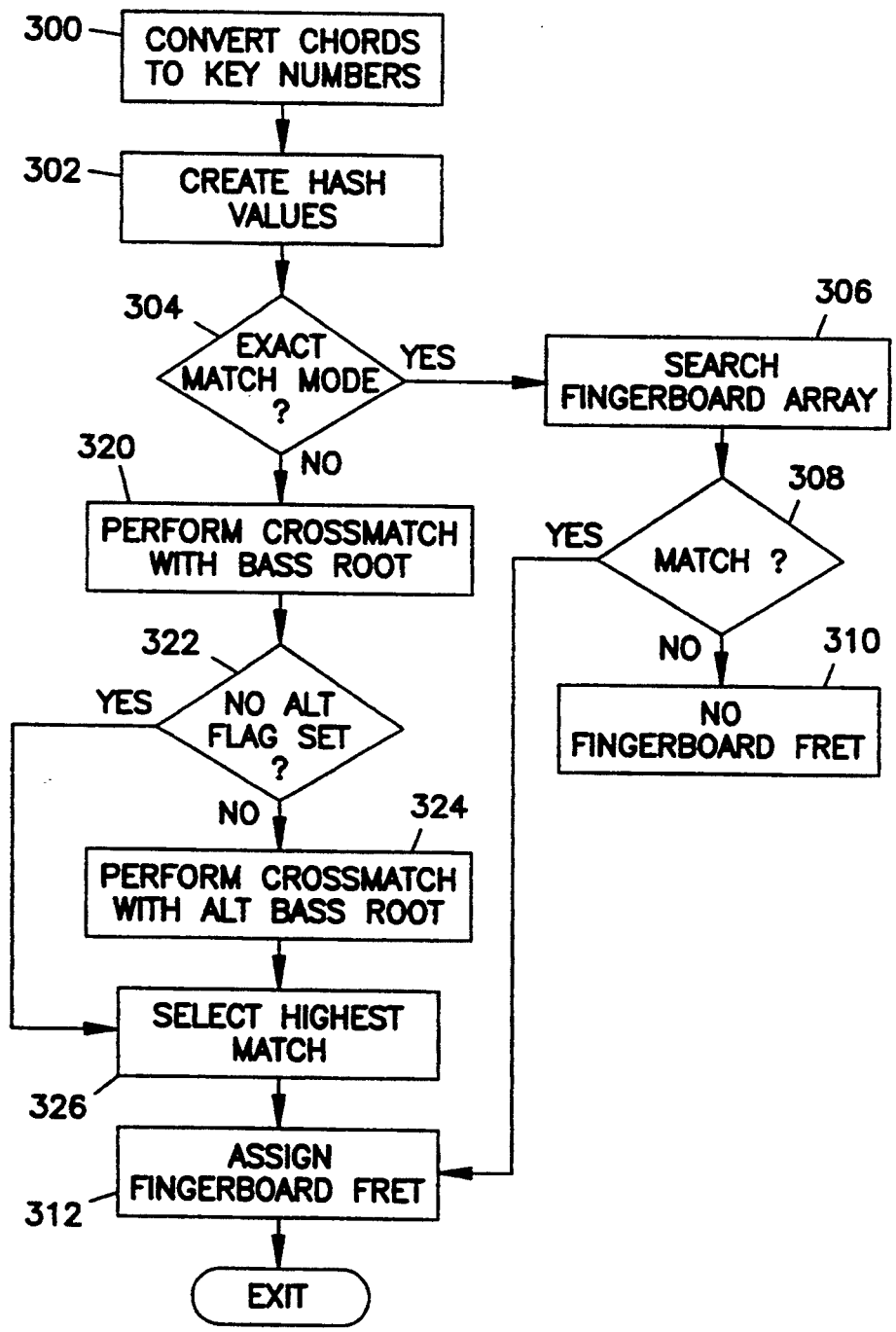
FIG. 13 is a simplified flow chart showing the automatic transposition and mapping of a selected chord symbol into fretting positions for a guitar fingerboard.

Referring now to FIG. 13, a flow chart outlining the steps for automatically mapping a chord notation onto a guitar fingerboard is shown. At Convert Chords 300, a chord notation as represented as an Entry Element 70 is converted into key number (representing semitones) and normalized to the octave at Middle C. The bass root of the chord and the alternate bass root of the chord are also converted into key numbers. For example, a "C7" chord in the key of C is comprised of the notes "C", "E", "G" and "B-flat". The MIDI key number for each of these notes is 60, 64, 67 and 71, respectively. The bass root of the chord is "C" and, because these keys are a "perfect" chord, there is no alternate bass root. Once the chord notations are converted to key number values, Create Hash Value 302 generates a hash value representing all of the notes in the chord. The hash value is an efficient way of representing the normalized chord notation in terms of its bass root. The key number for the bass root of the chord is always assumed to be present and then every additional key number in the chord is represented as a semitone bit value in a 16 bit data structure. The least significant bit of the hash value would be the semitone just above the bass root, with the next bit representing the next semitone and so on. Using the "C7" chord described above, the 16 bit hash value would be "0000 1000 0100 1000". The "C" is the bass root and is not represented. For example, the "E" is 4 semitones away from "C", so the fourth least significant bit is set. The bass root, the alternate bass root, and the hash value form the variables that are used to automatically analyze the chord to determine the proper fretting positions for the guitar fingerboard.

In the preferred embodiment, the programmable data processing system may be set by the user to perform either an exact match of the bass root and hash value or to perform a cross match approximation. At Exact Match Mode 304, the program determine which mode has been set. If an exact match is required, Search Fingerboard Array 306 determines if an exact match exists in an array of fingerboard records of a chosen set of 16 combinations of fretting positions for the bass root of the chord being searched. Up to 65,000 possible combinations of fretting positions may be represented for all keys. However, to minimize lookup time, only sixteen combinations are chosen for each bass root. As the bass root may be any of the semitones in an octave, the total array includes all possible fretting combinations for all of the bass roots. If an exact match is found at Match 308, then Assign Fingerboard frets 310 assigns the correct graphical representation of the fingeboard for the associated chord notation to be printed out or displayed whenever that chord is displayed on a staff line. If no match is found, then No Fingerboard Frets 312 returns an empty set from the function call and the analysis did not come up with a fingerboard fret assignment for the particular chord notation. The advantage of requiring an exact match is that the search time for automatically analyzing the chord notation is relatively short. The disadvantage is that only "pure" chords will be mapped onto the guitar fingerboard.

If Exact Match Mode 304 is not set, then the program will perform Call Crossmatch With Bass Root 320. The Crossmatch routine is designed to select the best fingerboard fret assignment for the particular chord notation, even when there is no exact match of a "pure" chord. The Crossmatch routine will search the fingerboard record array using the bass root and determine two parameters for each fingerboard record. First, it will determine the number of missing notes using the hash value. Second it will determine the highest interval match on the interval tree for the chord. (i.e., a chord with a note in the 7th position would be higher than a chord with a note only in the 5th position) Based upon these parameters, the best match between the chord notation and the fingerboard record is selected. For example, if two fingerboard records are each one note "short" from the chord notation, the fingerboard record with the higher interval match will be chosen as the "matching" chord. At NoAlt Bass Flag Set 322, the program checks to see if the Crossmatch routine is to be called with the alternate bass root. If the flag is not set (the default), Perform Crossmatch With Alt Bass Root 324 calls the Crossmatch routine with the alternate bass root. Select Highest Match 326 chooses the highest "matching" fingerboard record to represent the fret positions for the associated chord notation. One again, Assign Fingerboard frets 310 assigns the correct graphical representation of the fingerboard for the associated chord notation to be printed out or displayed whenever that chord is displayed on a staff line. The advantage of using this approximation method is that more chords will be automatically matched to appropriate fingerboard records. The disadvantage is that the search time is extended because of the need to calculate the two parameters for each fingerboard record for both the bass root and alternate bass root.

The preferred embodiment of the present invention combines both the exact and approximation methods to minimize the time required to search the fingerboard record array and maximize the number of matches. If a match is found on the short "pure" search, then the longer approximation search need not be performed. One of the principal advantages of the preferred embodiment in combination with the Enigma data structure is the ability to not only dynamically generate the guitar fingerboards automatically, but also to dynamically change the guitar fingerboards as the underlying chord notations are changed because of a change in the key signature.

Figure 14:
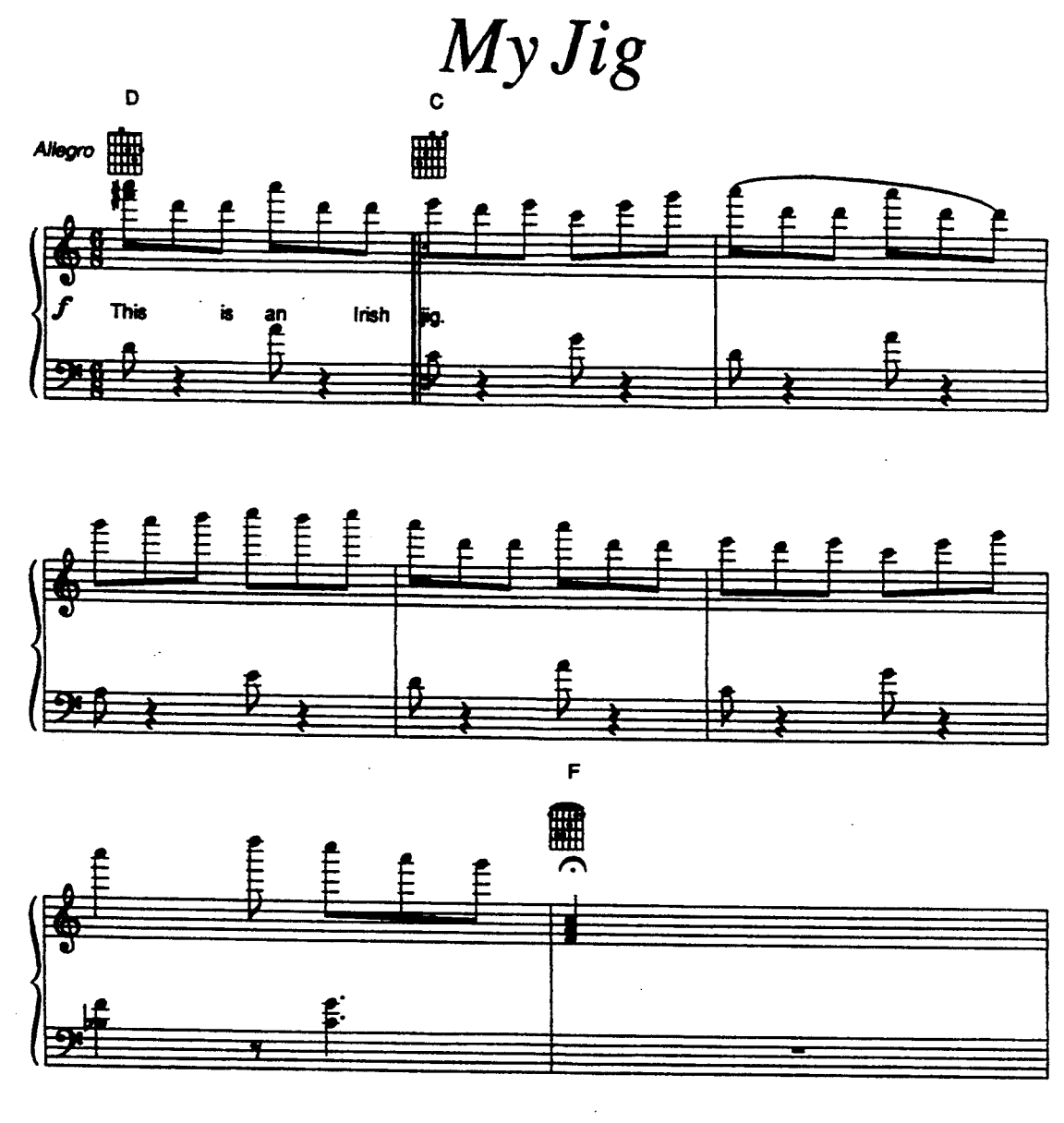

Referring now to FIG. 14, a sample composition showing the results of the automatic generation of guitar fingerboards from selected chord notations is shown. The graphical representations of the fingerboard fret positions are represented as individual characters for each fingerbaord record stored in a special font such as the Seville™ font, available from Coda Music Software, Minneapolis, Minnesota. In this embodiment, the graphical representations could be either a single character for the combination of the fingerboard with the fret positions filled in, or two characters, one for the fingerboard and one for the fret positions. In an alternative embodiment, the graphical representations could be accomplished using two characters, the fingerboard and a single dot for drawing each fret (fingertip) position. Since every fingerboard has multiple fret positions, the disadvantage with this embodiment is the additional time necessary to calculate and store the position of the dot for each fret position involved in drawing each complete fingerboard.

Although the description of the preferred embodiment has been quite specific, it is contemplated that various changes could be made without deviating from the spirit of the present invention. Accordingly, it is intended that the scope of the present invention be dictated by the appended claims rather than by the description of the preferred embodiment.

APPENDIX B

METHOD AND APPARATUS FOR REPRESENTING MUSICAL INFORMATION

^others
^FN(0) "Petrucci"
^IU(0) 4 1 -80 3 1 -330
^IU(0) 2 1 -580 1 1 -830
^KL(0) 0 48 421 619 0 0
^MP(0) 0 0 0 0 0 0
^MP(0) 0 0 0 0 0 0
^MP(0) 0 0 0 0 0 0
^MP(0) 0 0 0 0 0 0
^MP(0) 0 0 0 0 0 0
^MP(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^OC(0) 0 0 0 0 0 0
^SL(0) -2012733439 1 -44204
^EN(1) "plain"
^FM(1) 5 0 0 0 0
^FN(1) "Chicago"
^FR(1) 1 6 620 0
^FS(1) 1 5 87 215 0 0
^IN(1) "piano"
^IN(1) ""
^IS(1) 0 255 4 1024 0 0
^KF(1) 0 0 1 0 0 0
^MS(1) 600 255 4 1024 1 0
^PL(1) 0 0 0 0 0 0
^PO(1) -144 480 144 -144 0 0
^PS(1) 1632 2944 1 0
^SS(1) 0 0 0 -200 1 128

^TO(1) 258 772 1286 1800 2314 2828
^TO(1) 3342 3856 4370 4884 5398 5912
^TO(1) 6426 6940 7454 7968 8482 8996
^TO(1) 9510 10024 10538 11052 11566 12080
^TO(1) 12594 13108 13622 14136 14650 15164
^TO(1) 15678 16192 16706 17220 17734 18248
^TO(1) 18762 19276 19790 20304 20818 21332
^TO(1) 21846 22360 22874 23388 23902 24416
^Tn(1) 0 1 4 0 3 6
^Tn(1) 2 5 0 0 0 0
^Tp(1) 5 2 6 3 0 4
^Tp(1) 1 5 0 0 0 0
^EN(2) "bold"
^FN(2) "New York"
^FR(2) 7 11 620 0
^IN(2) "drums"
^IN(2) ""
^IS(2) 4 255 4 1024 0 4
^MS(2) 600 255 4 1024 1 0
^PL(2) 0 0 0 0 0
^SS(2) 0 0 0 -200 0 0
^EN(3) "italic"
^FN(3) "Geneva"
^FR(3) 12 12 620 0
^IN(3) "tpt. 2"
^IN(3) ""
^IS(3) 0 255 4 1024 0 0
^MS(3) 600 255 4 1024 1 0
^PL(3) 0 0 0 0 0
^EN(4) "underline"
^FN(4) "Monaco"
^FR(4) 13 19 620 0
^IN(4) "tpt. 1"
^IN(4) ""
^IS(4) 0 255 4 1024 0 0
^MS(4) 600 255 4 1024 1 0
^PL(4) 0 0 0 0 0
^EN(5) "outline"
^FN(5) "Zapf, Dingbat"
^FN(5) "s"
^FR(5) 20 23 855 0
^EN(6) "shadow"
^FN(6) "Bookman"
^FR(6) 23 27 854 0
^FN(7) "N Helvetica "

^FN(7) "Narrow"
^FR(7) 28 37 620 0
^FN(8) "Palatino"
^FR(8) 39 47 620 0
^FN(9) "Zapf Chancer"
^FN(9) "y"
^FR(9) 49 55 620 0
^FA(10) 0 0 0 0 0
^FN(10) "Times"
^FR(10) 1 6 620 0
^FA(11) 0 0 0 0 0
^FN(11) "Helvetica"
^FR(11) 7 11 620 0
^FA(12) 0 0 0 0 0
^FN(12) "Courier"
^FR(12) 13 19 620 0
^FA(13) 0 0 0 0 0
^FN(13) "Symbol"
^FR(13) 1 3 -3292 0
^FR(13) 9 11 -3292 0
^FN(14) "Avant Garde"
^FN(15) "New Century "
^FN(15) "Schlbk"
^FN(16) "Rameau"
^FN(17) "Newport"
^FN(18) "Midicom"
^FN(19) "Seville"
^FN(20) "Petrucci"
^FN(21) "Sonata"
^IU(65530) 4 1 -248 3 1 -568
^IU(65530) 2 1 -888 1 1 -1208
^01(65534) 0 0 4 1024 0 0
^02(65534) 0 71 0 2 12 0
^03(65534) 0 71 0 0 71 0
^04(65534) 0 -192 -64 1 12 2
^05(65534) 1 12 0 144 0 0
^06(65534) 61 207 250 119 87 110
^07(65534) 98 35 220 186 46 106
^08(65534) 74 221 227 183 238 206
^09(65534) 228 197 168 244 95 45
^10(65534) 103 251 240 7 0 0
^11(65534) 110 98 35 186 220 0
^12(65534) 1 1 1 1 1 1
^13(65534) 4 24 75 -8 24 24
^14(65534) 0 3168 0 0 0 0
^15(65534) 0 0 0 2448 0 0

^16(65534) -144 144 144 -144 0 0
^17(65534) 0 0 0 -200 6 0
^18(65534) 24 0 12 24 12 0
^19(65534) 24 0 1 1 99 67
^20(65534) 5 18 2 12 7 5
^21(65534) 4 8 18 6 4 4
^22(65534) 0 -24 -8 6 18 8
^23(65534) 50 6 512 0 0 0
^24(65534) 13 69 52 48 65 60
^25(65534) 360 1 24 0 12 0
^26(65534) 1 12 0 1 12 0
^27(65534) 1 12 0 1 12 0
^28(65534) -10 6 38 -6 -2 0
^29(65534) -4 0 66 -4 -4 4
^30(65534) -2 -2 66 -2 -5 4
^31(65534) 2 -6 63 -2 -6 0
^32(65534) -10 6 214 -4 -4 0
^33(65534) -3 -1 86 -6 0 0
^34(65534) -5 1 116 -2 0 0
^35(65534) 0 -4 63 -4 0 0
^36(65534) 2 9 0 1 1 0
^37(65534) 0 71 0 12 0 0
^38(65534) 78 65 97 129 140 0
^39(65534) 36 0 100 96 71 0
^40(65534) 0 192 12 -12 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0

```
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^40(65534) 0 0 0 0 0 0
^41(65534) 0 0 0 0 0 0
^50(65534) 0 0 0 0 8 -8
^51(65534) 0 -6 0 -6 0 8
^52(65534) -16768 0 15658 25795 16448 0
^53(65534) 15658 25795 15744 0 -17024 0
^54(65534) 16128 0 16128 0 16128 0
^55(65534) 16128 0 16448 0 16448 0
^IP(65534) 4 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
```

^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 0 0 0 0 0
^fi(65534) 0 1 0 1 1 0
^fi(65534) 0 0 128 1 170 2
^fi(65534) 0 0 0 0 0 0

^details

^GF(1,1) 7 0 0 0 0
^GF(1,2) 8 0 0 0 0
^GF(1,4) 9 0 0 0 0
^GF(2,1) 4 4 0 0 0
^GF(2,2) 12 4 0 0 64
^GF(2,3) 5 4 0 0 0
^GF(2,4) 6 4 0 0 0
^GF(3,1) 10 0 0 0 64
^GF(3,2) 11 0 0 0 64
^GF(3,4) 13 0 0 0 64
^GF(4,1) 1 0 0 0 0
^GF(4,2) 2 0 0 0 0
^GF(4,4) 3 0 0 0 0

^entries

^eE(0) 56 57 0 0 0 0 $00000000 $00000000 $00000000
^eE(1) 0 2 0 0 512 0 $C0000800 $80010020 $00000000
^eE(2) 1 3 0 0 512 0 $C0000000 $80010040 $00000000
^eE(3) 2 4 0 0 1024 0 $81000800 $00000000 $00000000
^eE(4) 3 5 0 0 1024 0 $81000800 $00000000 $00000000
^eE(5) 4 6 0 0 512 0 $81000800 $00000000 $00000000
^eE(6) 5 7 0 0 512 0 $C0000000 $C0010040 $00000000
^eE(7) 6 8 0 0 1024 0 $C0000800 $80010040 $00000000
^eE(8) 7 9 0 0 1024 0 $C0000800 $80010050 $00000000
^eE(9) 8 10 0 0 1024 0 $C0000800 $80010020 $00000000
^eE(10) 9 11 0 0 512 0 $C0000801 $80010010 $00000000
^eE(11) 10 12 0 0 512 0 $C0000001 $80010000 $00000000
^eE(12) 11 0 0 0 4096 0 $C0000800 $80010010 $00000000
^eE(13) 0 14 0 0 512 0 $C0000800 $80010040 $00000000
^eE(14) 13 15 0 0 512 0 $C0000000 $80010040 $00000000
^eE(15) 14 16 0 0 512 0 $C0000800 $80010040 $00000000

```
^eE(16)  15 17 0 0  512  0 $C0000000 $80010040 $00000000
^eE(17)  16 18 0 0  1024 0 $C0000800 $80010040 $00000000
^eE(18)  17 19 0 0  512  0 $C0000800 $80010040 $00000000
^eE(19)  18 20 0 0  512  0 $C0000000 $80010040 $00000000
^eE(20)  19 21 0 0  512  0 $C0000800 $80010040 $00000000
^eE(21)  20 22 0 0  1536 0 $C0000000 $80010020 $00000000
^eE(22)  21 23 0 0  512  0 $C0000800 $80010040 $00000000
^eE(23)  22 24 0 0  1536 0 $C0000000 $80010010 $00000000
^eE(24)  23 25 0 0  512  0 $C0000801 $80010020 $00000000
^eE(25)  24 26 0 0  512  0 $C0000001 $80010020 $00000000
^eE(26)  25 27 0 0  1024 0 $C0000800 $80010030 $00000000
^eE(27)  26 0  0 0  512  0 $81000800 $00000000 $00000000
^eE(28)  0 30 0 29  1536 0 $C0000800 $8001FFD0 $80020000
^eE(29)  0 0 28 0   1536 0 $C0000800 $80030020 $00000000
^eE(30)  28 32 0 31 512  0 $C0000000 $8001FFD0 $80020000
^eE(31)  0 0 30 0   512  0 $C0000000 $80030020 $00000000
^eE(32)  30 34 0 33 512  0 $C0000801 $8001FFD0 $80020000
^eE(33)  0 0 32 0   512  0 $C0000801 $80030020 $00000000
^eE(34)  32 36 0 35 512  0 $C0000001 $8001FFD0 $80020000
^eE(35)  0 0 34 0   512  0 $C0000001 $80030020 $00000000
^eE(36)  34 37 0 0  512  0 $81000800 $00000000 $00000000
^eE(37)  36 39 0 38 512  0 $C0000000 $C001FFD0 $C002FFF0
^eE(38)  0 0 37 0   512  0 $C0000000 $C0030010 $00000000
^eE(39)  37 41 0 40 1024 0 $C0000800 $8001FFD0 $8002FFF0
^eE(40)  0 0 39 0   1024 0 $C0000800 $80030010 $00000000
^eE(41)  39 43 0 42 1024 0 $C0000800 $8001FFD0 $8002FFF0
^eE(42)  0 0 41 0   1024 0 $C0000800 $80030010 $00000000
^eE(43)  41 45 0 44 1024 0 $C0000800 $8001FFD0 $8002FFF0
^eE(44)  0 0 43 0   1024 0 $C0000800 $80030010 $00000000
^eE(45)  43 47 0 46 512  0 $C0000801 $8001FFD0 $80020000
^eE(46)  0 0 45 0   512  0 $C0000801 $80030020 $00000000
^eE(47)  45 49 0 48 512  0 $C0000001 $8001FFE0 $80020000
^eE(48)  0 0 47 0   512  0 $C0000001 $80030030 $00000000
^eE(49)  47 51 0 50 1024 0 $C0000800 $8001FFC0 $8002FFE0
^eE(50)  0 0 49 0   1024 0 $C0000800 $80030000 $00000000
^eE(51)  49 53 0 52 512  0 $C0000801 $8001FFC0 $8002FFE0
^eE(52)  0 0 51 0   512  0 $C0000801 $80030000 $00000000
^eE(53)  51 55 0 54 512  0 $C0000001 $C001FFC0 $C102FFF9
^eE(54)  0 0 53 0   512  0 $C0000001 $C0030010 $00000000
^eE(55)  53 0 0 56  2048 0 $C0000800 $8001FFC0 $8002FFF9
^eE(56)  0 0 55 0   2048 0 $C0000800 $80030010 $00000000
```

^text

^lyric

APPENDIX C

Discussion of the Enigma Data Structures.

09/06/88 by Phil Farrand
Author/Inventor of Enigma

Copyright 1988 by Opus Dei and CODA
All rights reserved.

Table of Contents

Discussion of Method

The Other Group - Overview
The Other Group - Declared Data Structure
  OTHERDTAIL
The Other Group - Assigned Data Structures

| | |
|---|---|
| AAMOUNT | INTVBANK |
| ACCIORDER | ISPEC |
| ARBBOUNDS | KEYFORMAT |
| ARBHEADER | KEYMAP |
| ARBMUSIC | KEYSATTRIB |
| BACKREPT | MENU2MAP |
| BEATCHART | MENUMAP |
| CLEFENUM | MSPEC |
| CLIPSPEC | NAMESPEC |
| CSPEC | PAGEOFFSET |
| DATABLOCK LONGBLOCK | PARBMUSIC |
| DOBJSPEC | PERCENTS |
| DTXTSPEC | PSPEC |
| DYNAMIC | PTXTTIE |
| DURALLOT | REPSUPSED |
| ENCLSPEC | REPTENUM |
| ENDGTEXT | REPTSPEC |
| ENDSTART | REPTTEXT |
| FRAMEATTS | SEPERATES |
| FRAMESPEC | SHAPEDATA |
| FREEZMEAS | SHAPEDEF |
| FROZENSPLIT | SHAPELIST |
| FROZENSTAVE | SSPEC |
| FSTKEY | STRINGS |
| GSPEC | TEXTBLOCK |
| HEADSPEC | TIMELOWER |
| ILIST | TIMEUPPER |
| IMRKDEF | TXTLAYOUT |
| INSTATTS | XISPEC |
| INSTUSED | |

Table of Contents (cont.)

The Detail Group - Overview
The Detail Group - Declared Data Structure
    DTAIL
The Detail Group - Assigned Data Structures
    ALTS
    BEAMCHART
    BEAMEXTEND
    BMHI
    BMLO
    CHRD
    CLEFOCTV
    CROSSSTAF
    CUEN
    DTPERCENT
    DTSTRING
    EDYNAMIC
    FLOATS
    GFHOLD
    HHOCKSPEC
    IMRK
    LDLINE
    LYRDATA
    LYRICLINES
    MARBMUSIC
    MIXTTIE
    RPNO
    SBMALT
    SHAPENOTE
    STEMDEF
    STHG
    TIEALTER
    TUPL
    TUPN
    WEXT The Entry Pool - Overview
The Entry Pool - Declared Data Structure
    ENTRY
    TENTRY
    TGRAFILE The Global Group - Overview and Variables The Text Group - Overview A Tag List for Others A Tag List for Details An Approximate Nesting and Access Order.

Discussion of Method:
    This document attempts to acquaint the reader with the Enigma Music Publishing System, hereinafter referred to as "Enigma". The document constitutes a resource for understanding the neccessary formatting of data structures required to instruct Enigma to perform a given task.

Each of the five main data structure groups in Enigma will be explained. These groups are:

The Other Group
The Detail Group
The Entry Pool
The Global Group
The Text Group

In the Detail Group and the Other Group, we will not only examine the declared data structures (i. e. the ones which actually map into memory), but also the assigned data structures. By assigned data structures we refer to the process of imposing a structure on a number of bytes which previously have been declared to be an array. This process is accomplished through pointers and will be discussed in greater detail in the Detail Group and the Other Group enumeration.

Extensive bitfielding is used in Enigma to control paths of execution. However, since not all 'C' compilers support this function and since one of the main designs tenets of Enigma is portability, the bitfielding is implemented through bit masks. These bit masks will also be discussed where appropriate.

The format for the discussion of each group will be:

A title page detailing all of the declared and assigned data structures with a brief description of each.

· Successive pages detail each data structure.

The Other Group

Area of Control:

The Other Group controls the layout of the music, the assignment of Grafile records to instruments, repeats, dynamics, arbitrary music format and placement, headers, text blocks, measure numbers, shape definitions, and alternate key and time signature formatting. In twobyte, it controls all the other areas not controlled by the Detail, Grafile, Text or Global Groups and hence its name.

Method of Control:

The Other Group was designed for maximum flexibility. To this end, the declared data structure of the Other Group is very simple. It is an array of records. Each record contains a comparator, tag, and a six word data array. In use, these data arrays provide a region in memory upon which is imposed an assigned data structure. For example, each measure in Enigma is assigned a Measure Specification Record in the Other Group declared data structure. For measure number one, the Measure Specification Record would be a record with a comparator of one (1), a tag of 'MS' (for Measure Specification) and a six word data array upon which Enigma will impose the following structure when it acsesses it:

```
#define MSPEC struct mspec
MPSEC
        {,
        twobyte measpace;       /* The amount of vitual space
                                      horizontally the measure occupies */
        twobyte key;            /* The key of the measure */
        twobyte beats;          /* The number of beats in the measure */
        twobyte divbeat;        /* The division of the beat in the
                                      measure */
```

```
            twobyte auxflag;          /* The auxiliary flag used to assign
                                         attributes to the measure */
            twobyte meflag;           /* The primary flag used to assign
                                         attributes to the measure */
         };
```

Note that the declaration of this structure does not implicitly consume memory. The structure is only assigned to records as needed. There is nothing which dictates that one record of the Other Group declared data structure must be a Measure Specification Record as opposed to another type of record. The structure is fluid. Enigma and the programmer assign records as needed to accomplish different tasks.

The routine to implement this method is called 'serch_others()'. It is passed a comparator, a tag, and an incidence number. If the routine is passed an incidence number of four, it will search through the Other Group declared data structure looking for the fourth instance of a record which matches the comparator and tag. It might be helpful to see an example in 'C'.

```
         void setMSPEC( measure, space )
              twobyte measure;
              twobyte space;
              {
              MSPEC *ms;
              twobyte data[OTDATA];
              twobyte *serch_others();

if( (ms = serch_others( measure, 'MS', 0 )) )
                   ms->measpace = space;

else
                   {
                   creat_others( measure, 'MS', data );

if( (ms = others _others( measure, 'MS', 0 )) )
                        ms->measpace = space;
                   }
              }
```

The routine is passed a measure number and the amount of virtual space to assign to the measpace element of the measure's Measure Specification Record. It calls serch_others() to fetch the base address of the data array element of the record which has a comparator equal to the measure number and a tag of 'MS'. If serch_others() returns greater than zero the routine uses the returned pointer to become a pointer to the assigned data structure MSPEC and sets the measpace element of the MSPEC structure equal to space. Otherwise, the routine attempts to create the record by calling creat_others(), which will attempt to open a record with the passed information. If creat_others() is sucsessful, it will return with the address of the data array for the record newly assigned.

This method is used for all the assigned data structures of the Other Group (and the Detail Group, by the way).

Declared Data Structures:

```
         OTHERDTAIL *others;          A pointer to the base of the array of records.
         OTHERDTAIL *curothers;       A pointer to the current record.
         OTHERDTAIL *lastothers;      A pointer to the last record.
```

Assigned Data Structures:

| | |
|---|---|
| CSPEC | Core Specification |
| DURALLOT | Duration Allotments |
| PSPEC | Page Specification |
| PAGEOFFSET | Page Coordinate Offsets |
| PERCENTS | Page and Stave Percentage Reduction/Enlargements |
| SSPEC | Stave Specification |
| GSPEC | Instrument Group Specification |
| ISPEC | Instrument Specification |
| INSTATTS | Instrument Attributes |
| MSPEC | Measure Specification |
| TIMEUPPER | Alternate Time Signature Upper Half |
| TIMELOWER | Alternate Time Signature Lower Half |
| INSTUSED | Stave Instrument Usage |
| ILIST | Instrument List |
| INTVBANK | Interval (or Suffix) Bank |
| BACKREPT | Backward Bar Repeat Specification |
| ENDSTART | Ending Bracket Repeat Specification |
| ENDGTEXT | Ending Bracket Text |
| REPSUSED | Repeat Assignment |
| REPTSPEC | Repeat Specification |
| REPTTEXT | Repeat Text |
| REPTENUM | Repeat Actuators Enumeration |
| ENCLSPEC | Enclosure Specification |
| NAMESPEC | Instrument Name Specification |
| STRINGS | Text Strings |
| DYNAMIC | Dynamic Assignment |
| DTXTSPEC | Dynamic Text Specification |
| DOBJSPEC | Dynamic Object Specification |
| IMRKDEF | Intepretive Mark Specification |
| SEPERATES | Seperate Position Placement |
| PTXTTIE | Text Block Page Assignment |
| TEXTBLOCK | Text Block Definition |
| TXTLAYOUT | Text Layout for Text Block Assignment |
| SHAPEDEF | Shape Definition |
| SHAPELIST | Shape Definition Instruction List |
| SHAPEDATA | Shape Definition Data |
| DATABLOCK | Data Array in Words |
| LONGBLOCK | Data Array in Longs |
| KEYFORMAT | Alternate Key Format Specification |
| KEYMAP | Key Mapping for Relationship of Semi to Scaletones |
| ACCIORDER | Accidental Alteration Order |
| AAMOUNT | Accidental Alteration Amount |
| FSTKEY | Tone Centers for Alternate Key |
| KEYSATTRIB | Key Format Attributes |
| MENUMAP | Measure Number Specification Map |
| MENU2MAP | Secondary Measure Number Specification Map |
| FRAMESPEC | Frame Specification |
| FRAMEATTS | Frame Attributes |
| CLEFENUM | Inter-Measure Clef Changes List |
| BEATCHART | Alternate Positioning Chart by Beats |
| ARBMUSIC | Arbitrary Music Specification |
| ARBHEADER | Arbitrary Music Header Specification |
| ARBBOUNDS | Arbitrary Music Bounds Specification |
| ARBASSIGN | Arbitrary Music Measure Assignment |
| PARBMUSIC | Arbitrary Music Page Assignment |
| HEADSPEC | Header Specification |
| CLIPSPEC | Clip Specification |
| FROZENSTAVE | Frozen Stave Specification |
| FROZENSPLIT | Frozen Measure Split Specification |
| FREEZMEAS | Frozen Measure Group |
| XISPEC | Part Extraction Rest Measure Specifcation |

The Other Group

Name: OTHERDTAIL
Type: Declared

Structure:

```
#define OTHERDTAIL struct odtail
OTHERDTAIL
    {
    twobyte cmper;
    twobyte tag;
    twobyte array[OTDATA]  /* defined as six */
    };
```

Declarations:

| | |
|---|---|
| OTHERDTAIL *others; | A pointer to the base of the array of records. |
| OTHERDTAIL *curothers; | A pointer to the current record. |
| OTHERDTAIL *lastothers; | A pointer to the last record. |

Discussion:

This declared data structure forms the basis for the entire Other Group. All of the assigned data structure in the Other Group are assigned to the records of this structure. You will note the declarations for this structure are all pointers. The master controlling program will need to initialize these pointers to the region of memory it assigns for the Other Group. Declaring them as pointers also allow the user the potential ability (providing the master controlling program supports it) to resegment the application's memory for more efficient use.

The Other Group

Name: AAMOUNT
Tag: Ap An (explained below)

Comparator: For Linear Key Formats the comparator is the format number.
For NonLinear Key Signatures the comparator is the key signature number.

Structure:

```
#define AAMOUNT struct aamount
AAMOUNT
    {
    twobyte amount[6];
    };
```

Brief: This structure holds an array of information on the amount of accidental alteration for each accidental in the linear key format or the nonlinear key signature.

Discussion:

Enigma uses a redefinable method for structuring tonality. Enigma defines tonality in terms of a key map, an accidental amount list, an accidental order list, a tonecenter list, a clef octave accidental assignment list and a set of attributes.

Two classes of tonality exist, linear key formats and non-linear key signatures.

In a linear key format individual key signatures comprised of two bytes compacted into a word. The upper byte contains the number of the key format for the key signature. By default, traditional Western tonality is key format number zero.

The lower byte defines the number of accidentals. Accidentals may be in the range -127 to 127. This amounts to two banks within each key format which can be defined independently of each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

A non-linear key signature uses the entire word for the key signature number.

```
twobyte amount[6];
```
The AAMOUNT structure provides the accidental alteration amount for a linear key format and a non-linear key signature. In a linear key format, the two banks are held under seperate tags, Ap for positive and An for negative. Each list will have as many entries as there are scaletones. In a non-linear key signature the entire list of alteration amounts is held under the Ap tag. The list will have as many elements as there as accidentals in the non-linear key signature. The list must be null terminated.

Each element of the list (comprised of one or more records) is the amount of alteration for the accidental in the key signature. The list is the in number of harmonic levels of alteration. a one will indicate a sharp. A negative one will indicate a flat.

The Other Group - AAMOUNT. 2

Since traditional Western tonality does not mix the type of accidentals in the key signatures. The list for the positive bank would be all ones and the list negative bank would be all negative ones.

Since Enigma considers sucsessive records of the same comparator and tag to be members of the same record, there is a theoretical limit of 196602 scaletones to the key format. Enigma limits this to 100.

The Other Group

Name:   ACCIORDER

Tag:    on op (See information below)

Comparator:   For Linear Key Formats the comparator is the format number.
              For Non-Linear Key Signatures the comparator is the key signature number.

Structure:
```
#define ACCIORDER struct acciorder
ACCIORDER
    {
    twobyte acci[6];
    };
```

Brief:   This structure holds an array of information on the order of accidental alteration for a linear key format or a non-linear key signature.

Discussion:
   Enigma uses a redefinable method for structuring tonality. Enigma defines tonality in terms of a key map, an accidental amount list, an accidental order list, a tonecenter list, a clef octave accidental assignment list and a set of attributes.

Two classes of tonality exist, linear key formats and non-linear key signatures.

In a linear key format individual key signatures comprised of two bytes compacted into a word. The upper byte contains the number of the key format for the key signature. By default, traditional Western tonality is key format number zero.

The lower byte defines the number of accidentals. Accidentals may be in the range -127 to 127. This amounts to two banks within each key format which can be defined independently of each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

A non-linear key signature uses the entire word for the key signature number.

```
twobyte acci[6];
```
The ACCIORDER structure contains the order of alteration for a linaer key format and a non-linear key signature. In other words, this list show the progression of accidentals in a linear key format or all the accidentals in a non-linear key signature. The data is the harmonic levels in the order they are applied as the accidentals of a key signature grow. The list is in offsets of harmonic levels from middle-C, the reference concrete harmonic value.

In a linear key format, the twobanks are held under seperate tags, op for positive and on for negative. The number of elements in the list is the number of scaletones in the key format. In a non-linear key signature the entire list is held under the op tag. The number of elements in the list is the number of accidentals in the key signature.

The Other Group - ACCIORDER. 2

For traditional Western tonality the op list would be: 3 0 4 1 5 2 6 and the on list would be: 6 2 5 1 4 0 3.

Since Enigma considers sucsessive records of the same comparator and tag to be members of the same record, there is a theoretical limit of 196602 scaletones to the key format. Enigma limits this to 100.

The Other Group

Name: ARBBOUNDS

Tag: AB

Comparator: An arbitrary music measure ID

Structure:
```
#define ARBBOUNDS struct arbbounds
ARBBOUNDS
    {
    fourbyte topadd;
    fourbyte leftadd;
    twobyte riteadd;
    twobyte centerpull;
    };
```

Brief: This structure with its companions, ARBMUSIC and ARBHEADER, define a measure of arbitrary music.

Discussion:

Enigma allows the construction of arbitrary music measures. These are measures of music which fall outside the flow of the music of the piece. They can be placed on any page or tied to any instrument at any measure. The three structures ARBMUSIC, ARBHEADER and ARDBOUNDS define all the attributes for the measure (See discussion of ARBMUSIC and ARDHEADER).

Since Enigma recognizes not only the comparator and tag for for record, but also the incident of the record. Multiple measures can be set up under a single comparator. To set up the measures, always create a record for each structure of the arbitrary music specification (ARBMUSIC, ARBHEADER and ARBBOUNDS).

```
fourbyte  topadd;
fourbyte  leftadd;
twobyte   riteadd;
```

The arbitrary music drawing routine is supplied with three positioning variable. It is supplied with a horizontal coordinate, a width coordinate and a vertical coordinate.

The routine uses the horizontal and vertical coordinates for the left and top margins respectively. A right margin is created from the horizontal coordinate added to the width coordinate.

These elements offset these coordinates.

The Other Group - ARBBOUNDS.  2

```
twobyte centerpull;
```
This element defines the amount of space between the signature header, if any, and the music of the arbitrary music measure. An illustration would be helpful:

centerpull

If centerpull is positive, more space will be created at this place. If centerpull is negative, less space will be created.

The Other Group

Name:  ARBHEADER

Tag:   AH

Comparator:  An arbitrary music measure ID

Structure:

```
#define ARBHEADER struct arbheader
ARBHEADER
    {
    twobyte clef;
    twobyte key;
    twobyte beats;
    twobyte divbt;
    twobyte group;
    twobyte flag;
    };
```

Brief:  This structure, with its companions ARBMUSIC and ARBBOUNDS, define a measure of arbitrary music.

Discussion:

Enigma allows the construction of arbitrary music measures. These are measures of music which fall outside the flow of the music of the piece. They can be placed on any page or tied to any instrument at any measure. The three structures ARBMUSIC, ARBHEADER and ARDBOUNDS define all the attributes for the measure (See discussion of ARBMUSIC and ARDBOUNDS).

Since Enigma recognizes not only the comparator and tag for for record, but also the incident of the record. Multiple measures can be set up under a single comparator. To set up the measures, always create a record for each structure of the arbitrary music specification (ARBMUSIC, ARBHEADER and ARBBOUNDS).

```
twobyte clef;
```
This is the clef to draw in the signature field of the arbitrary measure.

```
twobyte key;
```
This variable holds the 'global' key signature for the piece. The key signature is mapped in two bytes. The upper byte indicates keyformat. The lower byte indicates number of accidentals and can be positive or negative. Traditional Western tonality is keyformat number zero. Therefore; the key of D would have a value of 2. The key of Eflat would have a value of 253, since the lower byte of the key word is treated as a signed byte. As can be deduced from the above sentences, Enigma supports the capability to redefine all elements of the key signature. An alternate key format can be specified with the KEYFORMAT record. The KEYFORMAT record can be used to specify the number semitones and scaletones in the new key format. The relationship of semitones to scaletones can be specified through a KEYMAP record. The accidental alteration order can be specified through the ACCIORDER record. The accidental alteration amount can be specified through the AAMOUNT record. The tonecenters for the new key format can be specified through FSTKEY. See the discussions of KEYFORMAT, KEYMAP, ACCIORDER, AAMOUNT and FSTKEY for more information.

The Other Group - ARBHEADER.   2

```
twobyte beats;
twobyte divbeat;
```
These two variables specify the number of beats in a measure and the division of the beat respectively. The division of the beat is in terms of Enigma based durations where a quarter note is equal to 1024 units. Therefore the time signature of 6/8 would have a 2 in beats and 1536 in divbeat, since 1536 is equal to a dotted quarter. Enigma can also understand complex time signatures beyond triplet division. For instance the value of 2 in beats and a double dotted quarter in divbeat would produce the time signature of 14/16. It is left to the reader to evaluate that this is correct.

```
twobyte group;
```
This is the bracket to draw in front of the signature field of the arbitrary measure.

```
twobyte flag;
```
The flag is bit mapped as follows:

```
        #define DOBARLINE           0x0800
        #define AMALTNUMTSIG        0x0400
        #define AMALTDENTSIG        0x0200
        #define SOLIDBAR            0x0080
        #define LITELINE            0x0040
        #define DBLLINE             0x0020
```

DOBARLINE
This indicates Enigma should drawn a bar line at the end of the arbitrary measure.

AMALTNUMTSIG
AMALTDENTSIG

Enigma supports alternate time signatures. By alternate time signatures we mean time signatures which cannot be classified within the traditional classifications of simple and complex (duple and triple). For instance, the time signature with an upper half of '3+3+2' can be created by setting ALTNUMTSIG and creating a TIMEUPPER record with that information (See discussion of TIMEUPPER). An alternate lower half can be created by setting ALTDENTSIG and creating a TIMELOWER record (See discussion of TIMELOWER). Note: Enigma will use the value in beats for the comparator in searching for the TIMEUPPER record and the value in divbeat when searching for the TIMELOWER record.

SOLIDBAR
LITELINE
DBLLINE

These bits control the type of barline to draw for the measure. The LITELINE bit works only in conjunction with the SOLIDBAR bit. Set the desired bits.

The Other Group

Name: ARBMUSIC

Tag: AM

Comparator: An arbitrary music measure ID

Structure:

```
#define ARBMUSIC struct arbmusic
ARBMUSIC
     {
     twobyte percent;
     twobyte bounds;
     twobyte header;
     twobyte qinst;
     twobyte qmeasure;
     twobyte flag;
     };
```

Brief: This structure, with its companions ARBHEADER and ARBBOUNDS, define a measure of arbitrary music.

Discussion:

Enigma allows the construction of arbitrary music measures. These are measures of music which fall outside the flow of the music of the piece. They can be placed on any page or tied to any instrument at any measure. The three structures ARBMUSIC, ARBHEADER and ARDBOUNDS define all the attributes for the measure (See discussion of ARBHEADER and ARDBOUNDS).

Since Enigma recognizes not only the comparator and tag for the record, but also the incident of the record. Multiple measures can be set up under a single comparator. To set up the measures, always create a record for each structure of the arbitrary music specification ( ARBMUSIC, ARBHEADER and ARDBOUNDS).

twobyte percent;
  This is the percentage, in unit deviation from 100, at which to drawn the measure.

twobyte bounds;
twobyte header;
  Enigma will use these elements as comparators to find the companion ARDBOUNDS and ARBHEADER records, respectively.

```
twobyte qinst;
twobyte qmeasure;
```
   The names of these elements stand for quasi-instrument and quasi-measure. Enigma is heavily oriented in it layout procedures toward instruments and measures. These elements allow the arbitrary music measure to tie into those layout capabilities. For instance, if `qinst` and `qmeasure` elements are set to an existing instrument and measure (and the dynamic and repeat bits are enabled in the flag element), any repeats or dynamics associated with the instrument at that measure will be drawn on the arbitrary music measure, including any individual positioning control which may be in force.

The Other Group - ARBMUSIC.   2

More useful however, is to set `qinst` and `qmeasure` to a nonexisting instrument and measure number. All of the control facilities for layout and positioning which are available to the normal music will now be independently available to the arbitrary music measure.

```
twobyte flag;
```
   The `flag` is bit mapped as follows:

```
#define AMVERTHOLD       0x8000
#define NEGLEFTLINE      0x8000
#define NEGAMKEY         0x8000
#define NEGAMTIME        0x1000
#define NEGDYNAMIC       0x0800
#define NEGAMSTAFF       0x0400
#define NEGREPEAT        0x0200
#define NEGAMCLEF        0x0100
#define AMTYPEBITS       0x00E0
#define DYNAMBIT         0x0010
#define FORREPBAR        0x0008
#define BACREPBAR        0x0004
#define BARENDING        0x0002
#define REPEATS          0x0001
```

AMVERTHOLD
   When reducing or enlarging, Enigma provides a choice with the vertical coordinate. Normally, Enigma will let the vertical coordinates compress and expand as the percentage does. If this bit is set, the vertical coordinates of the additions to the measure (repeats, dynamics, measure numbers, etc.) will remain uneffected by the change in percentage.

NEGLEFTLINE
NEGAMKEY
NEGAMTIME
NEGDYNAMIC
NEGAMSTAFF
NEGREPEAT
NEGAMCLEF
   These bits control the pieces of the music which will be drawn. See discussion of the `instflag` element of ISPEC for more details.

The Other Group - ARBMUSIC.   3

AMTYPEBITS
   These bits specify the type of positioning to use for this measure. Five types of positioning are currently defined (See discussion of the POSBITS of the `auxflag` element of the MSPEC structure). They are:

```
#define SCALEPOSITS        0
#define useTIMESIG         1
#define useBEATCHART       2
#define POSareOFFSETS      4
#define POSareABSOLUT      5
```

SCALEPOSITS

This type of positioning uses the `posi` element of each entry in ratio to the `totpos` element for the record (see a discussion of The Grafile Group) and the new width to calculate a new position.

useTIMESIG

This type of positioning uses the `elldur` element of each entry in ratio to the `totdur` element for the record (see a discussion of The Grafile Group) and the time signature of the measure to calculate a new position.

useBEATCHART

This type of positioning uses a BEATCHART record under `qmeasure` to position the entries. To use, set the positioning type to 2. Create a BEATCHART record under `qmeasure`. (See the discussion of BEATCHART).

POSareOFFSETS

This type of positioning is similar to useTIMESIG except the `posi` element of each entry (see a discussion of The Grafile Group) is added to the newly calculated width.

POSareABSOLUTE

No scoping is done. The `posi` element of each entry is unchanged.

DYNAMBIT

This bit informs Enigma of the existence of dynamics tied to this measure. To place dynamics in a measure, set this bit. Create one or more DTXTSPEC or DOBJSPEC records under the desired offsets (See the discussion of DTXTSPEC and DOBJSPEC). Create one or more DYNAMIC records under `qmeasure` with a tag of 'DY' (See discussion of DYNAMIC). This will tie the newly created dynamics to the measure.

FORREPBAR

This bit signals Enigma that a forward repeat bar exists in the measure.

The Other Group - ARBMUSIC.    4

BACREPBAR

This bit signals Enigma that a backward repeat bar exists in the measure. To establish an closed ending bracket over the measure, create a BACKREPT record under `qmeasure` and a tag of 'BR' (See discussion of BACKREPT).

BARENDING

This bit signals the beginning of a bar repeat ending. Set this bit and create an ENDSTART record under `qmeasure` and a tag of 'ES' (See discussion of ENDSTART). Create an ENDTEXT record to accompany it if desired (See discussion of ENDTEXT).

REPEATS

This bit informs Enigma of the existence of text repeat structures tied to this measure. To place text repeats in a measure, set this bit. Create one or more REPTSPEC records under the desired offsets (See the discussion of REPTSPEC). Create one or more REPSUSED records under `qmeasure` with a tag of 'RU' (See discussion of REPSUSED). This will tie the newly created text repeats to the measure.

The Other Group

Name: BACKREPT
Tag: BR

Comparator: The measure it belongs to.

Structure:
```
#define BACKREPT struct backrept
BACKREPT
    {
    twobyte current;
    twobyte actuate;
    twobyte target;
    twobyte pos1pos2;
    twobyte line1line2;
    twobyte flag;
    };
```

Brief: This structure assigns attributes to a backward repeat bar.

Discussion:
Enigma describes repeats functionally with respect to aural playback. It understands when to take a repeat and when to skip ahead. It is not the intention of this document, however, to describe the playback capabilities of Enigma. Therefore, we will limit our discussion of repeat structures to those elements which effect the visual representation of the repeat. The others will be presented but not discussed. The playback capabilities of Enigma can be discovered in the document 'A Reference for the Aural Playback Capabilities of Enigma'.

This structure is accessed when Enigma encounters a BACREPBAR bit set in the meflag element of a measure's MSPEC. The comparator will be the measure number and the tag will be 'BR'.

```
twobyte current;
twobyte actuate;
twobyte target;

twobyte pos1pos2;
twobyte line1line2;
```
If the BARENDING bit is also set in the meflag element of the measure's MSPEC, Enigma will construct a closing ending bracket in conjunction with the backward repeat bar. Note: An ENDSTART structure does not have to exist for the measure in order for Enigma to do this.

The Other Group - BACKREPT.2

These two elements break out into four signed bytes which we will call pos1, pos2, line1 and line2 respectively. These four signed bytes control the appearance of the closing ending bracket. An illustration might help:

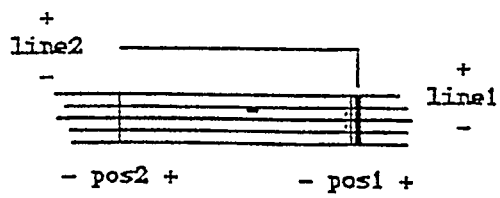

pos1 controls the horizontal position of the vertical line from the rite side of the measure.

pos2 controls the horizontal endpoint of the horizontal line from the left side of the measure.

line1 controls the vertical endpoint of the vertical line from the top of the staff added to
uENDNGLINE.

line2 controls the vertical position of the horizontal line from the top of the staff added to
uENDNGLINE.

```
twobyte flag;
```
The flag is bitmapped as follows:

```
#define isJUMPER      0x8000
#define isMARKER      0x4000
#define JMPonACTU     0x0800
#define JMPALWAYS     0x0400
#define JMPtoMARK     0x0200
#define REPuntilACT   0x0100
#define COUNTPASSES   0x0080
#define CLRonCHANGE   0x0040
#define MULTACTUATE   0x0008
#define INDIVPLAC     0x0001
```

INDIVPLAC

Enigma allows individual placement control over selected instruments in the stave system stack for a given measure when constructing the closing ending bracket. To use, set this bit. Create a SEPERATES record under this measure number and a tag of 'BI'. Fill it with the number of the instrument whose closing bracket you wish to individually control, the current measure number and the appropriate displacements.

The Other Group

Name:  BEATCHART

Tag:   BC

Comparator:  The measure it belongs to.

Structure:

```
#define BEATCHART struct beatchart
BEATCHART
    {
    fourbyte dur;
    twobyte pos;
    twobyte endpos;
    twobyte tbpos;
    twobyte AAAA;
    };
```

Brief:  Each record of this structure provides an entry in a beat positioning chart Discussion:

Enigma allows the constuction of a beat positioning chart. This chart offers precise control over the positioning of entries within a measure. The chart contains a series of durations. These durations are in terms of ellasped time from the beginning of the chart. For each duration a starting position and an ending position exist. The first record of the chart contains the total duration for the chart. It also contains the total positional displacement for the chart.

With this chart, Enigma has at its disposal the total duration of the chart, the total positional displacement of the chart and ellapsed duration points each of which have a position domain.

To scale an entry into its proper position in a measure, Enigma also has the total duration for the GRAFILE record, the total position displacement for the GRAFILE record, the ellapsed duration from the start of the record and the actual width of the measure on the line which the entries must be fitted to.

Given all this information, it is simple mathematics to calculate the relative position of the entry.

```
fourbyte dur;
```
   For the first record under this comparator, this element will contain the total duration for the chart. For successive records, this element will contain durational control points.

```
twobyte pos;
twobyte endpos;
```
   These elements define the positional domain for the value in dur.

```
twobyte tbpos;
```
   For the first record, this element will contain the total positional displacement for the chart.

The Other Group

Name: CLEFENUM

Tag: CE

Comparator: An enumerated clef list ID

Structure:

```
#define CLEFENUM struct clefenum
CLEFENUM
    {
    twobyte clef;
    twobyte xdisp;
    twobyte ydisp;
    twobyte percent;
    twobyte AAAA;
    twobyte BBBB;
    };
```

Brief: Each record of this structure provides one inter-measure clef change.

Discussion:
   Enigma supports inter-measure clef changes. This structure allows the creation of a clef changes list using multiple records under the same comparator.

This structure is accessed when the CLEFISLIST bit is set in the flag element of a GFHOLD record. Enigma searches for a CLEFENUM record under the value in the clef element of the GFHOLD record and a tag of 'CE' (See discussion of GFHOLD in the Detail Group).

Each CLEFENUM record enumerates one clef change.

```
twobyte clef;
```
The number of the clef to change to.

```
twobyte xdisp;
twobyte ydisp;
```
The postionally displacements from the top left point of the measure to the location of the clef. xdisp is used to determine when to begin placing entries in the new clef.

```
twobyte percent;
```
The percentage at which to draw the clef.

The Other Group

Name: CLIPSPEC

Tag: KL

Comparator: 0

Structure:
```
#define CLIPSPEC struct clipspec
CLIPSPEC
    {
    twobyte top;
    twobyte left;
    twobyte bottom;
    twobyte rite;
    twobyte AAAA;
    twobyte BBBB;
    };
```

Brief: This structure assigns a clip region.

Discussion:
This structure structure is a kludge. Since there are many calculation which go into creating a page, Enigma cannot generate it instantaneously on most computer systems. This structure allows only a specific part of the page to be redrawn.

```
twobyte top;
twobyte left;
twobyte bottom;
twobyte rite;
```
These elements specify the bounding box of the clip.

The Other Group

Name: CSPEC

Tag: cs

Comparator: 0 (for now)

Structure:

```
#define CSPEC struct cspec
CSPEC
     {
     twobyte AAAA;
     twobyte BBBB;
     twobyte CCCC;
     twobyte DDDD;
     twobyte EEEE;
     twobyte pieceflag;
     };
```

Brief: This structure assigns attributes which concern the entire piece of music.

Discussion:

You will note that most of CSPEC is unassigned. Currently, CSPEC only provides the ability to create a piece which can float key signatures, time signatures, music fonts and note shapes. In such a piece, each instrument has the capability for any or all of these to be independently assigned. A 'global' key and time signature can be assigned for instruments which do not float, under the normal conventions of MSPEC (See the discussion of MSPEC). The 'global' music font is defined in global variables. A global notes shapes setting is defined by the DOSHAPENOTES bit in the pieceflag of this structure.

This ability is accessed through the pieceflag element of CSPEC.

The pieceflag is bit mapped as follows:

```
#define FLOATKEYS          0x8000
#define FLOATTIME          0x4000
#define FLOATFONT          0x2000
#define FLOATSHAPE         0x1000
#define DOSHAPENOTES       0x0080
#define TCDWATER           0x000F
```

These bits are used to enable the floating capabilities for the entire piece. The flags can be independantly set. A piece might have floating key signatures and music fonts but not time signatures and note shapes.

FLOATKEYS
FLOATTIME
     Each instrument which will float either key or time or both (as opposed to using the 'global' key and time signatures found in each MSPEC) will need to have an Instrument Specification Chart initialized by setting the FLOATKEYS and/or FLOATTIME bits in the instflag element of its ISPEC structure (See discussion of ISPEC).

To assign a new key or time signature, create a FLOATS record in The Detail Group under the instrument and measure number with the appropriate information (See discussion of FLOATS under The Detail Group). An instrument which floats either key or time signatures should have a FLOATS record for every measure in the piece.

FLOATFONT

Each instrument which will float their music font (as opposed to using the 'global' music font found in MUSICFONT, MUSICSIZE and MUSICEFX) will need to have an Instrument Attributes Chart initialized by setting the USEMFONT bit in the flag element of its INSTATTS structure (See discussion of INSTATTS).

To assign a new music font to an instrument, place the ID number of the music font in the mfont element of the INSTATTS structures.

FLOATSHAPE

Each instrument which will float their note shapes (as opposed to using a 'global' note shapes enabled by the DONOTESHAPES bit below) will need to have an Instrument Attributes Chart initialized by setting the DOSHAPENOTES bit in the flag element of its INSTATTS structure (See discussion of INSTATTS).

To assign a new set of note shapes to an instrument, create the appropriate SHAPENOTE records under the instrument ID in details (See a discussion of SHAPENOTE in The Detail Group).

DOSHAPENOTES

This flag enables note shapes for the entire piece. To use, set this bit and then create the appropriate SHAPENOTE records in details with a comparator one of 0 (See a discussion of SHAPENOTE in The Detail Group).

TCDWATER

This flag masks a number in the lower four bits of the flag which controls the ratio of TCD bits to RLBITS in a Tone Center Displacement word of a note element of an entry (See discussion of TCDs in The Entry Pool). The number is in the range 0-15 and denotes the position of the RLBIT. Zero is the least significant bit. Fifteen in the most significant bit.

The Other Group

Name: DATABLOCK LONGBLOCK

Tag: DB EB LD GP IP IK

> EB is used to hold the shape IDs of shapes which are subtracted out of the main shape in a TXTLAYOUT record.
> GP is used to hold the next available group number.
> IP is used to hold the next available instrument number.
> IK is used to hold key number offsets from the root key number of a chord suffix Comparator:  DB - Undefined
             LB - Undefined
             GP - 65535
             IP - 65535
             IK - The Chord Suffix ID Structure:
```
#define DATABLOCK struct datablock
DATABLOCK
    {
    twobyte data[6];
    };
```

```
#define LONGBLOCK struct longdata
LONGBLOCK
    {
    fourbyte data[3];
    };
```

Brief: This structure provides generalized data.

Discussion:
    twobyte data[6];
    fourbyte data[3];
      These elements provide Enigma with general data storage. One use for this storage is in the exceptions element of the TEXTBLOCK record (See discussion of TEXTBLOCK).

Since Enigma views successive records of the same comparator and tag as members of the same record. The structure are limited to 32767 records per comparator, of which there are 32767 (given the memory, of course).

The Other Group

Name: DOBJSPEC

Tag: DO

Comparator: An object dynamic ID

Structure:
```
#define DOBJSPEC struct dobjspec
DOBJSPEC
    {
    twobyte instlist;
    twobyte datalist;
    twobyte value;
    twobyte auxdata1;
    twobyte auxdata2;
    twobyte flag;
    };
```

Brief: This structure assigns attributes to dynamic objects.

Discussion:
    Enigma describes dynamics functionally with respect to aural playback. By dynamics, we enlarge the definition to include any object which dynamically alters the aural playback of the piece. These include amplitude changes, tempo changes and timbral changes. It is not the intention of this document, however, to describe the playback capabilities of Enigma. Therefore, we will limit our discussion of dynamics to those elements which effect the visual representation of the dynamic. The others will be presented but not discussed. The playback capabilities of Enigma can be discovered in the document 'An Introduction to the Aural Playback Capabilities of Enigma'.

This structure is accessed when Enigma is creating a visual representation of the dynamic object. It is found by using the dynumber element of the DYNAMIC record which assigns this dynamic object to a measure. The dynumber element is used as a comparator to search for a DOBJSPEC record with tag 'DO'.

At first glance the value of having shape definitions for dynamics may not be clear. It is the easiest way to do crescendo and decrescendo marking.

The tag for this structure serves two purposes. The first instance of a record with a given comparator and a tag of 'DO' will be this structure. However the successive instances of records with the given comparator and a tag of 'DO' will be of structure SHAPEDATA.

The data for the shape definition of the dynamic will be in these successive records. This allows the same shape drawing instructions to be applied to different data for given group of dynamic objects. For instance, our crescendo and decrescendo markings may always be defined as two lines. The data for these lines (their length, inclination and degree of separation) will change from marking to marking.

The Other Group - DOBJSPEC.  2

```
twobyte instlist;
twobyte datalist;
```
Enigma defines shapes with an instruction list, a data list, and a bounding box. The bounding box is used when Enigma is pouring text into a shape for a rough approximation to determine if the shape should even be considered for intersection.

Usually, the two lists are compiled into a path by Enigma. This path can then be stroke, filled or poured with text (See discussion of SHAPEDEF for more information).

To create a dynamic object, Enigma shortcircuits this process by holding the number for the instruction list in the dynamic object specification. It searches for a SHAPELIST record under this number with a tag of 'SL'. It then fetches the data for the found instructions.

The data for the instructions can come from two places.

If the USEDATA bit is set in the flag element, Enigma will search for a SHAPEDATA record under the number in datalist. Otherwise, it will use successive records under the current comparator and the current tag ('DO').

```
twobyte flag;
```
The flag is bitmapped as follows:

```
#define WHITEOUT      0x8000
#define FEATHERTIPS   0x4000
#define VALUEisEXEC   0x2000
#define USEauxDATA    0x1000
#define USEDATA       0x0800
#define FLIPSTROKE    0x0400
#define objBRACKET    0x0200
#define LOCKDOWN      0x0200
#define DYTYPEBITS    0x00FF
```

WHITEOUT,
If the final command in the shape is a fill command (or a stroke command with FLIPSTROKE set), Enigma will generate a setgray call of 1 previous to the call of eofill in POSTSCRIPT™. This will turn the shape opaque white.

FEATHERTIPS
　　If the shape consists of one bezier curve. This flag will cause Enigma to generate to curves, the second slightly lower than the first and call eofill instead of stroke to do the path. It results in a slur with feathered tips.

USEDATA
　　Normally, a dynamic object will hold its own data. The first record of the given dynamic number and tag 'DO' will be of structure DOBJSPEC. successive records of the given dynamic number and tag 'DO' will be of structure SHAPEDATA. Enigma will use these successive records to constitute the data for the dynamic object.
　　If this bit is set, Enigma will ignore the successive records and search for SHAPEDATA records under the number in datalist with a tag of 'SB'.

FLIPSTROKE
　　If this bit is set and the last instruction in the shape definition is 'stroke', it will be flipped to 'fill' when a POSTSCRIPT™ listing is generated from the piece.

The Other Group - DOBJSPEC. 3 objBRACKET
　　If this bit is set the instlist element will contain a bracket number which will be passed to drawbracket() in place of a shape definition passed to the shape handling routines.

LOCKDOWN
　　Normally, Enigma will scale the horizontal coordinates of a shape to the current measure percent enduction (the amount of expansion or contraction caused by fitting a range of measures on a line). WIth this flag set, Enigma will not scale the shape.

The Other Group

Name: DTXTSPEC

Tag: DT

Comparator: A text dynamic ID

Structure:
```
#define DTXTSPEC struct dtxtspec
DTXTSPEC
    {
    twobyte fontsize;
    twobyte efx;
    twobyte value;
    twobyte auxdata1;
    twobyte auxdata2;
    twobyte flag;
    };
```

Brief: This structure provides data for and assigns attributes to text dynamics.

Discussion:
　Enigma describes dyanamics functionally with respect to aural playback. By dynamics, we enlarge the definition to include any object which dynamically alters the aural playback of the piece. These include amplitude changes, tempo changes and timbral changes. It is not the intention of this document, however, to describe the playback capabilities of Enigma. Therefore, we will limit our discussion of dynamics to those elements which effect the visual repesentation of the dynamic. The others will be presented but not discussed. The playback capabilities of Enigma can be discovered in the document 'An Introduction to the Aural Playback Capabilities of Enigma'.

This structure is accessed when Enigma is creating a visual representation of the text dynamic. It is found by using the dynumber element of the DYNAMIC record which assigns this text dynamic to a measure. The dynumber element is used as a comparator to search for a DTXTSPEC record with tag 'DT'.

The tag for this structure serves two purposes. The first instance of a record with a given comparator and a tag of 'DT' will be this structure. However the successive instances of records with the given comparator and a tag of 'DT' will be of structure STRINGS.

The character string data for the dynamic will be in these successive records. Since Enigma will group these records into one character string there is a theoretical limit of 32767 characters to the text dynamic. In reality, Enigma stops at 24.

The Other Group - DTXTSPEC. 2

```
twobyte fontsize;
twobyte efx;
```
These two elements dictate the font, size and effects applied to the text drawn for the dynamic. The font and size reside in the upper and lower byte of the first element respectively.

Enigma will take the number in font and attempt to find STRINGS record under that number with a tag of 'FN' (Font Name. See discussion of STRINGS). If it finds the record, it will compile the font name into a string and pass it to a low level hardware routine which will initialize the primitive text drawing routines to that font.

Enigma will take the number in size and pass it to a low level hardware routine which will initialize the primitive text drawing routines to that size.

Enigma will take the number in efx and strip the bits out of it one at a time. For each set bit Enigma will attempt to find STRINGS record under that bit number with a tag of 'EN' (Effects Name. See discussion of STRINGS ). If it finds the record, it will compile the effects name into a string and pass it to a low level hardware routine which will initialize the primitive text drawing routines to that effect.

This approach insures portability.

```
twobyte value;
twobyte auxdata1;
twobyte auxdata2;
```
Normally, these elements reside in the aural playback domain. There is one case where they will effect the visual representation of the dynamic.

If a '#' exists in the character string for the dynamic, Enigma will convert one of these elements to a string and replace the '#' with that string.

If neither the POUNDaux1 or POUNDaux2 bits are set in the flag element of this structure, value will be converted.

If neither the POUNDaux1 bit is set in the flag element of this structure, auxdata1 will be converted.

If neither the POUNDaux2 bit is set in the flag element of this structure, auxdata2 will be converted.

The Other Group - DTXTSPEC. 3 twobyte flag;
The flag is bitmapped as follows:

```
#define POUNDaux1      0x8000
#define POUNDaux2      0x4000
#define VALUEisEXEC    0x2000
#define USEauxDATA     0x1000
#define SIDES          0x0F00
#define DYTYPEBITS     0x00FF
```

POUNDaux1
If a '#' exists in the character string for this dynamic and this bit is set, Enigma will convert the auxdata1 element into a string. Enigma will replace the '#' with this string.

POUNDaux2
If a '#' exists in the character string for this dynamic and this bit is set, Enigma will convert the auxdata2 element into a string. Enigma will replace the '#' with this string.

SIDES
Enigma allows a text dynamic to be enclosed. The number of sides for the enclosure is given in SIDES.

| If SIDES equals: | The enclosure will be a: |
|---|---|
| 1 | box |
| 2 | circle |
| 3 | triangle |
| 4 | diamond |
| 5 | pentagon |
| 6 | hexagon |
| 7 | septagon |

The parameters of the box are individually specified in another structure, ENCLSPEC. The comparator for this structure is the dynamic number and the tag is 'De'. See ENCLSPEC for more details.

The Other Group

Name: DYNAMIC
Tag: DY

Comparator: The measure it belongs to.

Structure:

```
#define DYNAMIC struct dynamic
DYNAMIC
    {
    twobyte dynumber;
    twobyte posadd;
    twobyte lineadd;
    twobyte IndivPos;
    twobyte current;
    twobyte flag;
    };
```

Brief:   This structure assigns attributes to dynamics and ties them to measures.

Discussion:

Enigma describes dyanamics functionally with respect to aural playback. By dynamics, we enlarge the definition to include any object which dynamically alters the aural playback of the piece. These include amplitude changes, tempo changes and tambral changes. It is not the intention of this document, however, to describe the playback capabilities of Enigma. Therefore, we will limit our discussion of dynamics to those elements which effect the visual representation of the dynamic. The others will be presented but not discussed. The playback capabilities of Enigma can be discovered in the document 'An Introduction to the Aural Playback Capabilities of Enigma'.

This structure is accessed when Enigma encounters a DYNAMIC bit set in the meflag element of a measure's MSPEC. The comparator will be the measure number and the tag will be 'DY'.

Successive DYNAMIC records may be created with the same measure number. This allows more than one dynamic to be assigned to the measure. The number of assignments is limited to 32767.

twobyte dynumber;
   This element holds the number of the dynamic to be assigned. It will be used as a comparator in searching for the DYNAMIC record.

The Other Group - DYNAMIC.2 twobyte posadd;
twobyte lineadd;
   These two elements hold the positional displacement for the dynamic. When Enigma calls the dyanmic drawing routine it passes the routine the top left corner of the measure of a position. These elements offset the horizontal and vertical postions, respectively.

twobyte IndivPos;
   This element holds an ID for the individual positioning records for the dynamic it assigns to the measure. See the discussion of SEPRPLACE below.

twobyte current;
   This element is used in playback.

twobyte flag;

The `flag` is bitmapped as follows:

```
#define  TEXTOBJECT    -0x8000
#define  SEPRPLACE      0x0800
#define  INDIVINST      0x0400
#define  INDOVERRIDE    0x0200
#define  VECTORSTART    0x0100
```

TEXTOBJECT

Enigma defines two types of dynamics: text dynamics and dynamic objects. This bit indicates which type of dynamic this record assigns. Text dynamics are defined by a DTXTSPEC record. Dynamic objects are defined by a DOBJSPEC. See discussion of DTXTSPEC and DOBJSPEC.

SEPRPLACE

Enigma allows individual positioning control over selected instruments in the stave system stack for a given measure when constructing a dynamic. To use, set this bit. Create a SEPERATES record under the same comparator as the DYNAMIC record with a tag of 'DI'. Fill it with the number of the instrument whose dynamic position you wish to individually control, a Individual Positioning ID (in place of the mesure number) and the appropriate displacements. Put the ID in the IndivPos element.

INDIVINST

Enigma allows placement of dynamcs on selected instruments within the stave system stack for a given measure. This means that a dynamics may be placed on only a few instruments even though the other instruments might normally be acceptable to dynamics.

Enigma provides additional control by allowing a different list to be used when printing parts. The user has control over the placement of the dynamic in the score and on each individual part.

This bit is used to signal Enigma for an individual dynamic list. Currently 255 individual dynamic lists can be created for the score in a piece and 255 individual dynamic lists for the parts. The ID of the particular list to use is in the lower byte of the `flag` element. The mask LISTNUM is used to mask off the ID number. To use, set this bit. Create an ILIST structure under an ID in the range 1-255 with a tag of 'DC' for the score and another with a tag of 'dc' for the parts and place the instrument number in them.

The Other Group - DYNAMIC.3

Provided the dynamic will be drawn on the measure (See discussion of DTXTSPEC and DOBJSPEC), the dynamic will be drawn only on the instruments in the ILIST structure, even though the other instruments in the stave system might normally be acceptable to dynamics.

INDOVERRIDE

This bit is used to signal an override list when an instrument or instruments which have the NEGDYNAMIC bit set in the `instflag` element of their ISPEC need to have dyanamics drawn on them (See discussion of ISPEC). Currently 255 individual override dynamic lists can be created for the score in a piece and 255 individual override dynamic lists for the parts. The ID of the particular list to use is in the lower byte of the `flag` element. The mask LISTNUM is used to mask off the ID number. To use, set this bit. Create an ILIST structure under an ID in the range 1-255 with a tag of 'IO' for the score and another with a tag of 'io' for the parts and place the instrument number in them.

If individual placement and individual override are needed simultaneously the IDs for both lists must be the same.

Provided the dynamics will be drawn on the measure.(See discussion of DTXTSPEC and DOBJSPEC), the dynamic will be drawn on the instrument, even though the instrument's ISPEC says not to. Note: this is slightly different from the way Enigma overrides NEGREPEAT and NEGMNUMB bits in the instflag element of the ISPEC (See discussion of ISPEC). Enigma provides individual override control for each dynamic assigned to a measure, whereas it provides only bulk override control for all the repeats in a measure.

The Other Group

Name: DURALLOT

Tag: DA

Comparator: The duration which corresponds to the positional width defined by this record Structure:
```
#define DURALLOT struct durallot
DURALLOT
    {
    twobyte allotment;
    twobyte AAAA;
    twobyte BBBB;
    twobyte CCCC;
    twobyte DDDD;
    twobyte EEEE;
    };
```

Brief: This structure provides a minimum positional width to a given duration.

Discussion:
In music typography there is not a one to one correlation between the absolute start time of an entry with in a measure and the horizontal position of the entry with in the measure. Music Engravers use a system called proportional spacing. Different durations are given different weights. A quarter note might get three and a half spaces. A half note, five spaces. Enigma handles this by providing beat charts which can map any ellapsed duration to any horizontal position within the measure. Enigma also provides routines in its Edit Community which can take a stack of instruments and multiple measures and do porportional spacing (the mapping of the different weights of the entries into a beat chart to display them positionally). These routines rely on the information from DURALLOT records to provide the weights for the diferrent durations. Enigma expects to be able to use a duration as a comparator with a tag of DA and access one of these records. It none exists Enigma will use a default allotment (weight).

twobyte allotment;
    This element holds the allotment (weight) for the duration which was used as a comparator. It is in EVPUs.

The Other Group

Name: ENCLSPEC

Tag: De He Me Rx

Comparator:
- De: a text dynamic ID
- He: 0 for global headers or the page it belongs to
- Me: the measure it belongs to
- Rx: a text repeat ID Structure:

```
#define ENCLSPEC struct enclspec
ENCLSPEC
    {
    twobyte xadd;
    twobyte yadd;
    twobyte radadd;
    twobyte toprat;
    twobyte botrat;
    twobyte lwidth;
    };
```

Brief: This structure defines an enclosure for text.

Discussion:

This structure defines text enclosures for four different types of text: Dynamics, Headers, Measure Numbers and Repeats. The respective tags are: De He Me Rx. It contains the necsessary offset information to precisely control the shape and size of the enclosure.

When this structure is accessed Enigma knows the number of sides for the enclosure and well as the coordinates for a rectangle which encloses the text.

```
twobyte xadd;
twobyte yadd;
```
Enigma takes the retangle and derives a center point from it. This center point is offset by xadd and yadd.

```
twobyte radadd;
```
Enigma also derives a radius from the rectangle. The value is added to radadd.

```
twobyte toprat;
twobyte botrat;
```
These two variables establish an aspect ratio for the enclosure. If the ratio is 1:1, the enclosure sides will be equal. If the ratio is 2:1, it will be vertically elongated. If the ratio is 1:2, it will be horizontally elongated.

```
twobyte lwidth;
```
This element contains the width of the line in points multiplied by 100. For instance, if the line should be half a point wide, this element would contain 50.

The Other Group

Name: ENDGTEXT

Tag: ET

Comparator: The measure it belongs to.

Structure:

```
#define ENDGTEXT struct endgtext
ENDGTEXT
    {
    char string[12];
    };
```

Brief: This structure hold the text string for an opening ending bracket.

Discussion:

`char string[12];`
Aside from providing a text string to draw, the structure provides one additional feature.

If a '#' exists in the string, Enigma will replace it with the actuator/s of the ENDSTART record. (See discussion of ENDSTART).

Since Enigma groups successive records of the same comparator and tag as the same record, theoretically, there is no limit of 32767 characters in the string. In reality, Enigma limits is to 64.

The Other Group

Name: ENDSTART

Tag: ES

Comparator: The measure it belongs to.

Structure:

```
#define ENDSTART struct endstart
ENDSTART
    {
    twobyte current;
    twobyte nextend;
    twobyte txtposline;
    twobyte pos1pos2;
    twobyte line1line2;
    twobyte flag;
    };
```

Brief: This structure assigns attributes to an opening ending bracket.

Discussion:

Enigma describes repeats functionally with respect to aural playback. It understands when to take a repeat and when to skip ahead. It is not the intention of this document, however, to describe the playback capabilities of Enigma. Therefore, we will limit our discussion of repeat structures to those elements which effect the visual representation of the repeat. The others will be presented but not discussed. The playback capabilities of Enigma can be discovered in the document 'An Introduction to the Aural Playback Capabilities of Enigma'.

This structure is accessed when Enigma encounters a BARENDING bit set in the meflag element of a measure's MSPEC. The comparator will be the measure number and the tag will be 'ES'.

Enigma holds the actuator number/s for the ending start bracket in another structure. It is a REPTENUM structure under the measure number of this ending with a tag of 'EE'. By actuator number, we mean the threshold at which Enigma will 'drop into' the ending bracket. For instance, if the actuator number is set to one, the first time Enigma encounters the ending bracket if will 'drop into' the bracket. On successive encounters, however, it will not.

Enigma also supports multiple actuator for a single repeat structure. For instance, a repeat structure can be programmed to take a repeat on the second, third and fifth time. This is accomplished by filling the REPTENUM record with more than one actuator.

At first glance this discussion might seem solely in the domain of playback, however, it relevance will be apparent is the discussion of txtposline.

```
twobyte current;
twobyte nextend;
```

The Other Group - ENDSTART.2

```
twobyte txtposline;
```
An opening ending bracket differs from a closing ending bracket not only in the construction of the bracket, but also in the addition of a line of text indicating what number of ending bracket it is.

Enigma can create this text in two ways.

In default, Enigma will pull the actuator convert it to a string and print it. If there are multiple actuators for the repeat, it will print each of these separated by commas.

Enigma can, however, be set to draw any text string in the opening ending bracket. Create a ENDTEXT record under this measure number with the tag 'ET'. Enigma will check for the existence of such a record before printing the actuator/s and if such a record exists will print it in place of the actuators (See discussion of ENDTEXT).

Now for the description of txtposline.

This element breaks into two signed bytes which control the placement of the text string in the opening ending bracket. We will call these two variables pos and line. A illustration would be helpful:

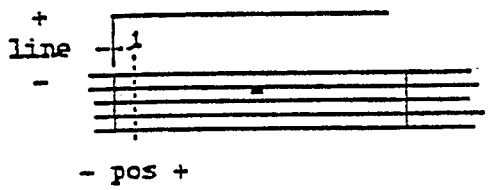

pos controls the horizontal displacement from the vertical line.
line controls the vertical displacement from the end point of the vertical line.

```
twobyte pos1pos2;
twobyte line1line2;
```
These two elements break out into four signed bytes which we will call pos1, pos2, line1 and line2 respectively. These four signed bytes control the appearance of the opening ending bracket. An illustration might help:

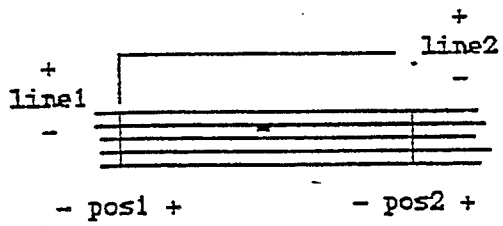

pos1 controls the horizontal position of the vertical line from the left side of the measure.
pos2 controls the horizontal endpoint of the horizontal line from the right side of the measure.
line1 controls the vertical endpoint of the vertical line from the top of the staff added to the
    global uENDNGLINE.
line2 controls the vertical position of the horizontal line from the top of the staff

The Other Group - ENDSTART.3

```
twobyte flag;
```
The flag is bitmapped as follows:

```
#define isJUMPER        0x8000
#define isMARKER        0x4000
#define JMPonACTU       0x0800
#define JMPALWAYS       0x0400
#define JMPtoMARK       0x0200
#define REPuntilACT     0x0100
#define COUNTPASSES     0x0080
#define CLRonCHANGE     0x0040
#define MULTACTUATE     0x0008
#define INDIVPLAC       0x0001
```

MULTACTUATE
    This bit should always be set for ending brackets.

INDIVPLAC
    Enigma allows individual placement control over selected instruments in the stave system stack for a given measure when constructing the opening ending bracket. To use, set this bit. Create a SEPERATES record under this measure number and a tag of 'EI'. Fill it with the number of the instrument whose opening bracket you wish to individually control, the current measure number and the appropriate displacements.

Enigma allows individual placement control over selected instruments in the stave system stack for a given measure when postitioning the text line of the opening ending bracket. To use, set this bit. Create a SEPERATES record under this measure number and a tag of 'LI'. Fill it with the number of the instrument whose text line you wish to individually control, the current measure number and the appropriate displacements.

The Other Group

Name: FRAMEATTS

Tag: FA

Comparator: A frame ID

Structure:
```
#define FRAMEATTS struct frameatts
FRAMEATTS
    {
    twobyte transpose;
    twobyte restlevel;
    twobyte hhockID;
    fourbyte mask;
    twobyte flag;
    };
```

Brief: This structure assigns attributes to a frame. It is normally used with mirror frames.
(See discussion below).

Discussion:
Enigma's main body of music data is held in a structure called the Entry Pool (See a discussion of the Entry Pool in the Entry Pool Section). Since each stream in the Entry Pool is continuous via the links, some mechanism is needed to break a stream into smaller pieces without imposing an artificial hierachry on the Entry Pool. A FRAMESPEC record accomplishes this by holding in its data a starting entry number and an ending entry number. These two numbers 'frame' a piece of a stream in the Entry Pool. As can be deduced, it is easily possible that two frames will overlap or that one frame might enclose another. Although Enigma makes no stipulations on the interweaving of frames, by convention we say the fram which encompasses the largest portion of the overlap is the 'original'. The other frames are 'mirrors'. We do not use the term 'copies'. Since copies denote a duplication of the material. There is no duplication of the material in a mirrored frame. It is simply another way of viewing the original material. The labelling of a frame as an original or a mirror does not occur in the frame specification. It occurs in the Graphic File Assignment Record which maps a frame to a framework intersection point.

The FRAMEATTS record is normally used to modify the appearance of a mirrored frame. Before displaying a frame, Enigma transfers the information in the frame into a temporary graphic file buffer (frame buffer) called tgf. Once the information is in tgf it can be massaged with the information in a FRAMEATTS record. We say that the FRAMEATTS record is normally used to massage the appearance of a mirrored frame since any desired transformation of the original would likely occur in the Entry Pool. The reader should be aware that certain programs will likely exist which will assume a frame is a mirrored frame is a FRAMEATTS record exists under the frame's ID. Since certin restriction engage with the presence of a mirrored frame, (i.e. the information in the entries of the frame is non-editable), a supervising program should take care in the creation and maintainece of the record.

The Other Group - FRAMEATTS. 2

`twobyte transpose;`
   If the `doTRANSPOSE` bit in the `flag` element is set, Enigma will transpose all of the notes of the `frame` specified by the companion `FRAMESPEC` record. Normally the transposition will be diatonic by the amount in `transpose`. If the `doCHROMTRANS` bit is set in the `flag` element The transposition will be chromatic and the amount in `transpose` should be in terms of half steps.

`twobyte restlevel;`
   If Enigma is horizontally hocketting a frame and if the `useRESTLEVEL` bit is set in the `flag` element, Enigma will replace the harmonic levels of the rests in the `frame` specified by the companion `FRAMESPEC` record with the value in `restlevel`. The value is in units of tone center displacement.

`twobyte hhockID;`
   If the `doHOCKETTING` bit in the `flag` element is set, Enigma will use the frame number in the comparator of this record and the value in `hhockID` as the comparator one and comparator two in a search of details for a `HHOCKSPEC` record. Each `HHOCKSPEC` record will contain an entry number and a note ID (See Entry Pool for more information). Enigma will attempt to match each note in the frame with a `HHOCKSPEC` record. If no match can be found the note will be deleted from `tgf`.

`fourbyte mask;`
   If the `doMASK` bit in the `flag` element is set, Enigma will take `mask` and 'and' it against all the `ef` elements of the `frame` specified by the companion `FRAMESPEC` record before drawing it to the screen.

`twobyte flag;`
   The `flag` is bitmapped as follows:

```
        #define doMASK          0x8000
        #define doTRANSPOSE     0x4000
        #define doHOCKETTING    0x2000
        #define FREEZESTEMS     0x1000
        #define HIDEOTHERS      0x0800
        #define HIDECONTROLS    0x0400
        #define useRESTLEVEL    0x0200
        #define doFLOATREST     0x0100
        #define reBEAM          0x0080
        #define useBEAMCHART    0x0040
        #define reduceRESTS     0x0020
        #define JUSTIFY         0x0010
        #define FREEZEtoUP      0x0008
        #define HOCKENTvsDUR    0x0004
        #define INVERTHOCK      0x0002
        #define doCHROMTRANS    0x0001
``` doMASK

If this bit is set, Enigma will take the mask element and 'and' it against all the ef elements of frame before drawing it to the screen (See discussion of the Entry Pool).

The Other Group - FRAMEATTS. 3 doTRANSPOSE

If this bit is set, Enigma will transpose all of the notes of frame diatonically or chormatically by the amount in the element transpose before drawing it to the screen.

doHOCKETTING

If this bit is set, Enigma will hocket the frame. Enigma will take the frame number and the value in hhockID as two comparators for a search in details looking for a HHOCKSPEC record (tag of HH). Each note in the hocket will have a HHOCKSPEC record. Notes which do not have a HOCKSPEC record will be delete from tgf. All resulting note-less entries will turn into rests.

FREEZESTEMS

If this bit is set, Enigma will set the FREEZSTEM bit in the ef element of each entry in the frame. The direction of the frozen stem is determined by the setting of FREEZEtoUP.

HIDEOTHERS

If this bit is set and Enigma is hocketting the frame, Enigma will set the IGNOREBIT bit in the ef element of each entry in the frame. All entries excluded by the hocket will not be drawn.

HIDECONTROLS

If this bit is set and Enigma is hocketting the frame, Enigma will set the IGNOREBIT bit in the ef element of each note-less controlled entry in the frame.

useRESTLEVEL

If this bit is set and Enigma is hocketting the frame, Enigma will turn all note-less entries into rests and set their tone center displacement to the value in restlevel.

doFLOATREST

If this bit is set and Enigma is hocketting the frame, Enigma will turn all note-less entries into rests and set the FLOATREST bit in each of their ef elements.

reBEAM

If this bit is set and Enigma is hocketting the frame, Enigma will reanalyze all the entries within the frame and reset the beam bits according to the beats of the time signature. This is useful if you are hocketting the same frame into a number of different time signatures and you want the beaming to reflect the time signature of each measure. This feature is fully supported through alternate time signature upper and lower halves.

useBEAMCHART

Normally, Enigma will use the time signature of the measure to rebeam the frame. However, Enigma can apply a designed beaming chart to a specific instrument at a specific measure and a specific record. Set both the reBEAM and useBEAMCHART bits. Create the beaming chart in successive records of the structure BEAMCHART in the Detail Group (See discussion of BEAMCHART in the Detail Group) using the instrument and measure as the two comparators.

```
reduceRESTS
JUSTIFY
```
These bits are reserved for future revisions.

The Other Group - FRAMEATTS. 4

FREEZEtoUP
This bit determines the direction of freezing for the stems. Set for up.

HOCKENTvsDUR
Not Used. Historical.

INVERTHOCK
Not Used. Historical.

doCHROMTRANS
If the doTRANSPOSE bit and this bit is set Enigma will transpose the frame chromatically before drawing it to the screen.

The Other Group

Name: FRAMESPEC

Tag: FR

Comparator: A frame ID

Structure:
```
#define FRAMESPEC struct framespec
FRAMESPEC
    {
    fourbyte startE;
    fourbyte endE;
    twobyte totalpos;
    twobyte flag;
    };
```

Brief: This structure specifies a frame.

Discussion:
Enigma's main body of music data is held in a structure called the Entry Pool (See a discussion of the Entry Pool in the Entry Pool Section). Since each stream in the Entry Pool is continuous via the links, some mechanism is needed to break a stream into smaller pieces without imposing an artificial hierachry on the Entry Pool. A FRAMESPEC record accomplishes this by holding in its data a starting entry number and an ending entry number. These two numbers 'frame' a piece of a stream in the Entry Pool. As can be deduced, it is easily possible that two frames will overlap or that one frame might enclose another. Although Enigma makes no stipulations on the interweaving of frames, by convention we say the frame which encompasses the largest portion of the overlap is the 'original'. The other frames are 'mirrors'. We do not use the term 'copies', since copies denote a duplication of the material. There is no duplication of the material in a mirrored frame. It is simply another way of viewing the original material. The labelling of a frame as an original or a mirror does not occur in the frame specification. It occurs in the Graphic File Assignment Record (GFHOLD of The Detail Group) which maps a frame to a framework intersection point.

```
fourbyte startE;
fourbyte endE;
```
These elements dictate the boundaries of the frame. endE is the last entry in the frame.

Note: If the PLACEHOLDER bit is set in the flag element startE is interpreted as a rest value. All subsequent ellapsed durations of the frame are pushed forward by that amount. Enigma expects only one place holder per frame. If the PLACEHOLDER bit is set Enigma will expect the next incidence to contain the boundaries of the frame.

```
twobyte totalpos;
```
This element hold the total horizontal width of the all entries of the frame. It is used by scalepos() when scaling the frame into a framework intersection point.

```
twobyte flag;
```
The flag element currently contains only on bit mapped:

The Other Group

Name: FREEZMEAS

Tag: FM

Comparator: The measure which begins the freeze.

Structure:
```
        #define FREEZMEAS struct freezmeas
        FREEZMEAS
            {
            twobyte endmeas;
            twobyte AAAA;
            twobyte BBBB;
            twobyte CCCC;
            twobyte DDDD;
            twobyte EEEE;
            };
```

Brief: This structure freezes a range of measures into a line of music.

Discussion:
When Enigma is packing measures onto a line it normally calculates the width of the clef and starting key signature on the line, adds up all the measpace elements in the MSPEC records and factors in any key and time signature, It then establishes a percentage of compression or expansion to be applied to all the measure on the line to make them fit.

This structure allows the user to freeze a range of measures on a line regardless of their widths. When Enigma is packing a line and it encounter one of these records it will stop packing so that the next line can begin with the measure which contains one of these records. Enigma will then pack the next line with the all the measures up to the measure specified by endmeas.

```
twobyte endmeas;
```
   This element contain the number of the first measure on the next line.

The Other Group

Name:   FROZENSPLIT

Tag:    FS

Comparator:   The stave system it belongs to.

Structure:
```
        #define FROZENSPLIT struct frozensplit
        FROZENSPLIT
            {
            twobyte presmeas;
            twobyte preswidth;
            twobyte postsmeas;
            twobyte postsstart;
            twobyte postswidth;
            twobyte flag;
            };
```

Brief:   This structure freezes a stave system's measure splits.

Discussion:
   Normally, before drawing a stave system, Enigma will call a routine to calculate the number of measures on the line of the stave system. It passes the routine the number of the measure to begin with. The routine performs a number of tasks. It determines how many measures will fit on the line. It determines the amount of reduction or enlargement needed to fit the measures to the space on the line. It determines if a measure split is in progress. It determines if the final measure on the line should be split and it informs the rest of the Enigma graphic routines which measures to draw if a clip is is progress.

This structure can remember the result of those calculations concerning measure splits. The next time Enigma draws the stave system it will not have to call the line packing routine again. It is accessed when the companion FROZENSTAVE record has the doFREEZESPLIT bit set in its flag element. Also the FROZENLINE bit of the flag element of the stave's SSPEC must be set.

Conversely, the user may pack this structure (and its companion FROZENSTAVE), to create any measure layout desired.

An understanding is needed of Enigma's representation of split measures. A few definitions are needed.

A split measure breaks into one presplit section and one or more postsplit sections. Normally, the measure's presplit section will occur at the end of a line and the measure's postsplit section will occur at the beginning of the next line. In the case of a long cadenza, the split section after the first split section may be broken up over more than one line. The first section is still considered to be the presplit section and the rest are considered postsplit sections.

The Other Group - FROZENSPLIT.2

A presplit section can be defined with a measure number and a position width, since the start is assumed to zero.

A postsplit section must be defined with a measure number, a starting position and a width.

Two variables determine what measures are drawn on a line. We will call them `mestart` and `meend`. `mestart` holds the number of the first measure on the line. `meend` holds the number of first measure not on the line.

Enigma does not consider presplit sections to be part of the conceptual line (of course, it draws them on the physical line). Therefore, the measure number for the presplit section will be equal to `meend`.

The measure number for the postsplit section will be equal to `mestart`, if the postsplit section finishes the measure.

The postsplit section which does not finish a measure (our cadenza example) is a special case. Enigma does not consider it to be part of the conceptual line (of course, it draws it on the physical line). In this case, `mestart`, `meend` and the number of the postsplit measure will all be equal. This indicates to Enigma that there are no legal measures on the line. It will, however, check for a presplit and postsplit section assigned to the line.

```
twobyte presmeas;
twobyte preswidth;
twobyte postsmeas;
twobyte postsstart;
twobyte postswidth;
```

The purpose of these elements should be clear.

`presmeas` and `postmeas` hold the number of the presplit and postsplit measures on the line.

`preswidth` is the horizontal width of the presplit section, in terms of the virtual horizontal displacement found in the `measpace` element of the measure's MSPEC (See discussion of MSPEC).

`postsstart` is the horizontal position of the start of the postsplit section, in terms of the virtual horizontal displacement found in the `measpace` element of the measure's MSPEC (See discussion of MSPEC).

`postswidth` is the horizontal width of the postsplit section, in terms of the virtual horizontal displacement found in the `measpace` element of the measure's MSPEC (See discussion of MSPEC).

```
twobyte flag;
```
No bits are defines for the `flag` element.

The Other Group

Name: FROZENSTAVE

Tag: FS

Comparator: The stave system it belongs to.

Structure:
```
#define FROZENSTAVE struct frozenstave
FROZENSTAVE
    {
    twobyte mstart;
    twobyte mend;
    twobyte mperc;
    twobyte mclipstr;
    twobyte mclipend;
    twobyte flag;
    };
```

Brief: This structure freezes a stave system.

Discussion:
Normally, before drawing a stave system, Enigma will call a routine to calculate the number of measures on the line of the stave system. It passes the routine the number of the measure to begin with. The routine performs a number of tasks. It determines how many measures will fit on the line. It determines the amount of reduction or enlargement needed to fit the measure to the space on the line. It determines if a measure split is in progress. It determines if the final measure on the line should be split and it informs the rest of the Enigma graphic routines which measures to draw if a clip is is progress.

This structure can remember the result of those calculations. The next time Enigma draws the stave system it will not have to call the line packing routine again.

Conversely, the user may pack this structure (and its companion FROZENSPLIT), to create any measure layout desired.

This structure is accessed with the FROZENLINE bit of the staveflag element of the stave system's SSPEC is set (See discussion of SSPEC).

twobyte mstart;
twobyte mend;
   These elements specify starting and ending measure for the stave system. The mend element is the number of the first measure not on the line.

twobyte mperc;
   This element specifies the amount of reduction of enlargement which needs to be applied to the measures of the line to fit them to the width of the line.

twobyte mclipstr;
twobyte mclipend;
   If the doCLIPFREEZE bit is set in the flag element, these elements specify starting and ending measure for the clip. The mclipend element is the number of the first measure not in the clip.

The Other Group - FROZENSTAVE.2

```
twobyte flag;
```
The flag element is bit mapped as follows:

```
#define doCLIPFREEZE      0x0300
#define doSPLITFREEZE     0x0400
``` doCLIPFREEZE
doSPLITFREEZE
    These bits specify whether information on clipping and/or measure splits is include in this structure and its companion FROZENSPLIT.

The Other Group

Name:    FSTKEY

Tag:      Tn - For the negative bank
          Tp - For the positive bank

Comparator:    For Linear Key Formats the comparator is the format number.
                    For NonLinear Key Signatures the comparator is the key signature number.

Structure:

```
#define FSTKEY struct fstkey
FSTKEY
    {
    twobyte tcent[6];
    };
```

Brief:    This structure holds the data on the tonecenters for a linear key format or a non-linear key signature.

Discussion:
    Enigma uses a redefinable method for structuring tonality. Enigma defines tonality in terms of a key map, an accidental amount list, an accidental order list, a tonecenter list, a clef octave accidental assignment list and a set of attributes.

Two classes of tonality exist, linear key formats and non-linear key signatures.

In a linear key format individual key signatures comprised of two bytes compacted into a word. The upper byte contains the number of the key format for the key signature. By default, traditional Western tonality is key format number zero.

The lower byte defines the number of accidentals. Accidentals may be in the range -127 to 127. This amounts to two banks within each key format which can be defined independently of each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

A non-linear key signature uses the entire word for the key signature number.

```
twobyte tcent[6];
```
The FSTKEY structure provides two lists of tonecenters for the key format, one for each bank. For a non-linear key signature Enigma uses only the first element of the positive bank list. These tone centers are in offsets of harmonic levels from middle-C, the reference concrete harmonic value.

Each will have as many tone centers as there are scaletones.

In traditional Western tonality the positive bank list would be: 0 4 1 5 2 6 3 0 and the negative bank list would be: 0 3 6 2 5 1 4 0

The Other Group - FSTKEY. 2

Since Enigma considers successive records of the same comparator and tag to be members of the same record, there is a theoretical limit of 196602 scaletones to the key format. Enigma limits this to 64.

The Other Group

Name: GSPEC

Tag: GS

Comparator: A group ID

Structure:
```
#define GSPEC struct gspec
GSPEC
    {
    twobyte brac;
    twobyte bracpos;
    twobyte bractop;
    twobyte bracbot;
    twobyte AAAA;
    twobyte groupflag;
    };
```

Brief: This structure assigns attributes to an instrument group.

Discussion:

```
twobyte brac;
```
This variable holds the number of the bracket to draw for the instrument group.

```
twobyte bracpos;
twobyte bractop;
twobyte bracbot;
```
These variables serve as displacements for the position information passed to the bracket drawing routine. The bracket drawing routine receive an x position and two y positions for the drawing of the bracket. It then accesses this structure and adds these variables to its passed variables before drawing the bracket.

```
twobyte groupflag;
```
No bits are currently defined for the group flag.

The Other Group

Name: HEADSPEC

Tag: HS

Comparator: 0 for headers/footers which are drawn on all pages.
The page number ofr headers/footers drawn only on one page.

Structure:
```
#define HEADSPEC struct headspec
HEADSPEC
    {
    twobyte xadd;
    twobyte yadd;
    twobyte fontsize;
    twobyte efx;
    twobyte offpage;
    twobyte flag;
    };
```

Brief: This structure assigns attributes to headers (footers).

Discussion:

This structure is accessed when the PAGEHEADER bit of the pageflag element of a page's PSPEC is set.

Enigma support two types of headers: global and local. Global page header are available to all pages. Local headers are available only to their assigned page.

Global headers have a comparator of zero. You can create as many of these as you like (limited to 32767, of course) and use the ONLYODDS and ONLYEVEN bits to control which pages the headers are actually drawn on.

Local headers use the page number as a comparator. You can create as many of these as you like (limited to 32767, of course). These will be drawn only on the page number found in the comparator.

The text for the header is kept in a STRINGS structure under the comparator used for its companion HEADSPEC with the tag 'HT'. Since multiple HEADSPEC records can be defined under the same comparator, the text for the headers must maintain this feature. This is accomplished by grouping four STRINGS records for each HEADSPEC record. Since each STRINGS record holds 12 characters, the text of a given HEADSPEC is limited to 48 characters. If this limitation is a problem see USEOLDX and USEOLDY in the flag element.

The text for a header provides one additional feature, if a '#' exists in the character string, Enigma will replace it with either the page number, the time or the date depending on the setting of POUNDTIME and POUNDDATE.

```
twobyte xadd;
twobyte yadd;
```
These two elements are positional offset. The coordinates they are added to are determined by the settings of TAKETOP, TAKEBOT, CENTERED and RITEJUST in the flag The Other Group - `HEADSPEC`. 2
    element.

The Other Group - `HEADSPEC`. 3

```
twobyte fontsize;
twobyte efx;
```
These two elements break into three variables which dictate the font, size and effects applied to the text drawn for the headers.

Enigma will take the number in font and attempt to find STRINGS record under that number with a tag of 'FN' (Font Name. See discussion of STRINGS). If it finds the record, it will compile the font name into a string and pass it to a low level hardware routine which will initialize the primitive text drawing routines to that font.

Enigma will take the number in size and pass it to a low level hardware routine which will initialize the primitive text drawing routines to that size.

Enigma will take the number in efx and strip the bits out of it one at a time. For each set bit Enigma will attempt to find STRINGS record under that bit number with a tag of 'EN' (Effects Name. See discussion of STRINGS ). If it finds the record, it will compile the effects name into a string and pass it to a low level hardware routine which will initialize the primitive text drawing routines to that effect.

This approach insures portability.

```
twobyte offpage;
```
Page numbers can be created with headers by placing a '#' in the character string for the header. If this element is not equal to zero, Enigma will add it to the page number before converting it to a string and printing it. This allows printed page numbers to be offset from the physical page number (To account for a cover page, for instance.

Also, if a sequential number is need in the character string, this element can cause the number to start counting anywhere.

```
twobyte flag;
```
The flag is bitmapped as follows:

```
#define ONLYODDS     0x2000
#define ONLYEVEN     0x1000
#define SIDES        0x0F00
#define TAKETOP      0x0080
#define TAKEBOT      0x0040
#define USEOLDX      0x0020
#define USEOLDY      0x0010
#define POUNDTIME    0x0008
#define POUNDDATE    0x0004
#define CENTERED     0x0002
#define RITEJUST     0x0001
```

ONLYODDS
ONLYEVEN
    Enigma allows a header to be assigned only to odd numbered pages or even numbered pages. If neither bit is set and the header is a global header, it will be drawn on all pages.

The Other Group - HEADSPEC. 4

SIDES

Enigma allows a header to be enclosed. The number of sides for the enclosure is given in SIDES.

| If SIDES equals: | The enclosure will be a: |
|---|---|
| 1 | circle |
| 2 | box |
| 3 | triangle |
| 4 | diamond |
| 5 | pentagon |
| 6 | hexagon |
| 7 | septagon |

The parameters of the box are individually specified in another structure, ENCLSPEC. The comparator for this structure is the dynamic number and the tag is 'He'. See ENCLSPEC for more details.

TAKETOP
TAKEBOT

These bits dictate whether the HEADSPEC defines a header or footer. If TAKETOP is set, Enigma will use the top margin of the page. If TAKEBOT is set, it will use the bottom margin of the page. yadd is either subtract from the top or added to bottom. Otherwise, the header would not show up since it would be off the page.

USEOLDX
USEOLDY

Enigma preserves the horizontal and vertical position after the text of the header is drawn. If either of these bits are set, Enigma will use the old position/s instead of calculating a new one from the position offset. This allows the creation of a character string larger than 48 characters. It also allows the creation of a string with both the time and date in it. Note: this works with both left and right justification.

POUNDTIME

If a '#' exists in the character string of the header and this bit is set, Enigma will call a low-level hardware routine which will convert the current time into a string. Enigma will use this string to replace the '#'

POUNDDATE

If a '#' exists in the character string of the header and this bit is set, Enigma will call a low-level hardware routine which will convert the current date into a string. Enigma will use this string to replace the '#'

CENTERED
RITEJUST

These bits control the justification for the header. If neither is set, the repeat will be left justified. If RITEJUST is set the repeat will be right justified. If CENTERED is set the repeat will be centered. xadd is added to both the left and right margins.

The Other Group

Name: ILIST

Tag: IL MO RO IO io DC dc

The 'formal' tag for this structure is 'IL'. However, other features of the Enigma system use this structure when they need an instrument list. The other tags used for this structure are:

MO

This tag is used to set up an override list when a instrument or instruments which have the NEGMNUMB bit set in the instflag element of their ISPEC need to have measure numbers drawn on them (See discussion of ISPEC). To override the NEGMNUMB bit of an instrument's ISPEC, set the MNOVERRIDE bit in the auxflag element of the desired measure's MSPEC. Create an ILIST structures under the measure number with a tag of 'MO' and place the instrument number in it.

Provided the measure numbers will be drawn on the measure (See discussion of MENUMAP and MENU2MAP), the measure number will be drawn on the instrument, even though the instrument's ISPEC says not to.

RO

This tag is used to set up an override list when an instrument or intruments which have the NEGREPEAT bit set in the instflag element of their ISPEC need to have text repeats drawn on them (See discussion of ISPEC). To override the NEGREPEAT bit of an instrument's ISPEC, set the RIOVERRIDE bit in the meflag element of the desired measure's MSPEC. Create and ILIST structure under the measure number with a tag of 'RO' and place the instrument number in it.

Provided the text repeats will be drawn on the measure (See discussion of REPSUSED, REPTSPEC and REPTTEXT), the text repeats will be drawn on the instrument, even though the instrument's ISPEC says not to.

IO io

This tag is used to set up an override list when an instrument or intruments which have the NEGDYNAMIC bit set in the instflag element of their ISPEC need to have dyanamics drawn on them (See discussion of ISPEC). To override the NEGDYNAMIC bit of an instrument's ISPEC, set the INDOVERRIDE bit in the flag element of the desired measure's DYNAMIC (See discussion of DYNAMIC). Create an ILIST structure under a individual override dynamic list ID with a tag of 'IO' for the score and 'io' for the parts.

Provided the dynamic will be drawn on the measure (See discussion of DYANMIC, DTXTSPEC and DOBJSPEC), the dynamic will be drawn on the instrument, even though the instrument's ISPEC says not to. Note: this is slightly different from text repeats and measure numbers. Enigma provides individual override control for each dynamic assigned to a measure, whereas it provides only bulk override control for all the repeats in a measure.

The Other Group - ILIST.2

DC dc

Enigma allows placement of dynamics on selected instruments within the stave system stack for a given measure. This means that a dynamics may be placed on only a few instruments even though the other instruments might normally be acceptable to dynamics.

This tag is used to set up an individual dynamic list. To set up the list, set the INDIVINST bit in the flag element of the desired measure's DYNAMIC. Create an ILIST structure under a individual placement daynamic list ID with a tag of 'DC' for the score or 'dc' for the parts and place the instrument number in it.

Provided the dynamic will be drawn on the measure (See discussion of DYNAMIC, DTXTSPEC and DOBJSPEC), the dynamic will be drawn only on the instruments in the ILIST structure, even though the other instruments in the stave system might normally be acceptable to dynamics.

Comparator:
- MO - The measure it belongs to.
- RO - The measure it belongs to.
- IO - An individual override dynamic list.
- io - An individual override dynamic list.
- DC - An individual placement dynamic list.
- dc - An individual placement dynamic list.

Structure:
```
#define ILIST struct ilist
ILIST
    {
    twobyte inst[6];
    };
```

Brief: This structure provides an instrument list for all features which need one.

Discussion:
`twobyte inst[6];`
Each entry in the array will contain an instrument number.

Enigma will recognize successive records with the same comparator and tag as being members of this record. Therefore, the data is open ended.

The Other Group

Name: IMRKDEF
Tag: IX

Comparator: An interpretive mark ID

Structure:
```
#define IMRKDEF struct dobjspec
IMRKDEF
    {
    twobyte symbol;
    twobyte sizefont;
    twobyte value;
    twobyte auxval;
    twobyte hhock;
    twobyte flag;
    };
```

Brief: This structure defines the appearance and performance of an interpretive mark.

Discussion:

Enigma describes interpretive marks functionally with respect to aural playback. It is not the intention of this document, however, to describe the playback capabilities of Enigma. Therefore, we will limit our discussion of interpretive marks to those elements which effect the visual representation of the interpretive marks. The others will be presented but not discussed. The playback capabilities of Enigma can be discovered in the document 'An Introduction to the Aural Playback Capabilities of Enigma'.

This structure is accessed when Enigma is creating a visual representation of the interpretive marks It is found by using the `imrkdef` element of the IRMK or RPNO record which assigns this interpretive mark to an entry. The `imrkdef` element is used as a comparator to search for a IMRKDEF record with tag 'IX'.

```
twobyte symbol;
twobyte font;
```
The `symbol` element renders the symbol to use. The `font` element renders the font to use.

```
twobyte value;
twobyte auxval;
twobyte hhock;
```

The Other Group - IMRKDEF. 2

```
twobyte flag;
```
The `flag` is bitmapped as follows:

```
#define TIMEvsAMP      0x0800
#define NOTEBASED      0x0400
#define ALTERDUR       0x0200
#define VALisFRAC      0x0100
#define USETOPNOTE     0x0080
#define IMRKITERANT    0x0040
#define HORZITERANT    0x0020
```

USETOPNOTE
    If this bit is set, Enigma use the harmonic value of the top note of the entry for the y coordinate, otherwise it will use the bottom.

IMRKITERANT
    If this bit is set, Enigma iterate the character in symbol. In other words, Enigma will take the information in the assignment record IMRK and cast it to a RPNO record. The RPNO record contains additional information which Enigma will use to determine how many times to recopy the character in a row. With this bit set Enigma will repeat the character vertically.

HORZITERANT
    If this bit and the bit above are set, Enigma will repeat the character horizontally.

The Other Group

Name: INSTATTS

Tag: IA

Comparator: An instrument ID

Structure:
```
#define INSTATTS struct instatts
INSTATTS
    {
    twobyte AAAA;
    twobyte baseyoff;
    twobyte staffnum;
    twobyte mfont;
    twobyte sizeefx;
    twobyte flag;
    };
```

Brief: This structure assigns attributes to an instrument.

Discussion:
This structure allows the user to assign different types of attributes to an instrument. These attributes currently include: converting the disply of the instrument to tabliture, using more or less than five lines in the staff, setting the music font, size and efx for the music characters just in this instrument, using note shapes in this instrument and defeating the automatic drawing of whole rests in empty measures of the instrument.

twobyte baseyoff;
(This element is named backwards it should be named yoffbase).
If TABNOTES is set in the flag element, this element provides information when the instrument is displaying in guitar tabliture. The element breaks into two bytes. The most significant byte is the offset from the top line of the staff at which to draw the tabliture numbers. It is in terms of 4 EVPUs per unit. The least significant byte is the keynumber of the open guitar string the intrument represents.

twobyte staffnum;
If USESTAFFNUM is set in the flag element, Enigma will use the the number in this element when drawing the staff lines. If staffnum is set to 15, Enigma will draw 15 staff lines. Also if this element is negative, Enigma will draw only one staff line but that staff line will correspond to the number in staffnum time negative one. In otherwords, a -5 in staffnum will cause Enigma to draw only the lowest staff line on a normal staff. This number is open ended. Finale™1.0.0 limits it to the range -12 to 100.

twobyte mfont;
twobyte sizeefx;
If the USEMFONT bit is set, Enimga will use these two elements to make up the three components needed to specify a type face: font, size and effects. Enigma will use the information here in place of the globals MUSICFONT, MUSICSIZE and MUSICEFX when drawing the music characters of frames connected to the instrument.

The Other Group - ISPEC. 2

```
twobyte flag;
```
The flag is bit mapped as follows:

```
#define TABNOTES        0x0200
#define BLANKMEASURE    0x0100
#define DOSHAPENOTES    0x0080
#define USESTAFFNUM     0x0040
#define USEMFONT        0x0020
```

TABNOTES
   If this bit is set, Enigma will convert the notes of any frames assigned to this instrument to key numbers, subtract the keynumber from the lower word of `baseyoff` and if the result is greater than or equal to zero will convert the number into an ASCII string and display it at a vertical offset from the top line of the staff using the upper word of the `baseyoff` element as the displacement.

BLANKMEASURE
   Normally, if Enigma encounters an empty framework intersection point (FIP) in an instrument it will fill the FIP with a whole rest. With this bit set, Enigma will leave the empty FIP blank.

DOSHAPENOTES
   If this bit is set Enimga will use note shapes when drawing the frames assigned to this instrument (See discussion of SHAPENOTE in The Detail Group).

USESTAFFNUM
   If this bit is set, Enigma will use the the number in `staffnum` when drawing the staff lines. If `staffnum` is set to 15, Enigma will draw 15 staff lines. Also if this element is negative, Enigma will draw only one staff line but that staff line will correspond to the number in `staffnum` time negative one. In otherwords, a -5 in `staffnum` will cause Enigma to draw only the lowest staff line on a normal staff. This number is open ended. Finale™ 1.0.0 limits it to the range -12 to 100.

USEMFONT
   If this bit is set, Enimga will use the two elements `mfont` and `sizeefx` to make up the three components needed to specify a type face: font, size and effects. Enigma will use these elements instead of the globals MUSICFONT, MUSICSIZE and MUSICEFX when drawing the music characters of frames connected to the instrument.

The Other Group

Name: INSTUSED
Tag: IU

Comparator: An instrument usage list ID. Zero for the global instrument list.

Structure:
```
#define INSTUSED struct instused
INSTUSED
```

```
        {
        INGRSEPAR igs[2];
        };

#define INGRSEPAR struct ingrsepar
        INGRSEPAR
            {
            twobyte inst;
            twobyte group;
            twobyte separ;
            };
```

Brief: This structure provides the 'global' instrument list as well as any stave instrument lists.

Discussion:

Enigma always maintains a 'global' instrument list using this structure. The comparator for the 'global' instrument is zero and the tag is 'IU'. This list must exists before Enigma will create any pages of music.

Enigma also provides the capability to create an instrument list specific to a stave system. To do this, create a SSPEC record for the stave system if one does not exist. Set the INSTLIST bit in the staveflag element of the SSPEC record (See discussion of SSPEC). Create an INSTUSED record under the stave number with a tag of 'IU'.

```
INGRSEPAR igs[2];
```
Each INSTUSED record contains two igs elements. These elements are themselves structures:

```
    twobyte inst;
```
    This variable holds the instrument number.

```
    twobyte group;
```
    This variable assigns the instrument to a group.

```
    twobyte separ;
```
    This variable holds the amount of vertical displacement from the top of the stave system to the top of this instrument's staff.

Enigma will recognize successive records with the same comparator and tag as being members of this record. Therefore, the data is open ended.

The Other Group

Name: INTVBANK
Tag: IV

Comparator: A chord suffix ID

Structure:
```
        #define INTVBANK struct intvbank
        INTVBANK
```

```
{
    twobyte symbol;
    twobyte xdisp;
    twobyte ydisp;
    twobyte sizefont;
    twobyte BBBB;
    twobyte flag;
};
```

Brief: This structure provides data for intervals (or suffixes) for chords. For historical reasons, this structure is called the interval bank. It is more correctly called the suffix bank.

Discussion:

Enigma defines chord symbols by function. It breaks the chord symbol into three parts: root scale tone, alternate bass scale tone and suffix (See discussion of CHRD in the Detail Group).

This structure provides a suffix bank from which chord symbols may be assigned suffixes. By suffix, we refer to any symbol after the chord letter declaration but before the alternate bass declaration. For example, in the chord 'A7', the '7' is the suffix. In the chord 'Eb 13 #11 / G', '13#11' would be the suffix. This structure allows the visual design of chord suffixes. These suffixes can then be assigned to chord symbols by placing the suffix number into a CHRD record and tying it to an entry in a GRAFILE record (See th dicussion of CHRD in the Detail Group and the discussion of the CHORD bit in the ef element of the GRAFILE record in the Grafile Group).

All the INTVBANK records under the same comparator and tag define one suffix.

`twobyte symbol;`
This value can be an ASCII character or a number to be converted to an ASCII string. The isNUMBER bit in the flag element determines which it is.

`twobyte xdisp;`
The horizontal displacement in EVPUs from the right edge of the chord letter declaration.

`twobyte ydisp;`
The verticle displacement in EVPUs from the baseline of the chord letter declaration.

`twobyte sizefont;`
This element breaks into two bytes. The most significant byte yields the size of the symbol element. The least significant byte yields the font ID of the symbol. This means Enigma has independant font and size control over every symbol in a chord suffix.

`twobyte flag;`
The flag is bitmapped as follows:

```
#define  isNUMBER      0x0800
#define  preFLAT       0x0080
#define  preSHARP      0x0040
#define  prePLUS       0x0020
#define  preMINUS      0x0010
#define  anyCHpres     0x00F0
``` isNUMBER
> If this bit is set, Enigma interpret the value in symbol as a number an convert it to an ASCII string before printing it.

preFLAT
preSHARP
prePLUS
preMINUS
> These bits allow the user to specify a prefix to any symbol. The prefixes they define are a flat, a sharp, a plus sign and a minus sign respectively.

anyCHpres
> This mask is used to determine if any of the prefixes exist.

The Other Group

Name:  ISPEC
Tag:   IS

Comparator:   An instrument ID

Structure:

```
#define ISPEC struct ispec
ISPEC
    {
    twobyte curclef;
    twobyte curkey;
    twobyte curbts;
    twobyte curdiv;
    twobyte transposition;
    twobyte instflag;
    };
```

Brief:   This structure specifies an instrument.

Discussion:

```
twobyte curclef;
twobyte curkey;
twobyte curbts;
twobyte curdiv;
```
> These four variables track the clef, key signature and time signature of the instrument through its changes. Enigma handles the updating of these and the programmer should never have to worry about them.

```
twobyte transposition;
```
> This variable instructs Enigma how to transpose an instrument which does not play in concert pitch. The value is is a composite of three elements: an optional forced clef, the interval adjustment and the key signature adjustment. They are accessed via four bit masks:

```
#define SETTOCLEF      0x8000
#define WHICHCLEF      0x7000
#define INTVADJ        0x0FC0
#define KEYSIGADJ      0x003F
```

SETTOCLEF
WHICHCLEF

If SETTOCLEF is true, WHICHCLEF will contain the number of the clef to use which ever drawing the instrument in it extracted transposition. This is used for instruments which are always written in a clef whether they sound in that range or not (i.e. Tenor Saxaphone).

INTVADJ

This mask yields the number of harmonic levels needed to adjust the notes of the instrument to make the transposition correct. If the instrument is a Bb trumpet the notes of hte trumpet should always be adjusted up one harmonic level.

The Other Group - ISPEC. 2

KEYSIGADJ

This mask yields a value which is in terms of the number of accidentals added to or subtracted from the key signature. For example Bb trumpet would have a two in this variable since a transposition for Bb trumplet is equivalent to adding two sharps. The number is negative for adding flats.

```
twobyte instflag;
```
The `instflag` is bit mapped as follows:

```
#define FLOATKEYS        0x8000
#define FLOATTIME        0x4000
#define BLINEBREAK       0x2000
#define RBARBREAK        0x1000
#define NEGDYNAMIC       0x0800
#define NEGMNUMB         0x0400
#define NEGREPEAT        0x0200
#define NEGNAME          0x0100
#define ALTNUMTSIG       0x0080
#define ALTDENTSIG       0x0040
#define NEGKEY           0x0020
#define NEGTIME          0x0010
#define NEGCLEF          0x0008
#define CLEFBITS         0x0007
```

FLOATKEYS
FLOATTIME

These bit indicate to Enigma that this instrument's key and/or time signatures will float independently of the 'global' key and time signatures found in MSPEC records (See discussion of MSPEC). In order to float the key and/or time signatures in this instrument, these bits must be set as well as the bits in CSPEC, the DELTAKEY and DELTATIME bits in MSPEC, and the appropriate FLOATS records of the Detail Group must be created (See their respective discussions).

BLINEBREAK
RBARBREAK

These bits provide control over barlines drawn within instrument groupings. Normally, a barline will be drawn connecting all the instruments in a group. If BLINEBREAK is set, the barline will break before this instrument and a new barline will begin with this instrument and continue until the end of the group or another instrument's BLINEBREAK bit is set. The same occurs is RBARBREAK is set, except that RBARBREAK deals with repeat bars.

NEGDYNAMIC
This bit indicates that dynamics should not be drawn on this instrument. This bit can be overridden from a dynamic assignments record through the INDOVERRIDE bit (See discussion of DYNAMIC).

NEGMNUMB
This bit indicates that measure numbers should not be drawn on this instrument. This bit can be overridden from a measure specification record through the MNOVERRIDE bit (See discussion of MSPEC).

The Other Group - ISPEC. 3

NEGREPEAT
This bit indicates that text repeats should not be drawn on this instrument. This bit can be overridden from a measure specification record through the RIOVERRIDE bit (See discussion of MSPEC).

NEGNAME
This bit indicates that the instrument name should not be drawn on this instrument. This bit cannot be overridden.

The Other Group - ISPEC. 4
The Other Group - ISPEC.3

ALTNUMTSIG
ALTDENTSIG
These bits float with curbts and curdiv (See discussion of ALTNUMTSIG and ALTDENTSIG in MSPEC for more information on their function).

NEGKEY
NEGTIME
NEGCLEF
These bits instruct Enigma not to draw the key, time and/or clef for the instrument, respectively. These bits cannot be overridden.

CLEFBITS
Using the bits the user can specify the instrument start in another clef besides the default clef found in uDEFCLEF (See discussion of uDEFCLEF under the Globals Group).

The Other Group

Name:   KEYFORMAT
Tag:    KF

Comparator:   For Linear Key Formats the comparator is the format number.
              For Non-linear Key Signatures the comparator is the key signature number.

Structure:

```
#define KEYFORMAT struct keyformat
KEYFORMAT
    {
        twobyte semitones;
        twobyte scaletones;
        twobyte tonecenters;
        twobyte keymap;
        twobyte acciorder;
        twobyte aamount;
    };
```

Brief: This structure comprises an alternate tonality.

Discussion:

Enigma uses a redefinable method for structuring tonality. Enigma defines tonality in terms of a key map, an accidental amount list, an accidental order list, a tonecenter list, a clef octave accidental assignment list and a set of attributes.

Two classes of tonality exist, linear key formats and non-linear key signatures.

In a linear key format individual key signatures comprised of two bytes compacted into a word. The upper byte contains the number of the key format for the key signature. By default, traditional Western tonality is key format number zero.

The lower byte defines the number of accidentals. Accidentals may be in the range -127 to 127. This amounts to two banks within each key format which can be defined independently of each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

A non-linear key signature uses the entire word for the key signature number.

The discussion of each element in this structure details the controllable aspects of Enigma's tonality.

```
twobyte semitones;
```
This element determines the number of semitones in the scale of the key format.

```
twobyte scaletones;
```
This element determines the number of scaletones in the scale of the key format.

The Other Group - KEYFORMAT.   2

```
twobyte tonecenters;
twobyte keymap;
twobyte acciorder;
twobyte aamount;
```
Each of these elements hold the comparator which Enigma will use when accessing their corresponding structure. The execution format for all four is the same.

Enigma will use the number found in the element to search for the appropriate
record under the appropriate tag.

Enigma will down load the contents of the record/s into its 'in-house' data
structures for tonality. Since the keyformat contains two banks, the number of
entries in the record/s of tonecenters, acciorder, and aamount should be the
number in scaletones times 2. The number of entries in the record/s for keymap
should be the number in semitones.

tonecenters is the comparator for FSTKEY record/s.
keymap is the comparator for KEYMAP record/s.
acciorder is the comparator for ACCIORDER record/s.
aamount is the comparator for AAMOUNT record/s.

See the discussions of FSTKEY, KEYMAP, ACCIORDER and AAMOUNT for more information.

Since Enigma uses a twobyte to define semitone and scaletone in the structure,
there is a theoretical limit of 32767 semi and scaletones to the scale. In reality,
Enigma limits this to 100.

The Other Group

Name: KEYMAP
Tag: KM

Comparator: For Linear Key FOrmats the comparator is the format number.
For Non-linear Key Signatures the comparator is the key signature
number.

Structure:
```
#define KEYMAP struct keymap
KEYMAP
    {
    twobyte keych[6];
    };
```

Brief: This structure holds the data for the key map for the key format.

Discussion:
Enigma uses a redefinable method for structuring tonality. Enigma defines tonality in terms of
a key map, an accidental amount list, an accidental order list, a tonecenter list, a clef octave
accidental assignment list and a set of attributes.

Two classes of tonality exist, linear key formats and non-linear key signatures.

In a linear key format individual key signatures comprised of two bytes compacted into a word.
The upper byte contains the number of the key format for the key signature. By default,
traditional Western tonality is key format number zero.

The lower byte defines the number of accidentals. Accidentals may be in the range -127 to
127. This amounts to two banks within each key format which can be defined independently of
each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

A non-linear key signature uses the entire word for the key signature number.

```
twobyte keych[6];
```
The KEYMAP structure indicates the relationships between semitones and scaletones. Each entry in the key map corresponds to a semitone. Scaletones are indicated by placing the harmonic level generated by that scale tone 'or'ed with the DIATONBIT into a given entry.

The DIATONBIT is declared as:

```
#define DIATONBIT    0x80000000
```

The map should be created for the linear key format without accidentals. The

The Other Group - KEYMAP. 2 number of entries in the list should equal the number of semitones in the linear key format.

The map should be created for the non-linear key signature with accidentals included. The number of entries in the list should equal the number of semitones in the non-linear key signature.

In traditional Western tonality the key map would be (in hex):

```
                0x800000000
                         0
                0x800000001
                         0
                0x800000002
                0x800000003
                         0
                0x800000004
                         0
                0x800000005
                         0
                0x800000006
```

If you cock the top of your head to the right and view the list sideways, you will notice the similarity in layout to the keys of a piano keyboard. By its construction, the piano keyboard maps the relationships of semitones to scaletones. Enigma can do the same in software.

Since Enigma considers successive records of the same comparator and tag to be members of the same record, there is a theoretical limit of 196602 semitones to the key format. Enigma limits this to 100.

The Other Group

Name: KEYSATTRIB
Tag:  KA

Comparator:  For Linear Key Formats the comparator is the format number.
For Non-linear Key Signatures the comparator is the key signature number.

Structure:
```
#define KEYSATTRIB struct KEYSATTRIB
KEYSATTRIB
    {
    twobyte harmrefer;
    twobyte middlekey;
    twobyte afontsym;
    twobyte agotokey;
    twobyte asymbolist;
    twobyte attribs;
    };
```

Brief:  This structure adds attributes to an alternate tonality.

Discussion:

Enigma uses a redefinable method for structuring tonality. Enigma defines tonality in terms of a key map, an accidental amount list, an accidental order list, a tonecenter list, a clef octave accidental assignment list and a set of attributes.

Two classes of tonality exist, linear key formats and non-linear key signatures.

In a linear key format individual key signatures comprised of two bytes compacted into a word. The upper byte contains the number of the key format for the key signature. By default, traditional Western tonality is key format number zero.

The lower byte defines the number of accidentals. Accidentals may be in the range -127 to 127. This amounts to two banks within each key format which can be defined independently of each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

A non-linear key signature uses the entire word for the key signature number.

The discussion of each element in this structure details the controllable attributes of Enigma's tonality.

The Other Group - KEYFORMAT. 2

`twobyte harmrefer;`
This is the oddest piece of the whole Enigma architecture. While I know what this does, I do not know what it is for. I felt that I should include the ability that it provides although I do not understand the manner in which it would be used. This is how it works. Enigma uses a formula to convert tone center displacements to harmonic levels. A harmonic level is in terms of the number of half spaces away from middle-c, the concrete reference harmonic value. Middle-c is zero, therefore the c an octave below is -7 in 19th century western tonality. So, to convert tone center displacements to harmonic levels Enigma adds the tone center displacement to the current tone center. Then it adds the harmonic reference value (not to be confused with the concrete reference harmonic value). So to find the y coordinate for the note Enigma does this:

$$y = TomeCenterDisplacement + ToneCenter + HarmonicReference + ClefAdjustment + StaffAdjustment + SystemAdjustment + PageAdjustment$$

That is what this value does. I don't know what it is for.

`twobyte middlekey;`
This element maps the concrete reference harmonic value (middle-c) to a key number (currently MIDI key numbers). It allows Enigma to generate key numbers for any keyboard mapping as long a the key numbers increase as the pitch rises.

`twobyte afontsym;`
This element hold a font ID for the symbol list which has its ID in `asymbolist`. The size and effects are taken from the globals `KEYSIZE` and `KEYEFX`.

`twobyte agotokey;`
This element allow Enimga to understand some of the structuring of the clavier keyboard it is playing information to. `agotokey` holds the number of units of alteration necssessary to increment the key number. If `agotokey` is one and Enigma encounters a tcd of zero in the key of C with a raise/lower amount of 1, Enigma will play a c sharp on the keyboard. If `agotokey` is two and Enigma encounters a tcd of zero in the key of C with a raise/lower amount of 1, Enigma will play a middle-c on the keyboard (since a raise/lower amount of two is required to go to the next keynumber.

`twobyte asymbolist;`
If the `SLISTATTRIB` bit is set in the `flag` element and this element is greater than zero, it contains an ID for a accidental replacement symbol list. Enimga allows the user to replace an alteration amount (i.e. one for sharp, negative one for flat) with a string of characters. This ID is used as comparator one. The alteration level is used as comparator two. The tag is KS. The data is a string of up to 8 characters, null terminated (See `DTSTRING` in the Detail Group for more information).

`twobyte attribs;`
This element functions as a flag register. Only one bit is currently defined:

```
#define SLISTATTRIB     0x0800
```

SLISTATTRIB
If this bit is set and the value in `asymbolist` is greater than zero, Enigma will use the value in `asymbolist` as an accidental replacement symbol list.

The Other Group

Name: MENU2MAP
Tag: Mn

Comparator: 0

Structure:

```
#define MENU2MAP struct menu2map
MENU2MAP
    {
    twobyte xdisp;
    twobyte ydisp;
    twobyte font;
    twobyte size;
    twobyte efx;
    twobyte prefix;
    };
```

Brief:
    This structure assigns attributes to a measure number map.

Discussion:

Enigma allows multiple MENUMAP and MENU2MAP records to be installed in a piece. This allows the creation of sections which are numbered differently with respect to their measure numbers. For instance, in some music the introductory measures are numbered with letters. The measure numbers do not begin until the entrance of the choir.

Since each MENUMAP stipulates its area of domain, numbering system, font, size and effect, it is simple to implement the above example.

All MENUMAP and MENU2MAP records have a comparator of zero. MENUMAP and MENU2MAP records with comparators greater than zero will not be recognized by Enigma.

When creating the measure numbering map records, always create both a MENUMAP and MENU2MAP record.

```
twobyte xadd;
twobyte yadd;
```
  These two elements contain offsets to alter the coordinates passed to the measure number drawing routine.

When Enigma calls the measure number drawing routine, it passes the routine three positioning arguments. It passes the left side of the measure as the left margin. It passes the right side of the measure as the right margin. It passes the top of the staff as the text baseline.

xadd offsets the left margin.
xadd offsets the right margin.
yadd offsets the baseline.

The Other Group - MENU2MAP.2

```
twobyte font;
twobyte size;
twobyte efx;
```
These three elements dictate the font, size and effects applied to the text drawn for the measure numbers.

Enigma will take the number in font and attempt to find STRINGS record under that number with a tag of 'FN' (Font Name. See discussion of STRINGS). If it finds the record, it will compile the font name into a string and pass it to a low level hardware routine which will initialize the primitive text drawing routines to that font.

Enigma will take the number in size and pass it to a low level hardware routine which will initialize the primitive text drawing routines to that size.

Enigma will take the number in efx and strip the bits out of it one at a time. For each set bit Enigma will attempt to find STRINGS record under that bit number with a tag of 'EN' (Effects Name. See discussion of STRINGS ). If it finds the record, it will compile the effects name into a string and pass it to a low level hardware routine which will initialize the primitive text drawing routines to that effect.

This approach insures portability.

```
twobyte prefix;
```
Enigma allows the inclusion of a prefix to be printed before the measure number. This element is two chars packed into a word.

The Other Group

Name: MENUMAP
Tag: MN

Comparator: 0

Structure:
```
    #define MENUMAP struct menumap
    MENUMAP
        {
        twobyte startme;
        twobyte endme;
        twobyte incidence;
        twobyte startchar;
        twobyte base;
        twobyte flag;
        };
```

Brief:
This structure formats the printing of measure numbers.

Discussion:
Enigma allows multiple MENUMAP records to be installed in a piece. This allows the creation of sections which are numbered differently with respect to their measure number. For instance, in some music the introductory measures are numbered with letters. The measure numbers do not begin until the entrance of the choir.

Since each MENUMAP stipulates its area of domain, numbering system, font, size and effect, it is simple to implement the above example.

All MENUMAP and MENU2MAP records have a comparator of zero. MENUMAP and MENU2MAP records with comparators greater than zero will not be recognized by Enigma.

When creating the measure numbering map records, always create both a MENUMAP and MENU2MAP record.

```
twobyte startme;
twobyte endme;
```
These two elements mark the domain of influence for this MENUMAP record. This measure numbers which have the potential of being drawn using this MENUMAP record must be greater than or equal to startme and less than endme.

Measure numbers will normally begin with zero at startme. If the CNTFROMONE bit is set in the flag element, the measure numbers will begin with one.

```
twobyte incidence;
```
If the MULTIPLEOF bit is set in the flag element, incidence will contain the rate at which to draw the measure numbers. For instance, if incidence is set to 4, measure numbers will be drawn on every fourth measure.

The Other Group - MENUMAP. 2

```
twobyte startchar;
twobyte base;
```
These two elements allow the design of alternate numbering systems.

startchar specifies the starting character from which to pull the characters which comprise the symbolic representational units (In other words, for normal numbering, startchar would be set to 48. This is the ASCII code for the symbol zero).

base is the numbering base for the MENUMAP record (Set to 10 for normal numbering).

```
twobyte flag;
```
The flag is bitmapped as follows:

```
#define STARTOFLINE    0x8000
#define MULTIPLEOF     0x4000
#define SIDES          0x0F00
#define CNTFROMONE     0x0080
#define NOZERO         0x0040
#define DOUBLEUP       0x0020
#define CENTERED       0x0002
#define RITEJUST       0x0001
```

STARTOFLINE
MULTIPLEOF
   These bits define when Enigma will draw the measure numbers. If STARTOFLINE is set, Enigma will draw a measure number at the beginning of each line. If MULTIPLEOF is set, Enigma will draw a measure number on each multiple of instance.

SIDES
   Enigma allows a measure number to be enclosed. The number of sides for the enclosure is given in SIDES.

| If SIDES equals: | The enclosure will be a: |
|---|---|
| 1 | circle |
| 2 | box |
| 3 | triangle |
| 4 | diamond |
| 5 | pentagon |
| 6 | hexagon |
| 7 | septagon |

The parameters of the box are individually specified in another structure, ENCLSPEC. The comparator for this structure is the measure number and the tag is 'Me'. See ENCLSPEC for more details.

The Other Group - MENUMAP.    3

CNTFROMONE
 Certain numbering system look better if the first number draw is not the zeroeth. Decimal is one such number system. With this bit set, Enigma will increment each measure number before drawing it.

NOZERO
 The effect of this bit is best illustrated by an example. Suppose a numbering system with a startchar of 'A' and a base of 4. The first four numbers would be:

A    B    C    D

Now suppose that the next four number are:

AA   AB   AC   AD

This is a plausible numbering system, however it has a major flaw. If 'A' is equal to 0, then 'AA' must be equal to 00 (?!?). If 'A' is equal to 1, then 'AA' is equal to 11, but under normal numbering conventions, 'AA' should be equal to a 1 and a place holder. The problem with this numbering system is it contains no place holder, no zero. As you have guessed, Enigma can use this type of numbering system by setting this bit.

DOUBLEUP
 Using the above example, this bit causes the following numbering system:

A    B    C    D    AA   BB   CC   DD

CENTERED
RITEJUST
 These bit control the justification for the measure number. If neither is set, the measure number will be left justified. If RITEJUST is set the measure number will be right justified. If CENTERED is set the measure number will be centered.

The Other Group

Name:   MSPEC
Tag:    MS

Comparator:   The measure it belongs to.

Structure:

```
#define MSPEC struct mspec
MSPEC
```

```
{
    twobyte measpace;
    twobyte key;
    twobyte beats;
    twobyte divbeat;
    twobyte auxflag;
    twobyte meflag;
};
```

Brief:   This structure assigns attributes to a measure.

Discussion:

twobyte measpace;
  This variable contains the amount of virtual horizontal space which the measure
  occupies. It is used in calculating the number of measures to the line twobyte key;
  This variable holds the 'global' key signature for the measure. The key signature
  is mapped in two bytes. The upper byte indicates keyformat. The lower byte
  indicates number of accidentals and can be positive or negative. Traditional
  Western tonality is keyformat number zero. Therefore, the key of D would have a
  value of 2. The key of Eflat would have a value of 253, since the lower byte of the
  key word is treated as a signed byte. As can be deduced from the above sentences,
  Enigma supports the capability to redefine all elements of the key signature. An
  alternate key format can be specified with the KEYFORMAT record. The KEYFORMAT
  record can be used to specify the number semitones and scaletones in the new key
  format. The relationship of semitones to scaletones can be specified through a
  KEYMAP record. The accidental alteration order can be specified through the
  ACCIORDER record. The accidental alteration amount can be specified through the
  AAMOUNT record. The tonecenters for the new key format can be specified through
  FSTKEY. See the discussions of KEYFORMAT, KEYMAP, ACCIORDER, AAMOUNT and FSTKEY
  for more information.

twobyte beats;
twobyte divbeat;
  These two variables specify the number of beats in a measure and the division of
  the beat respectively. The division of the beat is in terms of Enigma based
  durations where a quarter note is equal to 1024 units. Therefore the time
  signature of 6/8 would have a 2 in beats and 1536 in divbeat, since 1536 is equal to
  a dotted quarter. Enigma can also understand complex time signatures beyond
  triplet division. For instance the value of 2 in beats and a double dotted quarter in
  divbeat would produce the time signature of 14/16. It is left to the reader to
  evaluate that this is correct.

The Other Group - MSPEC.    2 twobyte auxflag;
  The auxflag is bit mapped as follows:

```
        #define MNFORCEBIT          0x0800
        #define MNSEPPLACE          0x0400
        #define MNOVERRIDE          0x0200
        #define POSSPLIT            0x0100
        #define ALTNUMTSIG          0x0080
        #define ALTDENTSIG          0x0040
        #define IGNOREKEY           0x0020
        #define IGNORETIME          0x0010
        #define INDIVPOSDEF         0x0008
        #define POSDEFBITS          0x0007
```

MNFORCEBIT
> This bit forces Enigma to draw a measure number on this measure. Normally, Enigma will use the information in the MENUMAP and MENU2MAP records to determine when to draw the measure number (See discussion of MENUMAP and MENU2MAP).

MNSEPPLACE
> This bit provides individual placement control for the measure numbers drawn on this measure. Normally, Enigma will use the information in the MENUMAP and MENU2MAP records to determine where to draw the measure number and so will draw it in the same place for each instrument. However, Enigma can be instructed to drawn a measure number for an instrument in a different place. Set this bit. Create a SEPERATES record under the measure number with a tag of 'MI'. Set the instno and measure elements of the SEPERATES record to this instrument and measure number and the x and y displacement set as you wish.

MNOVERRIDE
> This bit allows the NEGMNUMB bit of the ISPEC record for the instrument to be overridden in this measure. Set the bit. Create an ILIST record under the measure number and a tag of 'MO'. Place the number of the instrument to override in the ILIST record.

POSSPLIT
> This bit tells Enigma it is possible to split the measure. This bit does not mandate that Enigma split the measure. It only informs Enigma of the possibility. If, when trying to fit the measures on a line, Enigma determines a split is possible and beneficial it will split the measure according to the DATABLOCK record under the measure with the tag 'SM'. To use, set the bit. Create a DATABLOCK record under the measure number with the tag 'SM'. In the DATABLOCK record place the desired split points in terms of the measpace element of the MSPEC record for the measure.

ALTNUMTSIG
ALTDENTSIG
> Enigma supports alternate time signatures. By alternate time signatures we mean time signatures which cannot be classified within the traditional classifications of simple and complex (duple and triple). For instance, the time signature with an upper half of '3+3+2' can be created by setting ALTNUMTSIG and creating a TIMEUPPER record with that information (See discussion of TIMEUPPER). An alternate lower half can be created by setting ALTDENTSIG and creating a TIMELOWER record (See discussion of TIMELOWER). Note: Enigma will use the value in beats for the comparator in searching for the TIMEUPPER record and the value in divbeat when searching for the TIMELOWER record.

The Other Group - MSPEC. 3

IGNOREKEY
IGNORETIME
> These bits instruct Enigma to ignore any key or time signature changes which have occured between this and the previous measure.

INDIVPOSDEF
> This bit allows individual positioning definitions to exist between the measures in the measure stack. If set, Enigma will not use the ellasped time of the measure for the total time in its calculations for positioning of entries. Instead, Enimga will find the ellasped time of each measure in the measure stack individually by its entries.

POSDEFBITS

These bits specify the type of positioning to use for this measure. This type of positioning will apply to all the instruments in the current stave system for this measure, unless the INDIVPOSDEF bit is set. As Enigma attempts to layout a line of music, the actual space occupied by the measure on the line very rarely will correspond to the measpace element of that measure's MSPEC. Therefore, Enigma must understand what type of positioning the user wishes to employ for the measure in order to scope all the positions in proportion to the new width. Five types of positioning are currently defined. They are:

```
#define    SCALEPOSITS        0
#define    useTIMESIG         1
#define    useBEATCHART       2
#define    POSareOFFSETS      4
#define    POSareABSOLUT      5
#define    BEATOFFSET         6
```

SCALEPOSITS

This type of positioning uses the posi element of each entry in ratio to the totpos element for the record (see a discussion of The Grafile Group) and the new width to calculate a new position.

useTIMESIG

This type of positioning uses the elldur element of each entry in ratio to the totdur element for the record (see a discussion of The Grafile Group) and the time signature of the measure to calculate a new position.

useBEATCHART

This type of positioning uses a BEATCHART record under this measure number to position the entries. To use, set the positioning type to 2. Create a BEATCHART record under this measure number. (See the discussion of BEATCHART).

POSareOFFSETS

This type of positioning is similar to useTIMESIG except the posi element of each entry (see a discussion of The Grafile Group) is added to the newly calculated width.

POSareABSOLUTE

No scoping is done. The posi element of each entry is unchanged.

The Other Group - MSPEC. 4

BEATOFFSET

This type of positioning is similar to useBEATCHART except the posi element of each entry (see a discussion of The Entry Pool) is added to the newly calculated width.

twobyte meflag;

The meflag is bit mapped as follows:

```
#define    LINEBREAK         0x8000
#define    RIOVERRIDE        0x1000
#define    DELTAKEY          0x0800
#define    DELTATIME         0x0400
#define    ARBITMUSIC        0x0200
#define    MEASURETEXT       0x0100
#define    SOLIDBAR          0x0080
#define    LITELINE          0x0040
```

```
-#define DBLLINE         0x0020
 #define DYNAMBIT        0x0010
 #define FORREPBAR       0x0008
 #define BACREPBAR       0x0004
 #define BARENDING       0x0002
 #define REPEATS         0x0001
```

LINEBREAK

This bit will force Enigma to begin a new line with this measure.

RIOVERRIDE

This bit allows a NEGREPEAT bit in an instrument's ISPEC record to be overridden. Set the bit. Create an ILIST record under the measure number and a tag of 'RO'. Place the number of the instrument to override in the ILIST record. All of the text repeat structures associated with this measure will now be drawn in the instrument.

DELTAKEY
DELTATIME

These bits allow the user to restrike the key or time signature on each instrument.

ARBITMUSIC

Arbitrary music may be assigned to a measure by setting this bit and creating one or more MARBMUSIC records in the Detail Group to assign the arbitrary music to the measure. Also, a piece of arbitrary music must exist to be drawn and therefore one or more ARBMUSIC, ARBHEADER and ARBBOUNDS records should be created (See discussions of ARBMUSIC, ARBHEADER and ARBBOUNDS and the discussion of MARBMUSIC in the Detail Group).

MEASURETEXT

The measure may be assigned one or more text blocks by setting this bit, creating one or more TEXTBLOCK records under a chosen offset with the tag 'MT' (See discussion of TEXTBLOCK) and tying them together with one or more MTXTTIE records in the Detail Group (See discussion of MTXTTIE in the Detail Group). Also a text block should exist to be drawn in the Text Group (See discussion of text blocks in the Text Group).

The Other Group - MSPEC.     5

SOLIDBAR
LITELINE
DBLLINE

These bits control the type of barline to draw for the measure. The LITELINE bit works only in conjunction with the SOLIDBAR bit. Set the desired bits.

DYNAMBIT

This bit informs Enigma of the existence of dynamics tied to this measure. To place dynamics in a measure, set this bit. Create one or more DTXTSPEC or DOBJSPEC records under the desired offsets (See the discussion of DTXTSPEC and DOBJSPEC). Create one or more DYNAMIC records under the measure number with a tag of 'DY' (See discussion of DYNAMIC). This will tie the newly created dynamics to the measure.

FORREPBAR

This bit signals Enigma that a forward repeat bar exists in the measure.

BACREPBAR

This bit signals Enigma that a backward repeat bar exists in the measure. To establish an closed ending bracket over the measure, create a BACKREPT record under the measure number and a tag of 'BR' (See discussion of BACKREPT).

BARENDING

This bit signals the beginning of a bar repeat ending. Set this bit and create an ENDSTART record under this measure and a tag of 'ES' (See discussion of ENDSTART). Create an ENDTEXT record to accompany it if desired (See discussion of ENDTEXT).

REPEATS

This bit informs Enigma of the existence of text repeat structures tied to this measure. To place text repeats in a measure, set this bit. Create one or more REPTSPEC records under the desired offsets (See the discussion of REPTSPEC ). Create one or more REPSUSED records under the measure number with a tag of 'RU' (See discussion of REPSUSED). This will tie the newly created text repeats to the measure.

The Other Group

Name: NAMESPEC
Tag: NS

Comparator: The instrument ID

Structure:

```
#define NAMESPEC struct namespec
NAMESPEC
    {
    twobyte pos1pos2;
    twobyte lineadd;
    twobyte font;
    twobyte size;
    twobyte efx;
    twobyte flag;
    };
```

Brief: This structure assigns attributes to instrument names.

Discussion:

This structure is accessed when Enigma is constructing the lines of a stave system. If Enigma can find an ISPEC for the instrument, it first tests to see if the NEGNAME bit is set in the flag element of the instrument's ISPEC (See discussion of ISPEC).

Next, Enigma checks for a NAMESPEC for the instrument. If is finds one, Enigma will draw the name of the instrument according to the specification.

If Enigma cannot find a NAMESPEC, it will attempt to find an instrument name by searching for a STRINGS record with the instrument number as comparator and a tag of 'IN' (See discussion of STRINGS). If Enigma finds the instrument name, it will draw the name, left justified, according to the settings of uNAMEPOS, uNAMELINE, uNAMEFONT, uNAMESIZE and uNAMEEFX (See discussion of these under the Global Group). This can be a twobyte cut to drawing all the names in the same position, relative to their staves. To accomplish this, create a STRINGS record under the instrument number with a tag of 'IN'. Whenever Enigma creates a stave system with this instrument included (providing the NONAMES bit is not set in the stave system's SSPEC, if any. See discussion of SSPEC), it will draw the name according to the settings of uNAMEPOS, uNAMELINE, uNAMEFONT, uNAMESIZE and uNAMEEFX. the STRINGS instrument name is limited to 24 characters.

This might seem to be the easier way to accomplish instrument names. However, the NAMESPEC structure does provide some additional features. First, multiple NAMESPEC records can be created for the same instrument. This allows multiple names to be attached to an instrument, each independently controllable with the parameters of NAMESPEC. In this instance, multiple STRINGS records will exist under the instrument number and a tag of 'IN'. Enigma will group these records in block of two, treating each block as a separate name. It will match the multiple name specifications to these block when it constructs the names for the instrument. Other features are enumerated below:

The Other Group - NAMESPEC.2

```
twobyte pos1po2;
twobyte lineadd;
```
These two elements break into three variable called: pos1, pos2 and lineadd. The first two are signed bytes. These variables control the placement of the instrument name An illustration is in order:

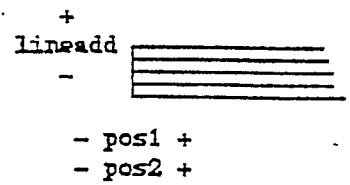

When Enigma calls the name drawing routine, it passes the routine two positioning arguments. It passes the left side of the staff as a horizontal position. It passes the top of the staff as a character baseline.

pos1 offsets the horizontal position to create a left margin.
pos2 offsets the horizontal position to create a right margin.
lineadd offsets the baseline.

```
twobyte font;
twobyte size;
twobyte efx;
```
These three elements dictate the font, size and effects applied to the instrument name.

Enigma will take the number in font and attempt to find STRINGS record under that number with a tag of 'FN' (Font Name. See discussion of STRINGS). If it finds the record, it will compile the font name into a string and pass it to a low level hardware routine which will initialize the primitive text drawing routines to that font.

Enigma will take the number in size and pass it to a low level hardware routine which will initialize the primitive text drawing routines to that size.

Enigma will take the number in efx and strip the bits out of it one at a time. For each set bit Enigma will attempt to find STRINGS record under that bit number with a tag of 'EN' (Effects Name. See discussion of STRINGS ). If it finds the record, it will compile the effects name into a string and pass it to a low level hardware routine which will initialize the primitive text drawing routines to that effect.

This approach insures portability.

The Other Group - NAMESPEC.3

```
twobyte flag;
```
The flag is bitmapped as follows:

```
#define CENTERED        0x0002
#define RITEJUST        0x0001
```

CENTERED
RITEJUST

These bit control the justification for the instrument name. If neither is set, the name will be left justified. If RITEJUST is set the name will be right justified. If CENTERED is set the name will be centered.

The Other Group

Name: PAGEOFFSET
Tag: PO

Comparator: The page number

Structure:

```
#define PAGEOFFSET struct pageoffset
PAGEOFFSET
    {
    twobyte top;
    twobyte left;
    twobyte bottom;
    twobyte rite;
    twobyte AAAA;
    twobyte BBBB;
    };
```

Brief: This structure creates margins for a page of music.

Discussion:

```
twobyte top;
twobyte left;
twobyte bottom;
twobyte rite;
```
These variables determine the margins for the page.

The Other Group

Name: PARBMUSIC
Tag: PM

Comparator: The page number

Structure:

```
#define PARBMUSIC struct parbmusic
PARBMUSIC
```

```
    {
    twobyte arbnum;
    fourbyte topadd;
    fourbyte leftadd;
    twobyte mwidth;
    };
```

Brief: This structure ties an arbitrary music measure to a page.

Discussion:
Enigma allows the construction of arbitrary music measures. These are measures of music which fall outside the flow of the music of the piece. The PARBMUSIC structure ties these measures to a page. The three structures ARBMUSIC, ARBHEADER and ARDBOUNDS define all the attributes for the measure (See discussion of ARBMUSIC, ARDHEADER and ARDBOUNDS).

Since Enigma recognizes not only the comparator and tag for for record, but also the incident of the record. Multiple measures can be set up under a single comparator. To set up the measures, always create a record for each structure of the arbitrary music specification (ARBMUSIC, ARBHEADER and ARBBOUNDS).

`twobyte arbnum;`
Enigma will use the comparator found in this element when searching for the arbitrary music structures. The measures created under this comparator are assigned in bulk by this element.

`fourbyte topadd;`
`fourbyte leftadd;`
`twobyte mwidth;`
The arbitrary music drawing routine is supplied with three positioning variables. It is supplied with a horizontal coordinate, a width coordinate and a vertical coordinate.

The `topadd` element added to the top of the page supplies the vertical coordinate.

The `leftadd` element added to the top of the page supplies the horizontal coordinate.

The `mwidth` element supplies the width coordinate.

The Other Group

Name: PERCENTS
Tag: PP SP

Comparator: The page number for PP records.
The stave system it belongs to for SP records.

Structure:
```
    #define PERCENTS struct percents
    PERCENTS
        {
        twobyte staffsiz;
        twobyte musicsiz;
        twobyte AAAA;
        twobyte BBBB;
        twobyte CCCC;
        twobyte flag;
        };
```

Brief: This structure assigns percentage reduction and enlargements to pages and staves.

Discussion:
This structure is used for both the page and stave percentage reduction or enlargements. The tag for page is 'PP'. The tag for stave is 'SP'.

```
twobyte staffsiz;
```
This variable holds the percentage of reduction or enlargement in unit deviation from 100 for the staff of the music.

```
twobyte musicsiz;
```
This variable holds the percentage of reduction or enlargement in unit deviation from 100 for the music symbols.

```
twobyte flag;
```
The flag is bit mapped as follows:

```
#define NOREVERTPERC      0x8000
#define MARGSCOPING       0x4000
#define SPACESCOPING      0x2000
```

NOREVERTPERC
   This bit applies only to page reduction/enlargements (enductions for twobyte). If this bit is set Enigma will not restore the page percentage to what it was before the enduction. All subsequent pages will be drawn in this enduction percentage.

MARGSCOPING
   This bit applies to both page and stave enductions. When set, Enigma will scope the margin to the same visual place as before the enduction. For instance, If the user needs a few more measures per line but doesn't want to reduce the amount of space taken by each measure, they can reduce the entire page by 75% and set this bit. Enigma will scope the margins to be visually as large as before but the music will be smaller and therefore more music will fit on a page. For staves, only the right margin is scoped.

The Other Group - PERCENTS.2

SPACESCOPING
   This bit applies only to staves. If set, Enigma will close up (or open up) the space created by the enduction between the enducted stave and the next stave, if a subsequent one exists on the page.

The Other Group

Name:   PSPEC
Tag:    PS

Type:   The page number

Structure:
```
#define PSPEC struct pspec
PSPEC
    {
    fourbyte top;
```

```
        fourbyte rite;
        twobyte stavestr;
        twobyte pageflag;
        };
```

Brief: This structure assigns boundaries and attributes to a page of music.

Discussion:

```
fourbyte top;
fourbyte rite;
```
　These two variables determine the height and width of a given page in terms of coordinate on Enigma's virtual page.

```
twobyte stavestr;
```
　This variable, if set, will force Enigma to begin the page with this stave.

```
twobyte pageflag;
```
　The pageflag is bit mapped as follows:

```
        #define NEWPERCENTAGES      0x0800
        #define ARBITMUSIC          0x0200
```

NEWPERCENTAGES
　　Any page may be set to any percentage (smaller than 100 for reduction, larger for enlargement). Set this bit and create a PERCENTS record under the page number with the tag 'PP' for Page Percentages (See discussion of PERCENTS).

ARBITMUSIC
　　Arbitrary music may be assigned to a page by setting this bit and creating one or more PARBMUSIC records to assign the arbitrary music to the page. Also, a piece of arbitrary music must exist to be drawn and therefore one or more ARBMUSIC, ARBHEADER and ARBBOUNDS records should be created (See discussions of PARBMUSIC, ARBMUSIC, ARBHEADER and ARBBOUNDS).

The Other Group

Name:　PTXTTIE

Tag:　　PT

Comparator: The page number

Structure:
```
        #define PTXTTIE struct PTXTTIE
        PTXTTIE
            {
            twobyte offset;
            twobyte xdisp;
            twobyte ydisp;
            twobyte AAAA;
            twobyte BBBB;
            twobyte CCCC;
            };
```

Brief:　This structure assigns text blocks to pages.

Discussion:
Enigma allows text blocks to be defined with respect to layout (See discussion of TEXTBLOCK and TXTLAYOUT under the Other Group). This structure simply assigns these block to a page.

To use, create a PTXTTIE record. Use the page number. Set the tag to 'PT' and fill the record with the appropriate information. The value in offset should be the comparator of a TEXTBLOCK record.

Of course, the text blocks must also be in existence (See discussion of TEXTBLOCK and TXTLAYOUT under the Other Group).

twobyte offset;

This element holds the number of the TEXTBLOCK record to assign.

twobyte xdisp;
twobyte ydisp;
These elements provide x and y displacements for the text block from the top left corner of the page.

The Other Group

Name: REPSUSED
Tag: RU

Comparator: The measure it belongs to.

Structure:
```
#define REPSUSED struct repsused
REPSUSED
    {
    twobyte current;
    twobyte actuate;
    twobyte target;
    twobyte repnum;
    twobyte AAAA;
    twobyte flag;
    };
```

Brief: This structure assigns attributes to text repeats and ties them to measures.

Discussion:
Enigma describes repeats functionally with respect to aural playback. It understands when to take a repeat and when to skip ahead. It is not the intention of this document, however, to describe the playback capabilities of Enigma. Therefore, we will limit our discussion of repeat structures to those element which effect the visual representation of the repeat. The others will be presented but not discussed. The playback capabilities of Enigma can be discovered in the document 'An Introduction to the Aural Playback Capabilities of Enigma'.

This structure is accessed when Enigma encounters a REPEATS bit set in the meflag element of a measure's MSPEC. The comparator will be the measure number and the tag will be 'RU'.

Successive REPSUSED record may be created with the same measure number. This allows more than one repeat to be assigned to the measure. The number of assignments is limited to 32767.

```
twobyte current;
twobyte actuate;
```
This element holds the actuator number. By actuator number, we mean the threshold at which Enigma will take the repeat. For instance, if the actuator number is set to one, the first time Enigma encounters the repeat if will perform the repeat. On successive encounters, however, it will not.

Enigma also supports multiple actuators for a single repeat structure. For instance, a repeat structure can be programmed to take a repeat on the second, third and fifth time. This is accomplished by setting the MULTACTUATE bit (described below) and creating a REPTENUM record under the current measure with a tag of 'RS' and an incident of 1 (See discussion of REPTENUM).

At first glance this discussion might seem solely in the domain of playback, however, there are two instances which will cause the actuator/s to be converted to a string and printed.

The Other Group - REPSUSED.2

If no REPTTEXT record exists in conjunction with the REPTSPEC record assigned by this structure, Enigma will draw the actuator/s in its place (See discussion of REPTTEXT and REPTSPEC ).

If a '#' exists in the character string of the REPTTEXT record and neither the POUNDMARK or POUNDMEAS bit is set in the flag element of the REPTSPEC record which this structure assigns, the actuator/s will be converted to a string and will replace the '#'. (See discussion of REPTTEXT and REPTSPEC ).

```
twobyte target;
```
Normally this element resides in the playback domain. There are two instances which concern target.

If a '#' exists in the character string of the REPTTEXT record connected to the REPTSPEC record which this structure assigns and the POUNDMARK bit is set in the flag element of the REPTSPEC record which this structure assigns, target will be interpreted as the number of another repeat structure. Enimga will sweep through the piece look for the first instance of a REPSUSED structure which assigns the repeat to a measure. Using this information, Enigma will replace the '#' with the repeat structure, just as it would be drawn on that measure and then print the character string (See discussion of REPTTEXT and REPTSPEC ).

If a '#' exists in the character string of the REPTTEXT record connected to the REPTSPEC record which this structure assigns and the POUNDMEAS bit is set in the flag element of the REPTSPEC record which this structure assigns, target will be interpreted as a measure number. Enigma will replace the '#' with the measure number, just as it would be drawn on the measure and then print the character string (See discussion of REPTTEXT and REPTSPEC ).

```
twobyte repnum;
```
This element holds the number of the repeat structure to be assigned. It will be used as a comparator in searching for the REPTSPEC record.

twobyte flag;
The flag is bitmapped as follows:

```
#define isJUMPER        0x8000
#define isMARKER        0x4000
#define JMPonACTU       0x0800
#define JMPALWAYS       0x0400
#define JMPtoMARK       0x0200
#define REPuntilACT     0x0100
#define COUNTPASSES     0x0080
#define CLRonCHANGE     0x0040
#define MULTACTUATE     0x0008
#define INDIVPLAC       0x0001
```

The Other Group - REPSUSED.3

MULTACTUATE

This bit allows Enigma repeat structures to be programmed with multiple actuators. This becomes important for the visual representation when Enigma is printing the actuators for the text repeat. Also, if an REPTEXT record exists for the text repeat and a '#' exists in the character string of the REPTEXT record, this bit will be checked, provided neither the POUNDMARK or POUNDMEAS bit is set in the flag element of the REPTSPEC record which this structure assigns (See discussion of REPTEXT).

INDIVPLAC

Enigma allows individual placement control over selected instruments in the stave system stack for a given measure when constructing the text repeat. To use, set this bit. Create a SEPERATES record under this measure number and a tag of 'RI'. Fill it with the number of the instrument whose text repeat you wish to individually control, the current measure number and the appropriate displacements.

The Other Group

Name: REPTENUM

Tag: EE RS

When a search is made for multiple acutators, Enigma will use one of these tags

If the current repeat is an open ending bracket repeat, it will look for this structure under the current measure, a tag of 'EE' and an incidence of 0.

If the current repeat is an text repeat, it will look for this structure under the current repeat number, a tag of 'RS' and an incidence of 1.

Comparator:  EE - The measure it belongs to.
             RS - The text repeat ID Structure:
```
#define REPTENUM struct reptenum
REPTENUM
    {
    twobyte acts[6];
    };
```

Brief:
>This structure enumerates multiple acutators for a repeat.

Discussion:
>```
>twobyte acts[6];
>```
>The number of each actuator cycle is placed in the array.
>
>Enigma will recognize successive records with the same comparator and tag as being members of this record. Therefore, the data is open ended.

The Other Group

Name: REPTSPEC
Tag: RS

Comparator: The text repeat ID

Structure:
```
        #define REPTSPEC struct reptspec
        REPTSPEC
        {
            twobyte pos1pos2;
            twobyte lineadd;
            twobyte font;
            twobyte size;
            twobyte efx;
            twobyte flag;
        };
```

Brief: This structure assigns attributes to text repeats.

Discussion:
>This structure is accessed when Enigma is creating a visual representation of the text repeat. It is found by using the repnum element of the REPSUSED record which assigns this text repeat to a measure. The repnum element is used as a comparator to search for a REPTSPEC record with tag 'RS'.

```
twobyte pos1po2;
twobyte lineadd;
```
>These two elements break into three variable called: pos1, pos2 and lineadd. The first two are signed bytes. These variables control the placement of the text for the repeat. An illustration is in order:

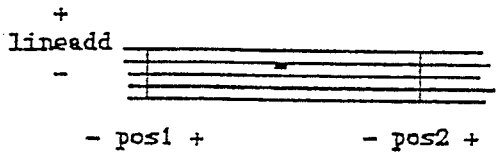

>When Enigma calls the text repeat drawing routine, it passes the routine three positioning arguments. It passes the left side of the measure as the left margin. It passes the right side of the measure as the right margin. It passes the top of the staff as the text baseline.

pos1 offsets the left margin.
pos2 offsets the right margin.
lineadd offsets the baseline.

The Other Group - REPTSPEC.    2

```
twobyte font;
twobyte size;
twobyte efx;
```
These three elements dictate the font, size and effects applied to the text drawn for the repeats.

Enigma will take the number in font and attempt to find STRINGS record under that number with a tag of 'FN' (Font Name. See discussion of STRINGS). If it finds the record, it will compile the font name into a string and pass it to a low level hardware routine which will initialize the primitive text drawing routines to that font.

Enigma will take the number in size and pass it to a low level hardware routine which will initialize the primitive text drawing routines to that size.

Enigma will take the number in efx and strip the bits out of it one at a time. For each set bit Enigma will attempt to find STRINGS record under that bit number with a tag of 'EN' (Effects Name. See discussion of STRINGS ). If it finds the record, it will compile the effects name into a string and pass it to a low level hardware routine which will initialize the primitive text drawing routines to that effect.

This approach insures portability.

```
twobyte flag;
```
The flag is bitmapped as follows:

```
        #define SIDES           0x0700
        #define POUNDMARK       0x0080
        #define POUNDMEAS       0x0040
        #define USETHISFONT     0x0020
        #define SRCHwithTAG     0x0010
        #define CENTERED        0x0002
        #define RITEJUST        0x0001
```

SIDES
    Enigma allows a text repeat to be enclosed. The number of sides for the enclosure is given in SIDES.

| If SIDES equals: | The enclosure will be a: |
|---|---|
| 1 | circle |
| 2 | box |
| 3 | triangle |
| 4 | diamond |
| 5 | pentagon |
| 6 | hexagon |
| 7 | septagon |

The parameters of the box are individually specified in another structure, ENCLSPEC. The comparator for this structure is the repeat number and the tag is 'Rx'. See ENCLSPEC for more details.

The Other Group - REPTSPEC.  3

POUNDMEAS
   If a '#' exists in the character string of the REPTTEXT record connected to the REPTSPEC record and the POUNDMEAS bit is set, Enigma will interpret the target element of the REPSUSED record which assigns this structure to be a measure number. Enigma will replace the '#' with the measure number, just as it would be drawn on the measure and then print the character string (See discussion of REPTTEXT and REPTUSED).

POUNDMARK
   If a '#' exists in the character string of the REPTTEXT record connected to this record and the POUNDMARK bit is set, Enigma will interpret the target element of the REPSUSED record which assigns this structure to be the number of another repeat structure. Enimga will sweep through the piece looking for the first instance of a REPSUSED structure which assigns the repeat to a measure. Using this information, Enigma will replace the '#' with the repeat structure, just as it would be drawn on that measure and then print the character string (See discussion of REPTTEXT and REPTUSED).

USETHISFONT
   Normally, when Enigma executes a POUNDMARK bit, it will draw the repeat to replace the '#' in the font size and efx of that repeat. If this bit is set, Enigma will use the font, size and efx of the current text repeat.

CENTERED
RITEJUST
   These bit control the justification for the text repeat. If neither is set, the repeat will be left justified. If RITEJUST is set the repeat will be right justified. If CENTERED is set the repeat will be centered.

The Other Group

Name:  REPTTEXT
Tag:   RT

Comparator:  The text repeat ID

Structure:
```
#define REPTTEXT struct repttext
REPTTEXT
    {
    char string[12];
    };
```

Brief:   This structure hold the text string for a text repeat.

Discussion:
   `char string[12];`
   Aside from providing a text string to draw, the structure provides one additional feature.

If a '#' exists in the string, Enigma will replace it with one of three things.

If the POUNDMARK bit is set in the flag element of the REPTSPEC record which is connected to this structure, the target element of the REPSUSED record which assigns the REPTSPEC record will be interpreted as the number of another repeat structure. Enimga will sweep through the piece look for the first instance of a REPSUSED structure which assigns the repeat to a measure. Using this information, Enigma will replace the '#' with the repeat structure, just as it would be drawn on that measure and then print the character string (See discussion of REPSUSED and REPTSPEC).

If the POUNDMEAS bit is set in the flag element of the REPTSPEC record which is connected to this structure, the target element of the REPSUSED record which assigns the REPTSPEC record will be interpreted as a measure number. Enigma will replace the '#' with the measure number, just as it would be drawn on the measure and then print the character string (See discussion of REPSUSED and REPTSPEC).

Otherwise, the actuator/s of the REPSUSED record which assigns this REPTSPEC record will be converted to a string and will replace the '#'. (See discussion of REPSUSED and REPTSPEC).

Since Enigma groups successive records of the same comparator and tag as the same record, theoretically, there is a limit of 32767 characters in the string. In reality, Enigma limits is to 64.

The Other Group

Name: SEPERATES

Type: Assigned

Tag: BI EI LI RI DI MI

There is no 'formal' tag for this structure. Other features of the Enigma system use this structure when they need to individually place entities which are normally placed in the same position relative to their staff for each instrument. The tags used for this structure are:

BI

This tag is used to set up an individual positioning record for an instrument which needs control over the positioning of a closing ending bracket. To use this feature, set the INDIVPLAC bit in the flag element of the desired BACKREPT record. Create a SEPERATES record under the same comparator as the BACKREPT with a tag of 'BI'. Fill the record with the desired instrument and measure number. The BACKREPT variables correspond to the SEPERATES elements as follows:

pos1 is added to x1add
    pos2 is added to x2add
    line1 is added to y1add
    line2 is added to y2add Successive individual positioning records for other instruments in the stave system stack may be set up the same way.

See the discussion of BACKREPT for more details.

EI

This tag is used to set up an individual positioning record for an instrument which needs control over the positioning of a opening ending bracket. To use this feature, set the INDIVPLAC bit in the flag element of the desired ENDSTART record.

Create a SEPERATES record under the same comparator as the ENDSTART with a tag of 'EI'. Fill the record with the desired instrument and measure number. The ENDSTART variables correspond to the SEPERATES elements as follows:

pos1 is added to x1add
   pos2 is added to x2add
   line1 is added to y1add
   line2 is added to y2add Successive individual positioning records for other instruments in the stave system stack may be set up the same way.

See the discussion of ENDSTART for more details.

The Other Group - SEPERATES. 2

LI
   This tag is used to set up an individual positioning record for an instrument which needs control over the positioning of the text line of a opening ending bracket. To use this feature, set the INDIVPLAC bit in the flag element of the desired ENDSTART record. Create a SEPERATES record under the same comparator as the ENDSTART with a tag of 'LI'. Fill the record with the desired instrument and measure number. The ENDSTART variables correspond to the SEPERATES elements as follows:

pos is added to x1add
   line is added to y1add

Successive individual positioning records for other instruments in the stave system stack may be set up the same way.

See the discussion of ENDSTART for more details.

RI
   This tag is used to set up an individual positioning record for an instrument which needs control over the positioning of a text repeat. To use this feature, set the INDIVPLAC bit in the flag element of the desired REPSUSED record. Create a SEPERATES record under the same comparator as the REPSUSED element repnum with a tag of 'RI'. Fill the record with the desired instrument and measure number. The offsets in the SEPERATES record will correspond to the variables in the REPTSPEC record which the REPSUSED record assigns. The REPTSPEC variables correspond to the SEPERATES elements as follows:

pos1 is added to x1add
   pos2 is added to x2add
   lineadd is added to y1add

Successive individual positioning records for other instruments in the stave system stack may be set up the same way.

See the discussion of REPSUSED and REPTSPEC for more details.

DI
   This tag is used to set up an individual positioning record for an instrument which needs control over the positioning of a dynamic. To use this feature, set the SEPRPLACE bit in the flag element of the desired DYNAMIC record. Create a SEPERATES record under the same comparator as the DYNAMIC with a tag of 'DI'. Fill the record with the desired instrument and Individual Positioning ID. The DYNAMIC variables correspond to the SEPERATES elements as follows:

> posadd is added to x1add
> lineadd is added to y1add

Successive individual positioning records for other instruments in the stave system stack may be set up the same way.

See the discussion of DYNAMIC for more details.

The Other Group - SEPERATES.  3

MI

This tag is used to set up an individual positioning record for an instrument which needs control over the positioning of a measure number. To use this feature, set the MNSEPRPLACE bit in the auxflag element of the desired MSPEC record. Create a SEPERATES record under the same comparator as the MSPEC with a tag of 'MI'. Fill the record with the desired instrument and measure. The MENU2MAP variables correspond to the SEPERATES elements as follows:

> xdisp is added to x1add
> ydisp is added to y1add

Successive individual positioning records for other instruments in the stave system stack may be set up the same way.

See the discussion of MENU2MAP for more details.

Comparator:  BI - The measure it belongs to.
             EI - The measure it belongs to.
             LI - The measure it belongs to.
             RI - A text repeat ID.
             DI - The measure it belongs to.
             MI - The measure it belongs to.

Structure:
```
#define SEPERATES struct seperates
SEPERATES
    {
    twobyte instno;
    twobyte measure;
    twobyte x1add;
    twobyte y1add;
    twobyte x2add;
    twobyte y2add;
    };
```

Brief: This structure provides individual positioning control for all features which need it.

Discussion:
twobyte instno;
twobyte measure;

These elements define the instrument and measure number at which the
individual positioning adjustments will occur.

```
twobyte x1add;
twobyte y1add;
twobyte x2add;
twobyte y2add;
```
These elements define the position adjustments. See the discussion of the tags
above for more information.

Enigma will recognize successive records with the same comparator and tag as

The Other Group - SEPERATES. 4
being members of this record. Therefore, the data is open ended.

The Other Group

Name: SHAPEDATA
Tag: SB

Comparator: The shape ID

Structure:
```
#define SHAPEDATA struct shapedata
SHAPEDATA
{
    fourbyte data[3];
};
```

Brief:
This structure provides data for a shape definition.

Discussion:
`fourbyte data[3];`
The elements of this structure form the data for the instructions in SHAPELIST
records. It is up to you to insure that the correct number of data units exist for the
SHAPELIST desired. (See discussion of SHAPELIST).

Since Enigma views successive records of the same comparator and tag as
members of the same record. The data list is theoretically limited to 98301 units. In
reality, Enigma limits it to 96 since, that maximum number of instructions is 16
and the maximum number of data units per instruction is 6.

The Other Group

Name: SHAPEDEF
Tag: SD

Comparator: The shape ID

Structure:
```
#define SHAPEDEF struct shapedef
SHAPEDEF
    {
    twobyte instlist;
    twobyte datalist;
    twobyte topbase;
    twobyte leftbase;
    twobyte botbase;
    twobyte ritebase;
    };
```

Brief:
    This structure comprises a shape definition

Discussion:
Enigma defines graphic shapes with an instrument list, a data list and a bounding box.

`twobyte instlist;`
  When this shape is required, Enigma will search for a SHAPELIST record under the number in this element and a tag of 'SL'.

`twobyte datalist;`
  When this shape is required, Enigma will search for a SHAPEDATA record under the number in this element and a tag of 'SB'.

`twobyte topbase;`
`twobyte leftbase;`
`twobyte botbase;`
`twobyte ritebase;`
  These four elements comprise a bounding box for the shape. Great precision is not required in this bounding box. Enigma, if necessary, will manufacture a precise bounding box in the process of compiling the shape. This bounding box is primarily used by the text block drawing routines when `instlist` and `datalist` are not valid (See discussion of TXTLAYOUT).

The Other Group

Name: SHAPELIST
Tag: SL

Comparator: The shape ID

Structure:
```
#define SHAPELIST struct shapelist
SHAPELIST
    {
    fourbyte instruct[3];
    };
```

Brief:   This structure provides instructions for a shape definition.

Discussion:
  `fourbyte instruct[3];`

Each instruction of Enigma's shape definitions is 32 bits fourbyte. The upper word is the revision number and number of data unit. The lower word is the instruction.
A diagram might be helpful:

```
00000000    00000000    0000000000000000
revision    dataunits   instruction
```

The instruction is a two character word. These are the instructions defined in revision number 1:

| Word | Explanation Type of Data Units | Number of Data Units | |
|------|-------------------------------|----------------------|---|
| 'rm' | relative move | 2 | x and y coordinates |
| 'rl' | relative line to | 2 | x and y coordinates |
| 'dl' | relative dotted lineto | 4 | x and y coordinates, dash on and off length |
| 'cv' | relative curveto (bezier) | 6 | control point one( x, y ) control point two( x, y ) end point( x, y ) |
| 'sf' | set font | 3 | Font ID, size and effects |
| 'dc' | draw character | 1 | An ASCII char cast fourbyte |
| 'gs' | move to start of path | 0 | |
| 'cp' | line to start of path | 0 | |
| 'sw' | set line width | 1 | line width in points * 100 at 100 % |
| 'st' | stroke path | 0 | |
| 'fl' | fill path | 0 | |

The Other Group - SHAPELIST.  2

As a courtesy to 'edb' sufferers we present the numerical equivalents to these instructions:

| Instruction | Word1 | Word2 |
|-------------|-------|-------|
| 'rm' | 258 | 29293 |
| 'rl' | 258 | 29292 |
| 'dl' | 260 | 25708 |
| 'cv' | 262 | 25462 |
| 'sf' | 259 | 29542 |
| 'dc' | 257 | 25699 |
| 'gs' | 256 | 26483 |
| 'cp' | 256 | 25456 |
| 'sw' | 257 | 29559 |
| 'st' | 256 | 29556 |
| 'fl' | 256 | 26220 |

A few points need to be discussed. The instruction lists of Enigma are similar to POSTSCRIPT®. If you are familiar with the path constructors of POSTSCRIPT®, you will have no trouble with them. Remember that the stroke path instruction will be the last instruction in the set if you want to see anything.

To make a path, create one or more records of SHAPELIST under a chosen comparator and the tag 'SL'. Fill the records two words at a time with the numbers above.

The path will also need data. See discussion of SHAPEDATA.

'edb' is currently kludged to look for shape instructions and shape data under a comparator of one and draw the shape if they exist. If you wish to experiment with Enigma shapes, use one for your comparator in your SHAPELIST and SHAPEDATA records.

Since Enigma view successive records fo the same comparator and tag as members of the same record. The instruction list is theoretically limited to 98301 instructions. In reality, Enigma limits it to 16.

The Other Group

Name:  SSPEC
Tag:   ss

Comparator:  The stave system it belongs to.

Structure:
```
#define SSPEC struct sspec
SSPEC
    {
    twobyte top;
    twobyte left;
    twobyte rite;
    twobyte xtraspace;
    twobyte mestart;
    twobyte staveflag;
    };
```

Brief:  This structure assigns attributes to a stave system.

Discussion:

```
twobyte top;
twobyte left;
twobyte rite;
twobyte xtraspace;
```
These four variables form margins for a stave system. xtraspace is the amount of vertical space in terms of the virtual page between the top of the last staff in this stave system and the top of the next stave system.

```
twobyte mestart;
```
If set, this variable will force Enigma to begin the stave system with this measure.

```
twobyte staveflag;
```
The staveflag is bit mapped as follows:

```
#define LINEBREAK         0x8000
#define INSTLIST          0x4000
define NONAMES           0x2000 define NEWPERCENTAGES    0x0800
define LINEPERC          0x0400 define FROZENLINE        0x0080
```

LINEBREAK
    This bit causes Enigma to begin a new page with this stave system.

INSTLIST
> This bit will cause Enigma to attempt to use the stave system's instrument list. An INSTUSED record should exist under the number of the stave system and the tag 'IU'

The Other Group - SSPEC.2

NONAMES
> If this bit is set Enigma will not attempt to draw the names of the instruments when it creates the stave system. The names of the instruments are kept in the NAMESPEC records. If NAMESPEC records do not exist for the instruments, the names will not be drawn however, some time is consumed in looking for the nonexistent records.

NEWPERCENTAGES
> Any stave may be set to any percentage (smaller than 100 for reduction, larger for enlargement). Set this bit and create a PERCENTS record under the stave number with the tag 'SP' for Stave Percentages (See discussion of PERCENTS).

LINEPERC
> Any staff of a stave system may be reduced or enlarged individually. Set this bit and create a DTPERCENT record in the Detail Group. (See the discussion of DTPERCENT under the Detail Group).

FROZENLINE
> The measure components of a line may be frozen to reduce computation time and crystallize layout. This bit, when set, will cause Enigma to look for a FROZENSTAVE and FROZENSPLIT record under this stave number. If it finds them it will draw the stave system in terms of the measure layout found in those records. To use, set the bit and create the FROZENSTAVE and FROZENSPLIT records (See discussion of the POSSPLIT bit in the auxflag of MSPEC, FROZENSTAVE and FROZENSPLIT).

The Other Group

Name:  STRINGS

Tag:   GN IN FN EN HT
> This structure has no 'formal' tag. It is used to hold the names of entities and these entities maintain their own tags:

>> GN - Group Name
>> IN - Instrument Name
>> FN - Font Name
>> EN - Font Effect
>> HT - Header/Footer Text Type:  GN - A Group ID
       IN - An Instrument ID
       FN - A Font ID
       EN - An Effects ID Structure:

```
#define STRINGS struct endgtext
STRINGS
    {
    char string[12];
    };
```

Brief:
> This structure holds text strings for Enigma.

Discussion:
> `char string[12];`
> Since Enigma groups successive records of the same comparator and tag as the same record, theoretically, there is a limit of 32767 characters in the string. In reality, Enigma set the following limits:
>
> | | |
> |---|---|
> | Group Name | 24 characters |
> | Instrument Name | 24 characters |
> | Font Name | 24 characters |
> | Effects Name | 24 characters |
> | Header/Footer Text | 48 characters |

The Other Group

Name: TEXTBLOCK

Tag: PT

Comparator: A text block ID

Structure:

```
#define TEXTBLOCK struct textblock
TEXTBLOCK
    {
    twobyte block;
    twobyte layout;
    twobyte syllstart;
    twobyte linestart;
    twobyte cont;
    twobyte flag;
    };
```

Brief: This structure defines a text block.

Discussion:

> `twobyte block;`
> This element contains the number of the text block to print. The acutal text blocks reside in the Text Group (See the discussion of the Text Group).
>
> `twobyte layout;`
> The element contains the number of the layout to use. Enigma will use this number as a comparator when searching for a TXTLAYOUT record under the tag 'TD'.
>
> `twobyte syllstart;`
> The element allows the user to set the starting syllable for the block. Enigma will normally begin printing the text with the first syllable. If a number exists in this element, Enimga will begin with that syllable instead. Enigma counts syllables from an analytical veiwpoint: any nonprinting character, space or hyphen signals the beginning of a new syllable.

```
twobyte linestart;
```
The element allows the user to set the starting line for the block. This becomes inportent only if you remeber that Enigma allows the assignment of individual placement for each line of text. Enigma will normally begin printing the text with the first line. If a number exists in this element, Enimga will begin with that line number instead.

```
twobyte cont;
```
This element is reserved for future revisions.

```
twobyte flag;
```
No bits are currently defined in flag.

The Other Group

Name: TIMEUPPER
Tag:  TU

Comparator: An alternate time signature upper half ID

Structure:
```
#define TIMEUPPER struct timeupper
TIMEUPPER
      {
      twobyte upper[6]
      };
```

Brief: This structure provides data for alternate time signature upper halves.

Discussion:
Enigma supports alternate time signatures. By alternate time signatures we mean time signatures which cannot be classified within the traditional classifications of simple and complex (duple and triple). For instance, the time signature with an upper half of '3+3+2' can not be classified within traditional music. Neither can a time signature with an upper half of '2.5'. These can be created with Enigma by setting the ALTNUMTSIG bit in the auxflag element of the measure's MSPEC (or by setting the ALTNUMTSIG bit in the flag element of the instrument's FLOATS record if the time signatures are floating) and creating a TIMEUPPER record with the desired information.

In searching for the TIMEUPPER record, Enigma will use the value in the beats element (of the MSPEC record or the FLOATS record, depending whether the time signatures are floating or not. See discussion of MSPEC and FLOATS in the Detail Group) as the comparator. The value in beats must match the comparator for the desired TIMEUPPER record for Enigma to draw the correct upper half of the time signature.

```
twobyte upper[6];
```
The words of this array are actually grouped into pairs. The first word is the integer and the second is the fraction with the numerator and denominator in the upper and lower bytes, respectively.

For instance, to create a time signature with an upper half of '2.5', the first word would be set to 2 and the second to 258, since the upper byte begins at 256.

Since the six word are grouped into pairs, one record only contains 3 entries.

Enigma will recognize successive records with the same comparator and tag as being members of this record. Therefore, the data is open ended.

The Other Group

Name: TIMELOWER
Tag: TL

Comparator: An alternate time signature lower half ID

Structure:
```
#define TIMELOWER struct timelower
TIMELOWER
    {
    twobyte lower[6]
    };
```

Brief: This structure provides data for alternate time signature lower halves.

Discussion:
Enigma supports alternate time signatures. By alternate time signatures we mean time signatures which cannot be classified within the traditional classifications of simple and complex (duple and triple). For instance, the time signature with a lower half of '4+16' can not be classified within traditional music. This can be created with Enigma by setting the ALTDENTSIG bit in the auxflag element of the measure's MSPEC (or by settings the ALTDENTSIG bit in the flag element of the instrument's FLOATS record if the time signatures are floating) and creating a TIMELOWER record with the desired information.

In searching for the TIMELOWER record, Enigma will use the value in the divbeat element (of the MSPEC record or the FLOATS record, depending whether the time signatures are floating or not. See discussion of MSPEC and FLOATS in the Detail Group) as the comparator. The value in divbeat must match the comparator for the desired TIMELOWER record for Enigma to draw the correct lower half of the time signature.

twobyte lower[6];
  The words of this array contain durations which Enigma will print. Our example of '4+16' would contain the two words '1024' and '256', since these are the Enigma based durations for a quarter and sixteenth note.

Enigma does not allow complex duration in an altered lower half and will ignore the dots if it finds any.

Enigma will recognize successive records with the same comparator and tag as being members of this record. Therefore, the data is open ended.

The Other Group

Name: TXTLAYOUT
Tag: TD

Comparator: A text layout ID

Structure:

```
#define TXTLAYOUT struct txtlayout
TXTLAYOUT
    {
    twobyte mainshape;
    twobyte exceptions;
    twobyte linedeline;
    twobyte xadd;
    twobyte yadd;
    twobyte flag;
    };
```

Brief:   This structure provides layout information for a block of text

Discussion:

This structure is accessed when a text block is printed. Enigma uses the layout element of a TEXTBLOCK record to search of its TXTLAYOUT record under the tag 'TD'.

twobyte mainshape;
  Enigma defines graphic shapes with an instruction list, a data list and a bounding box. These three elements are combined into a SHAPEDEF structure. Enigma searches for a SHAPEDEF record under the number found in mainshape and the tag 'SD'. It will use this shape definition as its main shape to pour text into. Enigma does not require that the instlist and datalist elements of the SHAPEDEF are valid (See discussion of SHAPEDEF, SHAPELIST and SHAPEDATA).

If either is not valid, Enigma will use the bounding box as its shape. The greatly speeds execution and should be employed whenever possible.

twobyte exception;
  If this element is greater than zero, Enigma will attempt to find DATABLOCK record/s under the number in exception with tags of 'EB'. These records together comprise a list of shape numbers whose shape definitions should be subtracted from the main shape.

To use this feature, pick a number and place it in exception. Create a DATABLOCK record under this number with a tag of 'EB'. Create one or more shape definitions (See SHAPEDEF, SHAPELIST and SHAPEDATA for details). Place the number/s of the shape definitions in the DATABLOCK record/s.

Remember that the instlist and datalist elements of the shape definition need not be valid. If they are not it will greatly speed execution, since Enigma will use only the bounding box.

The Other Group - TXTLAYOUT.   2 twobyte linedeline;
  Enigma uses this element and the current line number to access a LDLINE record in the Detail Group. This record will yield the amount of space desired by the user between this line and the next.

twobyte xadd
twobyte yadd;
  These two elements provide positional offsets to the upper left hand corner of the page at which to start the main shape. Right is positive for xadd. Down is negative for yadd.

twobyte flag;

The flag is defined as follow:

```
#define WORDWRAP      0x0800
#define NOINTERLETR   0x0400
#define LINEMASK      0x00F0
#define CENTERED      0x0002
#define RITEJUST      0x0001
```

WORDWRAP

Enigma will split a line of text which exceeds the margins into two lines if this bit is set. Otherwise, Enigma will continue the next line of text after the next carriage return.

NOINTERLETR

If this bit is set Enigma will not inter-letter space a words in full justification. Normally, in full justification, if Engima can only fit one word on a line, it will inter-letter space the word to fit the line unless the word is followed by a carriage return.

LINEMASK

These bits allow the specification of the type of spacing to use for the text. The number they produce is in terms of 1/2 space. Therefore, Enigma has the capability to do half-space through octuple-spacing in half space increments.

The Other Group

Name: XISPEC
Tag: XI

Comparator: The measure it belongs to.

Structure:

```
#define XISPEC struct xispec
XISPEC
    {
    twobyte measpace;
    twobyte nextmeas;
    twobyte numdec;
    twobyte shapedef;
    twobyte CCCC;
    twobyte DDDD;
    };
```

Brief: This structure defines an part extraction measure rest.

Discussion:

When parts are extracted from an orchetral score, measure rest are notated differrently. Normally as whole rest is place in the center of the measure. In an extracted part multiple measures in a row may have measure rests. To conserve on paper, these measure rests are combined and a number with a symbol is placed in the measure to indicate how many measures occur in the one measure rest.

This structure is normally transparent. When Enigma is instructed to extract a part, it calls xi_setup(). xi_setup() sweeps through the piece looking for a measure rest.

It calculates the number of measures which can be compacted into one and creates one of these records for each compaction. seq_music() senses the existance of these records and behaves accordingly.

The structure is discussed since it is possible to alter these records after they have been created to customize each compaction. Each record is filled from global variables and so begins it existence the same as the others.

twobyte measpace;
   This element contains the optimum gorizontal displacement for the compaction. It is initiliazed from the global XIMSPACE.

twobyte nextmeas;
   The element contains the number of the next non-compacted measure. Enigma derives the number of compacted measure by taking this value minus the current measure number.

twobyte numdec;
   This variable holds the descent amount from the top line of the staff for the number to be drawn. It is initialized with XINUMDEC.

twobyte shapedef;
   This element contains the number of the shape definition to use. The starting point for the shape is the mid-point of the center line of the staff. It is initialized with XISDEF.

The Detail Group

Area of Control:

The Detail Group operates primarily with the entries of the GRAFILE records (See the discussion of GRAFILE under the Grafile group). It handles, the modification of stems and beams, alteration of size of entries, assignment of interpretive marks, assignment of interpretive text, construction of tuplets, assignment of lyrics, construction of chord symbols, assignment of records to given instruments at given measures, the assignment of text blocks to measures, the control of floating key and time signatures, the assignment of arbitrary music to measures to name a few.

In short, it handles all the of grungy details. Hence, its name.

Method of Control:

The Detail Group was designed for maximum flexibility. To this end, the declared data structure of the Detail Group is very simple. It is an array of records. Each record contains two comparators, tag, and a four word data array. In use, these data arrays provide a region in memory upon which is imposed an assigned data structure. For example, each measure in Enigma may be assigned a GRAFILE record through a Grafile Record Assignment Chart in the Detail Group declared data structure. For instrument number one at measure number two, the Grafile Record Assignment Chart would be a record with the two comparators equal to one (1) and two (2), a tag of 'GF' (for Grafile Assignment) and a four word data array upon which Enigma will impose the following structure when it accesses it:

```
#define GFHOLD struct gfhold
GFHOLD
    {
    twobyte rec;        /* The record number to assign */
    twobyte clef;       /* The clef of the measure */
    twobyte mfont;      /* The alternate music font to use */
    twobyte flag;       /* The flag used to assign attributes */
    };
```

Note that the declaration of this structure does not implicitly consume memory. The structure is only assigned to records as needed. There is nothing which dictates that one record of the Detail Group declared data structure must be a Grafile Record Assignment Chart as opposed to another type of record. The structure is fluid. Enigma and the programmer assign records as needed to accomplish different tasks.

One of the routines to implement this method is called 'dt2serch()'. It is passed two comparators, a tag, and an incidence number. If the routine is passed an incidence number of four, it will search through the Detail Group declared data structure looking for the fourth instance of a record which matches the comparators and tag. It might be helpful to see an example in 'C'.

```
        tbool findGFrec( instrument, measure )
            twobyte instrument;
            twobyte measure;
            {
            GFHOLD *gh;
            twobyte *dt2serch();

if( (gh = dt2serch( instrument, measure, 'GF', 0 )) )
                return( YES );

return( NO );
            }
```

The routine is passed an instrument number and a measure number. It calls dt2serch() to fetch the base address of the data array element of the record which has the comparators equal to the instrument number and the measure number and a tag of 'GF'. If dt2serch () returns greater than zero, the Grafile Record Assignment Chart exists This method is used for all the assigned data structures of the Detail Group (and the Other Group, by the way).

Declared Data Structures:

| | |
|---|---|
| DTAIL *details; | A pointer to the base of the array of records. |
| DTAIL *curdtail; | A pointer. |
| DTAIL *cur2dtail; | A pointer. |
| DTAIL *lastdtail; | A pointer to the last record. |
| DTAIL *swpdtail; | A pointer to the last record. |

Assigned Data Structures:

| | |
|---|---|
| STHG | Stem Height Alteration |
| STEMDEF | Alternate Stem Definition |
| BMLO | Beam Low Alteration |
| BMHI | Beam High Alteration |
| SBMALT | Secondary Beam Alteration |
| CUEN | Cued Note |

| | |
|---|---|
| CROSSSTAF | Cross Staff Information |
| ALTS | Alternate Sizing |
| IMRK | Interpretive Mark |
| EDYNAMIC | Entry Level Dynamic Assignment |
| RPNO | Roll Piano Mark (Arpeggio) |
| TUPL | Tuplet Specification |
| TUPN | Tuplet Number Specification |
| CHRD | Chord Symbol |
| GFHOLD | Grafile Record Assignment Chart |
| DTPERCENT | Line Percentage Enduction Chart |
| LYRDATA | Lyrics |
| LYRICLINES | Base Line Offsets of vertiacl Positioning of Chords and Lyrics |
| MXTTIE | Text Block to Measure Assignment |
| FLOATS | Floating Key and Time Chart |
| BEAMCHART | Beaming Chart |
| MARBMUSIC | Arbitrary Music Assignment for Measures |
| BEAMEXTEND | Beam Extension |
| SHAPENOTE | Shape Note Head Data Files |
| LDLINE | Line Spacing Delineation Charts |
| HHOCKSPEC | Horizontal Hocketting Note Selection Charts |
| CLEFOCTV | Clef/Octave Delineation for Alternate Key Signatures |
| DTSTRING | Detail Character Strings |
| TIEALTER | Tie Alteration Information |

The Detail Group

Name: DTAIL

Type: Declared

Structure:

```
#define DTAIL struct dtail
DTAIL
    {
    twobyte rec;
    twobyte ent;
    twobyte tag;
    twobyte array[DTDATA]   /* defined as four */
    };
```

Declarations:

| | |
|---|---|
| DTAIL *details; | A pointer to the base of the array of records. |
| DTAIL *curdtails; | A pointer. |
| DTAIL *cur2dtails; | A pointer. |
| DTAIL *lastdtail; | A pointer to the last record. |
| DTAIL *swpdtail; | A pointer. |

Discussion:

This declared data structure forms the basis for the entire Detail Group. All of the assigned data structures in the Detail Group are assigned to the records of this structure. You will note the declarations for this structure are all pointers. The master controlling program will need to initialize these pointers to the region of memory it assigns for the Detail Group. Declaring them as pointers also allows the user the potential ability (providing the master controlling program supports it) to resegment the application's memory for more efficient use.

The Detail Group

Name: ALTS
Tag: AS

Comparator One: The high word of the entry number.
Comparator Two: The low word of the entry number.

Structure:

```
#define ALTS struct alts
ALTS
    {
    twobyte AAAA;
    twobyte percent;
    twobyte mfont;
    twobyte BBBB;
    twobyte flag;
    };
```

Brief: This structure provides control over the drawing percentage of entry groups as well as music font control for an entry group.

Discussion:
If this structure is tied to a single entry, it will effect only that entry. If it is tied to an entry which is the first entry of a beam group, the effects described will effect all the members of the group. If it is tied to an entry which is the member of a beam group but not the first entry, nothing will happen.

twobyte percent;
This element indicates, in unit deviations from 100, the amount drawing percentage applied to the effected entries. This alteration in size will occur only in the music symbols of the effected entries. It will have no effect on staff size.

twobyte mfont;
If the HASMFONT bit is set in the flag element, Enigma will reset the font to the value in this element. This allows the user to change music font for a single entry or a beam group.

twobyte flag;
One bit is defined in flag:

```
#define HASMFONT              0x0040
```

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the NOTEDTAIL, take the entry number break it into a high word and low word. Use the high word as comparator one and the low word as comparator two. Create a ALTS record under the tag AS and fill it with the desired information.

The Detail Group - ALTS. 2

The Detail Group

Name: BEAMCHART
Tag: BM

Comparator One: An instrument ID
Comparator Two: The measure it belongs to.

Structure:
```
#define BEAMCHART struct beamchart
BEAMCHART
      {
      twobyte frame;
      fourbyte beatdure1;
      twobyte AAAA;
      twobyte BBBB;
      };
```

Brief: This structure provides individual beaming control for hocketted records.

Discussion:
When Enigma hockets a record to an instrument at a measure, it provides the capability to re-beam the record. Enigma provides two types of re-beaming. It can reanalyze the record in terms of its time signature and set the beaming bit accordingly, or it can use a beaming chart to specify when new beams should begin.

To create a beaming chart, set up a hocketted record (See discussion of GFHOLD and FRAMEATTS in the Other Group). Set the reBEAM and useBEAMCHART bits in the flag element of the FRAMEATTS record.

Each BEAMCHART record will indicate the durational start of a new beam. Create the BEAMCHART records with the two comparators equal to the instrument and measure number. Fill the record with the desired information.

`twobyte frame;`
  Since the BEAMCHART deals with a specific frame, this element will hold the number of that frame.

`fourbyte beatdure1;`
  This element will contain, in elapsed time from the beginning of the measure, a point to begin a new beam. If the ellasped duration of an entry in tgf matches this value, a new beam will begin (See discussion of TGRAFILE in the Entry Pool.)

The Detail Group

Name: BEAMEXTEND
Type: Assigned
Tag: DE UE

The DE tag is for records which define a beam extension in the downstem beam.
The UE tag is for records which define a beam extension in the upstem beam.

Structure:

```
#define BEAMEXTEND struct beamextend
BEAMEXTEND
    {
        twobyte x3disp;
        twobyte x4disp;
        twobyte AAAA;
        twobyte BBBB;
        twobyte flag;
    };
```

Brief: This structure provides extension control over upstem and downstem beams.

Discussion:

At some point in the twentieth century some idiot decided it was legal to extend beams over barlines (just joking!). Enigma uses this record to provide that capability. The structure contains positional displacements for the start and end of the beam. If the beam groups which reside on either side of the barline have their beams extended toward each other, they will appear to be members of the same beam. There is an advantage to this scheme. If, in laying out the line, Enigma starts a new line at the barline between the two beam groups, the beam extensions will appear correctly.

Enigma also offers control over which beams are extended. See `flag` below.

`twobyte x3disp;`
`twobyte x4disp;`
  These elements will be added to the start and end points of the beam.

`twobyte flag;`
  The lower ten bits of the flag element are bit mapped to determine which beams should be extended. Follow the bouncing chart:

```
MSB        Bit #9                                                              LSB
           8th  16th  32th  64th  128th  256th  512th  1024th  2048th  4096th
```

This means that Enigma can take any duration, divide it by two and use it as a mask against the flag register to determine if the beam for that duration shouldbe extended. An additional bit is defined to speed processing:

```
#define EXTBEYOND8th 0x0800
```

If only the eighth note beam will be extended, clear this bit. If beams other than the eighth note beam will be extended, set it.

The Detail Group - BEAMEXTEND. 2

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the BMEXTDTAIL, take the entry number break it into a high word and low word. Use the high word as comparator one and the low word as comparator two. Create a BEAMEXTEND record under the tag DE or UE and fill it with the desired information.

The Detail Group

Name: BMHI
Tag: BH

Comparator One: The high word of the fourbyte entry number
Comparator Two: The low word of the fourbyte entry number Structure:

```
#define BMHI struct bmhi
BMHI
    {
    twobyte xadd;
    twobyte yadd;
    twobyte Sxadd;
    twobyte Syadd;
    twobyte AAAA;
    };
```

Brief: This structure provides control over an upstem beam.

Discussion:

When Enigma constructs a beam group, it runs an analysis on the group and determines a beam line of the upstem and downstem of the group. The beam line will form the top of the eighth note beam all other beams will run parallel to it. The beam line is defined by a point and a slope. The point is kept in an x and y variable as is the slope.

twobyte xadd;
twobyte yadd;
  These elements will be added to the point for the upstem beam line. With these variables you can control the height of the upstem beam line and the pivot point.

twobyte Sxadd;
twobyte Syadd;
  These elements will be added to the slope for the upstem beam line. With these variables you can control the inclination of the upstem beam line.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the STEMDTAIL, take the entry number break it into a high word and low word. Use the high word as comparator one and the low word as comparator two. Create a BMHI record under the tag BH and fill it with the desired information.

The Detail Group

Name: BMLO
Tag: BL

Comparator One: The high word of the fourbyte entry number
Comparator Two: The low word of the fourbyte entry number Structure:

```
#define BMLO struct bmlo
BMLO
     {
     twobyte xadd;
     twobyte yadd;
     twobyte Sxadd;
     twobyte Syadd;
     twobyte AAAA;
     };
```

Brief: This structure provides control over a downstem beam.

Discussion:
When Enigma constructs a beam group, it runs an analysis on the group and determines a beam line of the upstem and downstem of the group. The beam line will form the top of the eighth note beam all other beams will run parallel to it. The beam line is defined by a point and a slope. The point is kept in an x and y variable as is the slope.

twobyte xadd;
twobyte yadd;
  These elements will be added to the point for the downstem beam line. With these variables you can control the height of the downstem beam line and the pivot point.

twobyte Sxadd;
twobyte Syadd;
  These elements will be added to the slope for the downstem beam line. With these variables you can control the inclination of the downstem beam line.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the STEMDTAIL, take the entry number break it into a high word and low word. Use the high word as comparator one and the low word as comparator two. Create a BMLO record under the tag BL and fill it with the desired information.

The Detail Group

Name: CHRD
Tag: CH

Comparator One: The high word of the fourbyte entry number
Comparator Two: The low word of the fourbyte entry number Structure:

```
#define CHRD struct chrd
CHRD
    {
    twobyte reg;
    twobyte altbass;
    twobyte suffix;
    twobyte posline;
    };
```

Brief: This structure constructs a chord symbol and assigns it to an entry.

Discussion:

Enigma defines chord symbols by function. It breaks the chord symbol into three parts: root scale tone, alternate bass scale tone and suffix. Each element of this structure handles on part.

twobyte reg;
   This element holds root of the chord symbol. It is actually three segments compacted into a word. The segments are accessed through these masks:

```
#define RLBITS        0xFF00
#define dontPLAY      0x0080
#define dontROOT      0x0040
#define dontPLAYroot  0x0020
#define SCALENUM      0x001F
```

The SCALENUM bits contain the scale tone number of the root. The RLBITS contains the amount of alteration to impose on the root. It is in signed byte format.

The beauty of this scheme is its transposibility. Enigma actually creates the physical chord symbol on the fly. Therefore, whatever the key signature happens to be when the chord symbol is created, it will always be correct.

The other bits are flags to control execution:

dontPLAY
   If this bit is set Enigma will not play the chord in playback.

dontROOT
   If this bit is set Enigma will not display the root of the chord when constructing the chord symbol.

dontPLAYroot
   If this bit is set Enigma will not play the root of the chord in playback.

The Detail Group - CHRD. 2

`twobyte altbass;`
   This element holds the alternate bass, if any, of the chord symbol. It is mapped in the same manner as reg with exception of the bitflag which function differently

```
#define DOWNSIDEBIT    0x0080
#define doALTBASS      0x0040
#define dontPLAYaltb   0x0020
```

DOWNSIDEBIT
     If this bit is set in altbass, the alternate bass will be drawn underneath the root with a line dissecting them as opposed to placing the alternate bass on the same line as the root, separated by a slash.

doALTBASS
     This bit is must be set for Enigma to draw the alternate bass.

dontPLAYaltb
     If this bit is set Enigma will not play the alternate bass in playback.

`twobyte suffix;`
   This element contains the number of the suffix to append to the chord symbol. It is used to access INTVBANK records (See discussion of INTVBANK in the Other Group).

`twobyte posadd;`
   This element is added to the entry's position to create the x coordinate.

`twobyte lineadd;`
   This element is added to the harmonic level of the middle line of the staff offset by the baseline offset generated from the LYRICLINES records of CL type to create the y coordinate (See discussion of LYRICLINES for more information).

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the CHORDBIT, take the entry number break it into a high word and low word. Use the high word as comparator one and the low word as comparator two. Create a CHRD record under the tag CH and fill it with the desired information.

The Detail Group

Name:    CLEFOCTV
Tag:     co

Comparator One:   For Linear Key Formats the comparator is the format number.
                      For Non-Linear Key Signatures the comparator is the key signature number.
Comparator Two:   The clef number Structure:

```
#define CLEFOCTV struct clefoctv
CLEFOCTV
{
    twobyte ocadds[DTDATA];
};
```

Brief: This structure holds an array of information on the octaves for each bank of accidentals in a linear key format or a non-linear key signature.

Discussion:

Enigma uses a redefinable method for structuring tonality. Enigma defines tonality in terms of a key map, an accidental amount list, an accidental order list, a tonecenter list, a clef octave accidental assignment list and a set of attributes.

Two classes of tonality exist, linear key formats and non-linear key signatures.

In a linear key format individual key signatures comprised of two bytes compacted into a word. The upper byte contains the number of the key format for the key signature. By default, traditional Western tonality is key format number zero.

The lower byte defines the number of accidentals. Accidentals may be in the range -127 to 127. This amounts to two banks within each key format which can be defined independently of each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

```
twobyte ocadds[DTDATA];
```
The CLEFOCTV structure provides the clef/octave chart for the key format. This is a delineation of each octave for each accidental in each clef. The list is in octave numbers. The octave from middle-c to b' is zero.

The list delineates each octave for each accidental in each clef for the positive bank accidentals under the tag Cp and each the octave for each accidental in each clef for the negative bank accidentals under the tag Cn. Each list begins with the zeroeth clef and proceeds to the seventh clef. For each clef there are as many entries as there are scaletones.

The Detail Group - CLEFOCTV.2

In traditional Western tonality the list for the positive bank would be:

```
 1  1  1  1  0  1  0       /* Treble Clef sharp keys */
 0  0  0  0 -1  0 -1       /* Bass Clef sharp keys */
 0  0  0  0 -1  0 -1       /* Alto Clef sharp keys */
-1 -1 -1 -1 -2 -1 -2       /* Tenor Clef sharp keys */
 0  0  0  0  0  0  0       /* etc. */
 0  0  0  0  0  0  0
 0  0  0  0  0  0  0
```

In traditional Western tonality the list for the negative bank would be:

```
0  1  0  1  0  1  0       /* Treble Clef flat keys */
-1  0 -1  0 -1  0 -1      /* Bass Clef flat keys */
-1  0 -1  0 -1  0 -1      /* Alto Clef flat keys */
-2 -1 -2 -1 -2 -1 -2      /* Tenor Clef flat keys */
0  0  0  0  0  0  0       /* etc. */
0  0  0  0  0  0  0
0  0  0  0  0  0  0
```

Since Enigma considers sucsessive records of the same comparator and tag to be members of the same record. These lists could be built with 20 records (each record has five entries).

The Detail Group

Name: CROSSSTAF

Tag: CD

Comparator One: The high word of the entry number.
Comparator Two: The low word of the entry number.

Structure:

```
#define CROSSSTAF struct crossstaf
CROSSSTAF
    {
    twobyte noteID;
    twobyte instrument;
    twobyte AAAA;
    twobyte BBBB;
    twobyte CCCC;
    };
```

Brief: This structure maps one note to be displayed in a different instrument

Discussion:
Enigma allow notes which reside in one instrument to be displayed in another. We call this cross-staffing. This structure takes one note from an entry and assigns to be drawn in another entry. Enigma calculates the actual vertical position of the note on-the-fly when constructing the visual for the measure and accounts for any clef changes in the destination instrument.

twobyte noteID;
  This element holds the noteID of the note to be cross-staffed.

twobyte instrument;
  This element hold the ID of the instrument to be cross-staffed to. If the instrument does not exist in the current Instrument Usage List, Enigma will draw the note in its original instrument.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the CROSUPBIT, take the entry number break it into a high word and low word. Use the high word as comparator one and the low word as comparator two. Create a note in the entry and assign it a noteID. Set the CROSSBIT on the note Create a CROSSSTAF record under the tag CD and fill it with the desired information.

The Detail Group

Name: CUEN
Tag: CN

Comparator One: The high word of the fourbyte entry number
Comparator Two: The low word of the fourbyte entry number Structure:
```
#define CUEN struct alts
CUEN
    {
    twobyte tcd;
    twobyte percent;
    twobyte nxdisp;
    twobyte axdisp;
    twobyte altnhead;
    };
```

Brief: This structure provides control over individual notes of an entry.

Discussion:
Enigma allows individual notes to be cued, moved postitionally, and reassigned a shape for note head.

twobyte tcd;
This element defines which note this structure applies to. It is in the same format as the not array of the entries of the GRAFILE records (See GRAFILE under the Grafile Group for more information).

twobyte percent;
This element indicates, in unit deviations from 100, the amount of reduction or enlargement to apply to the note This alteration in size will occur only in the music symbol/s of the note (This includes the accidental). It will have no effect on staff size.

twobyte nxdisp;
This element allows horizontal control over the position of the note head. The value is added to the note head's position.

The ability to move a notehead horizontally may seem unnecessary, however, consider the case of the twentieth-century cluster.

The Detail Group - CUEN. 2 twobyte axdisp;
This element controls the position of the accidental. Affter the note head is drawn the displacement for the accidental is add to the note head position and the accidental is draw.

Two items of importance. Normally, the accidental positioning is determined by an algorithm in the entry drawing routine. It will take into account all the accidentals in the entry and try to arranged them horizontally in a palatable manner. If you alter the position of the accidental, Enigma will not include the accidental in its accidental placement calculations.

Second, the accidental positional displacement is always in relative terms from the notehead.

```
twobyte altnhead;
```
If this element is greater than zero, Enigma will use the number in it instead of the character number for the normal notehead.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the NOTEDTAIL, take the entry number break it into a high word and low word. Use the high word as comparator one and the low word as comparator two. Create a CUEN record under the tag CN and fill it with the desired information.

The Detail Group

Name: DTPERCENT
Tag: LP

Comparator One: The stave system number
Comparator Two: The instrument number

Structure:

```
#define DTPERCENT struct dtpercent
DTPERCENT
    {
    twobyte stavesiz;
    twobyte musicsiz;
    twobyte AAAA;
    twobyte BBBB;
    twobyte flag;
    };
```

Brief: This structure hold the data for a line percentage reduction or enlargement.

Discussion:
Enigma allows a staff of a stave system to be reduced or enlarged independently of the stave system.

To use, the LINEPERC bit in the staveflag element of a stave system's SSPEC must be set (See discussion of SSPEC under the Others Group). With this bit set, the line percentage reduction or enlargement can be assigned by creating a DTPERCENT record. Use the stave system number and the instrument for comparators. Set the tag to 'LP' and fill the record with the appropriate information.

```
twobyte stavesiz;
twobyte musicsiz;
```
These elements hold the percent sizes, in units deviations from 100, of the staff
and the music symbols respectively.
```
twobyte clef;
```
If CLEFISLIST is clear in flag, clef contains the number of the GRAFILE record.
Otherwise it contains the comparator for a CLEFENUM record (See discussion of
CLEFENUM under the Other Group).

```
twobyte flag;
```
The flag element is bit mapped as follows:

```
#define DOVERTHOLD            0x0800
```

DOVERTHOLD
    Normally, when a line is reduced the vertical coordinates will shrink with it.
With this bit set, the vertical coordinates will be the same as they would be
without the line percentage enduction.

The Detail Group

Name: DTSTRING

Tag:    KS - Accidental Replacement Symbol List
        Comparator One:                                    For Linear Key Formats.the comparator is the format number.
               For Non-Linear Key Signatures the comparator is the key signature number.
        Comparator Two:                                    The alteration level SB - Secondary Beam Break Information
        Comparator One:                                    The high word of the fourbyte entry number.
        Comparator Two:                                    The low word of the fourbyte entry number.

Structure:
```
#define DTSTRING struct dtstring
CLEFOCTV
    {
    uonebyte string[DTDATA*2];
    };
```

Brief:    This is a generalize data structure consisting of an array of 10 bytes of information Discussion:
    This structure could be used to hold any number of types of information. Currently, it hold two: It is the repository for Accidental Replacement Symbol Lists and Secondary Beam Break Information.

<u>Accidental Replacement Symbol Lists</u>

Enigma uses a redefinable method for structuring tonality. Enigma defines tonality in terms of a key map, an accidental amount list, an accidental order list, a tonecenter list, a clef octave accidental assignment list and a set of attributes.

Two classes of tonality exist, linear key formats and non-linear key signatures.

In a linear key format individual key signatures comprised of two bytes compacted into a word. The upper byte contains the number of the key format for the key signature. By default, traditional Western tonality is key format number zero.

The lower byte defines the number of accidentals. Accidentals may be in the range -127 to 127. This amounts to two banks within each key format which can be defined independently of each other in terms of order and type of accidentals in the key signature.

For traditional Western tonality, these two banks correspond to flats and sharps (flats are negative). An astute reader will immediately respond that there is no such thing and a key signature in traditional Western tonality with 127 flats! However, due to the fact that Enigma understands the functional basis of the traditional Western tonality, this oddity exists. To Enigma, there is no difference between a keysignature of 3 sharps or 30 sharps.

One of the attributes which can be defined is a replacement of the normal accidentals used in the key format with a string of up to eight characters. If the SLISTATTRIB bit is set in the flag element of a KEYSATTRIB record and the asymbolist element is greater than zero, Enigma will use the value in a sumolist as an ID for an accidental replacement symbol list. The ID will be the first comparator and the

The Detail Group - DTSTRING.2 alteration amount to be replaced will be the second comparator. Enimga allows the user to replace an alteration amount (i.e. one for sharp, negative one for flat) with a string of characters. The tag is KS. The data is a string of up to 8 characters, null terminated.

Secondary Beam Break Information

Enigma allows the user to specify beam breaks on any secondary beam independantly of other beam. When this structure under a tag of sB is connected to an entry, the secondary beams will break if their respective byte in the data is non-zero. The byte are mapped beginning with a 16th. So, to break the 16th note beam set the zeroeth element. So, to break the 64th note beam set the second element.

The Detail Group

Name: EDYNAMIC
Tag: ED

Comparator One: The high word of the fourbyte entry number
Comparator Two: The low word of the fourbyte entry number Structure:
```
#define EDYNAMIC struct edynamic
EDYNAMIC
    {
    twobyte dynumber;
    twobyte posadd;
    twobyte lineadd;
    twobyte current;
    twobyte flag;
    };
```

Brief: This structure assigns a dynamic to an entry.

Discussion:

```
twobyte dynumber;
```
This element holds the number of the dynamic. It can be a text or object dynamic depending on the setting of TEXTOBJECT in the flag element (See DOBJSPEC and DTXTSPEC under the Others Group for more information).

```
twobyte posadd;
twobyte lineadd;
```
These two elements displace the position of the dynamic. posadd is added to the entry's position to determine the actual x coordinate. lineadd is added to the y coordinate fetched from the upper or lower note in the entry depending on the setting of NOTEBELOW in the flag element.

```
twobyte current;
```
This element maintains count on the number of times this entry dynamic assignment record is accessed for playback. In other words, every time the entry is played, this value is incremented. If there is a value in the auxdata2 element of the dynamic, the dynamic will not be engaged until current and auxdata2 match.

The Detail Group - CUEN. 2

```
twobyte flag;
```
The flag element is bitmapped as follows:

```
#define TEXTOBJECT      0x8000
#define NOTEBELOW       0x0800
```

TEXTOBJECT
    If this bit is set, Enigma will search for a DTXTSPEC record under the dynamic numer, otherwise it will search for a DOBJSPEC record.

NOTEBELOW
    If this bit is set, Enigma will use the harmonic level of the bottom note for the y coodinate, otherwise it will use the top.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the IMRKDTAIL, take the entry number break it into a high word and low word. Use the high word as comparator one and the low word as comparator two. Create a EDYNAMIC record under the tag ED and fill it with the desired information. Create a DOBJSPEC or DTXTSPEC record in the Other Group under the dynamic number and fill it with the appropriate information.

The Detail Group

Name: FLOATS
Tag: FL

Comparator One:     An instrument ID
Comparator Two:     The measure it belongs to.

Structure:

```
#define FLOATS struct FLOATS
FLOATS
    {
    twobyte key;
    twobyte bts;
    twobyte div;
    twobyte AAAA;
    twobyte flag;
    };
```

Brief: This structure assigns a floating key and/or time signature to an instrument at a measure.

Discussion:

Enigma provides the ability to create a piece which can float key and time signatures. In such a piece, each instrument has the capability to be independently assigned key and time signatures. Key and time signature changes can also be independently assigned. A 'global' key and time signature can be assigned for instruments which do not float. This assignment is under the normal conventions of MSPEC (See the discussion of MSPEC in the Other Group).

This ability is accessed through the pieceflag element of CSPEC by setting the FLOATKEYS and/or FLOATTIME bit. These bits are used to enable the capability of floating key or time signatures or both for the entire piece.

Each instrument which will float either key or time or both (as opposed to using the 'global' key and time signatures found in each MSPEC) will need to have an Instrument Specification Chart and that chart should be initialized by setting the FLOATKEYS and/or FLOATTIME bits in the instflag element of its ISPEC structure (See discussion of ISPEC in the Other Group).

Create a FLOATS record with the two comparators equal to the instrument and measure number. Fill the record with the desired information. This should be done for every measure in the piece.

The Detail Group - FLOATS. 2 twobyte key;
  The key signature is mapped in two bytes. The upper byte indicates keyformat. The lower byte indicates number of accidentals and can be positive or negative. Enigma supports the capability to redefine all elements of the key signature. An alternate key format can be specified with the KEYFORMAT record. The KEYFORMAT record can be used to specify the number semitones and scaletones in the new key format. The relationship of semitones to scaletones can be specified through a KEYMAP record. The accidental alteration order can be specified through the ACCIORDER record. The accidental alteration amount can be specified through the AAMOUNT record. The tonecenters for the new key format can be specified through FSTKEY. See the discussions of KEYFORMAT, KEYMAP, ACCIORDER, AAMOUNT and FSTKEY in the Other Group for more information.

twobyte bts;
twobyte div;
  These two variables specify the number of beats in a measure and the division of the beat respectively. The division of the beat is in terms of Enigma based durations where a quarter note is equal to 1024 units. Therefore the time signature of 6/8 would have a 2 in beats and 1536 in divbeat, since 1536 is equal to a dotted quarter. Enigma can also understand complex time signatures beyond triplet division. For instance the value of 2 in beats and a double dotted quarter in divbeat would produce the time signature of 14/16. It is left to the reader to evaluate that this is correct.

```
twobyte flag;
```
The flag element is bit mapped as follows:

```
#define HASKEY          0x0800
#define HASTIME         0x0400
#define ALTNUMTSIG      0x0080
#define ALTDENTSIG      0x0040
```

HASKEY
    If this bit is set, key is valid. Should always be set.

HASTIME
    If this bit is set, bts and div are valid. Should always be set.

ALTNUMTSIG
ALTDENTSIG
    Enigma supports alternate time signatures. By alternate time signatures we mean time signatures which cannot be classified within the traditional classifications of simple and complex (duple and triple). For instance, the time signature with an upper half of '3+3+2' can be created by setting ALTNUMTSIG and creating a TIMEUPPER record with that information (See discussion of TIMEUPPER under the Other Group). An alternate lower half can be created by setting ALTDENTSIG and creating a TIMELOWER record (See discussion of TIMELOWER under the Other Group). Note: Enigma will use the value in bts for the comparator in searching for the TIMEUPPER record and the value in div when searching for the TIMELOWER record.

The Detail Group

Name:   GFHOLD
Tag:    GF

Comparator One:    An instrument ID
Comparator Two:    The measure it belongs to Structure:
```
#define GFHOLD struct GFHOLD
GFHOLD
    {
    twobyte frame;
    twobyte clef;
    twobyte mfont;
    twobyte AAAA;
    twobyte flag;
    };
```

Brief:    This structure assigns a frame to a framework intersection point.

Discussion:

In Enigma, the music of a piece does not exist within the confines of instruments and measures. It resides in The Entry Pool in stream of entries connected by the links in the entries. A section of a stream is bracketted by a frame specification (FRAMESPEC of The Other Group). The frame is assigned to a framework intersection point by one of these records.

twobyte frame;
  The element contains the frame ID.

twobyte clef;
  If CLEFISLIST is clear in flag, clef contains the clef number for the frame. Otherwise it contains the comparator for a CLEFENUM record (See discussion of CLEFENUM under the Other Group).

twobyte mfont;
  If mfont is greater than zero, Enigma will uses it to set the font for the music symbols of the record.

The Detail Group - GFHOLD. 2 twobyte flag;
  The flag element is bit mapped as follows:

```
#define RECISLIST      0x0800
#define CLEFISLIST     0x0400
#define DOSHAPENOTES   0x0080
```

RECISLIST
  If this bit is set, the number in rec should be used as a comparator in searching for a GRECENUM record (See discussion of GRECENUM under the Other Group).

CLEFISLIST
  If this bit is set, the number in clef should be used as a comparator in searching for a CLEFENUM record (See discussion of CLEFENUM under the Other Group).

DOSHAPENOTES
  If this bit is set, Enigma will amass a shape note chart using successive SHAPENOTE records under the current instrument number and a tag of 'HI' (see discussion of SHAPENOTE). This chart will be used to determine which notehead should be drawn.

To use, select a GRAFILE record. Create a GFHOLD record using the desired instrument and measure number for comparators and a tag of 'GF'. Place the number of the GRAFILE record in rec.

The Detail Group

Name: HHOCKSPEC
Tag: HH

Comparator One: A frame ID
Comparator Two: A horizontal hocketting ID

Structure:

```
#define HHOCKSPEC struct hhockspec
HHOCKSPEC
    {
    fourbyte eEnt;
    twobyte noteID;
    twobyte AAAA;
    twobyte BBBB;
    twobyte CCCC;
    };
```

Brief: This structure assigns one note to a horizontal hocket.

Discussion:

Enigma's main body of music data is held in a structure called the Entry Pool (See a discussion of the Entry Pool in the Entry Pool Section). Since each stream in the Entry Pool is continuous via the links, some mechanism is needed to break a stream into smaller pieces without imposing an artificial hierachry on the Entry Pool. A FRAMESPEC (The Other Group) record accomplishes this by holding in its data a starting entry number and an ending entry number. These two numbers 'frame' a piece of a stream in the Entry Pool. As can be deduced, it is easily possible that two frames will overlap or that one frame might enclose another. Although Enigma makes no stipulations on the interweaving of frames, by convention we say the fram which encompasses the largest portion of the overlap is the 'original'. The other frames are 'mirrors'. We do not use the term 'copies'. Since copies denote a duplication of the material. There is no duplication of the material in a mirrored frame. It is simply another way of viewing the original material. The labelling of a frame as an original or a mirror does not occur in the frame specification. It occurs in the Graphic File Assignment Record (GFHOLD) which maps a frame to a framework intersection point.

A FRAMEATTS (The Other Group) record is normally used to modify the appearance of a mirrored frame. Before displaying a frame, Enigma transfers the information in the frame into a temporary graphic file buffer (frame buffer) called tgf. Once the information is in tgf it can be massaged with the information in a FRAMEATTS (The Other Group) record. We say that the FRAMEATTS record is normally used to massage the appearance of a mirrored frame since any desired transformation of the original would likely occur in the Entry Pool. The reader should be aware that certain programs will likely exist which will assume a frame is a mirrored frame is a FRAMEATTS (The Other Group) record exists under the frame's ID. Since certin restriction engage with the presence of a mirrored frame, (i.e. the information in the entries of the frame is non-editable), a supervising program should take care in the creation and maintainece of the record.

The Detail Group - HHOCKSPEC. 2

If the doHOCKETTING bit in the flag element is set inf the FRAMEATTS record, Enigma will use the frame number in the comparator of the FRAMEATTS and the value in the element hhockID as the comparator one and comparator two in a search of details for a HHOCKSPEC record.

Each HHOCKSPEC assigns one note to the horizontal hocket. A HHOCKSPEC record contains an entry number and a note ID (See Entry Pool for more information). Enigma will attempt to match each note in the frame with a HHOCKSPEC record. If no match can be found the note will be deleted from tgf.

The Detail Group

Name: IMRK
Tag: IM

Comparator One: The high word of the fourbyte entry number
Comparator Two: The low word of the fourbyte entry number Structure:
```
#define IMRK struct imrk
IMRK
    {
    twobyte imrkdef;
    twobyte posadd;
    twobyte AAAA;
    twobyte noteadd;
    twobyte BBBB;
    };
```

Brief: This structure assigns an interpretive mark to an entry.

Discussion:
Enigma defines interpretive mark in IMRKDEF structures in The Other Group. These interpretive marks can be drawn as a single character, a verticle string of the same character or a horizontal string of the same character. The type of drawing depends on the setting of the IMRKITERANT and HORZITERANT bits of the flag element of the IMRKDEF structure. If Enimga is asked to draw a string of the same character it will cast the pointer to the IMRK structure to a pointer to a RPNO structure (See RPNO for more information).

```
twobyte imrkdef;
```
This element holds the number of the interpretive mark definition. This value will be used as comparator and Enigma will search for a IMRKDEF record in others. The IMRKDEF record will contain all the necessary information for Enigma to draw the interpretive mark. See IMRKDEF for more details.

```
twobyte posadd;
twobyte noteadd;
```
These two elements displace the position of the interpretive mark. posadd is added to the entry's position to determine the actual x coordinate. noteadd is added to the y coordinate fetched as described above.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

The Detail Group - CUEN. 2

On one of the entries is the Entry Pool, set the IMRKDTAIL, take the entry number break it into a high word and low word. Use the high word as comparator one and the low word as comparator two. Create a IMRK record under the tag IM and fill it with the desired information. Create an IMRKDEF record in the Other Group under the interpretive mark number and fill it with the appropriate information.

The Detail Group

Name: LDLINE
Tag: LD

Comparator One: The line delineation ID
Comparator Two: The effected line number Structure:

```
#define LDLINE struct ldline
LDLINE
    {
    twobyte linedeline;
    twobyte AAAA;
    twobyte BBBB;
    twobyte CCCC;
    twobyte DDDD;
    };
```

Brief: This structure assigns a vertical displacement to a specific line in a text block.

Discussion:

Normally, Enigma will use the type of spacing embedded in the flag element of the TXTLAYOUT block for the text block. This spacing defaults to single spacing. It can be set in half spacing increments from half spacing to octuple spacing.

Enigma provides the ability to incrementally specify the amount of space between the preceding base line and the current base line.

To use, chose a number for the line delineation chart. Place this number in the linedeline element of the TXTLAYOUT record.

Create a LDLINE record with the two comparators equal to the chose number and the line number you wish to control. Place the displacement amount in the linedeline element.

The Detail Group - INDVMPOS. 2

```
twobyte type;
```
This element will hold the type of positioning. Five types of positioning are currently defined. They are:

```
#define SCALEPOSITS        0
#define useTIMESIG         1
#define useBEATCHART       2
#define POSareOFFSETS      4
#define POSareABSOLUT      5
```

SCALEPOSITS

> This type of positioning uses the `posi` element of each entry in ratio to the `totpos` element for the record (see a discussion of The Grafile Group) and the new width to calculate a new position.

useTIMESIG

> This type of positioning uses the `elldur` element of each entry in ratio to the `totdur` element for the record (see a discussion of The Grafile Group) and the time signature of the measure to calculate a new position.

useBEATCHART

> This type of positioning uses a BEATCHART record whose comparator if found in the `btchart` element of this structure to position the entries. To use, set the positioning type to 2. Create a BEATCHART record under this measure number (See the discussion of BEATCHART).

POSareOFFSETS

> This type of positioning is similar to useTIMESIG except the `posi` element of each entry (see a discussion of The Grafile Group) is added to the newly calculated width.

POSareABSOLUTE

> No scoping is done. The `posi` element of each entry is unchanged.

The HASTYPE bit must be set in type for Enigma to recognize the type. It is defined as:

```
#define HASTYPE          0x0008
```

```
twobyte btchart;
```
If the type above is useBEATCHART, this element will hold the comparator for the BEATCHART record/s to use (See the discussion of BEATCHART).

```
twobyte inst;
twobyte measure;
```
The elements are reserved for future revisions

The Detail Group

Name: LYRDATA

Tag: ve ch se

The Text Group three types of lyrics: verses, choruses and sections. It is acknowledged there maybe other classifications for lyrics. However, Enigma allows up to 32767 incidents of each type in a piece and we think that's sufficient for all needs (See discussion of the Text Group for more details, no pun intended).

The tag for the structure will indicate what type of lyrics it is. ve stands for verse. ch stands for chorus. se stands for section.

Comparator One: The high word of the fourbyte entry number
Comparator Two: The low word of the fourbyte entry number Structure:

```
#define LYRDATA struct LYRDATA
LYRDATA
    {
    twobyte incident;
    twobyte syll;
    twobyte posadd;
    twobyte lineadd;
    twobyte wext;
    };
```

Brief:
>This structure assigns a lyric syllable to an entry.

Discussion:

`twobyte incident;`
`twobyte syll;`
>As stated, Enigma allows three types of lyrics and up to 32767 incidents of each. For instance, Enigma can recognize verse one, verse two and so on up to verse thirty two thousand seven hundred sixty seven.

>incident contains the incident number.
>syllable contains the syllable number.

`twobyte posadd;`
>This element is added to the position of the entry to create a x coordinate.

`twobyte lineadd;`
>This element is added to the harmonic value of the middle line of the staff to create a y coordinate.

The Detail Group - LYRDATA. 2

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the TEXTDTAIL, take the entry number break it into a high word and low word. Use the high word as comparator one and the low word as comparator two. Create a LYRDATA record under the tag ve, ch or se and fill it with the desired information.

The Detail Group

Name: LYRICLINES
Tag: Tags used for the baseline offset of verses, choruses and sections in the display of lyrics are compiled from the type of lyric (verse, chorus, section) and the number of the lyric. The tag is formatted in three parts. The most significant bit is always on to indicate this is a lyric baseline offsets record (Enigma protocal limits tags to positive ASCII characters). The next three bits delineate 0, 1 or 2 for verse, chorus and section respectively. The last twelve bits hold the number of the verse, chorus, or section. So the tag for a LYRICLINES record of chorus three would be: 1001000000000011 or 0x9003.

CL - For chord baseline offsets.

Comparators: See Below

Structure:
```
#define LYRICLINES struct lyriclines
LYRICLINES
    {
    fourbyte basedisp;
    twobyte AAAA;
    twobyte BBBB;
    twobyte CCCC;
    };
```

Brief: This structure provides base line displacements for the drawing of lyrics and chords Discussion:
Enigma allows the use to specify base line offsets for lyrics and chords. In other words, the user can say that for verse one the base line of the lyrics should be 64 EVPUs from the top of the staff. Each verse, chorus and section can be specified individually as can chords as a whole.

And Enigma provides greater control than this by allowing the user to specify a global displacement, an instrument displacement and staff system displacement. The user can specify tha on the third staff system the lyrics for chorus two be 16 EVPUs higher.

Each LYRICLINES record provides one displacement. The displacement it provides is determined by the comparators used.

| Comparator One | Comparator Two | Type of Displacement |
| --- | --- | --- |
| 0 | 0 | Applies to the whole piece |
| Instrument ID | 0 | Applies only to this instrument |
| Instrument ID | Staff System ID | Applies only to this instrument at this system |

```
fourbyte basedisp;
```
This element holds the base line displacement.

The Detail Group

Name: MARBMUSIC
Tag: MM

Comparator One: The instrument ID
Comparator Two: The measure it belongs to.

Structure:

```
#define MARBMUSIC struct marbmusic
MARBMUSIC
    {
    twobyte arbnum;
    twobyte topadd;
    twobyte leftadd;
    twobyte AAAA;
    twobyte BBBB;
    };
```

Brief: This structure ties an arbitrary music measure to an instrument at a normal measure.

Discussion:

Enigma allows the construction of arbitrary music measures. These are measures of music which fall outside the flow of the music of the piece. The MARBMUSIC structure ties these measures to an instrument at a normal measure. The three structures ARBMUSIC, ARBHEADER and ARDBOUNDS define all the attributes for the measure (See discussion of ARBMUSIC, ARDHEADER and ARDBOUNDS under the Other Group).

Since Enigma recognizes not only the comparator and tag for for record, but also the incident of the record. Multiple measures can be set up under the comparators of instrument and measure number. To set up the measures, always create a record for each structure of the arbitrary music specification (ARBMUSIC, ARBHEADER and ARBBOUNDS).

```
twobyte arbnum;
```
Enigma will use the comparator found in this element when searching for the arbitrary music structures. The measures created under this comparator are assigned in bulk by this element.

```
fourbyte topadd;
fourbyte leftadd;
twobyte mwidth;
```
The arbitrary music drawing routine is supplied with three positioning variables. It is supplied with a horizontal coordinate, a width coordinate and a vertical coordinate.

The topadd element added to the top of the instrument's staff supplies the vertical coordinate.

The leftadd element added to the left side of the measure supplies the horizontal coordinate.

Enigma supplies the mwidth element from the current width of the normal measure.

The Detail Group - MARBMUSIC. 2

The Detail Group

Name: MTXTTIE
Tag: MT

Comparator One: An Instrument ID
Comparator Two: The measure it belongs to.

Structure:

```
#define MTXTTIE struct mtxttie
MTXTTIE
    {
    twobyte offset;
    twobyte xdisp;
    twobyte ydisp;
    twobyte AAAA;
    twobyte BBBB;
    };
```

Brief:
    This structure assigns text blocks to measures.

Discussion:

Enigma allows text blocks to be defined with respect to layout (See discussion of TEXTBLOCK and TXTLAYOUT under the Other Group). This structure simply assigns these block to a particular instrument and measure.

To use, the MEASURETEXT bit in the meflag element of a measure's MSPEC must be set (See discussion of MSPEC under the Others Group). With this bit set, a text block can be assigned by creating a MTXTTIE record. Use the instrument and measure numbers for comparators. Set the tag to 'MT' and fill the record with the appropriate information.

Of course, the text blocks must also be in existence (See discussion of TEXTBLOCK and TXTLAYOUT under the Other Group).

`twobyte offset;`

This element holds the number of the TEXTBLOCK record to assign.

`twobyte xdisp;`
`twobyte ydisp;`
  These elements provide x and y displacements for the text block.

The Detail Group

Name: RPNO
Tag: RP

No Comparators

Structure:

```
#define RPNO struct rpno
RPNO
    {
    twobyte imrkdef;
    twobyte posadd;
    twobyte posadder;
    twobyte hinoadd;
    twobyte lonoadd;
    };
```

Brief:    This structure is used in drawing an iterated interpretive mark.

Discussion:
  Enigma defines interpretive mark in IMRKDEF structures in The Other Group. These
  interpretive marks can be drawn as a single character, a verticle string of the same
  character or a horizontal string of the same character. The type of drawing
  depends on the setting of the IMRKITERANT and HORZITERANT bits of the flag element
  of the IMRKDEF structure. If Enimga is asked to draw a string of the same character it
  will cast the pointer to the IMRK structure to a pointer to a RPNO structure (See RPNO
  for more information).

In the RPNO structure the posadd, posadder, hinoadd and lonoadd element define
  boundaries for the drawing of the interated interpretive mark. These boundaries
  have two sets of meanings depending on the type of iteration being drawn.

For vertical iteration, hinoadd and lonoadd are added to the highest and lowest notes
  of the entry respectively. Enigma starts with at the top and draws a character at the
  position of the entry plus the value in posadd. It increments the charater position
  by the amount in posadder and drops the vertical coordinate by a space. It checks to
  see if the new vertical coordinate is less than the value derived from the lowest
  note plus lonoadd. Drawing continues until it is.

For horizontal iteration, the start coordinate for the range of drawing is found by
  adding posadd to the position of the entry. The end coordinate for the range of
  drawing is found by adding posadder to the start coordinate. Enigma beings
  drawing with at veritcal position found by adding the highest note to hinoadd and
  the start coordinate. Enigma draws a character, adds the character width to the
  starting coordinate and continues until the starting coordinate is greater than or
  equal to the end coordinate.

The Detail Group

Name:   SBMALT
Tag:    bH - For upsteam beams
        bL - For downstem beams

Comparator One:  The high word of the fourbyte entry number
Comparator Two:  The low word of the fourbyte entry number Structure:
```
        #define SBMALT struct sbmalt
        SBMALT
            {
            twobyte xadd;
            twobyte yadd;
            twobyte Sxadd;
            twobyte Syadd;
            twobyte dura;
            };
```

Brief:  This structure provides independant beam height and angle control for each
secondary    beam Discussion:
  When Enigma constructs a beam group, it runs an analysis on the group and
  determines a beam line of the upstem and downstem of the group. The beam line will form the top of the eighth note beam all secondary beams will run parallel to it. The beam line is defined by a point and a slope. The point is kept in an x and y variable as is the slope.

This structure allows the beam line to be altered independantly for each secondary beam drawn. This allows Enigma to display 20th century crescendo beaming.

```
twobyte xadd;
twobyte yadd;
```
These elements will be added to the point for the upstem beam line. With these variables you can control the height of the upstem beam line and the pivot point.

```
twobyte Sxadd;
twobyte Syadd;
```
These elements will be added to the slope for the upstem beam line. With these variables you can control the inclination of the upstem beam line.

```
twobyte dura;
```
This element specifies the duration of the secondary beam to which this record applies.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD

The Detail Group - SBMALT. 2 in the Detail Group).

The Detail Group - SBMALT. 3

On one of the entries is the Entry Pool, set the STEMDTAIL, take the entry number break it into a high word and low word. Use the high word as comparator one and the low word as comparator two. Create a BMHI record under the tag BH and fill it with the desired information.

The Detail Group

Name: SHAPENOTE

Tag: HI HR

The HI tag is the tag for records which define shapenote heads at the Insturment Level.
The HR tag is the tag for records which define shapenote heads at the GRAFILE record Level.

Comparator One: HI - 0 for global assignment to the whole piece
The instrument ID for assignment to a specific instrument
HR - The frame ID Comparator Two: 0, 1, 2 or 3 (See below)

Structure:

```
#define SHAPENOTE struct shapenote
SHAPENOTE
    {
    twobyte nhead[DTDATA];
    };
```

Brief: This structure provides data for shaped notes.

Discussion:
Enigma allows note heads to respond functionally to their relative position in a key. This can be used by shaped note head as well as percussion scores.

The assignment of the noteheads can occur at three levels.

Using the CSPEC structure, Enigma can determine that every frame in the piece will use the shaped note heads.

Using the INSTATTS structure, Enigma can determine that any frame assigned to an instrument will use the shaped note heads.

Using the Grafile Record Assignment Record (GFHOLD), Enigma can impose the shaped note heads on the frame it assigns.

Enigma actually employs four bank of SHAPENOTE records for each assignment. The banks correspond to double-whole note head, whole note head, half note heads and quarter note head. If the information in one of these bank is incomplete or the bank does not exist, Enigma will use its standard note heads to make up the difference.

The four banks are defined with a chosen number as the first comparator and one of the following values for the second comparator:

0 - double whole note heads
    1 - whole note heads
    2 - half note heads
    3 - quarter note heads

The Detail Group - SHAPENOTE.2

For each bank, there should be enough SHAPENOTE records, under the same comparators, to account for the number of scaletones in the key. The first entry will correspond to the first scale tone and so on.

```
twobyte nhead[4];
```
Each of these elements will be a symbol number (usually ASCII).

The Detail Group

Name:   STEMDEF
Tag:    SU SL

The tag SU is used if the structure is defining an upstem stem.
The tag SL is used if the structure is defining a downstem stem.

Comparator One:   The high word of the fourbyte entry number
Comparator Two:   The low word of the fourbyte entry number Structure:
```
#define STEMDEF struct alts
STEMDEF
    {
    twobyte instlist;
    twobyte datalist;
    twobyte xdisp;
    twobyte ydisp;
    twobyte AAAA;
    };
```

Brief:  This structure holds a stem definition for an upstem or downstem stem.

Discussion:
Enigma allows the creation of specialized stems through its shape definition structures (See discussion of SHAPEDEF, SHAPELIST and SHAPEDATA under the Other Group)..

twobyte instlist;
twobyte datalist;
  Enigma defines shapes with an instruction list, a data list, and a bounding box. The bounding box is used when Enigma is pouring text into a shape for a rough approximation to determine if the shape should even be considered for intersection.

Usually, the two lists are compiled into a path by Enigma. This path can then be stroke, filled or poured with text (See discussion of SHAPEDEF for more information).

To create a custom stem, Enigma shortcircuits this process by holding the number for the instruction list and the data list in the stem definition record. It searches for a SHAPELIST record under this number with a tag of 'SL'. It searches for a SHAPEDATA record under the number in datalist. Using the instruction list and the data, Enigma creates a stem.

twobyte xadd;
twobyte yadd;
  These elements offset the starting point for the stem.

To use, the STEMDTAIL bit of the ef element of an entry in the desired GRAFILE record must be set (See discussion of GRAFILE under the Grafile Group). Create a STEMDEF record using the record number and the entry number as the two comparators.
Give it a tag of 'CN'. Fill the record with the appropriate information.

The Detail Group - STEMDEF. 2

The Detail Group

Name:  STHG
Tag:   ST

Comparator One:  The high word of the fourbyte entry number
Comparator Two:  The low word of the fourbyte entry number Structure:
```
#define STHG struct sthg
STHG
    {
    twobyte hiadd;
    twobyte loadd;
    twobyte uphadd;
    twobyte downhadd;
    twobyte AAAA;
    };
```

Brief: This structure provide stem control on non-beamed entries.

Discussion:

twobyte hiadd;
twobyte loadd;
   When Enigma analyzes the stem height and direction it initializes two variables.
   These variables set the stem length for both an upstem and downstem on an entry.
   These elements can alter those variables to independently control the height of
   the upstem and downstem. hiadd controls the upstem. loadd controls the
   downstem.

To use, the STEMDTAIL bit of the ef element of the desired entry in the desired
   GRAFILE record must be set (See discussion of GRAFILE under the Grafile Group).
   Create a STHG record using the record number and the entry number as the two
   comparators. Give it a tag of 'ST'. Fill the record with the appropriate information.

The Detail Group

Name: TIEALTER
Tag:  Te - Used for ties which begin a line
      Ts - Used for all other ties Comparator One: The high word of the fourbyte entry number
Comparator Two: The low word of the fourbyte entry number Structure:
```
#define TIEALTER struct tiealter
TIEALTER
    {
    twobyte tcd;
    twobyte st;
    twobyte en;
    twobyte yadd;
    twobyte flag;
    };
```

Brief: This structure provides control over a individual tie on a note.

Discussion:
   Each tie can be individually controlled in Enigma. The structure allows the user to
   alter the start and end points of the time, the height of the tie and freeze the tie on
   direction of the other.

twobyte tcd;
   Enigma matches this element with a tone center displacement of a note in the entry to determine which tie to alter.

twobyte st;
twobyte en;
   These elements will be added to the starting and end horizontal positions of the tie respectively before it is drawn.

twobyte yadd;
   This element is added to the normal y displacement for the tie.

twobyte flag;
   Two bits are currently defined:

```
#define FREEZETIE       0x0800
#define UDBIT           0x0001
```

FREEZETIE
   If this bit is set Enigma will force the tie in the directon dictated by the UDBIT.

UDBIT
   If this and the FREEZETIE bits are set Enimga will draw the tie curving down. Otherwise it will draw the tie curving up

The Detail Group - TIEALTER.  2

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the SPECIALALTS bit, take the entry number break it into a high word and low word. Use the high word as comparator one and the low word as comparator two. Create a TIEALTER record under the tag Ts and fill it with the desired information.

The Detail Group

Name:   TUPL
Tag:    TP

Comparator One:   The high word of the fourbyte entry number
Comparator Two:   The low word of the fourbyte entry number Structure:
```
#define TUPL struct tupl
TUPL
    {
    twobyte tupnum;
    twobyte tupsymdur;
    twobyte refnum;
    twobyte refdur;
    twobyte endent;
    };
```

Brief: This structure defines a tuplet structure.

Discussion:
Enigma fully functionally defines tuplet structures. In the case of a triplet, Enigma would understand it to be 3 eighths in the space of two eighths. This type of definition can be expanded to truly bizarre form. For instance, 5 dotted eighths in the space of 3 quarter notes. Enigma will handle these with easy.

The visualization of the tuplet structure can be designed in a companion TUPN record.

To start a tuplet, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group).

On one of the entries is the Entry Pool, set the TUPLSTART, take the entry number break it into a high word and low word. Use the high word as comparator one and the low word as comparator two. Create a TUPL record under the tag tp and fill it with the following information.

By the way, Enigma will recognize succesive records the same comparators as nested tuplets. This means you can assign multiple tuplets to the same entry and Enigma will nest them in order of their appearance in the Detail Group Declared Data Structure.

```
twobyte tupnum;
twobyte tupsymdur;
twobyte refnum;
twobyte refdur;
```
As mentioned above, Enigma defines tuplets in terms of four parameters. tupnum times tupsymdur gives the symbolic duration for the tuplet. refnum times refdur

The Detail Group - TUPL. 2

```
twobyte endent;
```
This element is configured by the drawing routines on-the-fly when the frame is transfered into tgf. The routine fre_elDur() sets up this element to hold the entry offset in tgf of the last entry in the tuplet group. The drawing routines use this information in drawing the tuplet brackets and slurs.

The Detail Group

Name: TUPN
Tag: TN

Comparator One: The high word of the fourbyte entry number
Comparator Two: The low word of the fourbyte entry number Structure:

```
#define TUPN struct tupn
TUPN
    {
    twobyte numoff;
    twobyte leftoff;
    twobyte midoff;
    twobyte riteoff;
    twobyte flag;
    };
```

Brief: This structure specifies the visualization of a tuplet.

Discussion:
This structure provides a companion to TUPL. TUPL defines the structure temporally. TUPN defines it visually. The user can control the appearance and type of the visualization `twobyte numoff;`
This element holds the vertical displacement for the number. It is in EVPUs.

`twobyte leftoff;`
`twobyte midoff;`
`twobyte riteoff;`
These three elements define the parameters for the slur or bracket connected to the number. They are all in EVPUs in displacements from the vertical position created by numoff.

`twobyte flag;`
The flag element is bitmapped as follows:

```
#define  NOTEBELOW       0x0800
#define  USERATIO        0x0400
#define  BREAKBRACK      0x0200
#define  TUPNTYPE        0x000F
```

NOTEBELOW
    If this bit is set, Enigma will use the harmonic level of the bottom note for the y coodinate, otherwise it will use the top.

USERATIO
    Normally, Enigma generates the visual number from the tupnum element of the companion TUPL structure. If this bit is set, Enigma a string consisting of the tupnum element, a colon and the number in the refnum element.

The Detail Group - TUPN. 2

BREAKBRACK
    If this bit is set, Enigma will break the slur or bracket where it touches the horizontal domain of the tuplet number.

TUPNTYPE
    These four bits define the type of tuplet visualization. Four types of visualization are currently defined:

```
#define   TUPNNOTHING      0
#define   TUPNNONL         1
```

```
#define    TUPNSLUR         2
#define    TUPNBRAK         3
```

TUPNNOTHING cause nothing to be drawn.
TUPNNONL draws only a number.
TUPNSLUR draws a number and a slur.
TUPNBRAK draws a number and a bracket.

To use, a frame must be active in the framework. Entries must exist in the Entry Pool (See discussion of ENTRY in The Entry Pool). The entries must be bounded by a frame (See discussion of FRAMESPEC in the Other Group). At least one instrument must exist in an Intrument Usage List (See INSTUSED in The Other Group). At least one measure must exist (see MSPEC in The Other Group). A Graphic Assignment Record must exist to tie the frame to the Framework Intersection Point (See GFHOLD in the Detail Group). A tuplet must exist on one of the entries.

On the same entry in the Entry Pool, set the TUPLSTART, take the entry number break it into a high word and low word. Use the high word as comparator one and the low word as comparator two. Create a TUPN record under the tag TN and fill it with the desired information.

The Entry Pool

Area of Control:

> The Entry Pool holds the music data for the piece. Its records contain information on the duration, position, attributes and notes of entries in the music. Its records also contain links in the form of entry numbers to tie records together horizontally and vertically. Some of the attrbitutes on the entries tie into Detail Group Record and so, indirectly the Entry Pool controls access to some structures of the Detail Group.

Method of Control:

> The Grafile Group contains one major structure, ENTRY. A secondary data structure TENTRY is a close relative of ENTRY. The TGRAFILE structure is used as temporary storage for a frame (a collection of ENTRY structures). It is an array of TENTRY records.

Declared Data Structures:

```
TGRAFILE *tgf;          A pointer to the temporary GRAFILE record.
TGRAFILE *tgf2;         A pointer to the secondary temporary
                        GRAFILE record.
```

The Entry Pool

Name:   ENTRY
Type:   Declared

Structure:
```
#define ENTRY struct entry
ENTRY
    {
    ufourbyte last;
    ufourbyte next;
```

```
    ufourbyte  up;
    ufourbyte  down;
    twobyte    dura;
    twobyte    posi;
    fourbyte   ef;
    fourbyte   not[NN];      /* NN is defined as 2 */
};
```

Brief: This structure holds one entry in the Entry Pool.

Discussion:

The Entry Pool is the main data storage area for music in Enigma. The Pool is made up of a virtual array of ENTRY records. Within the Entry Pool streams connect entries together. These streams are independant of each other. The Entry Pool makes no stipulations on the concurrency or sequentiality. The streams are implemented in the first four elements of the ENTRY structure. These four elements constitute a two dimensional double link list. last and next provide a horizontal linking of entries. up and down provide a vertical linking of entries. The vertical link is necessary for entries with more than 2 notes.

The rest of the ENTRY structure is farily mundane.

`twobyte dura;`
  This element holds the duration for the entry. The value is in terms of Enigma durational units. A quarter note equals 1024.

`twobyte posi;`
  This element hold the positional displacement for the entry.

`fourbyte ef;`
  The element ef is bit mapped as follows:

```
        #define SETBIT              0x80000000
        #define NOTEBIT             0x40000000
        #define CNTLRBIT            0x20000000
        #define CNTLBIT             0x10000000
        #define LINKBIT             0x08000000
        #define CHORDBIT            0x04000000
        #define ICLEFBIT            0x02000000
        #define FLOATREST           0x01000000
        #define GRACENOTE           0x00800000
        #define NOTEDTAIL           0x00400000
        #define IMRKDTAIL           0x00200000
        #define TEXTDTAIL           0x00100000
```

The Entry Pool - ENTRY. 2

```
        #define TUPLSTART           0x00080000
        #define CTUPPARA            0x00040000
        #define PRFMDATA            0x00020000
        #define OCTVCONT            0x00010000
        #define IGNOREBIT           0x00008000
        #define BMEXTDTAIL          0x00004000
        #define N5B3                0x00002000
        #define SPECIALALTS         0x00001000
        #define BEATBIT (BEAMBIT)   0x00000800
        #define SECBEAMBIT          0x00000400
        #define CNTLCONTBIT         0x00000200
        #define FREEZSTEM           0x00000100
        #define STEMDTAIL           0x00000080
```

```
#define CROSUPBIT        0x00000040
#define CROSDWBIT        0x00000020
#define REVUPSTEMBIT     0x00000010
#define REVDWSTEMBIT     0x00000008
#define DBLSTEMBIT       0x00000004
#define SPLITBIT         0x00000002
#define UDBIT            0x00000001
```

SETBIT
   This bit must be set for Enigma to recognize the entry.

NOTEBIT
   If this bit is set, the entry is a note entry: Otherwise, it is a rest entry.

CNTLRBIT
CNTLBIT
   During the initial design phases of Enigma it became necessary to develop temporal function definitions for entries. The cause was split-stemming. Music notation allows the over lapping of durations under certain circumstances. A music example would be helpful:

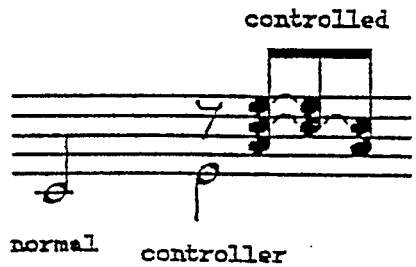

Three classes for temporal function definition were developed: They are Normal, Controller and Controlled. As illustrated, a Normal entry begins and ends without interference from others. If other entries begin with the period of existence for an entry, it is a Controller entry. These other entries which begin and end are Controlled entries, since come aspects of their visual appearance are controlled by the Controller entry, i.e. stem and tie direction.
   The CNTLRBIT is set for Controller entries.
   The CNTLBIT is set for Controlled entries.
   Neither is set for normal.
   Controlled entries should follow the controller entry in the GRAFILE record.

The Entry Pool - ENTRY. 3

LINKBIT
   If this bit is set, Enigma will treat this entry and the next entry as one entry. The LINKBIT can be set on successive entries to form an entry of up to 29 notes.

CHORDBIT
   If this bit is set, Enigma will look for a CHRD record in the Detail Group under this entry number (Using the high and low words) (See discussion of CHRD in the Detail Group).

ICLEFBIT
   This bit signals an inter-measure clef change. Enigma sets this bit in response to the creation of CLEFENUM records (See discussion of CLEFENUM in the Other Group).

FLOATREST
   If this bit is set and the entry is a rest entry, Enigma will use the harmonic value of the middle line of the staff for its vertical position regardless of the clef.

GRACENOTE
If this bit is set, the entry is grace note.

NOTEDTAIL
If this bit is set, Enigma will look for CUEN and ALTS records in the Detail Group under this entry number (Using the high and low words) (See discussion of CHRD in the Detail Group and ALTS in the Detail Group).

IMRKDTAIL
If this bit is set, Enigma will look for IMRK and EDYNAMIC records in the Detail Group under this entry number (Using the high and low words) (See discussion of IMRK and EDYNAMIC in the Detail Group).

TEXTDTAIL
If this bit is set, Enigma will look for LYRDATA records in the Detail Group under this entry number (Using the high and low words) (Using the high and low words) (See discussion of LYRDATA in the Detail Group).

TUPLSTART
This bit signals the start of a tuplet. If it is set, Enigma will look for a TUPL and TUPN record in the Detail Group under this entry number (Using the high and low words) (Using the high and low words) (See discussion of TUPL and TUPN in the Detail Group).

CTUPPARA
Normally when a controlled entry begins a tuplet, the reference duration value is fetched from the current durational units. If this bit is set, Enigma will use the durational units in existence to the controller entry for the reference duration.

PRFMDATA
If this bit is set, Enigma will look for PERFDATA records in the Detail Group under this entry number (Using the high and low words) (Using the high and low words) (See discussion of PERFDATA in the Detail Group).

OCTVCONT
These bit are reserved for future expansion.

The Entry Pool - ENTRY. 4

IGNOREBIT
If this bit is set, Enigma will ignore the entry.

BMEXTDTAIL
If this bit is set, Enigma will look for a BEAMEXTEND record in the Detail Group under this entry number (Using the high and low words) (See discussion of BEAMEXTEND in the Detail Group).

SPECIALALTS
If this bit is set, Enigma will look for a TIEALTER records in the Detail Group under this entry number (Using the high and low words) (See discussion of TIEALTER in the Detail Group).

BEATBIT (BEAMBIT)
This bit signals the start of a new beam.

SECBEAMBIT
If this bit is set, Enigma will look for a DTSTRING record in the Detail Group under this entry number (Using the high and low words) and a tag of sB to determine what beams to break (See discussion of DTSTRING in the Detail Group).

CNTLCONTBIT

Normally, the beaming of controlled entries occurs with the period of existence for the controller entry. If this bit is set, Enigma can beam two controlled entry groups together, even though they may be separated by a controller entry.

FREEZSTEM

If this bit is set the stem direction is frozen with the setting of UDBIT.

STEMDTAIL

If this bit is set and the entry starts a beam group, Enigma will look for BMLO, BMHI and SBMALT records in the Detail Group under this entry number (Using the high and low words) (See discussion of BMLO, BMHI and SBMALT in the Detail Group and ALTS in the Detail Group).

Otherwise, Enigma will look for a STHG record in the Detail Group under this entry number (Using the high and low words) (See discussion of STHG in the Detail Group).

In both cases, Enigma will look for a STEMDEF record in the Detail Group under this entry number (Using the high and low words) (See discussion of STEMDEF in the Detail Group).

CROSUPBIT
CROSDWBIT

If either of these bits are set, Enigma will look for a CROSSSTAF record in the Detail Group under this entry number (Using the high and low words) (See discussion of CROSSSTAF in the Detail Group).

Enigma will attempt to match CROSSSTAF records with any note in the entry with its CROSSBIT set.

REVUPSTEMBIT
REVDWSTEMBIT

Enigma allows stems to be reversed independently for upstems and downstems.

DBLSTEMBIT

The Entry Pool - ENTRY. 5

- If this bit is set, Enigma will double stem the entry.

The Entry Pool - ENTRY. 6

SPLITSTEM

If this bit is set, Enigma will split stem the entry. The notes which are a part of the upstemming will have their UPSPBIT set.

UDBIT

This bit indicates whether the entry is upstemmed or downstemmed.

```
fourbyte not[NN];
```
This array hold the notes of the entry. Each element of the array is bit mapped as follows:

```
#define SETBIT          0x80000000
#define TSBIT           0x40000000
#define TEBIT           0x20000000
#define CROSSBIT        0x10000000
#define UPSECBIT        0x08000000
#define DWSECBIT        0x04000000
```

```
#define UPSPBIT      0x02000000
#define ACCIBIT      0x01000000
#define NOTEID       0x001F0000
#define TCDBITS      0x0000FFF0
#define TCDRLBIT     0x00000008
#define TCDAMOUNT    0x00000007
```

SETBIT
   This bit must be set for Enigma to recognize the note.

TSBIT
TEBIT
   These bits signal the beginning and end of a tie respectively.

CROSSBIT
   If this bit is set and either the CROSUPBIT or CROSDWBIT is set in the ef element above, Enigma will look for a CROSSSTAF detail and attempt to cross-staff the note to the instrument in it UPSECBIT
DWSECBIT
   Enigma defines upstem seconds and downstem seconds. This bits indicate to Enigma if this note is either or both.

UPSPBIT
   If this bit is set and the SPLITBIT is set in the ef element above, Enigma will group this note with the upstem. Otherwise, the note will be grouped with the downstem.

ACCIBIT
   If this bit is set, Enigma will draw an accidental on the note.

NOTEID
   These bits allow Enigma to stamp an ID on the note which will not change even if the note changes. It allows the continuous tracking of note in horizontal hockets, for instance.

The Entry Pool - ENTRY.   7

TCDBITS
   Enigma defines notes in relationships to key. The value in these bits is a tone center displacement in terms of harmonic levels from the tone center of the key. Enigma creates the actual harmonic level on the fly as its drawing the record. This means the record can be placed in any key signature and all the note heads and accidentals will automatically be placed correctly. The tone center displacement is in the range of -2048 to 2047.

TCDRLBIT
   This bit indicates whether the value in TCDAMOUNT will raise or lower the tone center displacement. Set for raise TCDAMOUNT
   These bits supply the amount of alteration which should be applied to the tone center displacement. For instance, a d sharp in the key of c would have a tone center displacement of 1, the TCDRLBIT set and a value of 1 in these bits. An e flat in the key of c would have a tone center displacement of 2, the TCDRLBIT clear and a value of 1 in these bits.

The Entry Pool

Name: TENTRY

Type: Declared

Structure:
```
#define TENTRY struct tentry
TENTRY
    {
    fourbyte    elldur;
    fourbyte    actdur;
    ufourbyte   entnum;
    twobyte     orgposi;
    twobyte     AAAA;
    twobyte     dura;
    twobyte     posi;
    fourbyte    ef;
    fourbyte    not[TGFNN];    /* TGFNN is defined as 26 */
    };
```

Brief: This structure forms one entry for a TGRAFILE record.

Discussion:
This structure is a companion to ENTRY. Only those elements which are specific to TENTRY will be covered here. The reader should refer to ENTRY for the others.

```
fourbyte elldur;
fourbyte actdur;
```
These two elements are constructed as Enigma masses the entries of a frame into a TGRAFILE record. elldur holds the elapsed duration from the start of the frame in terms of Enigma duration units. actdur holds the actual duration for the entry. These elements reflect any tuplets in effect.

```
ufourbyte entnum;
```
This element holds the entry number of the entry in the Entry Pool. If successive entries where linked vertically to form a chord this entry number will be the number of the topmost entry.

```
twobyte orgposi;
```
This element holds the original positional displacement.

The Entry Pool

Name: TGRAFILE

Type: Declared

Structure:
```
#define TGRAFILE struct tgrafile
TGRAFILE
    {
    TENTRY ent[1]   /* There is, of course, more that one note
                       in the array. However, since this
                       structure is dynamically allocated and
                       there is only one record in TGRAFILE, we
                       can declare this array with only one
                       record and use MAXENTGF to allocate space
                       for as many as the user wants. Pointer
                       arithmetic will take care of the rest
                    */
    };
```

Brief: This structure forms a temporary storage area for the music file.

Discussion:
When Enigma needs to draw a frame, it transfers that frame in a temporary structure, TGRAFILE. This cuts accesses time to the music information since only entry offsets must be figured and no access to the Entry Pool is required.

The Global Group

Area of Control:

The Global Group encompasses all areas which can be determined by a few pieces of data. These areas are wide and diverse within Enigma.

Method of Control:

Enigma uses variables for many of the options it gives the user. The easiest method of discussion here is to list the variables and what they control.

```
twobyte MAXOTHERS;
twobyte MAXDTAILS;
twobyte MAXGF;
twobyte MAXENTGF;
```
These variables define the number of records allotted to each record-oriented structure in Enigma. MAXOTHERS defines the number of records in the Other Group. MAXDTAIL defines the number of records in the Detail Group. MAXGF defines the number of records in the Grafile Group under GRAFILE. MAXENTGF defines the number of entries in the Grafile Group under TGRAFILE.

```
float BEZIERSTEP;
```
When Enigma is calculating a bezier curve, it uses this number to increment the steps from 0 to 1. This number should be in the range of greater than zero and less than one. It is in floating point. The larger the number, the faster the execution but the sloppier the curves.

```
twobyte uDEFCLEF;
```
If an instrument does not have an ISPEC record, Enigma will default to using this clef for the instrument.

```
twobyte uDEFKEY;
twobyte uDEFBEATS;
twobyte uDEFDVIBEAT;
twobyte uDEFALTTOP;
twobyte uDEFALTBOT;
```
These varibales are defaulted to in the construction of an arbitrary music measure if Enigma can not find an ARBHEADER record of the measure.

```
twobyte uDOTRANSPOSE;
```
If this variable is greater than zero, Enigma will use the transposition element of an instrument's ISPEC to reset the key signature before drawing the music connected to that instrument (See discussion of ISPEC under the Other Group).

```
twobyte TABSPACES;
```
This variable holds the number of spaces in a tab.

The Global Group. 2

```
twobyte uDATEFORM;
twobyte NEEDSECS;
```

Enigma uses these variables when printing the date and time. uDATEFORM can be 0, 1, or 2 corresponding to twobyte form (11/5/58), fourbyte form (November 5, 1958) and abbreviated form (Nov. 5, 1958). NEEDSECS is set if Enigma should print seconds with the time of day.

```
char    CHRDFONT;
char    CHRDSIZE;
twobyte CHRDEFX;
```

These variables hold the font, size and effects for the text of chord symbols.

```
char    ENDGFONT;
char    ENDGSIZE;
twobyte ENDGEFX;
```

These variables hold the font, size and effects for the text of opening ending brackets.

```
char    TIMEFONT;
char    TIMESIZE;
twobyte TIMEEFX;
```

These variables hold the font, size and effects for the text of time signatures.

```
twobyte KEYFONT;
twobyte KEYSIZE;
twobyte KEYEFX;
```

These variables hold the font, size and effects for the text of key signatures.

```
twobyte CLEFFONT;
```

This variable holds the font for clefs.

```
twobyte uNAMEPOS;
twobyte uNAMELINE;
```

These variables hold the positionall displacements for a name of an instrument when it is drawn with out the benefit of a NSPEC record (See discussion of NSPEC).

```
twobyte uNAMEFONT;
twobyte uNAMESIZE;
twobyte uNAMEEFX;
```

These variables hold the font, size and effects for the text of instrument names drawn with out the benefit of a NSPEC record (See discussion of NSPEC).

```
twobyte MUSICFONT;
twobyte MUSICSIZE;
twobyte MUSICEFX;
```

These variables hold the font, size and effects for the music symbols.

The Global Group. 3

```
twobyte STAFF;
twobyte QUARTHEAD;
twobyte HALFHEAD;
twobyte WHOLEHEAD;
twobyte DWHOLEHEAD;
twobyte NATURAL;
twobyte FLAT;
twobyte SHARP;
```

```
twobyte DBLSHARP;
twobyte DBLFLAT;
twobyte DOT;
twobyte FLGUP;
twobyte FLGDN;
twobyte BREST;
twobyte DWREST;
twobyte WREST;
twobyte HREST;
twobyte QREST;
twobyte EREST;
twobyte SREST;
twobyte TREST;
twobyte SXREST;
twobyte LEDGER;
twobyte TENUDO;
twobyte ROLLPNO;
```
These variables hold the numbers of the characters in a music font which correspond to the variable name.

```
twobyte ASCIINATURAL;
twobyte ASCIIFLAT;
twobyte ASCIISHARP;
twobyte ASCIIDSHARP;
twobyte ASCIIDFLAT;
```
These variables hold the numbers of the characters for the accidentals for chord symbols.

```
twobyte uDOkeyCANCEL;
```
This variable determines whether Enigma will cancel an old key signature before drawing the new one. Set for cancellation.

```
twobyte uDOcSTART;
```
If the first measure of the line is in a key signature without accidental and the last measure of the last line was a measure with accidental, Enigma cancelled the accidentals at the end of the last line. If this variable is set, Enigma will restrike the cancellation accidentals at the beginning of the new line.

```
twobyte uDOBANKDIFF;
```
If this variable is set, Enigma will notice differences in key format number when considering whether to cancel a key signature be fore drawing the new one.

```
twobyte uEMCPERCENT;
twobyte uEMCPOSADD;
```
These variable contain information for end-of-measure clef changes. The hold the percentage at which to draw the clef and the positional adjustment to apply to the clef respectively.

The Global Group. 4

```
twobyte sSTROKE = 8;
twobyte sSPACE = 12;
```
These variables determine the number of virtual page units in a stroke and space respectively.

```
fourbyte  uSTDTOP;
fourbyte  uSTDLEFT;
fourbyte  uSTDBOT;
fourbyte  uSTDRITE;
```

These variables form defaultt page boundaries in the absence of a PSPEC record. (See discussion of PSPEC in the Other Group).

```
twobyte uPTOPADJ;
twobyte uPLEFTADJ;
twobyte uPBOTADJ;
twobyte uPRITEADJ;
```

These variables form default page offsets in the absence of a PAGEOFFSET record. (See discussion of PAGEOFFSET in the Other Group).

```
twobyte uSTOPADJ;
twobyte uSLEFTADJ;
twobyte uSRITEADJ;
twobyte uSXTRASPACE;
```

These variables form stave margins in the absence of a SSPEC record. (See discussion of SSPEC in the Other Group).

```
twobyte uCLEFfSEP;
twobyte uCLEFbSEP;
```

These variables hold the amount of space, in terms of virtual horizontal units, to reserve in front and back of the clef, respectively.

```
twobyte uKEYfSEP;
twobyte uKEYbSEP;
twobyte uKEYmSEP;
```

These variables hold the amount of space, in terms of virtual horizontal units, to reserve in front, back and between the cancelled and new key signatures, respectively.

```
twobyte uTIMEfSEP = 4;
twobyte uTIMEbSEP = 0;
```

These variables hold the amount of space, in terms of virtual horizontal units, to reserve in front and back of the time signature, respectively.

```
twobyte uENCLOSEXP[16];
```

This array holds the amount of space to add to the boundaries of an enclosure for each type of enclosure in positions 1 through 7 and each type of enclosure with the EQUALITY bit is set in positions 9 through 15 (See SIDES in the flag element of the REPTSPEC record in the Other Group).

```
twobyte uMAXSLOPE;
```

This variable defines the maximum slope allowed for a beam line in terms of the y differential in virtual page vertical units.

The Global Group. 5

```
twobyte uBEAMWIDTH;
```

This variable defines the width of the beam.

```
twobyte uHMBEAMTIP;
```

This variables defines the maximum distance allowed between the closest beam tip and the middle line of the staff in terms of the virtual page vertical units.

```
twobyte uSTEMLENGTH;
twobyte uSTEM2;
```

These variables determine the length of a normal and shortened stem, respectively, in terms of the virtual page vertical units.

```
twobyte uREVSTEMADJ;
```
This variable determines the harmonic level adjustment assign to a note head the is reverse stemmed.

```
twobyte uOVERLAP;
```
This variable determines the number of vertical units allowed between two accidentals in the same horizontal position.

```
twobyte GRACEPERC;
```
This variable determine the percentage of reduction for grace notes.

```
twobyte uDEFFLOAT;
```
This variable determines the number of decimal places the fraction printing routine will execute to.

```
twobyte FASTTIE;
```
This variable determines whether a tie will be drawn as a bezier curve or three lines. The lines are much faster. Set for fast.

```
twobyte uENDTIEADD;
twobyte uFTIEHEIGHT;
twobyte uFTIEINSET;
```
These three variables are used when drawing fast ties.

```
twobyte uTIEHEIGHT;
twobyte uTIEINSET;
```
These three variables are used when drawing bezier ties.

```
twobyte FASTBRAC;
```
Some bracket, like ties, can be drawn fast or slow. The piano brace is a good example. This variable determines whether these brackets will be drawn fast or slow.

The Text Group

Area of Control:

The Text Group is an ASCII file. Within the file two type of text are defined: Lyrics and Text Block.

Method of Control:

The Text Group is command-oriented. These commands define the type and subtype of the text and text appearance changes. The command lines must be isolated by white space (a space or any non-printing character) for Enigma to recognize them.

Each command starts with an '^'. There are three commands for type of text.

```
^lyrics()
```
    If the parenthesis are empty, the lyrics found in the section will be available to all instruments. If the lyrics should be only available to certain instruments or insturment groups, the names of these instruments or instrment groups should be placed in the parenthesis separated by commas.

Lyrics will continue until terminated by another type command. Lyrics has three subtypes:

```
^verse(#)
^chorus(#)
^section(#)
```
        Each subtype command must have the number of the subtype in the parenthesis. The number is in the range 1 to 32767. The subtype will continue until terminated by another subtype command or a type command.

```
^text()
```
        If the parenthesis are empty, the text blocks found in the section will be available to all instruments. If the text blocks should be only available to certain instruments or instrument groups, the names of these instruments or instrument groups should be placed in the parenthesis separated by commas.

Text blocks will continue until terminated by another type command. Text blocks has one subtypes:

```
^block(#)
```
        The subtype command must have the number of the subtype in the parenthesis. The number is in the range 1 to 32767. The subtype will continue until terminated by another subtype command or a type command.

The text appearance change commands transcend types and subtype. They remain in effect until another text appearance change command. There are three commands:

```
^font(name)
```
        This command changes the font of the text. The parenthesis contain the name of the font to change to. This name is compared against all STRINGS records in the Other Group under the tag 'FN' (Font Name, See discussion of STRINGS in the Other Group). If a match is found, Enigma will change to that font.

```
^size(#)
```
        This command changes the size of the text. The parenthesis contain the size of the font to change to. It is in the range 1 to 255.

```
^efx(name)
```
        This command changes the effects applied to the text. The parenthesis contain the name of the effect. The effects are cumulative. This name is compared against all STRINGS records in the Other Group under the tag 'EN' (Effect Name, See discussion of STRINGS in the Other Group). If a match is found, Enigma add the effect. The command line ^efx(plain) resets the text to plain text.

A Tag List for Others

| Tag | Structure Name | Description |
|---|---|---|
| AB | ARBBOUNDS | Arbitrary Music Bounds Specification |
| AC | TDIALATION | Performance Information for Time Dilation |
| AH | ARBHEADER | Arbitrary Music Header Specification |
| AM | ARBMUSIC | Arbitrary Music Specification |
| An | AAMOUNT | Accidental Alteration Amount (Negative Bank) |
| Ap | AAMOUNT | Accidental Alteration Amount (Positive Bank) |
| BC | BEATCHART | Alternate Positioning Chart by Beats |
| BI | SEPERATES | Seperate Position Placement |
| BR | BACKREPT | Backward Bar Repeat Specification |

| | | |
|---|---|---|
| CE | CLEFENUM | Inter-Measure Clef Changes List |
| CS | CSPEC | Core Specification |
| DA | DURALLOT | Duration Allotment for Proportional Spacing |
| DB | DATABLOCK | Data Array in Words |
| DC | ILIST | Inst List for Individual Placement of Dynamics (score) |
| dc | ILIST | Inst List for Individual Placement of Dynamics (parts) |
| De | ENCLSPEC | Dynamic Enclosure Specification |
| DI | SEPERATES | Seperate Position Placement |
| DO | DOBJSPEC | Dynamic Object Specification |
| DT | DTXTSPEC | Dynamic Text Specification |
| DY | DYNAMIC | Dynamic Assignment |
| EB | DATABLOCK | Text Shapes Exception Block |
| EE | REPTENUM | Repeat Actuators Enumeration |
| EI | SEPERATES | Seperate Position Placement |
| EN | STRINGS | Effects Name |
| ES | ENDSTART | Ending Bracket Repeat Specification |
| ET | ENDGTEXT | Ending Bracket Text |
| FA | FRAMEATTS | Frame Attributes |
| FM | FREEZMEAS | Frozen Measure Group |
| FN | STRINGS | Font Name |
| FR | FRAMESPEC | Frame Specification |
| FS | FROZENSTAVE | Frozen Stave Specification |
| Fs | FROZENSPLIT | Frozen Measure Split Specification |
| GN | STRINGS | Group Name |
| GP | DATABLOCK | Group Pool (Delivers the next group ID to use) |
| GS | GSPEC | Instrument Group Specification |
| He | ENCLSPEC | Header Enclosure Specification |
| HS | HEADSPEC | Header Specification |
| HT | STRINGS | Header Text |
| IA | INSTATTS | Instrument Attributes |
| IK | DATABLOCK | Suffix Interval Keynumber Offsets |
| IL | ILIST | Instrument List |
| IN | STRINGS | Instrument Name |
| IO | ILIST | Inst List for Individual Override for Dynamics (score) |
| io | ILIST | Inst List for Individual Override for Dynamics (parts) |
| IP | DATABLOCK | Instrument Pool (Delivers the next instrument ID to use) |
| IS | ISPEC | Instrument Specification |
| IU | INSTUSED | Stave Instrument Usage |
| IV | INTVBANK | Interval (or Suffix) Bank |
| IX | IMRKDEF | Intepretive Mark Definition |
| KA | KEYSATTRIB | Key Format Attributes |
| KF | KEYFORMAT | Alterniate Key Format Specification |
| KL | CLIPSPEC | Clip Specification |
| KM | KEYMAP | Key Mapping for Relationship of Semi to Scaletones |
| LB | LONGBLOCK | Data Array in Longs |
| LI | SEPERATES | Ending Bracket Text Seperate Position Placement |
| Me | ENCLSPEC | Measure Number Enclosure Specification |
| MI | SEPERATES | Individual Positioning for Measure Numbers |
| MM | ARBASSIGN | Arbitrary Music Measure Assignment |
| MN | MENUMAP | Measure Number Specification Map |
| Mn | MENU2MAP | Secondary Measure Number Specification Map |
| MO | ILIST | Measure Number Individual Override |
| MP | DATABLOCK | Initial Patch Settings for MIDI Channels |
| MS | MSPEC | Measure Specification |
| NS | NAMESPEC | Instrument Name Specification |
| OC | DATABLOCK | Output Route (Channel) Mapping to Midi Channels |
| On | ACCIORDER | Accidental Alteration Order List (Negative Bank) |
| Op | ACCIORDER | Accidental Alteration Order List (Negative Bank) |
| PD | PLAYDUMP | Dump String Enumeration for Text Dynamics |
| Pd | PLAYDUMP | Dump String Enumeration for Object Dynamics |

| Tag | Structure Name | Description |
|---|---|---|
| PL | PLAYINST | Instrument Output Channel Configuration |
| PM | PARBMUSIC | Arbitrary Music Page Assignment |
| PO | PAGEOFFSET | Page Coordinate Offsets |
| PP | PERCENTS | Page Percentage Reduction/Enlargements |
| PS | PSPEC | Page Specification |
| PT | TEXTBLOCK | Text Block Definition |
| pT | PTXTTIE | Text Block Assignment to Page |
| RI | SEPERATES | Repeat Seperate Position Placement |
| RO | ILIST | Repeat Individual Override |
| RS | REPTSPEC | Repeat Specification |
| RS | REPTENUM | Repeat Actuators Enumeration (Incident of 1) |
| RT | REPTTEXT | Repeat Text |
| RU | REPSUSED | Repeat Assignment |
| Rx | ENCLSPEC | Repeat Enclosure Specification |
| SB | SHAPEDATA | Shape Definition Data |
| SD | SHAPEDEF | Shape Definition |
| SL | SHAPELIST | Shape Definition Instruction List |
| SP | PERCENTS | Stave Percentage Reduction/Enlargements |
| SS | SSPEC | Stave Specification |
| TD | TXTLAYOUT | Text Layout for Text Block Assignment |
| TL | TIMELOWER | Alternate Time Signature Lower Half |
| Tn | FSTKEY | Tone Centers for Key Format (Negative Bank) |
| Tp | FSTKEY | Tone Centers for Key Format (Positive Bank) |
| TU | TIMEUPPER | Alternate Time Signature Upper Half |
| XI | XISPEC | Part Extraction Rest Measure Specifcation |
| XL | DATABLOCK | Executable Shape Sample List |
| XS | EXECSHAPE | Executable Shape Definition |

Reserved tags not in use: BP cP FP sP vP

The system designer can utilize the others structure for temporary storage by using tags which begin with '_'. For instance in Finale™1.0.0 (Mac Version) the tag _D is used for display lists. The Virtual Memory Routines by Jim Rauser are smart enough to strip these out on file closure.

Finale™1.0.0 uses the tag TO to remember the setting of the tool sets.

A Tag List for Details

| Tag | Structure Name | Description |
|---|---|---|
| AC | PERFDATA | Performance Data for Captured Performance |
| AS | ALTS | Alternate Sizing |
| BH | BMHI | Beam High Alteration |
| Bh | SBMALT | Secondary Beam Alteration (High) |
| BL | BMLO | Beam Low Alteration |
| Bl | SBMALT | Secondary Beam Alteration (Low) |
| BM | BEAMCHART | Beaming Chart |
| CD | CROSSTAFF | Cross Staff Information |
| CH | CHRD | Chord Symbol |
| ch | LYRDATA | Choruses |
| CL | LYRICLINES | Base Line Offsets for Vertical Positioning of Chords |
| CN | CUEN | Cued Note |
| Cn | CLEFOCTV | Clef/Octave Delineation for Key Formats (Negative Bank) |
| Cp | CLEFOCTV | Clef/Octave Delineation for key Formats (Positive Bank) |
| DE | BEAMEXTEND | DownStem Beam Extension |
| ED | EDYNAMIC | Entry Level Dynamic Assignment |
| FL | FLOATS | Floating Key and Time Chart |
| GF | GFHOLD | Grafile Record Assignment Chart |
| HH | HHOCKSPEC | Horizontal Hocketting Note Selection Charts |
| HI | SHAPENOTE | Instrument Shape Note Head Data Files |
| HR | SHAPENOTE | Frame Shape Note Head Data Files |

| | | |
|---|---|---|
| IM | IMRK | Interpretive Mark |
| KS | DTSTRING | Symbol Lists for Replacing Accidentals |
| LD | LDLINE | Line Spacing Delineation Charts |
| LP | DTPERCENT | Line Percentage Enduction Chart |
| ME | MIDIEXPRS | MIDI Expressions |
| MM | MARBMUSIC | Arbitrary Music Assignment for Measures |
| MT | MXTTIE | Text Block to Measure Assignment |
| RP | RPNO | Roll Piano Mark (Iterated Interpretive Marks) |
| sB | DTSTRING | Secondary Beam Break Information |
| se | LYRDATA | Sections |
| SL | STEMDEF | Alternate DownStem Definition |
| ST | STHG | Stem Height Alteration |
| SU | STEMDEF | Alternate UpStem Definition |
| Te | TIEALTER | End Tie Alteration Information |
| TN | TUPN | Tuplet Number Specification |
| TP | TUPL | Tuplet Specification |
| Ts | TIEALTER | Start Tie Alteration Information |
| UE | BEAMEXTEND | UpStem Beam Extension |
| ve | LYRDATA | Verses |

Additional tags are used for the baseline offset of verses, choruses and sections in the display of lyrics. These tags are compiled from the type of lyric (verse, chorus, section) and the number of the lyric. The tag is formatted in three parts. The most significant bit is always on to indicate this is a lyric baseline offsets record (Enigma protocal limits tags to positive ASCII characters). The next three bits delineate 0, 1 or 2 for verse, chorus and section respectively. The last twelve bits hold the number of the verse, chorus, or section. So the tag for a LYRICLINES record of chorus three would be: 1001000000000011 or 0x9003.

An Approximate Nesting and Access Order.

| | |
|---|---|
| CSPEC | Other Group |
|     FLOATS | Detail Group |
| INSTLIST (global) | Other Group |
| MENUMAP | Other Group |
| MENU2MAP | Other Group |
|     SEPERATES (MI) | Other Group |
|     ILIST (MO) | Other Group |
|     STRINGS (FN) | Other Group |
|     STRINGS (EN) | Other Group |
| PSPEC | Other Group |
|     CLIPSPEC | Other Group |
|     PAGEOFFSET | Other Group |
|     PERCENTS (PP) | Other Group |
|     TEXTBLOCK (PT) | Other Group |
|         TXTLAYOUT | Other Group |
|         SHAPEDEF | Other Group |
|             SHAPELIST | Other Group |
|             SHAPEDATA | Other Group |
|         TEXTGROUP | Text Group |
|         LDLINE | Detail Group |
|         STRINGS (FN) | Other Group |
|         STRINGS (EN) | Other Group |
|         STRINGS (IN) | Other Group |
|         STRINGS (GN) | Other Group |

|  |  |
|---|---|
| PARBMUSIC | Other Group |
|     ARBMUSIC | Other Group |
|     ARBHEADER | Other Group |
|     ARBBOUNDS | Other Group |
|  |  |
| .HEADSPEC | Other Group |
|     STRINGS (HT) | Other Group |
|  |  |
| SSPEC | Other Group |
|     INSTLIST (local) | Other Group |
|     PERCENTS (SP) | Other Group |
|     DTPERCENT | Detail Group |
|     NAMESPEC | Other Group |
|         STRINGS (IN) | Other Group |
|     FROZENSTAVE | Other Group |
|     FROZENSPLIT | Other Group |
|  |  |
| GSPEC | Other Group |
| ISPEC | Other Group |

Nesting and Access Order - 2

|  |  |
|---|---|
| MSPEC | Other Group |
|     TIMEUPPER | Other Group |
|     TIMELOWER | Other Group |
|     DATABLOCK (SM) | Other Group |
|     INDVMPOS | Detail Group |
|     BEATCHART | Other Group |
|  |  |
|     MARBMUSIC | Detail Group |
|         ARBMUSIC | Other Group |
|         ARBHEADER | Other Group |
|         ARBBOUNDS | Other Group |
|  |  |
|     MTXTTIE |  |
|         TEXTBLOCK (MT) | Other Group |
|             TXTLAYOUT | Other Group |
|             SHAPEDEF | Other Group |
|                 SHAPELIST | Other Group |
|                 SHAPEDATA | Other Group |
|         TEXTGROUP | Text Group |
|         LDLINE | Detail Group |
|         STRINGS (FN) | Other Group |
|         STRINGS (EN) | Other Group |
|         STRINGS (IN) | Other Group |
|         STRINGS (GN) | Other Group |
|  |  |
|     DYNAMIC | Other Group |
|         DTXTSPEC | Other Group |
|         DOBJSPEC | Other Group |
|             SHAPELIST | Other Group |
|             SHAPEDATA | Other Group |
|         SEPERATES (DI) | Other Group |
|         ILIST (IO) | Other Group |
|         STINGS (FN) | Other Group |
|         STRINGS (EN) | Other Group |
|  |  |
|     BACKREPT | Other Group |
|         SEPERATES (BI) | Other Group |

| | |
|---|---|
| ENDSTART | Other Group |
|     SEPERATES (EI) | Other Group |
|     SEPERATES (LI) | Other Group |
|     ILIST(RO) | Other Group |
|     ENDGTEXT | Other Group |
|     STRINGS (FN) | Other Group |
|     STRINGS (EN) | Other Group |
| REPSUSED | Other Group |
|     REPTSPEC | Other Group |
|     REPTTEXT | Other Group |
|     SEPERATES (RI) | Other Group |
|     ILIST(RO) | Other Group |
|     STRINGS (FN) | Other Group |
|     STRINGS (EN) | Other Group |

Nesting and Access Order - 3

| | |
|---|---|
| GFHOLD | Detail Group |
|     FRAMESPEC | Other Group |
|     FRAMEATTS | Other Group |
|         BEAMCHART | Detail Group |
|     CLEFENUM | Other Group |
|     ENTRY | Entry Pool |
|     TGRAFILE | Entry Pool |
|         TENTRY | Entry Pool |
|         CHRD | Detail Group |
|             INTVBANK | Other Group |
|         CUEN | Detail Group |
|         ALTS | Detail Group |
|         IMRK | Detail Group |
|         RPNO | Detail Group |
|         ITXT | Detail Group |
|         TUPN | Detail Group |
|         TUPL | Detail Group |
|         LYRDATA | Detail Group |
|         WEXT | Detail Group |
|         BEAMEXTEND | Detail Group |
|         STGH | Detail Group |
|         BMHI | Detail Group |
|         BMLO | Detail Group |
|     STEMDEF | Detail Group |
|         SHAPEDEF | Other Group |
|         SHAPELIST | Other Group |
|         SHAPEDATA | Other Group |
|     KEYFORMAT | Other Group |
|         FSTKEY | Other Group |
|         KEYMAP | Other Group |
|         ACCIORDER | Other Group |
|         AAMOUNT | Other Group |

I claim:

1. An apparatus for electronically storing and processing music information comprised of notes and rests to produce guitar fingerboards associated with said notes of said music information, the apparatus comprising:

means for receiving electronic signals representing a time-ordered sequence of said notes and rests in a musical composition to be performed by one or more sound sources;

means for identifying in said electronic signals the pitch of each note and the duration of each note and rest and means for assigning each note and rest to a first measure and succeeding sequentially ordered measures for an associated one of said sound sources;

means for storing an electronic representation of the pitch and duration of each note and the duration of each rest in a computer memory array;

means for retrieving the electronic representations of the pitch and duration of each note and the duration of each rest from said computer memory array;

means for translating all of the retrieved electronic representations associated with a single sound source into a first graphical representation of a musical staff with notes, chords and rests; and means for automatically producing a second graphical representation of a guitar fingerboard associated with selected ones of said chords in said first graphical representation to be displayed along with said first graphical representation.

2. The apparatus as recited in claim I wherein the pitch of each note and chord is expressed as a base value and a displacement from said base value.

3. The apparatus as recited in claim I wherein the duration of each note, each chord and each rest is expressed as one or more beat units, said beat unit being a specified absolute time interval.

4. The apparatus as recited in claim 1 wherein the means for storing an electronic representation of the pitch and duration of each note and each chord and the duration of each rest is a digital computer memory having a field format that is the same for each note, chord and rest.

5. The apparatus as recited in claim 4 wherein said field format comprises:
a comparator field for defining a sequential position;
a tag field for differentiating various acoustic or graphic attributes associated with a note, a chord, a rest, or a musical composition; and
a data field containing encoded data expressing one or more of said attributes or a pointer leading to one or more of said attributes.

6. The apparatus as recited in claim I wherein said computer memory array is comprised of a two dimensional framework of storage nodes, each storage node being associated with a unique one of said first and succeeding measures and a unique one of said one or more sound sources and at least one additional dimension implemented by vectors associated with one or more of said storage nodes, with said vectors containing additional electronic representations specifying graphical representations of textual, interpretive, pitch or duration attributes associated with the notes in the storage node associated with said vector.

7. A method for representing musical information as guitar fingerboards using a programmable data processing system, comprising means for entering musical information, a means for storing the musical information and a means for displaying said musical information and guitar fingerboards, the steps comprising:
providing said programmable data processing system with a plurality of data signals representing notes of said musical information, including chords;
storing the plurality of data signals in said storing means; and
using said programmable data processing system to perform the steps of:
representing a chord as a series of key numbers, including a base root and an alternate base root;
creating a hash value for said chord by combining said series of key numbers;
using said base roots, automatically matching said hash value with a computer memory array of fingerboard records stored in said storing means and containing a series of fingerboard fretting positions for a plurality of said base roots; and
displaying, on the displaying means, the matched fingerboard record associated with said hash value in rhythmic alignment with said chord along with a display of said notes corresponding to said data signals entered as said musical information.

8. The method of claim 7 wherein said array of fingerboard records includes a unique combination of one of said base roots and said hash value for each fingerboard record.

9. The method of claim 8 wherein said step of automatically matching said hash value includes the step of searching said array of fingerboard records for all fingerboard records that match said base root and then searching those fingerboard records for an exact match of said hash value.

10. The method of claim 7 wherein the step of automatically matching said hash value includes the steps of:
performing a crossmatch of said array of fingerboard records using said base root;
performing a crossmatch of said array of fingerboard records using said alternate base root; and
selecting the fingerboard record that is the highest weighted match based on how many notes in said chord are missing when compared to said fingerboard record and on how high a chord interval match exists compared to said fingerboard record.

11. A method for automatically producing guitar fingerboards for a musical notation system that uses a programmable data processing system for receiving user commands and musical information, and for storing, manipulating and displaying said musical information, the method comprising the steps of:
providing said programmable data processing system with music data which represents said musical information in the form of notes, chords and rests associated with one or more sound sources;
selecting with a user-command one of said sound sources; and displaying said music data as a set of graphical representations of said notes, chords and rests associated with a staff representing said user-selected sound source;
for each chord associated with each user-selected sound source, dynamically producing a guitar fingerboard symbol representative of that chord; and
simultaneously displaying said guitar fingerboard symbol associated with each of said chords in rhythmic and harmonic alignment with the display of said graphical representations of said notes, rests and chords.

12. The method of claim 11 wherein said step of dynamically producing a guitar fingerboard symbol is based upon an automatic analysis of the chord notation associated with each chord and wherein said chord notation is represented in a common data structure.

13. The method of claim 12 wherein said automatic analysis of said chord notation is accomplished by using an array of fingerboard records stored in the programmable data processing system that represents fretting combinations for a guitar fingerboard and matching said chord notation with an appropriate fretting combination for that chord.

14. The method of claim 12 wherein said automatic analysis of the chord notation includes the steps of:
representing each chord as a series of key numbers, including a base root and an alternate base root;
creating a hash value for each chord by combining the series of key numbers; and using said base roots, automatically matching said hash value with an array of fingerboard records stored in the programmable data processing system containing fretting combinations for a guitar fingerboard for a plurality of said base roots.

15. The method of claim 11 wherein said step of dynamically producing a guitar fingerboard symbol produces guitar finger board symbols having fretting combinations only when there is an exact match between said chord and the fretting combinations of one of the guitar fingerboard symbols.

16. The method of claim 11 wherein said step of dynamically producing a guitar fingerboard symbol produces guitar finger board symbols having fretting combinations that represent the best possible match between said chord and the fretting combinations of one of the guitar fingerboard symbols.

17. A method for electronically storing, processing and displaying music information comprised of notes, chords and rests to produce guitar fingerboards associated with said chords of said music information using a computer and a computer memory, comprising the steps of:

receiving electronic signals representing a time-ordered sequence of said notes, chords and rests in a musical composition to be performed by one or more sound sources;

storing an electronic representation of the pitch and duration of each of said notes and chords and the duration of each of said rests arrayed in said computer memory;

retrieving said electronic representations of the pitch and duration of each note, chord and the duration of each rest from said computer memory array;

translating all of said retrieved electronic representations associated with a single one of said sound sources into a first graphical representation of a musical staff with said notes, chords and rests;

automatically producing a second graphical representation of said guitar fingerboards associated with selected ones of said chords to be displayed along with said first graphical representation;

displaying said first graphical representation as said musical staff associated with said single sound; and displaying said second graphical representation of said guitar fingerboards in conjunction with said first graphical representation, each of said guitar fingerboards being displayed in rhythmic alignment with said selected ones of said chords which correspond to the associated guitar fingerboard.

* * * * *

UNITED STATES PATENT AND TRADEMARK OFFICE
CERTIFICATE OF CORRECTION

PATENT NO. : 5,396,828

DATED : March 14, 1995

INVENTOR(S) : Philip F. Farrand

It is certified that error appears in the above-identified patent and that said Letters Patent is hereby corrected as shown below:

Column 3, line 57, following "the" replace "bass" with --base--; following "alternate" replace "bass" with --base--.

Column 3, line 62, replace "bass" with --base--.

Column 5, line 34, replace "note" with --notes--.

Column 13, line 17, replace "physical sequentially" with --physically sequential arrangement--.

Column 15, line 66, replace "f" with --F--.

Column 16, line 31, replace "type" with --types--.

Column 16, line 64, replace "frame" with --Frame--.

Column 16, line 68, replace "frame" with --Frame--.

Column 19, line 25, replace "frame" with --Frame--.

Column 20, line 66, replace "frame" with --Frame--.

Column 22, line 36, replace "frame" with --Frame--.

Column 33, line 32, replace "frame" with --Frame--.

Column 17, line 21, replace "format" with --Format--.

Column 20, line 62, replace "format" with --Format--.

Column 21, line 62, replace "framework" with --Framework--.

Column 21, line 63, replace "framework" with --Framework--.

UNITED STATES PATENT AND TRADEMARK OFFICE
CERTIFICATE OF CORRECTION

PATENT NO. : 5,396,828

DATED : March 14, 1995

INVENTOR(S) : Philip F. Farrand

It is certified that error appears in the above-identified patent and that said Letters Patent is hereby corrected as shown below:

Column 33, line 33, replace "framework" with --Framework--.

Column 24, line 67, replace "structure-" with --structure--.

Column 26, line 53, replace "file" with --File--.

Column 27, line 35, replace "it" with --its--.

Column 29, line 62, replace "variable" with --variables--.

Column 31, line 17, following "is" insert--a--.

Column 31, line 49, replace "bit" with --bits--.

Column 32, line 63, replace "This" with --These--.

Column 34, line 35, replace "graphical with --graphically--.

Column 35, line 31, replace "BEADSPEC" with --HEADSPEC--.

Column 35, line 37, replace IUST with --ILIST--.

Column 35, line 47, replace "KEYIVIAP" with --KEYMAP--.

Column 37, line 47, replace "determine" with --determines--.

Column 37, line 59, replace "frets" with --FRETS--.

Column 38, line 29, replace "frets" with --FRETS--.

UNITED STATES PATENT AND TRADEMARK OFFICE
CERTIFICATE OF CORRECTION

PATENT NO. : 5,396,828

DATED : March 14, 1995

INVENTOR(S) : Philip F. Farrand

It is certified that error appears in the above-identified patent and that said Letters Patent is hereby corrected as shown below:

Column 38, line 28, replace "one" with --Once--.

Column 38, line 57, replace "fingerboard" with --fingerboards--.

Column 344, line 63, following "sound" insert --sources;--.

Column 347, line 14, replace "fingerboard" with --fingerboard--.

Column 348, line 19, following "sound" insert --source--.

Signed and Sealed this

Twentieth Day of February, 1996

Attest:

BRUCE LEHMAN

Attesting Officer

Commissioner of Patents and Trademarks